(12) United States Patent
Nakatsukasa

(10) Patent No.: US 8,743,374 B2
(45) Date of Patent: Jun. 3, 2014

(54) SHAPE MEASURING DEVICE, SHAPE MEASURING METHOD, AND SHAPE MEASURING PROGRAM

(71) Applicant: Keyence Corporation, Osaka (JP)

(72) Inventor: Takashi Nakatsukasa, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 13/957,522

(22) Filed: Aug. 2, 2013

(65) Prior Publication Data

US 2014/0071458 A1   Mar. 13, 2014

(30) Foreign Application Priority Data

Sep. 11, 2012 (JP) ................................. 2012-199983

(51) Int. Cl.
*G01B 11/24* (2006.01)
(52) U.S. Cl.
CPC ....................................... *G01B 11/24* (2013.01)
USPC ............................ 356/603; 356/602; 356/614
(58) Field of Classification Search
CPC ........................................................ G01B 11/24
USPC .................................................. 356/601–625
See application file for complete search history.

(56) References Cited

U.S. PATENT DOCUMENTS

| | | | | |
|---|---|---|---|---|
| 5,104,227 | A * | 4/1992 | Uesugi et al. ................. | 356/607 |
| 5,747,822 | A * | 5/1998 | Sinclair et al. ............ | 250/559.19 |
| 5,847,833 | A * | 12/1998 | Yokoyama et al. ........... | 356/613 |
| 6,291,817 | B1 * | 9/2001 | Kobayashi et al. ....... | 250/237 G |
| 6,996,266 | B2 * | 2/2006 | Hamaguchi .................. | 382/154 |
| 2003/0107747 | A1 * | 6/2003 | Iwasaki .......................... | 356/601 |
| 2008/0094643 | A1 * | 4/2008 | Nishio et al. .................. | 356/623 |
| 2009/0046301 | A1 * | 2/2009 | Asakura et al. ............... | 356/610 |
| 2012/0013616 | A1 * | 1/2012 | Uesaki .......................... | 345/419 |
| 2012/0106788 | A1 * | 5/2012 | Inomata ........................ | 382/103 |

OTHER PUBLICATIONS

Bergmann, Dirk, "New approach for automatic surface reconstruction with coded light," Remote Sensing and Reconstruction for Three-Dimensional Objects and Scenes from Proceedings of SPIE—The International Society for Optical Engineering, Jul. 9-10, 1995, San Diego, CA, vol. 2572, pp. 2-9 (9 pages including cover page).
Gühring, Jens, "Dense 3-D surface acquisition by structured light using off-the-shelf components," Videometrics and Optical Methods for 3D Shape Measurement from Proceedings of SPIE—The International Society for Optical Engineering, Jan. 22-23, 2001, San Jose, USA, vol. 4309, pp. 220-231 (13 pages including cover page).

* cited by examiner

*Primary Examiner* — Sang Nguyen
(74) *Attorney, Agent, or Firm* — Kilyk & Bowersox, P.L.L.C.

(57) ABSTRACT

The invention provide a shape measuring device, a shape measuring method, and a shape measuring program capable of clearly observing a surface state of a measuring object while measuring a shape of the measuring object at high accuracy. Light irradiated by a light projecting unit is reflected by a measuring object and received by a light receiving unit. Stereoscopic shape data of the measuring object is generated by a triangular distance measuring method. The light irradiated by the light projecting unit is reflected by the measuring object and received by the light receiving unit. All-focus texture image data of the measuring object is generated by synthesizing texture image data of a plurality of portions of the measuring object while changing a focus position of the light receiving unit. The stereoscopic shape data and the all-focus texture image data are synthesized to generate synthesized data.

14 Claims, 82 Drawing Sheets

FIRST

SEVENTH

THIRTEENTH

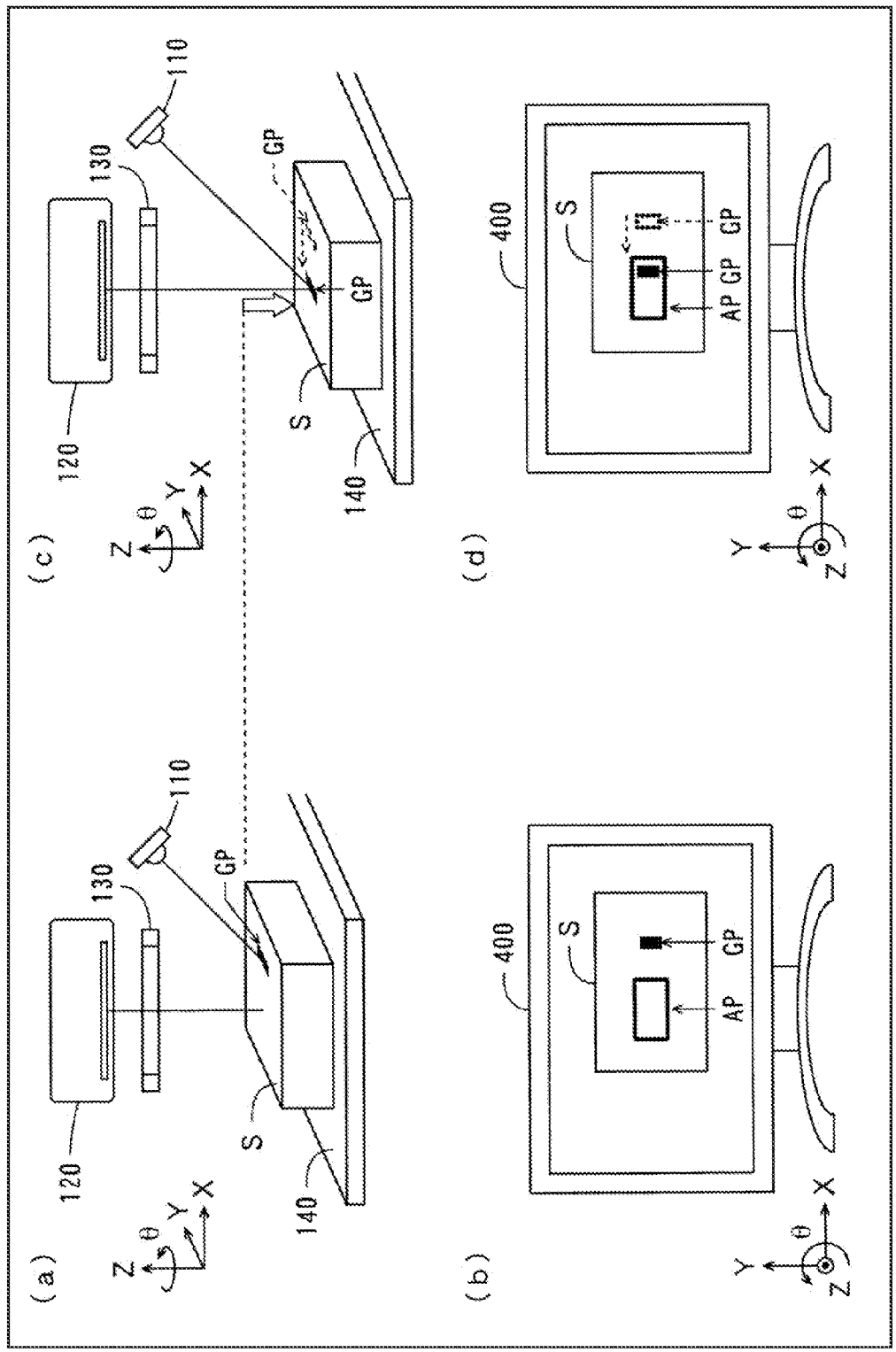

SHAPE MEASURING DEVICE, SHAPE MEASURING METHOD, AND SHAPE MEASURING PROGRAM

CROSS-REFERENCE TO RELATED APPLICATIONS

The present application claims foreign priority based on Japanese Patent Application No. 2012-199983, filed Sep. 11, 2012, the contents of which is incorporated herein by reference.

BACKGROUND OF THE INVENTION

1. Field of the Invention

The present invention relates to a shape measuring device, a shape measuring method, and a shape measuring program.

2. Description of Related Art

In the shape measuring device of a triangular distance measuring method, a surface of a measuring object is irradiated with light, and the reflected light is received by a light receiving element including pixels arrayed one-dimensionally or two-dimensionally. The height of the surface of the measuring object can be measured based on a peak position of a light receiving amount distribution obtained by the light receiving element. The shape of the measuring object thus can be measured.

In "Remote Sensing and Reconstruction for Three-Dimensional Objects and Scenes" by Toni F. Schenk, Proceedings of SPIE, Volume 2572, pp. 1-9 (1995), shape measurement of the triangular distance measuring method combining coded light and phase shift method is proposed. In "Videometrics and Optical Methods for 3D Shape Measurement" by Sabry F. El-Hakim and Armin Gruen, Proceedings of SPIE, Volume 4309, pp. 219-231 (2001), shape measurement of the triangular distance measuring method combining coded light and stripe-form light is proposed. In such methods, the accuracy in the shape measurement of the measuring object can be enhanced.

In the shape measurements described in "Remote Sensing and Reconstruction for Three-Dimensional Objects and Scenes" by Toni F. Schenk, Proceedings of SPIE, Volume 2572, pp. 1-9 (1995) and "Videometrics and Optical Methods for 3D Shape Measurement" by Sabry F. El-Hakim and Armin Gruen, Proceedings of SPIE, Volume 4309, pp. 219-231 (2001), the shape of the measuring object can be measured at high accuracy. However, the surface state that does not have a shape such as patterns, hues, or the like provided on the surface of the measuring object cannot be clearly observed.

SUMMARY OF THE INVENTION

It is an object of the present invention to provide a shape measuring device, a shape measuring method, and a shape measuring program capable of clearly observing a surface state of a measuring object while measuring a shape of the measuring object at high accuracy.

(1) A shape measuring device according to one embodiment of the invention includes a stage on which a measuring object is mounted; a light projecting unit configured to irradiate the measuring object mounted on the stage with first light for shape measurement obliquely from above and irradiate the measuring object mounted on the stage with second light for surface state imaging from above or obliquely from above; a light receiving unit arranged above the stage and configured to receive the first light and the second light reflected by the measuring object mounted on the stage and output a light receiving signal indicating a light receiving amount; a first data generating unit configured to generate first stereoscopic shape data indicating a stereoscopic shape of the measuring object by a triangular distance measuring method based on the light receiving signal corresponding to the first light output by the light receiving unit; a relative distance changing unit for changing a focus position of the light receiving unit by changing a relative distance between the light receiving unit and the stage in an optical axis direction of the light receiving unit; a second data generating unit for generating a plurality of pieces of data based on a plurality of light receiving signals corresponding to the second light output by the light receiving unit while changing the focus position by the relative distance changing unit, and generating state data indicating a surface state of the measuring object by extracting and synthesizing a plurality of data portions obtained while focusing on each of a plurality of portions of the measuring object from the plurality of pieces of generated data; a synthesizing unit for generating synthesized data indicating an image in which the stereoscopic shape and the surface state of the measuring object are synthesized by synthesizing the first stereoscopic shape data generated by the first data generating unit and the state data generated by the second data generating unit; and a display section for displaying an image in which the stereoscopic shape and the surface state of the measuring object are synthesized based on the synthesized data generated by the synthesizing unit.

In such a shape measuring device, the measuring object mounted on the stage is irradiated with the first light for shape measurement obliquely from above by the light projecting unit. The first light reflected by the measuring object mounted on the stage is received by the light receiving unit at a position above the stage, and the light receiving signal indicating the light receiving amount is output. The first stereoscopic shape data indicating the stereoscopic shape of the measuring object is generated by the triangular distance measuring method based on the output light receiving signal corresponding to the first light.

The focus position of the light receiving unit is changed by changing the relative distance between the light receiving unit and the stage in the optical axis direction of the light receiving unit. The measuring object mounted on the stage is irradiated with the second light for surface state imaging from above or obliquely from above by the light projecting unit. The second light reflected by the measuring object mounted on the stage is received by the light receiving unit at the position above the stage, and the light receiving signal indicating the light receiving amount is output. A plurality of pieces of data are generated based on the plurality of output light receiving signals corresponding to the second light while changing the focus position. A plurality of data portions obtained while focusing on each of a plurality of portions of the measuring object are extracted from the plurality of pieces of generated data and synthesized to generate the state data indicating the surface state of the measuring object.

The generated first stereoscopic shape data and the generated state data are synthesized to generate the synthesized data indicating an image in which the stereoscopic shape and the surface state of the measuring object are synthesized. The image in which the stereoscopic shape and the surface state of the measuring object are synthesized is displayed on the display section based on the generated synthesized data.

In this case, the first stereoscopic shape data indicates the stereoscopic shape of the measuring object measured at high accuracy by the triangular distance measuring method. The state data is generated by synthesizing the data indicating the surface state of the measuring object when each portion of the measuring object is positioned within the range of the depth of field of the light receiving unit. The state data thus clearly indicates the surface state of the entire surface of the measuring object. The synthesized state indicates the stereoscopic shape of the measuring object measured at high accuracy, and clearly indicates the surface state of the measuring object. Therefore, the surface state of the measuring object can be clearly observed while measuring the shape of the measuring object at high accuracy by displaying on the display section the synthesized image based on the synthesized data.

(2) The light projecting unit may include a first light projecting unit configured to irradiate the measuring object with the first light, and a second light projecting unit configured to irradiate the measuring object with the second light, the first light projecting unit may include a measurement light source for emitting light, and a pattern generating portion for generating the first light by converting the light emitted from the measurement light source to light having a pattern for shape measurement, the first light projecting unit being arranged to emit the first light in a direction tilted by a first angle, which is greater than 0 degrees and smaller than 90 degrees with respect to an optical axis of the light receiving unit, and the second light projecting unit may be arranged to emit the second light having a uniform light amount distribution in a direction parallel to the optical axis of the light receiving unit or in a direction tilted by a second angle, which is smaller than the first angle, with respect to the optical axis of the light receiving unit.

In this case, the first stereoscopic shape data can be easily generated by the triangular distance measuring method by the first light emitted from the first light projecting unit. The second light projecting unit emits the second light in a direction parallel to the optical axis of the light receiving unit or in a direction tilted by the second angle, which is smaller than the first angle, with respect to the optical axis of the light receiving unit, and thus can irradiate the measuring object with the second light while suppressing formation of shades due to irregularities of the measuring object. Therefore, the state data that indicates the surface state of the measuring object more clearly can be generated. The surface state of the measuring object thus can be more clearly observed.

(3) The light projecting unit may include a measurement light source for emitting light, and a pattern generating portion configured to generate the first light by converting the light emitted from the measurement light source to light having a pattern for shape measurement, and to generate the second light by converting the light emitted from the measurement light source to light having a uniform light amount distribution.

In this case, the measuring object can be irradiated with the first light and the second light by a common light projecting unit. The shape measuring device thus can be miniaturized. Furthermore, the manufacturing cost of the shape measuring device can be reduced.

(4) The shape measuring device may further include an operation unit for individually setting a first light amount condition defined by adjusting an intensity of the first light irradiated from the light projecting unit or an exposure time of the light receiving unit when receiving the first light reflected by the measuring object, and a second light amount condition defined by adjusting an intensity of the second light or an exposure time of the light receiving unit when receiving the second light reflected by the measuring object, and for receiving an instruction of the shape measurement from a user, wherein when receiving the instruction of the shape measurement from the user by the operation unit, the first data generating unit may generate the first stereoscopic shape data of the measuring object based on the light receiving signal output by the light receiving unit when the measuring object is irradiated with the first light in the first light amount condition, and the second data generating unit may generate the state data of the measuring object based on the light receiving signal output by the light receiving unit when the measuring object is irradiated with the second light in the second light amount condition.

In this case, the first light amount condition suited for the generation of the first stereoscopic shape data and the second light amount condition suited for the generation of the state data are individually set. The first stereoscopic shape data thus can be generated at higher accuracy, and the state data that more clearly indicates the surface state of the entire surface of the measuring object can be generated. As a result, the surface state of the measuring object can be more clearly observed while measuring the shape of the measuring object at higher accuracy.

(5) The operation unit may be configured to be operable by the user to select execution of any of first and second operation modes, and in the first operation mode, the second data generating unit may generate a plurality of pieces of data based on a plurality of light receiving signals corresponding to the second light output by the light receiving unit with the focus position changed to a plurality of positions by the relative distance changing unit, and generate the state data by extracting and synthesizing a plurality of data portions obtained while focusing on each of a plurality of portions of the measuring object from the plurality of pieces of generated data, and in the second operation mode, the second data generating unit may generate single data based on the light receiving signal corresponding to the second light output by the light receiving unit with the focus position of the light receiving unit fixed, and generate the state data from the single data.

The first operation mode is suited for the shape measurement when the difference in reflectivity or the difference in brightness depending on hue of the plurality of portions of the surface of the measuring object is small, and the dimension of the measuring object in the optical axis direction of the light receiving unit is greater than the depth of field of the light receiving unit. When carrying out the shape measurement of such a measuring object, the user can generate the state data that clearly indicates the surface state of the measuring object in a short time by selecting the first operation mode with the operation unit.

The second operation mode is suited for the shape measurement when the dimension of the measuring object is smaller than the depth of field of the light receiving unit. When carrying out the shape measurement of such a measuring object, the user can generate the state data that clearly indicates the surface state of the measuring object in a shorter time by selecting the second operation mode with the operation unit.

(6) The operation unit may be configured to be operable by the user to select execution of a third operation mode, and in the third operation mode, the second data generating unit may generate a plurality of pieces of data based on a plurality of light receiving signals corresponding to the second light output by the light receiving unit with the exposure time of the light receiving unit or the intensity of the second light changed, synthesize the plurality of pieces of generated data so that a dynamic range of the light receiving unit is enlarged, and generate the state data from the synthesized data.

The third operation mode is suited for the shape measurement when the surface of the measuring object includes a portion of high reflectivity and a portion of low reflectivity, or when the difference in brightness depending on hue is large. When carrying out the shape measurement of such a measuring object, the user can generate the state data that clearly indicates the surface state of the measuring object that does not include overexposure and underexposure by selecting the third operation mode with the operation unit.

(7) The operation unit may be configured to be operable by the user to select execution of a fourth operation mode, and in the fourth operation mode, the second data generating unit may generate a plurality of pieces of data based on a plurality of light receiving signals corresponding to the second light output by the light receiving unit with the exposure time of the light receiving unit or the intensity of the second light changed and the focus position changed to a plurality of positions by the relative distance changing unit, synthesize the plurality of pieces of generated data so that the dynamic range of the light receiving unit is enlarged, and generate the state data by extracting and synthesizing a plurality of data portions obtained while focusing on each of a plurality of portions of the measuring object from the synthesized data.

The fourth operation mode is suited for the shape measurement when the surface of the measuring object includes a portion of high reflectivity and a portion of low reflectivity or when the difference in brightness depending on hue is large, and the dimension of the measuring object is greater than the depth of field of the light receiving unit. When carrying out the shape measurement of such a measuring object, the user can generate the state data that clearly indicates the surface state of the measuring object by selecting the fourth operation mode with the operation unit.

(8) The second data generating unit may generate second stereoscopic shape data indicating a stereoscopic shape of the measuring object based on a relative distance between the light receiving unit and the stage by the relative distance changing unit, and the shape measuring device may further include a determination unit for determining, among the plurality of portions of the first stereoscopic shape data generated by the first data generating unit, a portion where deviation from the second stereoscopic shape data generated by the second data generating unit is greater than a predetermined threshold value.

In this case, the user can recognize, among the plurality of portions of the first stereoscopic shape data, the portion where the deviation from the second stereoscopic shape data is greater than the predetermined threshold value.

(9) The determination unit may display a stereoscopic image of the measuring object on the display section so that the portion of the first stereoscopic shape data where the deviation from the second stereoscopic shape data is greater than the predetermined threshold value is identified based on the first stereoscopic shape data generated by the first data generating unit.

In this case, the user can easily visually recognize, among the plurality of portions of the first stereoscopic shape data, the portion where the deviation from the second stereoscopic shape data is greater than the predetermined threshold value.

(10) The determination unit may interpolate, among the first stereoscopic shape data, the data of the portion where the deviation from the second stereoscopic shape data is greater than the predetermined threshold value based on data of other portions.

In this case, among the plurality of portions of the first stereoscopic shape data, the reliability can be enhanced for the portion where the deviation from the second stereoscopic shape data is greater than the predetermined threshold value.

(11) The determination unit may interpolate, among the first stereoscopic shape data, the data of the portion where the deviation from the second stereoscopic shape data is greater than the predetermined threshold value based on data of a corresponding portion of the second stereoscopic shape data.

In this case, among the plurality of portions of the first stereoscopic shape data, the reliability can be enhanced for the portion where the deviation from the second stereoscopic shape data is greater than the predetermined threshold value.

(12) The determination unit may determine a defective portion of the first stereoscopic shape data, and interpolate the defective portion based on data of a corresponding portion of the second stereoscopic shape data.

In this case, the stereoscopic shape corresponding to the defective portion of the first stereoscopic shape data can be measured. Furthermore, the user can observe on the display section the stereoscopic shape of the measuring object that does not include the defective portion in appearance.

(13) A shape measuring method according to another embodiment of the invention includes the steps of irradiating a measuring object mounted on a stage with first light for shape measurement obliquely from above by a light projecting unit; receiving the first light reflected by the measuring object mounted on the stage with a light receiving unit at a position above the stage, and outputting a light receiving signal indicating a light receiving amount; generating first stereoscopic shape data indicating a stereoscopic shape of the measuring object by a triangular distance measuring method based on the output light receiving signal corresponding to the first light; changing a focus position of the light receiving unit by changing a relative distance between the light receiving unit and the stage in an optical axis direction of the light receiving unit; irradiating the measuring object mounted on the stage with second light for surface state imaging from above or obliquely from above by the light projecting unit; receiving the second light reflected by the measuring object mounted on the stage with the light receiving unit at the position above the stage, and outputting a light receiving signal indicating the light receiving amount; generating a plurality of pieces of data based on a plurality of output light receiving signals corresponding to the second light while changing the focus position; generating state data indicating a surface state of the measuring object by extracting and synthesizing a plurality of data portions obtained while focusing on each of a plurality of portions of the measuring object from the plurality of pieces of generated data; generating synthesized data indicating an image in which the stereoscopic shape and the surface state of the measuring object are synthesized by synthesizing the generated first stereoscopic shape data and the generated state data; and displaying on a display section an image in which the stereoscopic shape and the surface state of the measuring object are synthesized based on the generated synthesized data.

In this shape measuring method, the measuring object mounted on the stage is irradiated with the first light for shape measurement obliquely from above by the light projecting unit. The first light reflected by the measuring object mounted on the stage is received by the light receiving unit at the position above the stage, and the light receiving signal indicating the light receiving amount is output. The first stereoscopic shape data indicating the stereoscopic shape of the measuring object is generated by the triangular distance measuring method based on the output light receiving signal corresponding to the first light.

The focus position of the light receiving unit is changed by changing the relative distance between the light receiving unit and the stage in the optical axis direction of the light receiving unit. The measuring object mounted on the stage is irradiated with the second light for surface state imaging from above or obliquely from above by the light projecting unit. The second light reflected by the measuring object mounted on the stage is received by the light receiving unit at the position above the stage, and the light receiving signal indicating the light receiving amount is output. A plurality of pieces of data are generated based on a plurality of output light receiving signals corresponding to the second light while changing the focus position. The state data indicating a surface state of the measuring object is generated by extracting and synthesizing a plurality of data portions obtained while focusing on each of a plurality of portions of the measuring object from the plurality of pieces of generated data.

The synthesized data indicating an image in which the stereoscopic shape and the surface state of the measuring object are synthesized is generated by synthesizing the generated first stereoscopic shape data and the generated state data. The image in which the stereoscopic shape and the surface state of the measuring object are synthesized is displayed on a display section based on the generated synthesized data.

In this case, the first stereoscopic shape data indicates the stereoscopic shape of the measuring object measured at high accuracy by the triangular distance measuring method. The state data is generated by synthesizing data indicating the surface state of the measuring object when each portion of the measuring object is positioned within a range of the depth of field of the light receiving unit. The state data thus clearly indicates the surface state of the entire surface of the measuring object. The synthesized data indicates the stereoscopic shape of the measuring object measured at high accuracy and also clearly indicates the surface state of the measuring object. Therefore, the surface state of the measuring object can be clearly observed while measuring the shape of the measuring object at high accuracy by displaying on the display section the synthesized image based on the synthesized data.

(14) A shape measuring program according to still another embodiment of the invention is a shape measuring program executable by a processing device, the program causing the processing device to execute the processing of: irradiating a measuring object mounted on a stage with first light for shape measurement obliquely from above by a light projecting unit; receiving the first light reflected by the measuring object mounted on the stage with a light receiving unit at a position above the stage, and outputting a light receiving signal indicating a light receiving amount; generating first stereoscopic shape data indicating a stereoscopic shape of the measuring object by a triangular distance measuring method based on the output light receiving signal corresponding to the first light; changing a focus position of the light receiving unit by changing a relative distance between the light receiving unit and the stage in an optical axis direction of the light receiving unit; irradiating the measuring object mounted on the stage with second light for surface state imaging from above or obliquely from above by the light projecting unit; receiving the second light reflected by the measuring object mounted on the stage with the light receiving unit at the position above the stage, and outputting a light receiving signal indicating the light receiving amount; generating a plurality of pieces of data based on a plurality of output light receiving signals corresponding to the second light while changing the focus position; generating state data indicating a surface state of the measuring object by extracting and synthesizing a plurality of data portions obtained while focusing on each of a plurality of portions of the measuring object from the plurality of pieces of generated data; generating synthesized data indicating an image in which the stereoscopic shape and the surface state of the measuring object are synthesized by synthesizing the generated first stereoscopic shape data and the generated state data; and displaying on a display section an image in which the stereoscopic shape and the surface state of the measuring object are synthesized based on the generated synthesized data.

In this shape measuring program, the measuring object mounted on the stage is irradiated with the first light for shape measurement obliquely from above by the light projecting unit. The first light reflected by the measuring object mounted on the stage is received by the light receiving unit at the position above the stage, and the light receiving signal indicating the light receiving amount is output. The first stereoscopic shape data indicating the stereoscopic shape of the measuring object is generated by the triangular distance measuring method based on the output light receiving signal corresponding to the first light.

The focus position of the light receiving unit is changed by changing the relative distance between the light receiving unit and the stage in the optical axis direction of the light receiving unit. The measuring object mounted on the stage is irradiated with the second light for surface state imaging from above or obliquely from above by the light projecting unit. The second light reflected by the measuring object mounted on the stage is received by the light receiving unit at the position above the stage, and the light receiving signal indicating the light receiving amount is output. A plurality of pieces of data are generated based on a plurality of output light receiving signals corresponding to the second light while changing the focus position. The state data indicating a surface state of the measuring object is generated by extracting and synthesizing a plurality of data portions obtained while focusing on each of a plurality of portions of the measuring object from the plurality of pieces of generated data.

The synthesized data indicating an image in which the stereoscopic shape and the surface state of the measuring object are synthesized is generated by synthesizing the generated first stereoscopic shape data and the generated state data. The image in which the stereoscopic shape and the surface state of the measuring object are synthesized is displayed on a display section based on the generated synthesized data.

In this case, the first stereoscopic shape data indicates the stereoscopic shape of the measuring object measured at high accuracy by the triangular distance measuring method. The state data is generated by synthesizing data indicating the surface state of the measuring object when each portion of the measuring object is positioned within a range of the depth of field of the light receiving unit. The state data thus clearly indicates the surface state of the entire surface of the measuring object. The synthesized data indicates the stereoscopic shape of the measuring object measured at high accuracy and also clearly indicates the surface state of the measuring object. Therefore, the surface state of the measuring object can be clearly observed while measuring the shape of the measuring object at high accuracy by displaying the synthesized image based on the synthesized data on the display section.

According to the present invention, the surface state of the measuring object can be clearly observed while measuring the shape of the measuring object at high accuracy.

BRIEF DESCRIPTION OF THE DRAWINGS

FIGS. 37A to 37D are views describing a third example of the first auxiliary function of the focus adjustment;

DETAILED DESCRIPTION OF PREFERRED EMBODIMENTS

[1] Configuration of Shape Measuring Device

Figure 1:
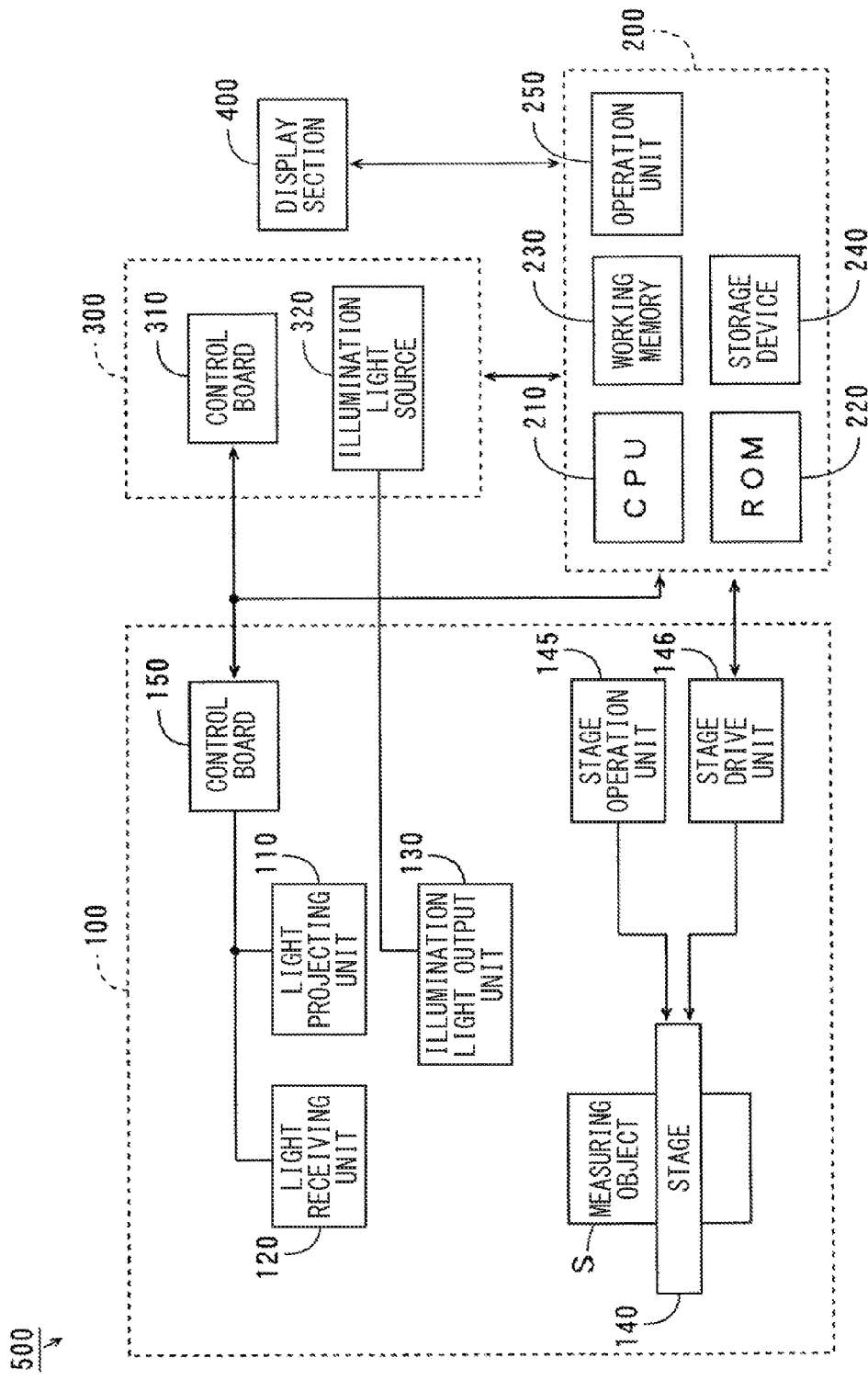
FIG. 1 is a block diagram showing a configuration of a shape measuring device according to one embodiment of the present invention.
Figure 2:
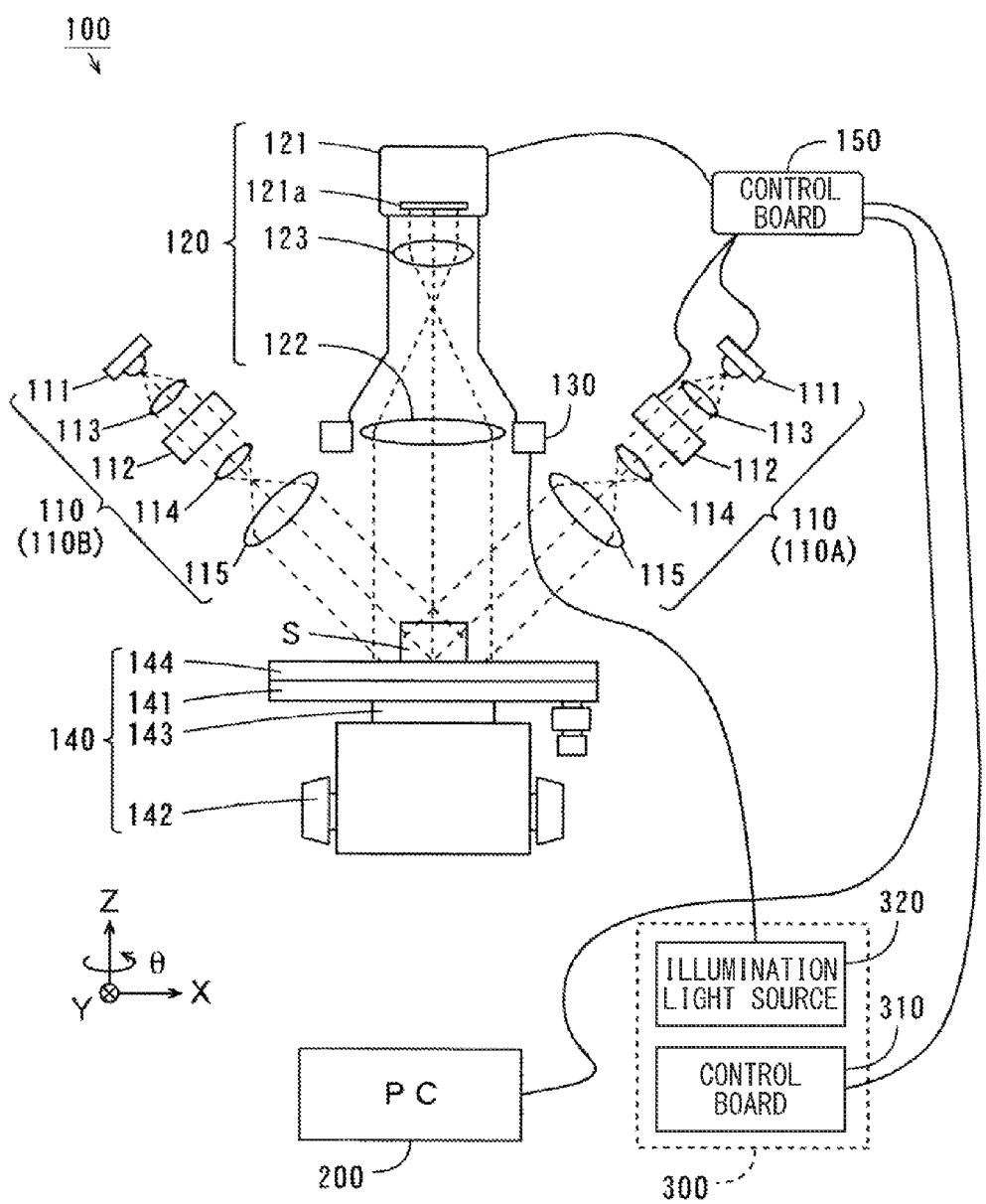
FIG. 2 is a schematic view showing a configuration of a measuring section of the shape measuring device of FIG. 1.

FIG. 1 is a block diagram showing a configuration of a shape measuring device according to one embodiment of the present invention. FIG. 2 is a schematic view showing a configuration of a measuring section of a shape measuring device 500 of FIG. 1. Hereinafter, the shape measuring device 500 according to the present embodiment will be described with reference to FIGS. 1 and 2. As shown in FIG. 1, the shape measuring device 500 includes a measuring section 100, a PC (Personal Computer) 200, a control section 300, and a display section 400.

As shown in FIG. 1, the measuring section 100 is, for example, a microscope, and includes a light projecting unit 110, a light receiving unit 120, an illumination light output unit 130, a stage 140, and a control board 150. The light projecting unit 110 includes a measurement light source 111, a pattern generating portion 112, and a plurality of lenses 113, 114, 115. The light receiving unit 120 includes a camera 121, and a plurality of lenses 122, 123. A measuring object S is mounted on the stage 140.

The light projecting unit 110 is arranged obliquely above the stage 140. The measuring section 100 may include a plurality of light projecting units 110. In the example of FIG. 2, the measuring section 100 includes two light projecting units 110. Hereinafter, when distinguishing the two light projecting units 110, one light projecting unit 110 is referred to as a light projecting unit 110A, and the other light projecting unit 110 is referred to as a light projecting unit 110B. The light projecting units 110A, 110B are symmetrically arranged with an optical axis of the light receiving unit 120 therebetween.

The measurement light source 111 of each light projecting unit 110A, 110B is, for example, a halogen lamp that emits white light. The measurement light source 111 may also be other light sources such as a white LED (Light Emitting Diode) that emits white light. The light (hereinafter referred to as measurement light) emitted from the measurement light source 111 is appropriately collected by the lens 113, and then enters the pattern generating portion 112.

The pattern generating portion 112 is, for example, a DMD (Digital Micro-mirror Device). The pattern generating portion 112 may also be an LCD (Liquid Crystal Display), an LCOS (Liquid Crystal on Silicon: reflective liquid crystal element), or a mask. The measurement light that entered the pattern generating portion 112 is converted to a pattern set in advance and an intensity (brightness) set in advance, and is then emitted. The measurement light emitted from the pattern generating portion 112 is converted to light having a diameter larger than the dimension of the measuring object S by the plurality of lenses 114, 115, and then applied on the measuring object S on the stage 140.

The light receiving unit 120 is arranged above the stage 140. The measurement light reflected by the measuring object S toward a position above the stage 140 is collected and imaged by the plurality of lenses 122, 123 of the light receiving unit 120, and then received by the camera 121.

The camera 121 is, for example, a CCD (Charge Coupled Device) including an imaging element 121a and a lens. The imaging element 121a is, for example, a monochrome CCD (Charge Coupled Device). The imaging element 121a may also be other imaging elements such as a CMOS (Complementary Metal Oxide Semiconductor) image sensor, and the like. An analog electric signal (hereinafter referred to as light receiving signal) corresponding to the light receiving amount is output from each pixel of the imaging element 121a to the control board 150.

As opposed to the color CCD, the monochrome CCD is not required to include pixels for receiving light of red wavelength, pixels for receiving light of green wavelength, and pixels for receiving light of blue wavelength. The resolution in the measurement of the monochrome CCD thus becomes higher than the resolution of the color CCD. Furthermore, the monochrome CCD is not required to include a color filter for each pixel, as opposed to the color CCD. The sensitivity of the monochrome CCD thus becomes higher than the sensitivity of the color CCD. For these reasons, the monochrome CCD is arranged in the camera 121 in this example.

In this example, the illumination light output unit 130 emits the light of red wavelength, the light of green wavelength, and the light of blue wavelength in a time division manner on the measuring object S. According to such a configuration, a color image of the measuring object S can be captured by the light receiving unit 120 using the monochrome CCD.

If the color CCD has sufficient resolution and sensitivity, the imaging element 121a may be a color CCD. In this case, the illumination light output unit 130 is not required to irradiate the light of red wavelength, the light of green wavelength, and the light of blue wavelength in a time division manner on the measuring object S, and irradiates white light on the measuring object S. The configuration of the illumination light source 320 thus can be simplified.

The control board 150 is mounted with an A/D converter (Analog/Digital Converter) and a FIFO (First In First Out) memory (not shown). The light receiving signal output from the camera 121 is sampled at a constant sampling period and converted to a digital signal by the A/D converter of the control board 150 based on control by the control section 300. The digital signal output from the A/D converter is sequentially accumulated in the FIFO memory. The digital signals accumulated in the FIFO memory are sequentially transferred to the PC 200 as pixel data.

As shown in FIG. 1, the PC 200 includes a CPU (Central Processing Unit) 210, a ROM (Read Only Memory) 220, a working memory 230, a storage device 240, and an operation unit 250. The operation unit 250 includes a keyboard and a pointing device. A mouse, a joy stick, or the like can be used for the pointing device.

The ROM 220 stores a system program. The working memory 230 includes a RAM (Random Access Memory), and is used for processing of various types of data. The storage device 240 includes a hard disc, and the like. The storage device 240 stores an image processing program and a shape measuring program. The storage device 240 is used to save various types of data such as pixel data provided from the control board 150.

The CPU 210 generates image data based on the pixel data provided from the control board 150. The CPU 210 also performs various types of processing on the generated image data using the working memory 230 and displays an image based on the image data on the display section 400. Furthermore, the CPU 210 applies a drive pulse to a stage drive unit 146, to be described later. The display section 400 is configured by, for example, an LCD panel or an organic EL (Electro-Luminescence) panel.

In FIG. 2, two directions orthogonal to each other in a plane (hereinafter referred to as mounting surface) of the stage 140 on which the measuring object S is mounted are defined as X direction and Y direction, and are indicated with arrows X, Y, respectively. A direction orthogonal to the mounting surface of the stage 140 is defined as Z direction, and is indicated with an arrow Z. A direction of rotating with an axis parallel to the Z direction as a center is defined as θ direction, and is indicated with an arrow θ.

The stage 140 includes an X-Y stage 141, a Z stage 142, a θ stage 143, and a tilt stage 144. The X-Y stage 141 includes an X-direction movement mechanism and a Y-direction movement mechanism. The Z stage 142 includes a Z-direction movement mechanism. The θ stage 143 includes a θ-direction rotation mechanism. The tilt stage 144 includes a mechanism (hereinafter referred to as tilt rotation mechanism) capable of rotating with the axis parallel to the mounting surface as the center. The X-Y stage 141, the Z stage 142, the θ stage 143 and the tilt stage 144 configure the stage 140. The stage 140 also includes a fixing member (clamp) (not shown) for fixing the measuring object S to the mounting surface.

A plane that is positioned at a focus of the light receiving unit 120 and that is perpendicular to the optical axis of the light receiving unit 120 is referred to as a focal plane of the light receiving unit 120. As shown in FIG. 2, the relative positional relationship among the light projecting units 110A, 110B, the light receiving unit 120, and the stage 140 is set such that the optical axis of the light projecting unit 110A, the optical axis of the light projecting unit 110B, and the optical axis of the light receiving unit 120 intersect each other at the focal plane of the light receiving unit 120.

A plane that is positioned at the focus of the light projecting unit 110 (point where the pattern of the measurement light is imaged) and that is perpendicular to the optical axis of the light projecting unit 110 is referred to as a focal plane of the light projecting unit 110. Each of the light projecting unit 110A, 110B is configured such that the focal plane of the light projecting unit 110A and the focal plane of the light projecting unit 110B intersect at a position including the focus of the light receiving unit 120.

The center of a rotation axis in the θ direction of the θ stage 143 coincides with the optical axis of the light receiving unit 120. Thus, when the θ stage 143 is rotated in the θ direction, the measuring object S can be rotated within the visual field with the rotation axis as the center without moving out from the visual field. The X-Y stage 141, the θ stage 143, and the tilt stage 144 are supported by the Z stage 142.

In other words, even in a state where the θ stage 143 is rotated in the θ direction or the tilt stage 144 is rotated in the tilt direction, the center axis of the light receiving unit 120 and a movement axis of the Z stage 142 do not shift from each other. The tilt direction is the rotation direction having an axis parallel to the mounting surface as the center. According to such a configuration, even in a state where the position or the posture of the measuring object S is changed, the stage 140 can be moved in the Z direction and a plurality of images captured at each of a plurality of different focus positions of the light receiving unit 120 can be synthesized.

A stepping motor is used for the X-direction movement mechanism, the Y-direction movement mechanism, the Z-direction movement mechanism, the θ-direction rotation mechanism, and the tilt rotation mechanism of the stage 140. The X-direction movement mechanism, the Y-direction movement mechanism, the Z-direction movement mechanism, the θ-direction rotation mechanism, and the tilt rotation mechanism of the stage 140 are driven by a stage operation unit 145 or the stage drive unit 146 of FIG. 1.

The user can move the mounting surface of the stage 140 in the X direction, the Y direction, or the Z direction or rotate the same in the θ direction or the tilt direction relatively with respect to the light receiving unit 120 by manually operating the stage operation unit 145. The stage drive unit 146 supplies current to the stepping motors of the stage 140 based on the drive pulse provided by the PC 200 to move the stage 140 in the X direction, the Y direction or the Z direction, or rotate the same in the θ direction or the tilt direction relatively with respect to the light receiving unit 120.

In the present embodiment, the stage 140 is an electrical stage that can be driven by the stepping motor and that can be manually operated, but the present invention is not limited thereto. The stage 140 may be an electrical stage that can be driven only with the stepping motor, or may be a manual stage that can be operated only by manual operation.

The control section 300 includes a control board 310 and an illumination light source 320. A CPU (not shown) is mounted on the control board 310. The CPU of the control board 310 controls the light projecting unit 110, the light receiving unit 120, and the control board 150 based on a command from the CPU 210 of the PC 200.

The illumination light source 320 includes three LEDs that emit red light, green light, and blue light, for example. The light of an arbitrary color can be generated from the illumination light source 320 by controlling the luminance of the light emitted from each LED. The light (hereinafter referred to as illumination light) generated from the illumination light source 320 is output from the illumination light output unit 130 of the measuring section 100 through a light guiding member (light guide). The illumination light source 320 may be arranged in the measuring section 100 without arranging the illumination light source 320 in the control section 300. In this case, the illumination light output unit 130 is not arranged in the measuring section 100.

Figure 3A:
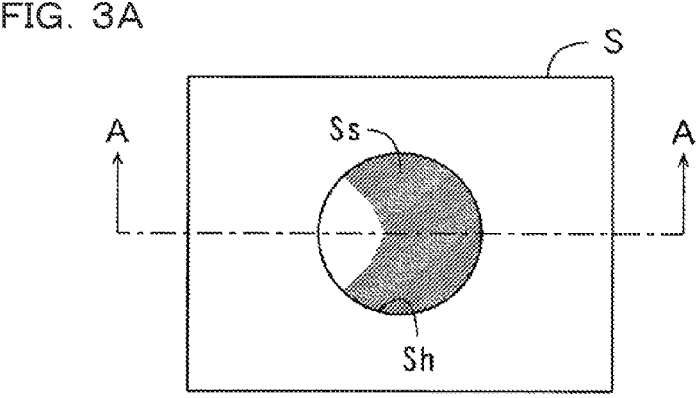
FIGS. 3A to 3D are schematic views of a measuring object in a state irradiated with light.

The illumination light output unit 130 of FIG. 2 has a circular ring shape, and is arranged above the stage 140 so as to surround the light receiving unit 120. The measuring object S is thereby irradiated with the illumination light from the illumination light output unit 130 so that shade is not formed. FIGS. 3A to 3D and FIGS. 4A to 4D are schematic views of the measuring object S in a state irradiated with light. In the example of FIGS. 3A to 3D and FIGS. 4A to 4D, the measuring object S has a hole Sh at substantially the middle of the upper surface. In FIGS. 3A, 3C, and 4A, shade Ss is shown by hatching.

Figure 3B:
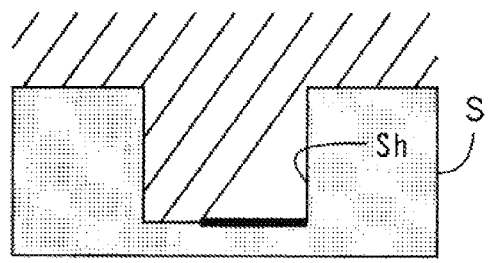
Figure 3C:
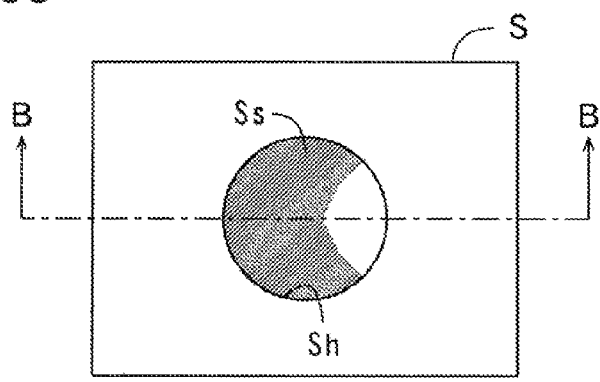
Figure 4A:
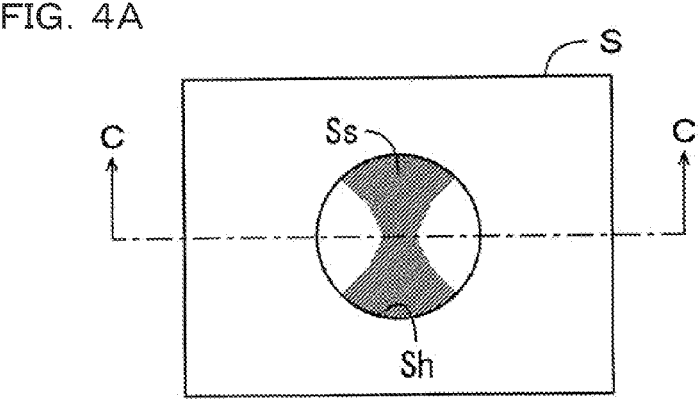
FIGS. 4A to 4D are schematic views of the measuring object in a state irradiated with light.

FIG. 3A is a plan view of the measuring object S in a state irradiated with the measurement light from one light projecting unit 110A of FIG. 2, and FIG. 3B is a cross-sectional view taken along line A-A of FIG. 3A. As shown in FIGS. 3A and 3B, when the measuring object S is irradiated with the measurement light from the one light projecting unit 110A, the measurement light may not reach the bottom of the hole Sh depending on the depth of the hole Sh thus forming the shade Ss. Therefore, a part of the measuring object S cannot be observed.

Figure 3D:
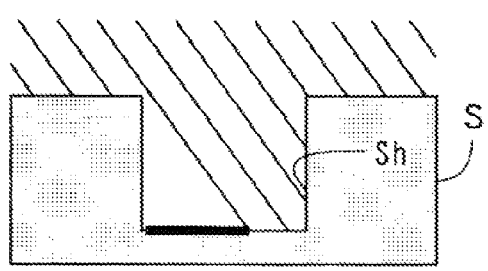

FIG. 3C is a plan view of the measuring object S in a state irradiated with the measurement light from the other light projecting unit 110B of FIG. 2, and FIG. 3D is a cross-sectional view taken along line B-B of FIG. 3C. As shown in FIGS. 3C and 3D, when the measuring object S is irradiated with the measurement light from the other light projecting unit 110B, the measurement light may not reach the bottom of the hole Sh depending on the depth of the hole Sh, thus forming the shade Ss. Therefore, a part of the measuring object S cannot be observed.

Figure 4B:
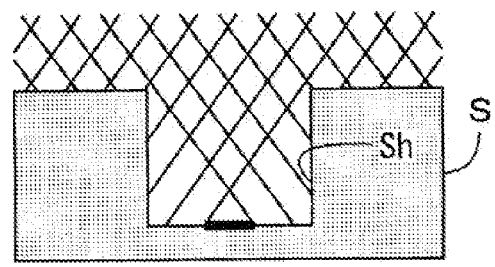

FIG. 4A is plan view of the measuring object S in a state irradiated with the measurement light from both light projecting units 110A, 110B, and FIG. 4B is a cross-sectional view taken along line C-C of FIG. 4A. As shown in FIGS. 4A and 4B, when the measuring object S is irradiated with the measurement light from both light projecting units 110A, 110B, the measurement light that does not reach the bottom of the hole Sh is reduced as compared to the case where the measuring object S is irradiated with the measurement light from one of the light projecting units 110A, 110B. Hence, the shade Ss that is formed is also reduced. Therefore, the portion of the measuring object S that can be observed increases.

Figure 4C:
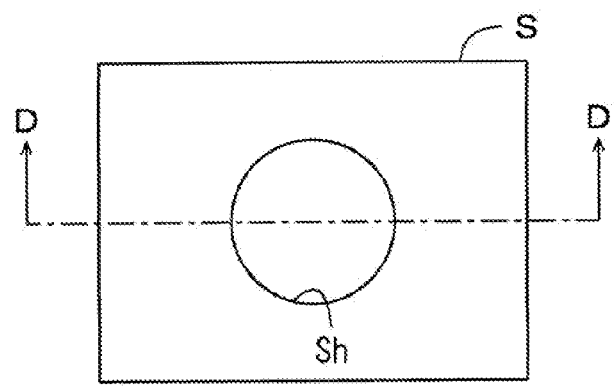
Figure 4D:
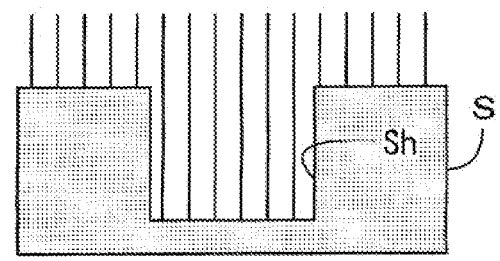

FIG. 4C is plan view of the measuring object S in a state irradiated with the illumination light from the illumination light output unit 130 of FIG. 2, and FIG. 4D is a cross-sectional view taken along line D-D of FIG. 4C. As shown in FIGS. 4C and 4D, since the illumination light is applied from substantially immediately above the measuring object S, the illumination light reaches the bottom of the hole Sh regardless of the depth of the hole Sh. Therefore, the majority of the measuring object S can be observed.

Figure 5:
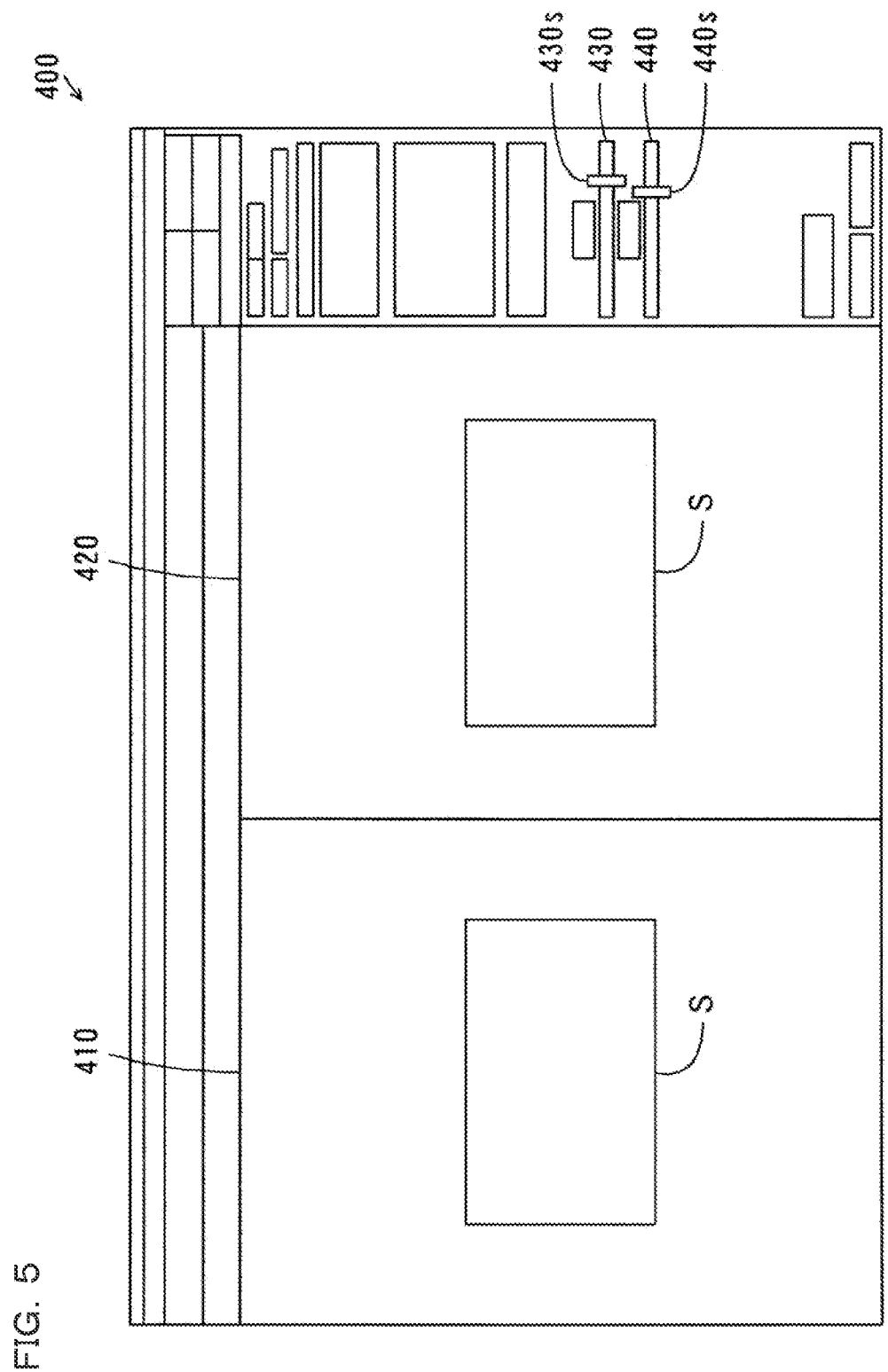
FIG. 5 is a view showing an example of a GUI for displaying images in dual-screen.

The image of the measuring object S irradiated with the measurement light from the one light projecting unit 110A and the image of the measuring object S irradiated with the measurement light from the other light projecting unit 110B may be displayed on the display section 400 so as to be side by side (dual display). FIG. 5 is a view showing an example of a GUI (Graphical User Interface) for displaying the images in dual screen.

As shown in FIG. 5, the display section 400 includes two image display regions 410, 420 arranged side by side. When displaying the images in dual screen, the measuring object S is alternately irradiated with the measurement light from the light projecting units 110A, 110B in a switching manner. In the image display region 410, the image of the measuring object S when irradiated with the measurement light from the one light projecting unit 110A is displayed. In the image display region 420, the image of the measuring object S when irradiated with the measurement light from the other light projecting unit 110B is displayed. The user thus can recognize, in a distinguished manner, the images of the measuring object S when irradiated with the measurement light from the respective light projecting units 110A, 110B.

In this example, the frequency of switching the measurement light from the light projecting units 110A, 110B is, for example, a few Hz. The frequency of switching the measurement light from the light projecting units 110A, 110B may be set to such a value (e.g., 100 Hz) that the user cannot recognize the switching. In this case, the measuring object S is observed by the user as if it is simultaneously irradiated with the measurement light from both light projecting units 110A, 110B in the measuring section 100.

Two light amount setting bars 430, 440 are displayed on the display section 400. The light amount setting bar 430 includes a slider 430s that can be moved in the horizontal direction. The light amount setting bar 440 includes a slider 440s that can be moved in the horizontal direction. Hereinafter, the measurement light emitted from one light projecting unit 110A is referred to as one measurement light, and the measurement light emitted from the other light projecting unit 110B is referred to as other measurement light. The position of the slider 430s on the light amount setting bar 430 corresponds to the light amount (hereinafter referred to as light amount of one measurement light) of the light receiving unit 120 when receiving the one measurement light. The position of the slider 440s on the light amount setting bar 440 corresponds to the light amount (hereinafter referred to as light amount of other measurement light) of the light receiving unit 120 when receiving the other measurement light.

The user can change the light amount of the one measurement light by operating the operation unit 250 of the PC 200 of FIG. 1 and moving the slider 430s of the light amount setting bar 430 in the horizontal direction. The light amount of the one measurement light is changed by changing the brightness of the one measurement light or the exposure time of the light receiving unit 120 when receiving the one measurement light. Similarly, the user can change the light amount of the other measurement light by operating the operation unit 250 and moving the slider 440s of the light amount setting bar 440 in the horizontal direction. The light amount of the other measurement light is changed by changing the brightness of the other measurement light or the exposure time of the light receiving unit 120 when receiving the other measurement light.

As described above, the images of the measuring object S when irradiated with the measurement light by the light projecting units 110A, 110B, respectively, are displayed side by side in the image display regions 410, 420. Therefore, the user can appropriately adjust the light amounts of the one measurement light and the other measurement light by moving the positions of the sliders 430s, 440s of the light amount setting bars 430, 440 while viewing the images of the measuring object S displayed in the image display regions 410, 420.

There may be a correlation between the light amounts of the one measurement light and the other measurement light, and the light amount (hereinafter referred to as light amount of illumination light) of the light receiving unit 120 when receiving the illumination light emitted from the illumination light output unit 130. In this case, the light amounts of the one measurement light and the other measurement light may be automatically adjusted based on the light amount of the illumination light. Alternatively, an adjustment guide for making the light amounts of the one measurement light and the other measurement light appropriate based on the light amount of the illumination light may be displayed on the display section 400. In this case, the user can appropriately adjust the light amounts of the one measurement light and the other measurement light by moving the positions of the sliders 430s, 440s of the light amount setting bars 430, 440 based on the adjustment guide.

If the irradiating direction of the light differs, the reflecting direction of the light also differs. Thus, the brightness of the image of the portion irradiated with one measurement light and the brightness of the image of the portion irradiated with the other measurement light differ from each other even concerning the same portion of the measuring object S. In other words, the light amount suited for shape measurement differs depending on the irradiating direction.

In the present embodiment, the respective brightness of the images when the measurement light is irradiated from the light projecting units 110A, 110B can be individually adjusted. Thus, the appropriate light amount corresponding to the irradiating direction of the light can be set. The image during the adjustment of the light amount is displayed while being updated in the image display regions 410, 420. The user thus can adjust the light amount while checking the image.

In this case, the PC 200 can display, in the image display regions 410, 420, the portion where overexposure occurs due to excessive brightness or the portion where underexposure occurs due to excessive darkness in the image in an identifiable manner. The user thus can easily check whether or not the light amount is being appropriately adjusted.

Figure 6:
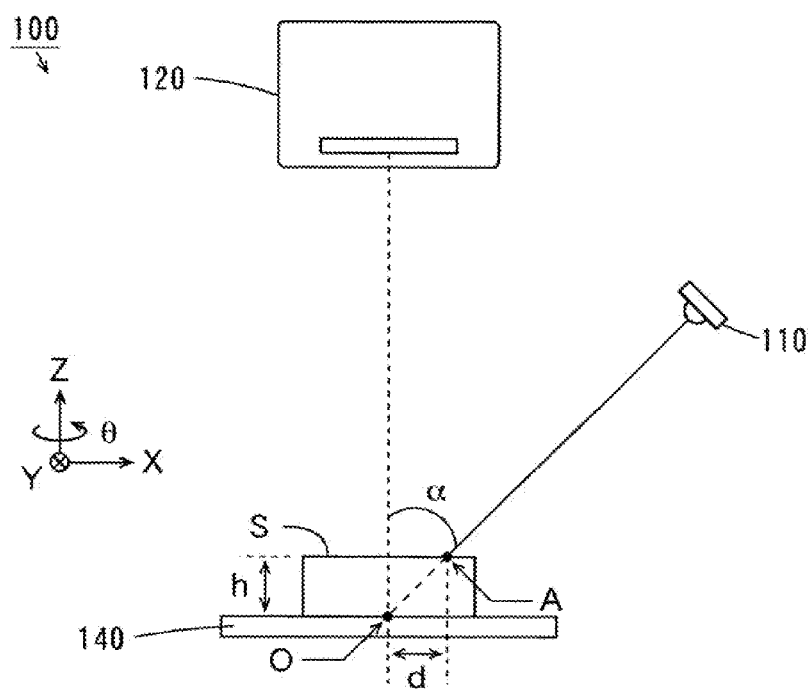
FIG. 6 is a view describing the principle of a triangular distance measuring method.

[2] Shape Measurement of Measuring Object (1) Shape Measurement by Triangular Distance Measuring Method In the measuring section 100, the shape of the measuring object S is measured by the triangular distance measuring method. FIG. 6 is a view describing the principle of triangular distance measuring method. As shown in FIG. 6, an angle α between the optical axis of the measurement light emitted from the light projecting unit 110 and the optical axis of the measurement light entering the light receiving unit 120 (optical axis of light receiving unit 120) is set in advance. The angle α is greater than 0 degrees and smaller than 90 degrees.

If the measuring object S is not mounted on the stage 140, the measurement light emitted from the light projecting unit 110 is reflected at point O of the mounting surface of the stage 140 and enters the light receiving unit 120. If the measuring object S is mounted on the stage 140, the measurement light emitted from the light projecting unit 110 is reflected at point A on the surface of the measuring object S and enters the light receiving unit 120.

Assuming the distance in the X direction between point O and point A is d, a height h of point A of the measuring object S with respect to the mounting surface of the stage 140 is obtained by h=d/tan(α). The CPU 210 of the PC 200 of FIG. 1 measures the distance d between point O and point A in the X direction based on the pixel data of the measuring object S provided by the control board 150. The CPU 210 also calculates the height h of point A at the surface of the measuring object S based on the measured distance d. The three-dimensional shape of the measuring object S is measured by calculating the heights of all the points on the surface of the measuring object S.

The measurement light having various patterns is emitted from the light projecting unit 110 of FIG. 1 so that all the points on the surface of the measuring object S are irradiated with the measurement light. The patterns of the measurement light are controlled by the pattern generating portion 112 of FIG. 1. The patterns of the measurement light will be described below.

(2) First Pattern of Measurement Light

Figure 7A:
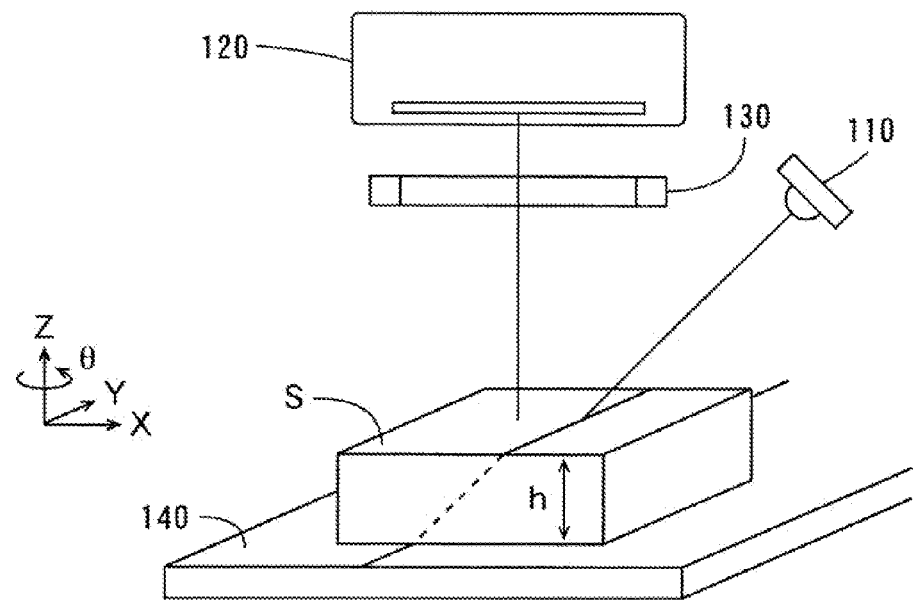
FIGS. 7A and 7B are views describing a first pattern of measurement light.
Figure 7B:
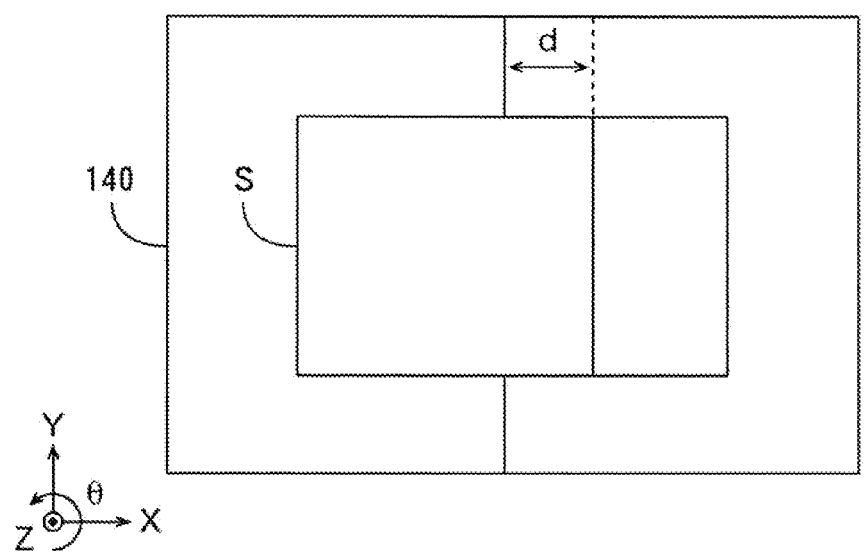

FIGS. 7A and 7B are views describing a first pattern of the measurement light. FIG. 7A shows a state in which the measuring object S on the stage 140 is irradiated with the measurement light from the light projecting unit 110. FIG. 7B shows a plan view of the measuring object S irradiated with the measurement light. As shown in FIG. 7A, in the first pattern, the measurement light (hereinafter referred to as linear measurement light) having a linear cross-section parallel to the Y direction is emitted from the light projecting unit 110. In this case, as shown in FIG. 7B, the portion of the linear measurement light, with which the stage 140 is irradiated, and the portion of the linear measurement light, with which the surface of the measuring object S is irradiated, are shifted from each other in the X direction by the distance d corresponding to the height h of the surface of the measuring object S. Therefore, the height h of the measuring object S can be calculated by measuring the distance d.

If a plurality of portions along the Y direction at the surface of the measuring object S has different heights, the distance d is measured for each portion so that the heights h for the plurality of portions along the Y direction can be calculated.

The CPU 210 of FIG. 1 measures the distance d for the plurality of portions along the Y direction at one position in the X direction, and then measures the distance for the plurality of portions along the Y direction at another position in the X direction by scanning the linear measurement light parallel to the Y direction in the X direction. The heights h of the plurality of portions of the measuring object S along the Y direction at a plurality of positions in the X direction thus can be calculated. The heights h of all the points on the surface of the measuring object S can be calculated by scanning the linear measurement light in the X direction in a range wider than the X direction dimension of the measuring object S. The three-dimensional shape of the measuring object S is thereby measured.

(3) Second Pattern of Measurement Light

FIGS. 8A to 8D are views describing a second pattern of the measurement light. As shown in FIGS. 8A to 8D, in the second pattern, the measurement light (hereinafter referred to as sinusoidal measurement light) having a linear cross-section parallel to the Y direction and having a pattern in which the intensity changes sinusoidally in the X direction is emitted from the light projecting unit 110 for a plurality of times (four times in this example).

Figure 8:
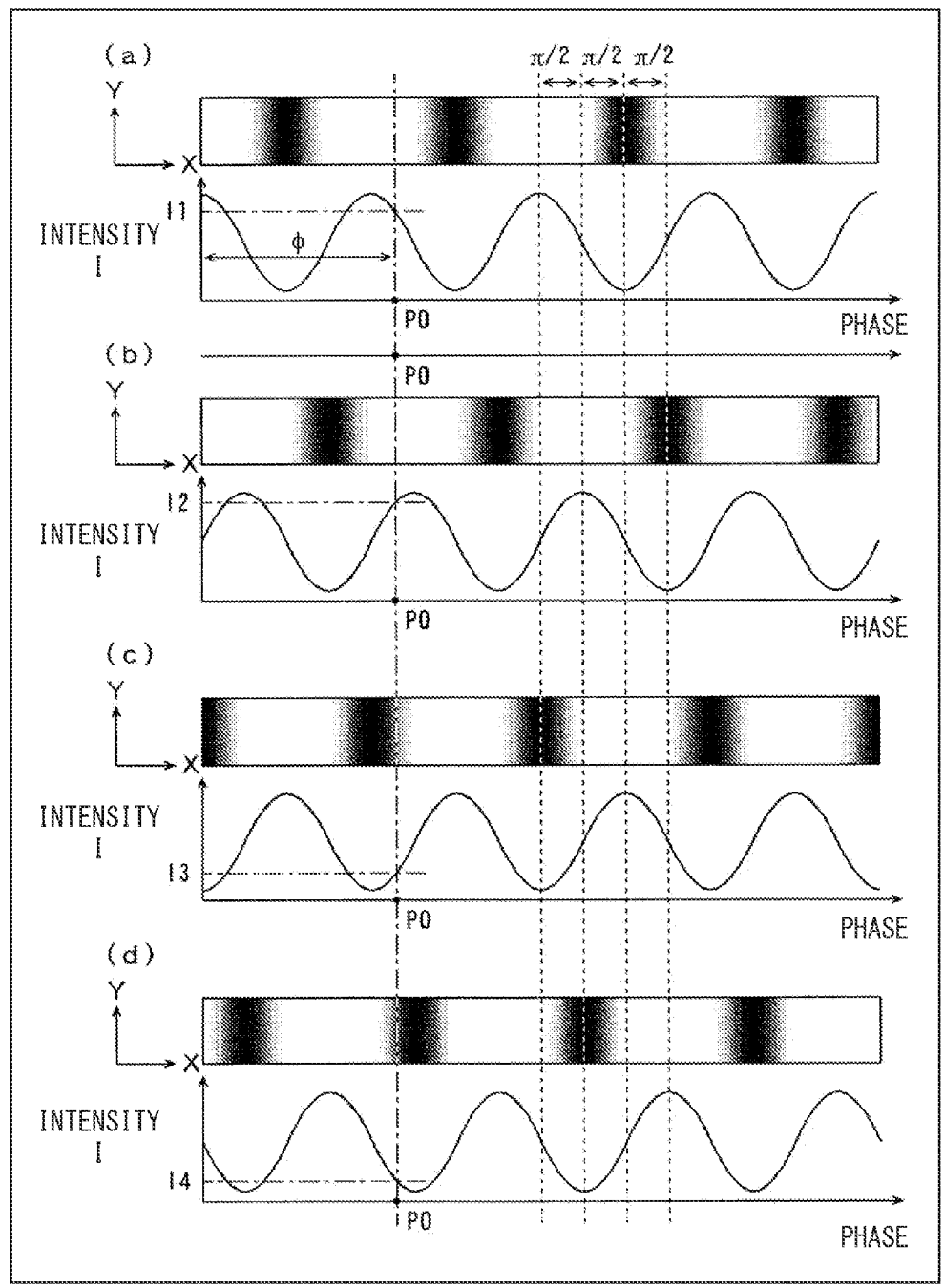
FIGS. 8A to 8D are views describing a second pattern of the measurement light.

FIG. 8A shows the sinusoidal measurement light emitted the first time. The intensity of the sinusoidal measurement light emitted the first time has an initial phase $\phi$ at an arbitrary portion P0 on the surface of the measuring object S. When such sinusoidal measurement light is emitted, the light reflected by the surface of the measuring object S is received by the light receiving unit 120. The intensity of the received light is measured based on the pixel data of the measuring object S. The intensity of light reflected by the portion P0 on the surface of the measuring object S is assumed as I1.

FIG. 8B shows the sinusoidal measurement light emitted the second time. The intensity of the sinusoidal measurement light emitted the second time has a phase $(\phi+\pi/2)$ at the portion P0 on the surface of the measuring object S. When such sinusoidal measurement light is emitted, the light reflected by the surface of the measuring object S is received by the light receiving unit 120. The intensity of the received light is measured based on the pixel data of the measuring object. S. The intensity of light reflected by the portion P0 on the surface of the measuring object S is assumed as I2.

FIG. 8C shows the sinusoidal measurement light emitted the third time. The intensity of the sinusoidal measurement light emitted the third time has a phase $(\phi+\pi)$ at the portion P0 on the surface of the measuring object S. When such sinusoidal measurement light is emitted, the light reflected by the surface of the measuring object S is received by the light receiving unit 120. The intensity of the received light is measured based on the pixel data of the measuring object S. The intensity of light reflected by the portion P0 on the surface of the measuring object S is assumed as I3.

FIG. 8D shows the sinusoidal measurement light emitted the fourth time. The intensity of the sinusoidal measurement light emitted the fourth time has a phase $(\phi+3\pi/2)$ at the portion P0 on the surface of the measuring object S. When such sinusoidal measurement light is emitted, the light reflected by the surface of the measuring object S is received by the light receiving unit 120. The intensity of the received light is measured based on the pixel data of the measuring object S. The intensity of light reflected by the portion P0 on the surface of the measuring object S is assumed as I4.

The initial phase $\phi$ is given by $\phi=\tan^{-1}[(I1-I3)/(I2-I4)]$. The height h of the arbitrary portion of the measuring object S is calculated from the initial phase $\phi$. According to this method, the initial phase $\phi$ of all the portions of the measuring object S can be calculated easily and at high speed by measuring the intensity of light for four times. The initial phase $\phi$ can be calculated by emitting the measurement light having different phases at least three times, and measuring the intensity of the received light. The three-dimensional shape of the measuring object S can be measured by calculating the height h of all the portions on the surface of the measuring object S.

(4) Third Pattern of Measurement Light

Figure 9A:
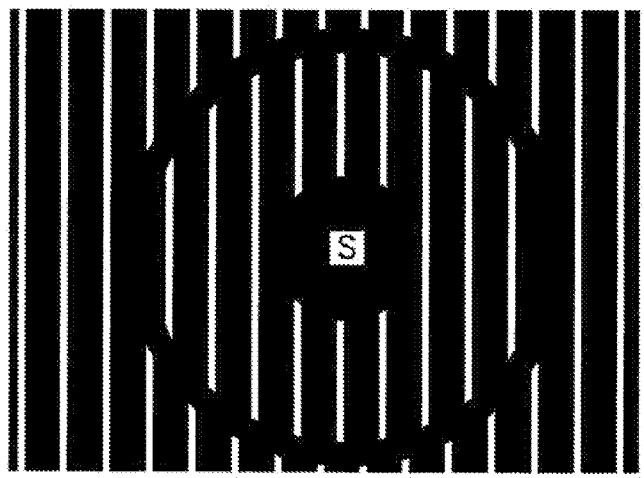
FIGS. 9A to 9C are views describing a third pattern of the measurement light.
Figure 9B:
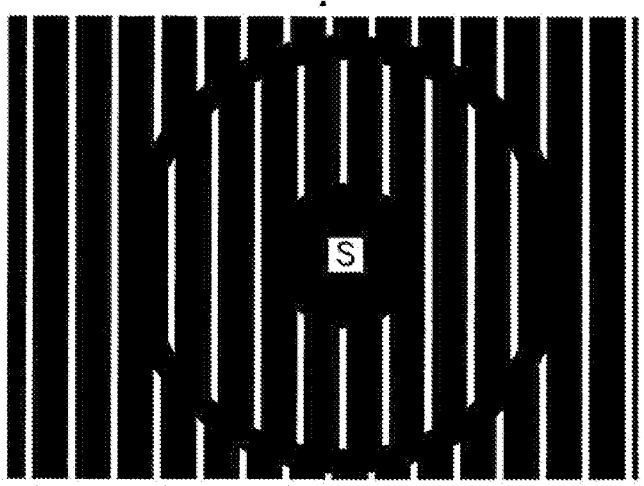
Figure 9C:
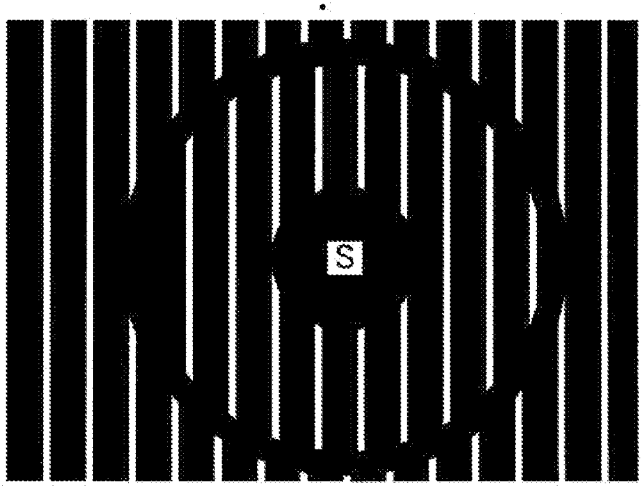

FIGS. 9A to 9C are views describing a third pattern of the measurement light. As shown in FIGS. 9A to 9C, in the third pattern, the measurement light (hereinafter referred to as striped measurement light) having a linear cross-section that is parallel to the Y direction and that is lined in the X direction is emitted from the light projecting unit 110 for a plurality of times (16 times in this example).

In other words, in the striped measurement light, the linear bright portion parallel to the Y direction and the linear dark portion parallel to the Y direction are periodically arrayed in the X direction. If the pattern generating portion 112 is the DMD, the dimension of the micro-mirror is assumed as one unit. The width in the X direction of each bright portion of the striped measurement light is, for example, three units, and the width in the X direction of each dark portion of the striped measurement light is, for example, 13 units. In this case, the period in the X direction of the striped measurement light is 16 units. The units of the bright portion and the dark portion differ according to the configuration of the pattern generating portion 112 of FIG. 2. For example, if the pattern generating portion 112 is the liquid crystal, one unit is the dimension of one pixel.

When the striped measurement light of first time is emitted, the light reflected by the surface of the measuring object S is received by the light receiving unit 120. The intensity of the received light is measured based on the pixel data of a first photographed image of the measuring object S. FIG. 9A shows the first photographed image of the measuring object S corresponding to the striped measurement light of first time.

The measurement light of second time has a pattern in which the bright portion and the dark portion are moved by one unit in the X direction from the striped measurement light of first time. When the striped measurement light of second time is emitted, the light reflected by the surface of the measuring object S is received by the light receiving unit 120. The intensity of the received light is measured based on the pixel data of a second photographed image of the measuring object S.

The measurement light of third time has a pattern in which the bright portion and the dark portion are moved by one unit in the X direction from the striped measurement light of second time. When the striped measurement light of third time is emitted, the light reflected by the surface of the measuring object S is received by the light receiving unit 120. The intensity of the received light is measured based on the pixel data of a third photographed image of the measuring object S.

Similar operation is repeated, so that the intensities of light corresponding to the striped measurement light of fourth to sixteenth times are respectively measured based on the pixel data of fourth to sixteenth photographed images of the measuring object S. When the striped measurement light, in which the period in the X direction is 16 units, is emitted sixteen times, all the portions of the surface of the measuring object S are irradiated with the striped measurement light. FIG. 9B shows a seventh photographed image of the measuring object S corresponding to the striped measurement light of seventh time. FIG. 9C shows a thirteenth photographed image of the measuring object S corresponding to the striped measurement light of thirteenth time.

Figure 10:
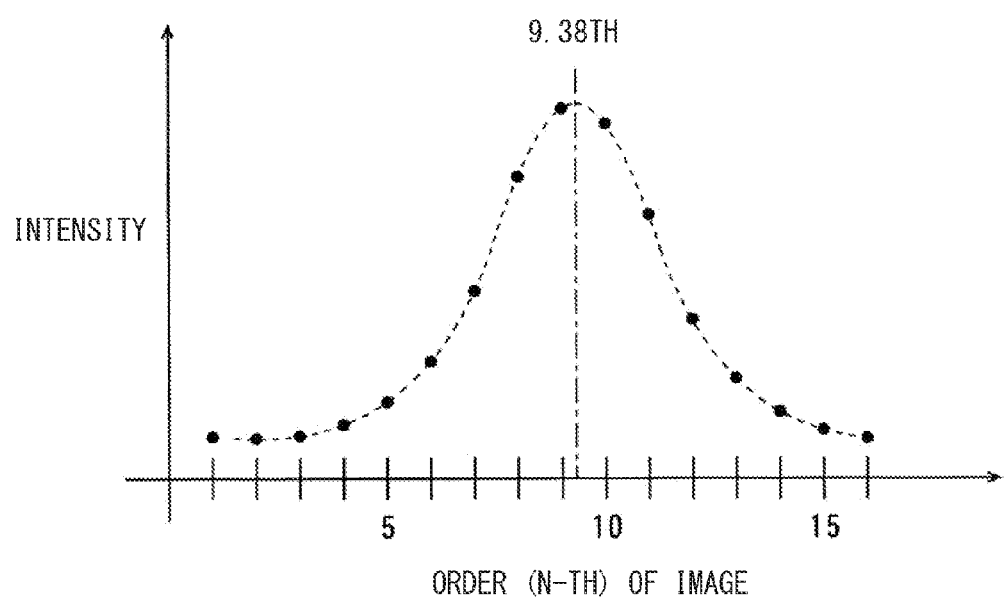
FIG. 10 is a diagram showing a relationship between the timing (order) at which an image of a specific portion of the measuring object is photographed and the intensity of the received light.
Figure 11:
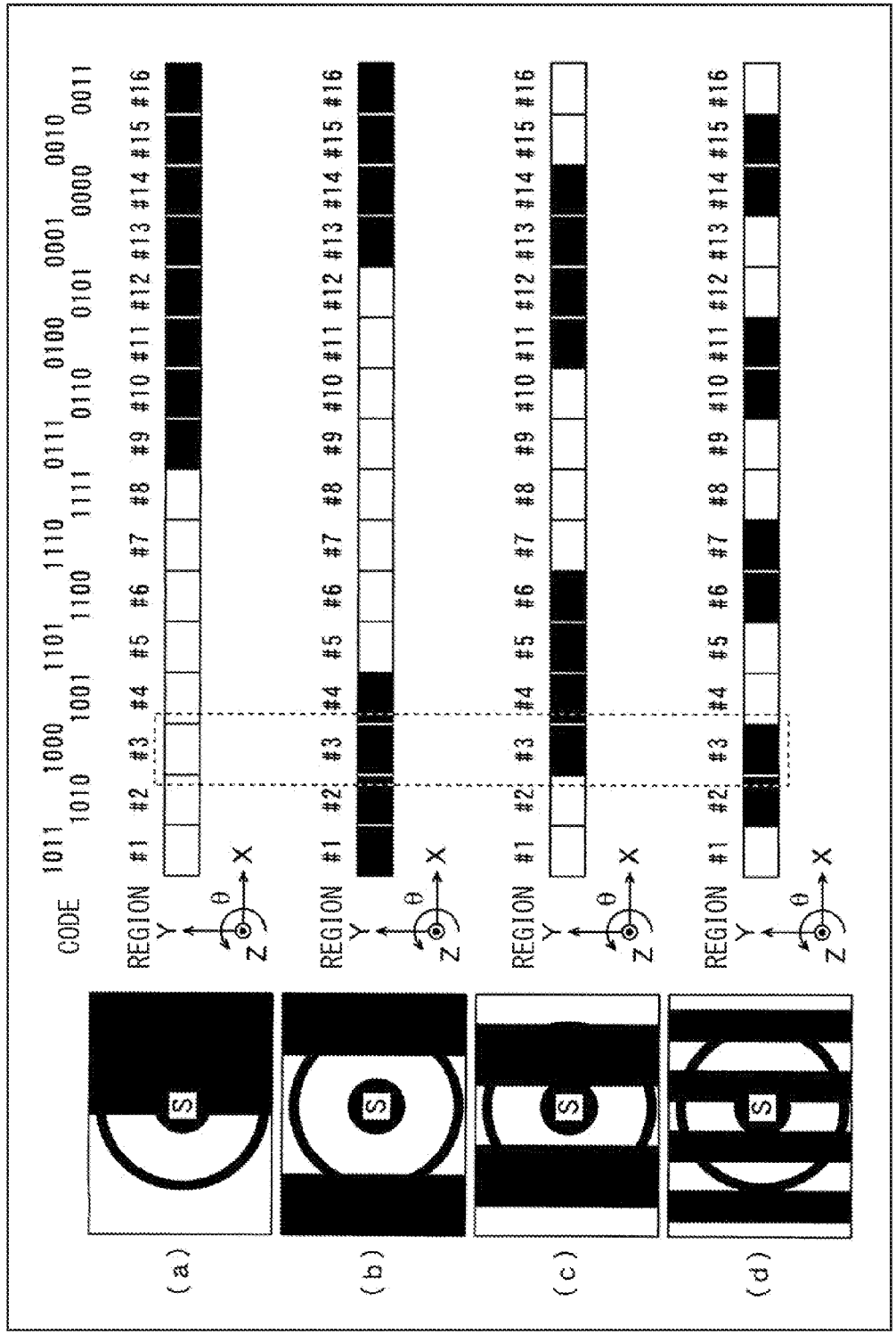
FIGS. 11A to 11D are diagrams describing a fourth pattern of the measurement light.

FIG. 10 is a diagram showing a relationship between the timing (order) at which the image of a specific portion of the measuring object S is photographed and the intensity of the received light. The horizontal axis of FIG. 10 indicates the order of the image, and the vertical axis indicates the intensity of the received light. As described above, first to sixteenth photographed images are generated for each portion of the measuring object S. The intensity of light corresponding to each pixel of the generated first to sixteenth photographed images is then measured.

As shown in FIG. 10, the intensity of light of each pixel of the photographed image corresponding to the number of the photographed image is illustrated to obtain a scattergram. The number (order) of the photographed image when the intensity of light is maximum can be estimated at an accuracy of smaller than one by fitting the Gaussian curve, a spline curve or a parabola, for example, to the obtained scattergram. In the example of FIG. 10, the intensity of light is estimated to be maximum in the virtual 9.38th photographed image between the ninth and the tenth according to the curve shown with a fitted dotted line.

The maximum value of the intensity of light can be estimated by the fitted curve. The height h of each portion of the measuring object S can be calculated based on the number of the photographed image in which the intensity of light estimated at each portion of the measuring object S is maximum. According to this method, the three-dimensional shape of the measuring object S is measured based on the intensity of light having a sufficiently large S/N (Signal/Noise) ratio. The accuracy in the shape measurement of the measuring object S thus can be enhanced.

In the shape measurement of the measuring object S using the measurement light having a periodic pattern shape such as the sinusoidal measurement light, the striped measurement light, or the like, the relative height (relative value of height) of each portion on the surface of the measuring object S is measured. This is because the absolute phase cannot be obtained since each of a plurality of lines (stripes) parallel to the Y direction that form the pattern cannot be identified and the uncertainty corresponding to an integral multiple of one period ($2\pi$) of the plurality of lines exist. Therefore, based an assumption that the height of one portion of the measuring object S and the height of a portion adjacent to such a portion continuously change, known unwrapping processing may be performed on the data of the measured height.

(5) Fourth Pattern of Measurement Light

FIGS. 11A to 11D are diagrams describing a fourth pattern of the measurement light. As shown in FIGS. 11A to 11D, in the fourth pattern, the measurement light (hereinafter referred to as coded measurement light) having a linear cross-section parallel to the Y direction and in which the bright portion and the dark portion are lined in the X direction is emitted from the light projecting unit 110 for a plurality of times (four times in this example). The proportions of the bright portion and the dark portion of the coded measurement light are 50% each.

In this example, the surface of the measuring object S is divided into a plurality of (16 in the example of FIGS. 11A to 11D) regions in the X direction. Hereinafter, the plurality of divided regions of the measuring object S in the X direction are referred to as first to sixteenth regions.

FIG. 11A shows the coded measurement light emitted the first time. The coded measurement light emitted the first time includes the bright portion irradiated on the first to eighth regions of the measuring object S. The coded measurement light emitted the first time includes the dark portion irradiated on the ninth to sixteenth regions of the measuring object S. Thus, in the coded measurement light emitted the first time, the bright portion and the dark portion are parallel in the Y direction and are lined in the X direction. Furthermore, the proportions of the bright portion and the dark portion of the coded measurement light emitted the first time are 50% each.

FIG. 11B shows the coded measurement light emitted the second time. The coded measurement light emitted the second time includes the bright portion applied on the fifth to twelfth regions of the measuring object S. The coded measurement light emitted the second time includes the dark portions applied on the first to fourth, and thirteenth to sixteenth regions of the measuring object S. Thus, in the coded measurement light emitted the second time, the bright portion and the dark portion are parallel in the Y direction and are lined in the X direction. Furthermore, the proportions of the bright portion and the dark portion of the coded measurement light emitted the second time are 50% each.

FIG. 11C shows the coded measurement light emitted the third time. The coded measurement light emitted the third time includes the bright portions applied on the first, second, seventh to tenth, fifteenth and sixteenth regions of the measuring object S. The coded measurement light emitted the third time includes the dark portions applied on the third to sixth, and eleventh to fourteenth regions of the measuring object S. Thus, in the coded measurement light emitted the third time, the bright portion and the dark portion are parallel in the Y direction and are lined in the X direction. Furthermore, the proportions of the bright portion and the dark portion of the coded measurement light emitted the third time are 50% each.

FIG. 11D shows the coded measurement light emitted the fourth time. The coded measurement light emitted the fourth time includes the bright portions applied on the first, fourth, fifth, eighth, ninth, twelfth, thirteenth, and sixteenth regions of the measuring object S. The coded measurement light emitted the fourth time includes the dark portions applied on the second, third, sixth, seventh, tenth, eleventh, fourteenth, and fifteenth regions of the measuring object S. Thus, in the coded measurement light emitted the fourth time, the bright portion and the dark portion are parallel in the Y direction and are lined in the X direction. Furthermore, the proportions of the bright portion and the dark portion of the coded measurement light emitted the fourth time are 50% each.

Logic "1" is assigned to the bright portion of the coded measurement light, and logic "0" is assigned to the dark portion of the coded measurement light. The alignment of the logics of the coded measurement light of the first time to the fourth time applied on each region of the measuring object S is referred to as a code. In this case, the first region of the measuring object S is irradiated with the coded measurement light of code "1011". Thus, the first region of the measuring object S is coded to code "1011".

The second region of the measuring object S is irradiated with the coded measurement light of code "1010". Thus, the second region of the measuring object S is coded to code "1010". The third region of the measuring object S is irradiated with the coded measurement light of code "1000". Thus, the third region of the measuring object S is coded to code "1000". Similarly, the sixteenth region of the measuring object S is irradiated with the coded measurement light of code "0011". Thus, the sixteenth region of the measuring object S is coded to code "0011".

As described above, the measuring object S is irradiated with the coded measurement light for a plurality of times such that one of the digits of the code differs only by "1" between the adjacent regions of the measuring object S. In other words, the measuring object S is irradiated with the coded measurement light for a plurality of times such that the bright portion and the dark portion change to a gray code pattern.

The light reflected by each region on the surface of the measuring object S is received by the light receiving unit 120. The code that changes due to the existence of the measuring object S is obtained for every region of the measuring object S by measuring the code of the received light. The difference between the obtained code and the code when the measuring object S does not exist is obtained for each region to calculate the distance corresponding to the distance d of FIG. 6. The absolute value of the distance d is calculated according to the characteristic of the measurement method using the coded measurement light that the code appears only once in the X-axis direction in the image. The absolute height (absolute value of height) of the relevant region of the measuring object S is thereby calculated. The three-dimensional shape of the measuring object S can be measured by calculating the heights of all the regions on the surface of the measuring object S.

In the above description, the surface of the measuring object S is divided into 16 regions in the X direction, and the coded measurement light is emitted from the light projecting unit 110 for four times, but the present invention is not limited thereto. The surface of the measuring object S may be divided into $2^N$ regions (N is a natural number) in the X direction, and the coded measurement light may be emitted from the light projecting unit 110 for N times. In the above description, N is set to 4 to facilitate the understanding. N is set to 8, for example, in the shape measurement processing according to the present embodiment. Therefore, the surface of the measuring object S is divided into 256 regions in the X direction.

In the shape measurement of the measuring object S using the coded measurement light, the distance in which the coded measurement light can be separated and identified, that is, the distance corresponding to one pixel is the smallest resolution. Therefore, if the number of pixels of the visual field in the X direction of the light receiving unit 120 is 1024 pixels, the measuring object S having a height of 10 mm, for example, can be measured with the resolution of 10 mm/1024≈10 μm. The shape measurement using the coded measurement light in which the resolution is low but the absolute value can be calculated, and the shape measurement using the sinusoidal measurement light or the striped measurement light in which the absolute value cannot be calculated but the resolution is high may be combined to calculate the absolute value of the height of the measuring object S at higher resolution.

In particular, in the shape measurement of the measuring object S using the striped measurement light of FIGS. 9A to 9C, the resolution may be 1/100 pixel. The resolution of 1/100 pixel corresponds to dividing the surface of the measuring object S into about 100000 regions in the X direction (i.e., N≈17) when the number of pixels of the visual field in the X direction of the light receiving unit 120 is 1024 pixels. Thus, the absolute value of the height of the measuring object S can be calculated at higher resolution by combining the shape measurement using the coded measurement light and the shape measurement using the striped measurement light.

A method of scanning the measuring object S with the linear measurement light is generally referred to as the light section method. A method of irradiating the measuring object S with the sinusoidal measurement light, the striped measurement light, or the coded measurement light is classified as the pattern projection method. Among the pattern projection method, the method of irradiating the measuring object S with the sinusoidal measurement light or the striped measurement light is classified as the phase shift method, and the method of irradiating the measuring object S with the coded measurement light is classified as the space encoding method.

In the phase shift method, when the sinusoidal measurement light or the striped measurement light, which has a periodic projection pattern, is emitted, the height of the measuring object S is obtained from a phase difference of the phase, which is calculated based on the light receiving amount reflected from a reference height position when the measuring object S does not exist, and the phase, which is calculated based on the light receiving amount reflected from the surface of the measuring object S when the measuring object S exists. In the phase shift method, the individual periodic stripe cannot be distinguished and the uncertainty corresponding to an integral multiple of one period of stripe (2π) exists, and hence there is a drawback that the absolute phase cannot be obtained. However, there are advantages that the measurement time is relatively short and the measurement resolution is high since the number of images to acquire is few compared to the light section method.

In the space encoding method, the code that changed due to the existence of the measuring object S is obtained for every region of the measuring object S. The absolute height of the measuring object S can be obtained by obtaining the difference between the obtained code and the code when the measuring object S does not exist for every region. In the space encoding method as well, there are advantages that the measurement can be carried out with a relatively few number of images, and the absolute height can be obtained. However, there is a limit in the measurement resolution compared to the phase shift method.

These projection methods each have advantages and disadvantages, but are common in that the methods all use the principle of triangulation. Therefore, the measurement of the shade portion on which the measurement light is not irradiated is not possible in any of the measurement methods.

[3] Microscope Mode and Shape Measurement Mode

Figure 12:
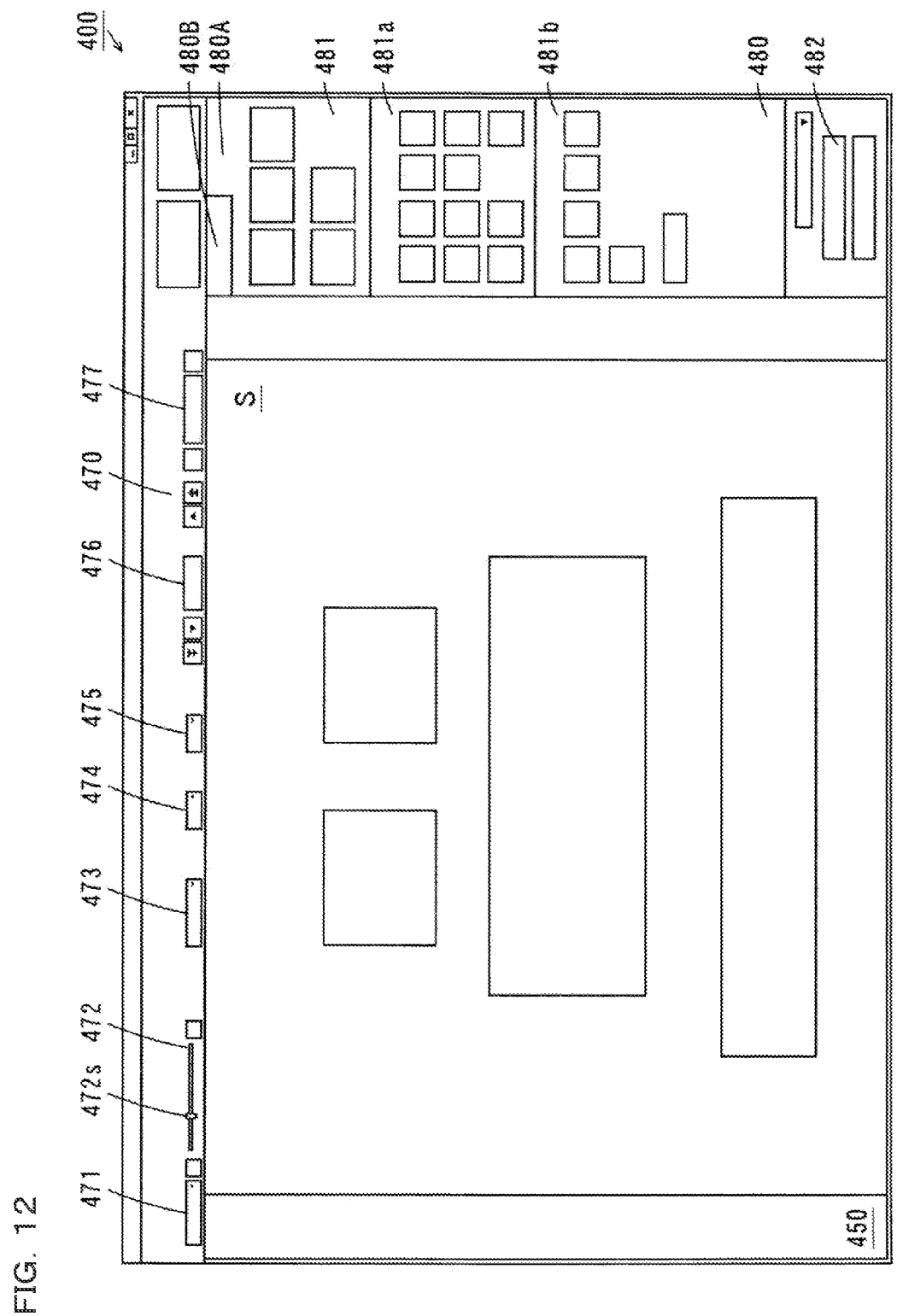
FIG. 12 is a view showing an example of the GUI of a display section at the time of selecting an operation mode.
Figure 13:
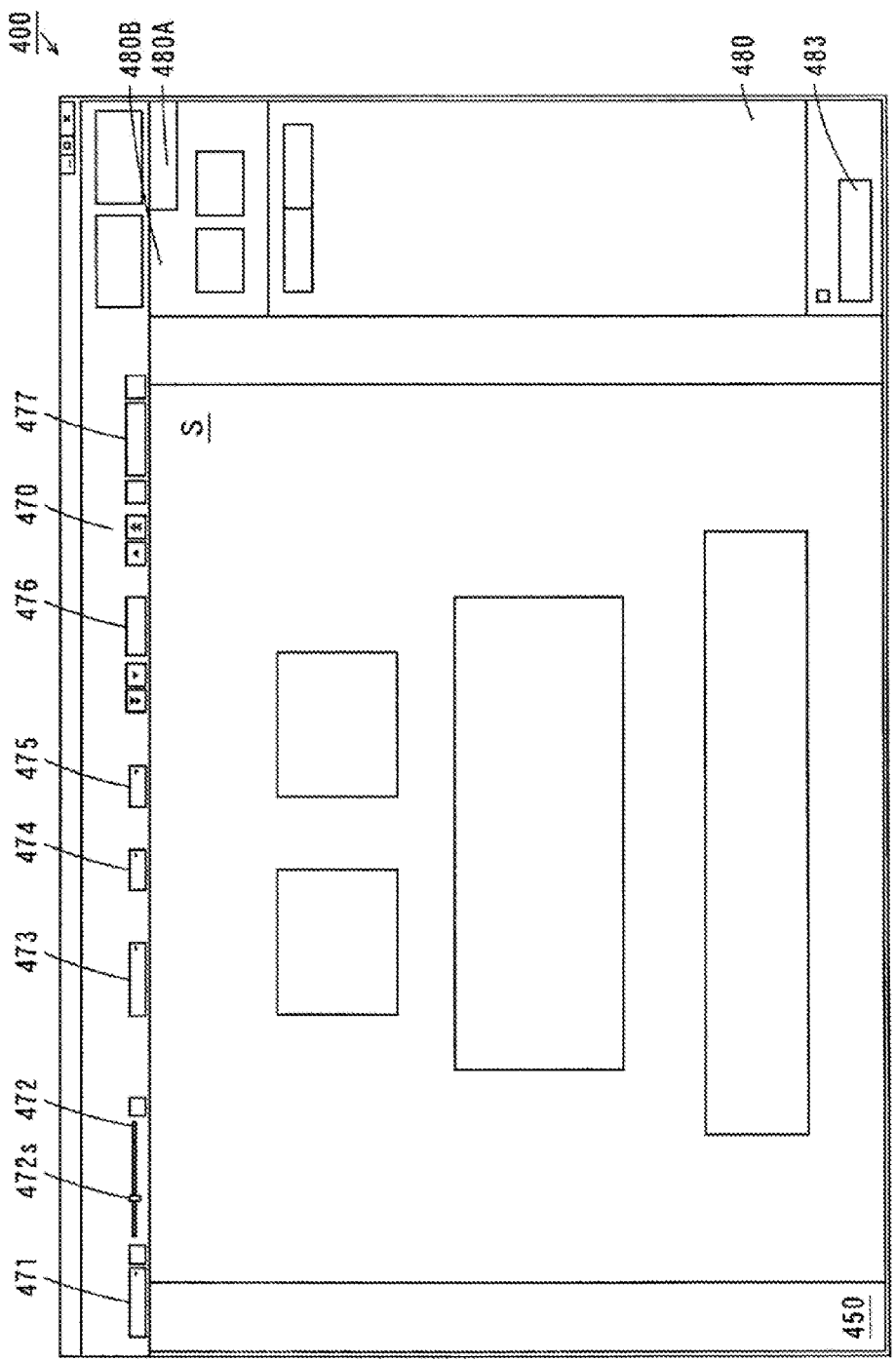
FIG. 13 is a view showing an example of the GUI of the display section at the time of selecting an operation mode.

The shape measuring device 500 according to the present embodiment can operate in a microscope mode and can also operate in a shape measurement mode. FIGS. 12 and 13 are views showing examples of a GUI of the display section 400 at the time of selecting the operation mode. As shown in FIGS. 12 and 13, an image display region 450 and setting changing regions 470, 480 are displayed on the display section 400. The image of the measuring object S captured by the light receiving unit 120 is displayed in the image display region 450.

In the setting changing region 470 is displayed a brightness selecting field 471, a brightness setting bar 472, a display switching field 473, a magnification switching field 474, a magnification selecting field 475, a focus adjustment field 476, and a focus guide display field 477. The brightness setting bar 472 includes a slider 472s that can be moved in the horizontal direction.

The user can switch the mode of exposure time of the light receiving unit 120 between auto (automatic) and manual by selecting the mode of exposure time of the light receiving unit 120 in the brightness selecting field 471. If manual is selected for the mode of exposure time of the light receiving unit 120, the user operates the operation unit 250 of the PC 200 to move the slider 472s of the brightness setting bar 472 in the horizontal direction, thus adjusting the exposure time of the light receiving unit 120. The user can switch the type of display of the image between color and monochrome by selecting the type of display of the image from the display switching field 473.

Figure 26:
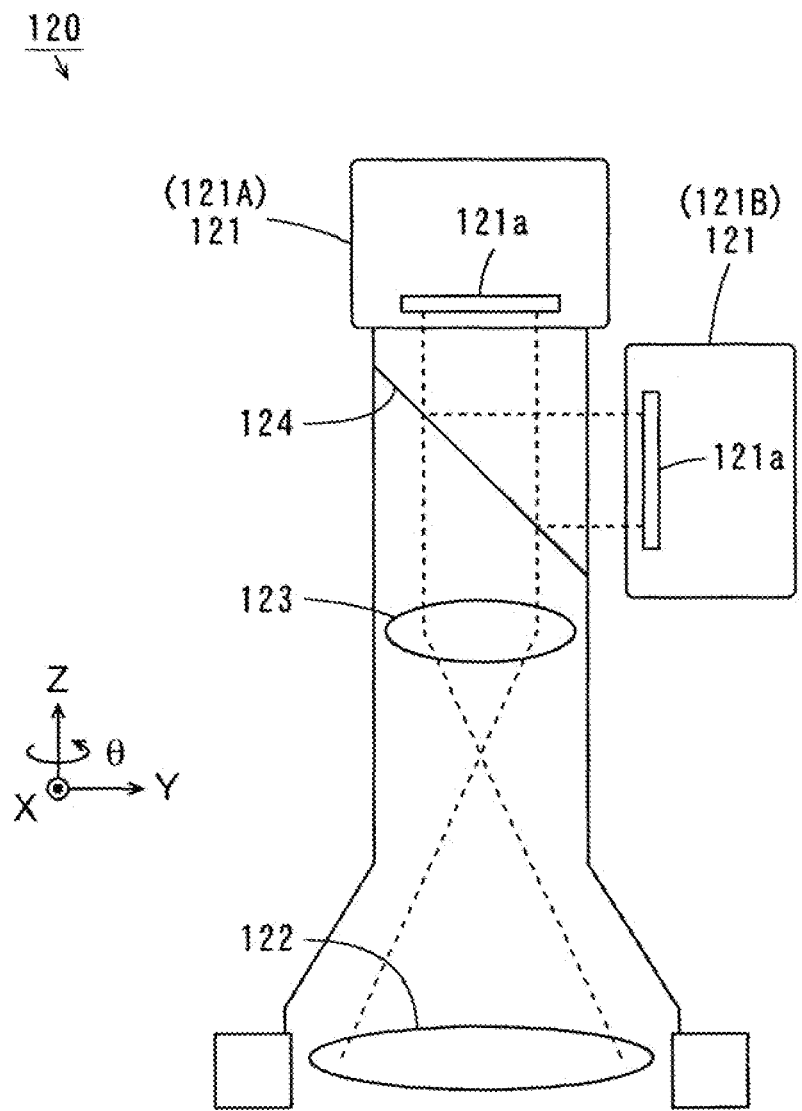
FIG. 26 is a schematic view showing the light receiving unit of FIG. 2 seen from the X direction.

As shown in FIG. 26, to be described later, the light receiving unit 120 includes a camera 121A and a camera 121B, having lenses of different magnifications from each other, for the camera 121. In this example, one camera 121A is referred to as a low magnification camera and the other camera 121B is referred to as a high magnification camera, for example. The user can switch the camera 121 of the light receiving unit 120 between the high magnification camera and the low magnification camera by selecting the magnification of the camera in the magnification switching field 474.

The light receiving unit 120 has a digital zoom function. In this example, the magnification of the camera 121 can be changed to substantially two or more types by combining the two cameras 121 and the digital zoom function. The user can set the magnification of the camera 121 of the light receiving unit 120 by selecting the magnification in the magnification selecting field 475.

The user can input the numerical value in the focus adjustment field 476 to change the focus position of the light receiving unit 120 in the Z direction by a distance corresponding to the input numerical value. The focus position of the light receiving unit 120 is changed by changing the position of the Z stage 142 of the stage 140, that is, the relative distance in the Z direction between the light receiving unit 120 and the measuring object S.

As shown in FIGS. 34A and 34B, and FIGS. 40A and 40B, to be described later, the user can display an auxiliary pattern AP on the display section 400 or the measuring object S, and display a guide pattern GP on the measuring object S by operating the focus guide display field 477. The details will be described in "first auxiliary function of focus adjustment", to be described later.

In the setting changing region 480, a microscope mode selecting tab 480A and a shape measurement mode selecting tab 480B are displayed. When the microscope mode selecting tab 480A is selected, the shape measuring device 500 operates in the microscope mode. In the microscope mode, the measuring object S is irradiated with the illumination light from the illumination light output unit 130. In this state, enlarged observation of the measuring object S can be carried out.

As shown in FIG. 12, when the microscope mode selecting tab 480A is selected, a tool selecting field 481 and a photograph button 482 are displayed in the setting changing region 480. The user operates the photograph button 482 to photograph (capture) the image of the measuring object S displayed in the image display region 450.

A plurality of icons for selecting a plurality of execution tools are displayed in the tool selecting field 481. The user operates one of the plurality of icons in the tool selecting field 481 to execute the execution tool such as planar measurement of the image of the measuring object S being observed, insertion of scale to the image, depth synthesis, insertion of comment to the image, improvement of image, and the like.

For example, when the execution of planar measurement is selected, a measurement tool display field 481a and an auxiliary tool display field 481b are displayed below the tool selecting field 481. The measurement tool display field 481a displays a plurality of icons for executing each of measurement of distance between two points, measurement of distance between two parallel lines, measurement of diameter or radius of a circle, measurement of an angle formed by two lines, and the like. The auxiliary tool display field 481b displays a plurality of icons for executing auxiliary drawing of dot, line, circle, and the like on the image in the image display region 450.

When the shape measurement mode selecting tab 480B is selected, the shape measuring device 500 operates in the shape measurement mode. As shown in FIG. 13, when the shape measurement mode selecting tab 480B is selected, a measurement button 483 is displayed in the setting changing region 480. The user can execute the shape measurement processing by operating the measurement button 483 after the preparation of the shape measurement is finished.

[4] Texture Image
(1) Synthesized Image
In the measuring section 100, data indicating the image of the state of the surface of the measuring object S is generated while being irradiated with the illumination light from the illumination light output unit 130 or the measurement light having a uniform pattern from the light projecting unit 110. The state of the surface includes, for example, pattern and hue. Hereinafter, the image of the state of the surface of the measuring object S is referred to as a texture image, and the data indicating the texture image is referred to as texture image data.

The generated texture image data and stereoscopic shape data generated in the shape measurement processing are synthesized to generate synthesized data. The display section 400 displays an image in which the stereoscopic shape of the measuring object S and the state of the surface are synthesized based on the synthesized data. Hereinafter, the stereoscopic shape data generated in the shape measurement processing is referred to as main stereoscopic shape data. The image displayed based on the main stereoscopic shape data is referred to as an image of the main stereoscopic shape.

Figure 14:
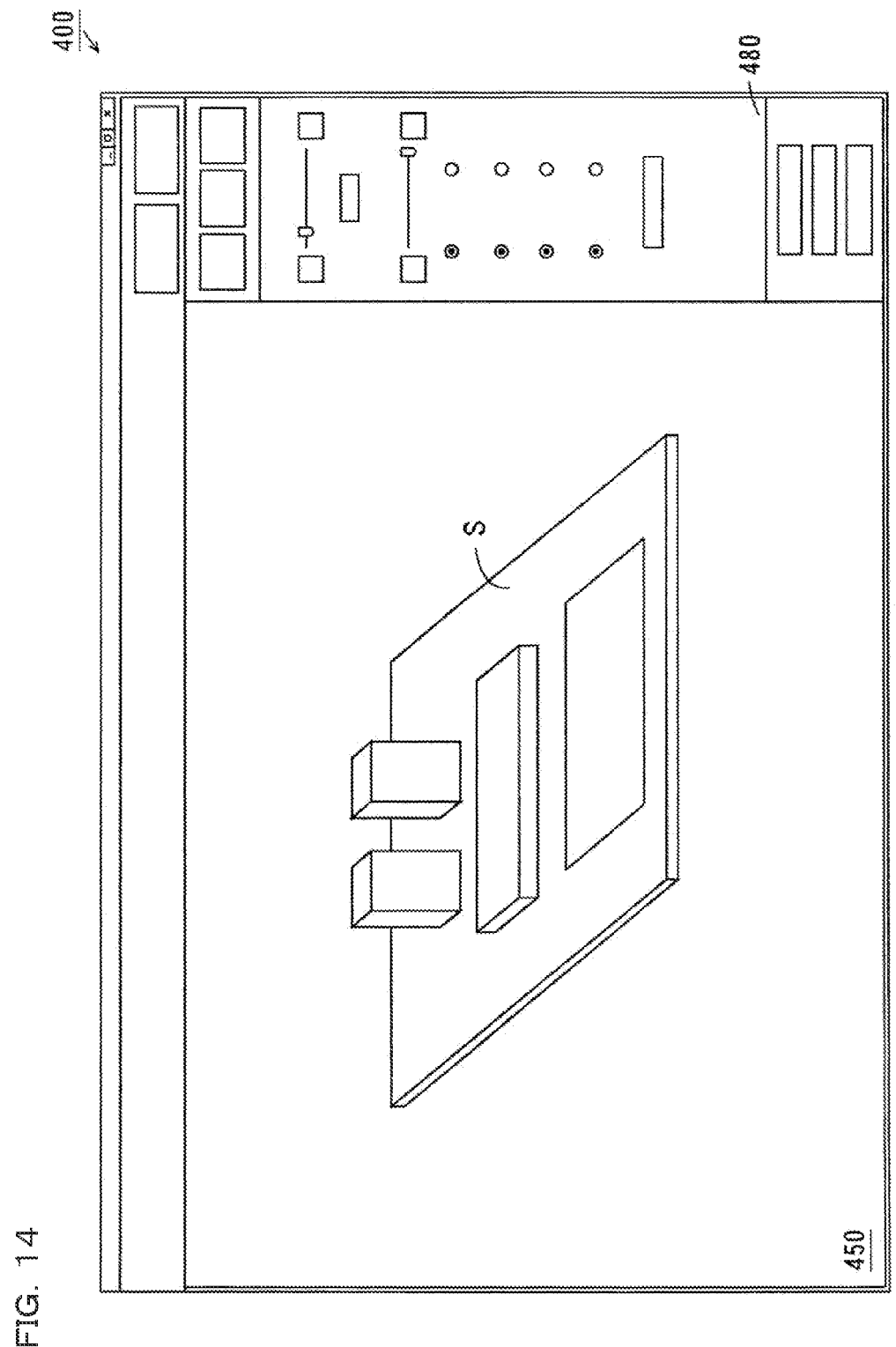
FIG. 14 is a view showing an example of the GUI of the display section after the execution of the shape measurement processing.

FIG. 14 is a view showing an example of the GUI of the display section 400 after the execution of the shape measurement processing. As shown in FIG. 14, the image of the measuring object S is displayed in the image display region 450 based on the synthesized data generated in the shape measurement processing. The user can check the measurement result of the measuring object S or execute a simple measurement on the synthesized image.

If the entire surface of the measuring object S is not positioned within a range of the depth of field although the entire surface of the measuring object S is positioned in a measurable range in the Z direction of the light receiving unit 120, the whole or a part of the texture image will not be clearly displayed. Thus, if the dimension in the Z direction of the measuring object S is greater than the range of the depth of field of the light receiving unit 120, the texture image data of the measuring object S positioned within the range of the depth of field of the light receiving unit 120 is acquired while changing the relative distance between the light receiving unit 120 and the measuring object S. By synthesizing the plurality of acquired texture image data, the texture image data (hereinafter referred to as all-focus texture image data) from which the entire surface of the measuring object S can be displayed clearly is generated.

Figure 15:
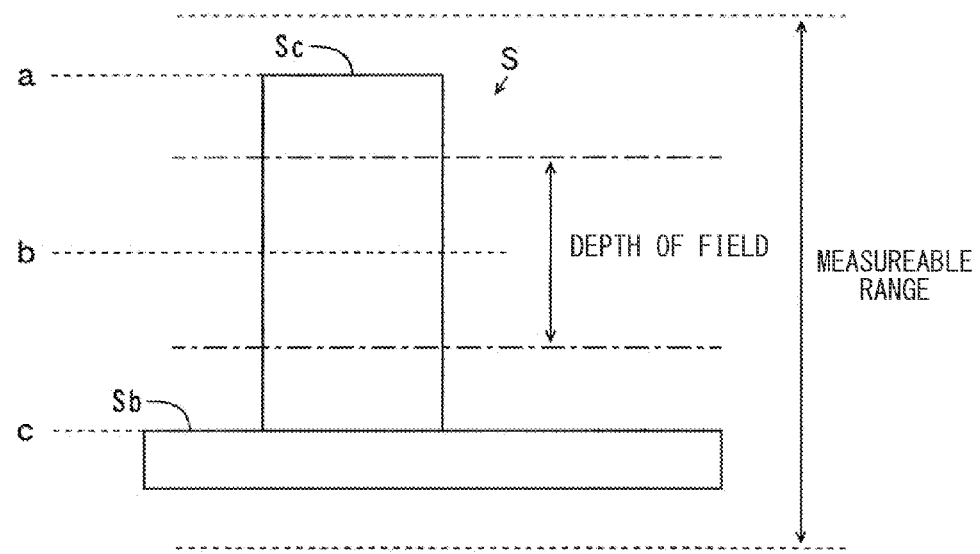
FIG. 15 is a schematic side view of the measuring object for describing an all-focus texture image.

FIG. 15 is a schematic side view of the measuring object S for describing the all-focus texture image. The measuring object S of FIG. 15 has a configuration in which an electrolytic capacitor Sc is mounted on the circuit substrate Sb. Characters are provided on the upper surface of the circuit substrate Sb and the electrolytic capacitor Sc. As shown in FIG. 15, the dimension in the Z direction of the measuring object S (dimension from the lower surface of the circuit substrate Sb to the upper surface of the electrolytic capacitor Sc in this example) is smaller than the measurable range in the Z direction of the light receiving unit 120 and greater than the range of the depth of field.

Figure 16A:
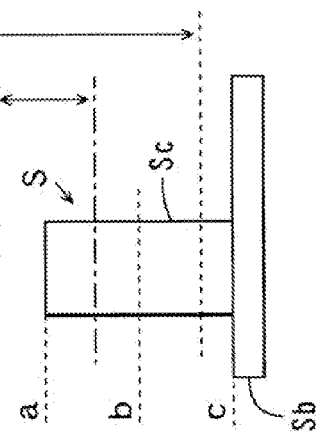
FIGS. 16A to 16F are views showing a relationship between a focus position of a light receiving unit and the definition of a texture image.
Figure 16C:
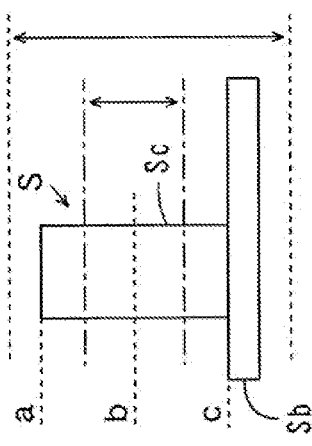
Figure 16E:
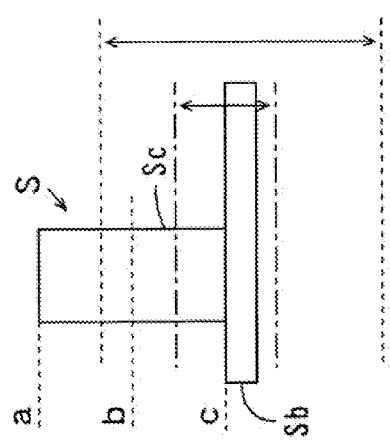
Figure 16B:
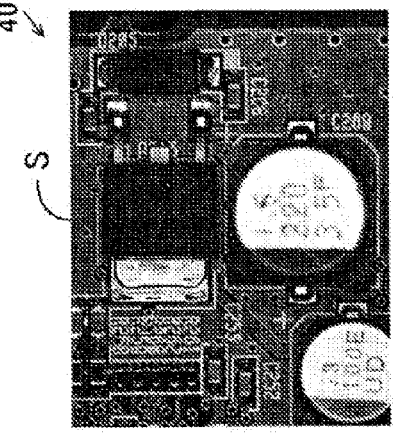

FIGS. 16A to 16F are views showing a relationship between the focus position of the light receiving unit 120 and the definition of the texture image. FIGS. 16A, 16C, and 16E show side views of the measuring object S of FIG. 15. In FIG. 16A, the light receiving unit 120 is focused on a position a on the upper surface of the electrolytic capacitor Sc of the measuring object S. In FIG. 16B, the light receiving unit 120 is focused on a position b intermediate between the upper surface of the electrolytic capacitor Sc and the upper surface of the circuit substrate Sb of the measuring object S. In FIG. 16C, the light receiving unit 120 is focused on a position c on the upper surface of the circuit substrate Sb of the measuring object S.

FIG. 16B shows the texture image of the measuring object S based on the texture image data acquired in the state of FIG. 16A. In this case, the position a on the upper surface of the electrolytic capacitor Sc is positioned within the depth of field of the light receiving unit 120, and thus the characters provided to the upper surface of the electrolytic capacitor Sc are displayed clearly, as shown in FIG. 16B. However, the position c on the upper surface of the circuit substrate Sb is not positioned within the depth of field of the light receiving unit 120. Thus, the characters provided to the upper surface of the circuit substrate Sb are displayed unclearly. Furthermore, the position c on the upper surface of the circuit substrate Sb is also not positioned within the measurable range in the Z direction of the light receiving unit 120. Therefore, when the height of the stage 140 is aligned with the position in FIG. 16E, the height of the position a on the upper surface of the electrolytic capacitor Sc cannot be calculated, or the reliability of the calculated height lowers.

Figure 16D:
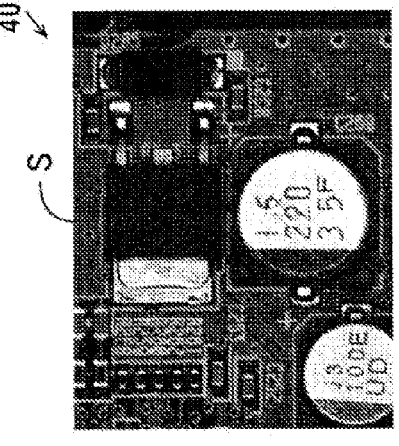

FIG. 16D shows the texture image of the measuring object S based on the texture image data acquired in the state of FIG. 16C. In this case, the position b intermediate of the upper surface of the electrolytic capacitor Sc and the upper surface of the circuit substrate Sb is positioned within the range of the depth of field of the light receiving unit 120. However, the upper surface of the electrolytic capacitor Sc and the upper surface of the circuit substrate Sb are positioned outside the range of the depth of field and within the measurable range in the Z direction of the light receiving unit 120, and thus the characters provided to the upper surface of the electrolytic capacitor Sc and the characters provided to the upper surface of the circuit substrate Sb are displayed slightly unclearly, as shown in FIG. 16D.

Figure 16F:
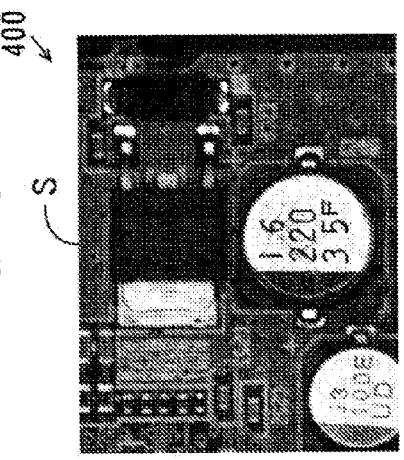

FIG. 16F shows the texture image of the measuring object S based on the texture image data acquired in the state of FIG. 16E. In this case, the position c on the upper surface of the circuit substrate Sb is positioned within the range of the depth of field of the light receiving unit 120, and thus the characters provided to the upper surface of the circuit substrate Sb are displayed clearly, as shown in FIG. 16F. However, the position a on the upper surface of the electrolytic capacitor Sc is not positioned within the range of the depth of field of the light receiving unit 120. Thus, the characters provided to the upper surface of the electrolytic capacitor Sc are displayed unclearly. The position a on the upper surface of the electrolytic capacitor Sc is also not positioned within the measurable range in the Z direction of the light receiving unit 120. Therefore, when the height of the stage 140 is aligned with the position in FIG. 16A, the height of the position c on the upper surface of the circuit substrate Sb cannot be calculated, or the reliability of the calculated height lowers.

Figure 17:
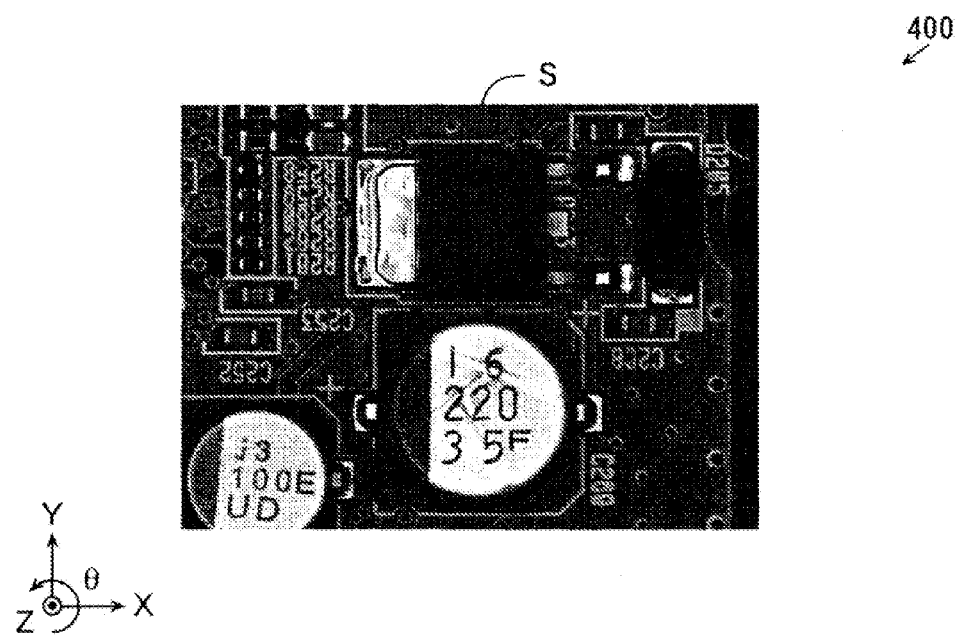
FIG. 17 shows an all-focus texture image of the measuring object based on the generated all-focus texture image data.

The all-focus texture image data is generated by synthesizing the texture image data of the positions a to c. FIG. 17 shows an all-focus texture image of the measuring object S based on the generated all-focus texture image data. As shown in FIG. 17, in the all-focus texture image, the characters provided to the upper surface of the electrolytic capacitor Sc are displayed clearly, and the characters provided to the upper surface of the circuit substrate Sb are also displayed clearly.

As described above, the height at which the light receiving unit 120 is focused is changed with respect to the measuring object S by changing the relative position in the Z direction between the light receiving unit 120 and the stage 140. Thus, even with the measuring object S having a level difference that cannot be accommodated within the range of the depth of field of the light receiving unit 120 at once, the all-focus texture image in which all portions are focused can be acquired by synthesizing a plurality of texture images captured while changing the focus of the light receiving unit 120.

Note that the depth of field has a width unique to the shape measuring device 500 that changes according to the magnification of the lens of the light receiving unit 120.

When generating the all-focus texture image, the relative positions in the Z direction of the light receiving unit 120 and the stage 140 are changed within a predetermined range at a predetermined interval to acquire a plurality of texture images. The range and interval along which the light receiving unit 120 and the stage 140 are relatively moved in the Z direction are values unique to the shape measuring device 500. However, if the shape of the measuring object S is known such as when the shape measurement processing of the measuring object S is executed in advance, when data (e.g., CAD data) indicating the shape of the measuring object S is obtained in advance, or the like, the optimum moving range and interval may be determined based on such data.

For example, a range slightly wider than the range defined by the upper limit and the lower limit of the height of the measuring object S may be assumed as the moving range. The interval may be changed according to the gradient of the height shape of the measuring object S. The parameters for defining the relative movement in the Z direction of the stage 140 and the light receiving unit 120 when acquiring the all-focus texture image may be arbitrarily set by the user.

The all-focus texture image data is generated by synthesizing a plurality of pieces of texture image data for a portion included within the range of the depth of field of the light receiving unit 120 of all the portions of the measuring object S. In acquiring the texture image data of each portion of the measuring object S, the height of each portion of the measuring object S is calculated based on the relative distance between the light receiving unit 120 and the measuring object S when each portion of the measuring object S is included within the range of the depth of field of the light receiving unit 120.

The data indicating the stereoscopic shape of the measuring object S is generated by synthesizing the heights calculated for all the portions of the measuring object S. The data indicating the stereoscopic shape of the measuring object S is referred to as sub-stereoscopic shape data. The all-focus texture image data and the main stereoscopic shape data are synthesized to generate the synthesized data.

Figure 18A:
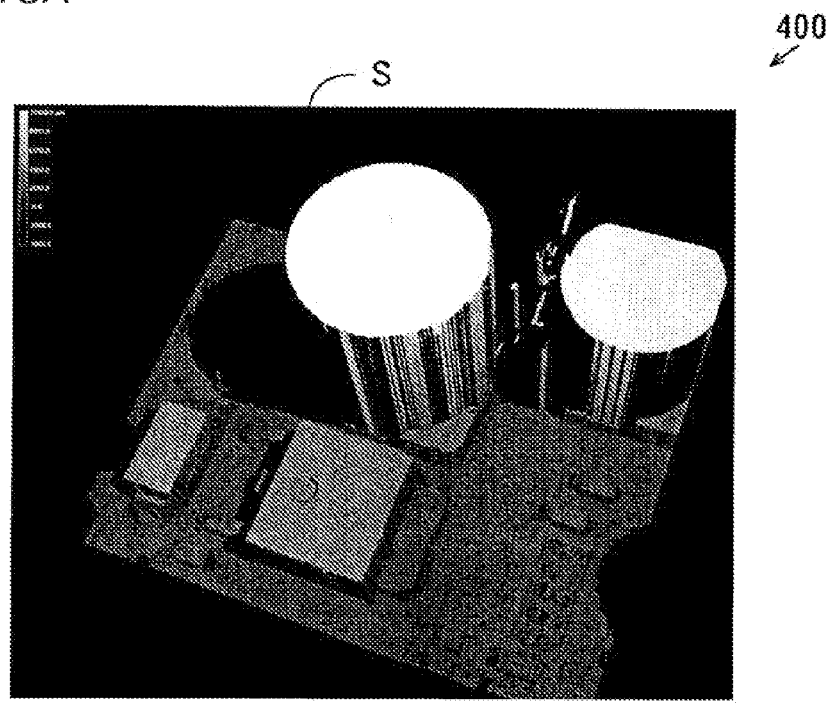
FIGS. 18A and 18B show synthesized images of the measuring object based on the synthesized data.
Figure 18B:
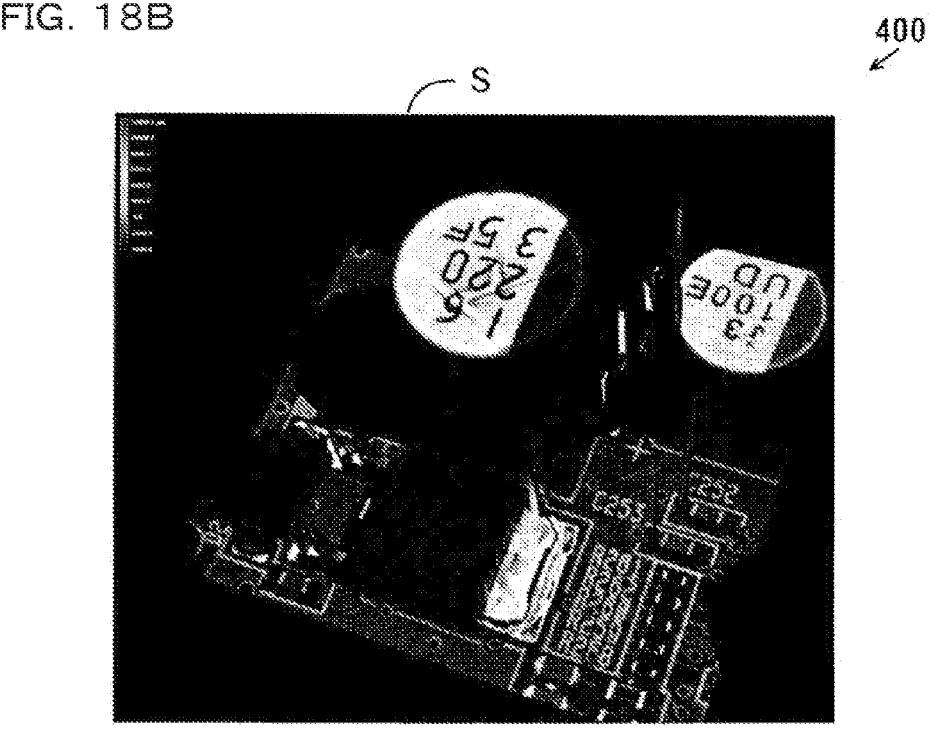

FIGS. 18A and 18B show synthesized images of the measuring object S based on the synthesized data. FIG. 18A shows an image of the main stereoscopic shape of the measuring object S based on the main stereoscopic shape data. The main stereoscopic shape data showing the main stereoscopic shape of FIG. 18A and the all-focus texture image data are synthesized to generate the synthesized data. FIG. 18B shows a synthesized image based on the generated synthesized data. As shown in FIG. 18B, even if the dimension in the Z direction of the measuring object S is greater than the range of the depth of field of the light receiving unit 120, the surface states of the different height portions of the measuring object S are displayed clearly.

The value of each pixel of the main stereoscopic shape data indicates the height data at the position of the relevant pixel. The value of each pixel of the all-focus texture image data, on the other hand, indicates the texture information (information on state of surface) including color and luminance at the position of the relevant pixel. Therefore, the synthesized image shown in FIGS. 18A and 18B can be generated by synthesizing the information of the corresponding pixels.

The shape measurement of the measuring object S is carried out normally in one processing, the details of which will be described later. For example, in the example of FIG. 16A, the height of the position c on the upper surface of the circuit substrate Sb cannot be calculated since the position c on the upper surface of the circuit substrate Sb is not within the measurable range of the light receiving unit 120. Therefore, as shown in FIG. 16C, the relative distance in the Z direction between the light receiving unit 120 and the stage 140 needs to be adjusted so that the entire measuring object S is accommodated within the measurable range in the Z direction of the light receiving unit 120 as much as possible.

In the processing of generating the all-focus texture image, the imaging is carried out a plurality of times while changing the relative distance in the Z direction between the light receiving unit 120 and the stage 140. Thus, the relative distance between the light receiving unit 120 and the stage 140 is not required to be adjusted in advance so that the entire measuring object S is accommodated within the range of the depth of field of the light receiving unit 120 in one imaging. Therefore, the user adjusts the relative distance in the Z direction between the light receiving unit 120 and the stage 140 with regard to whether or not the measuring object S is accommodated within the measurable range in the Z direction of the light receiving unit 120 for performing the shape measurement processing and not the range of the depth of field of the light receiving unit 120 when acquiring the texture image.

When performing the shape measurement processing at the position of the stage 140 shown in FIG. 16A, the height of the position c on the upper surface of the circuit substrate Sb cannot be calculated, or the reliability of the calculated height lowers. In the processing of generating the all-focus texture image, the imaging is carried out a plurality of times while changing the relative distance in the Z direction between the light receiving unit 120 and the stage 140, and thus the texture image in which the light receiving unit 120 is focused on the position c on the upper surface of the circuit substrate Sb can be acquired. Therefore, even if the height data is lacked or the pixel of low reliability exists at a part of the texture image, the texture information of the all-focus texture image data can be given to the relevant pixel.

In the shape measurement processing using the triangular distance measurement according to the present invention, the measurable range in the Z direction of the light receiving unit 120 is generally wider than the range of the depth of field of the light receiving unit 120. This is because in the triangular distance measurement, the shape of the measuring object S can be measured even if the image is blurred to some extent. However, the range of the depth of field of the light receiving unit 120 is a subjective range that appears to be in-focus to the user. Although the measurable range in the Z direction of the light receiving unit 120 is a value unique to the shape measuring device 500 defined by the light projecting unit 110 and the light receiving unit 120, the measuring object S not within the measurable range in the Z direction of the light receiving unit 120 is not necessarily unmeasurable.

Furthermore, if the level difference of the measuring object S is large, the entire measuring object S may not be measured all at once no matter how the relative distance in the Z direction between the light receiving unit 120 and the stage 140 is adjusted. In this case, the shape measurement processing is carried out a plurality of times while changing the relative distance in the Z direction between the light receiving unit 120 and the stage 140 even when performing the shape measurement processing, so that the stereoscopic shape configured by the height data having the highest reliability of each pixel can be acquired. In this case, the measurement of the entire measuring object S having the level difference exceeding the measurable range in the Z direction of the light receiving unit 120 is enabled, and the texture information can be given to the entire stereoscopic shape of the measuring object S having a large level difference.

In the example of FIGS. 18A and 18B, the texture image is synthesized to the measuring object S displayed three-dimensionally, but the present invention is not limited thereto. For example, the texture information may be displayed in a superimposed manner on the two-dimensional image in which the height of the measuring object S is represented by change in hue. In this case, the image having an intermediate hue and luminance between the two-dimensional image showing the height and the texture image may be generated and displayed by allowing the user to adjust the ratio between the two-dimensional image indicating the height and the texture information, for example.

In the above description, the all-focus texture image data and the sub-stereoscopic shape data are respectively generated based on the texture image data and the height of three positions a to c to facilitate the understanding, but the present invention is not limited thereto. The all-focus texture image data and the sub-stereoscopic shape data may be respectively generated based on the texture image data and the height of two or less, or four or more positions.

In this example, the position in the Z direction of the measuring object S is changed from the upper limit toward the lower limit, or from the lower limit toward the upper limit of the measurable range in the Z direction of the light receiving unit 120 at an interval smaller than the range of the depth of field of the light receiving unit 120. The all-focus texture image data and the sub-stereoscopic shape data are respectively generated based on the texture image data and the height of each position in the Z direction.

Alternatively, if the main stereoscopic shape data of the measuring object S is generated before the generation of the all-focus texture image data and the sub-stereoscopic shape data, the upper end and the lower end in the Z direction of the measuring object S can be calculated based on the main stereoscopic shape data. Therefore, the position in the Z direction of the measuring object S may be changed from the upper end toward the lower end, or from the lower end toward the upper end of the dimension in the Z direction of the measuring object S at an interval smaller than the range of the depth of field of the light receiving unit 120. The all-focus texture image data and the sub-stereoscopic shape data are respectively generated based on the texture image data and the height of each position in the Z direction.

In this case, the texture image data can be acquired in a minimum range for generating the all-focus texture image data and the sub-stereoscopic shape data of the measuring object S, and the height can be calculated. Thus, the all-focus texture image data and the sub-stereoscopic shape data can be generated at high speed.

(2) Type of Texture Image

The user can select the type of texture image when acquiring the texture image data. The type of texture image includes, for example, normal texture image, all-focus texture image, high dynamic range (HDR) texture image, and a combination of the same. When the all-focus texture image is selected, the all-focus texture image data described above is generated. When the HDR texture image is selected, the texture image data is generated in which a known high dynamic range (HDR) synthesis is carried out.

When the difference in reflectivity of a plurality of portions of the surface of the measuring object S or a difference in brightness depending on hue is small and the dimension of the measuring object S in the Z direction is greater than the depth of field of the light receiving unit 120, the user selects the all-focus texture image. The texture image data that clearly indicates the surface state of the measuring object S then can be generated in a short time. When the surface of the measuring object S includes a portion of high reflectivity and a portion of low reflectivity, or when the difference in brightness depending on hue is large, the user selects the HDR texture image. Thus, there can be generated the texture image data that clearly indicates the surface state of the measuring object S that does not include the underexposure and the overexposure.

In the normal texture image, the synthesis of the texture image is not carried out. In this case, one texture image data is generated based on the light receiving signal output by the light receiving unit 120 with the focus position of the light receiving unit 120 fixed. When the difference in reflectivity or the difference in brightness depending on hue of the plurality of portions of the surface of the measuring object S is small and the dimension of the measuring object S in the Z direction is smaller than the range of the depth of field of the light receiving unit 120, the user selects the normal texture image. Thus, there can be generated the texture image data that clearly indicates the surface state of the measuring object S in a shorter time.

When the HDR texture image is selected, a plurality of pieces of texture image data are generated under different imaging conditions at one position in the Z direction. The imaging conditions include an exposure time of the light receiving unit 120. The imaging conditions may include an intensity (brightness) of the illumination light from the illumination light output unit 130 or an intensity (brightness) of the uniform measurement light from the light projecting unit 110. In such cases, the CPU 210 can easily generate a plurality of pieces of texture image data under a plurality of imaging conditions.

The plurality of pieces of generated texture image data are synthesized (HDR synthesis) so that the texture image at a certain position in the Z direction does not include the underexposure and the overexposure. The dynamic range of the texture image is thereby enlarged. The HDR texture image is displayed based on the HDR synthesized texture image data (hereinafter referred to as HDR texture image data).

When the combination of the all-focus texture image and the HDR texture image (hereinafter referred to as HDR all-focus texture image) is selected, a plurality of pieces of texture image data are acquired under different imaging conditions at each position in the Z direction while changing the position in the Z direction of the measuring object S. The plurality of pieces of texture image data acquired at each position in the Z direction are HDR synthesized such that the dynamic range of the image at the position in the Z direction is enlarged, thus generating the HDR texture image data.

Furthermore, the HDR texture image data (hereinafter referred to as HDR all-focus texture image data) that can be displayed on the entire surface of the measuring object S is generated by synthesizing the plurality of pieces of HDR texture image data for the portion included within the range of the depth of field of the light receiving unit 120 of all the portions of the measuring object S. The HDR all-focus texture image is displayed based on the HDR all-focus texture image data.

As described above, when the surface of the measuring object S includes the portion of high reflectivity and the portion of low reflectivity or the difference in brightness depending on hue is large, and the dimension of the measuring object S is greater than the depth of field of the light receiving unit, the user selects the HDR all-focus texture image. The texture image data that clearly indicates the surface state of the measuring object S then can be generated.

Figure 19:
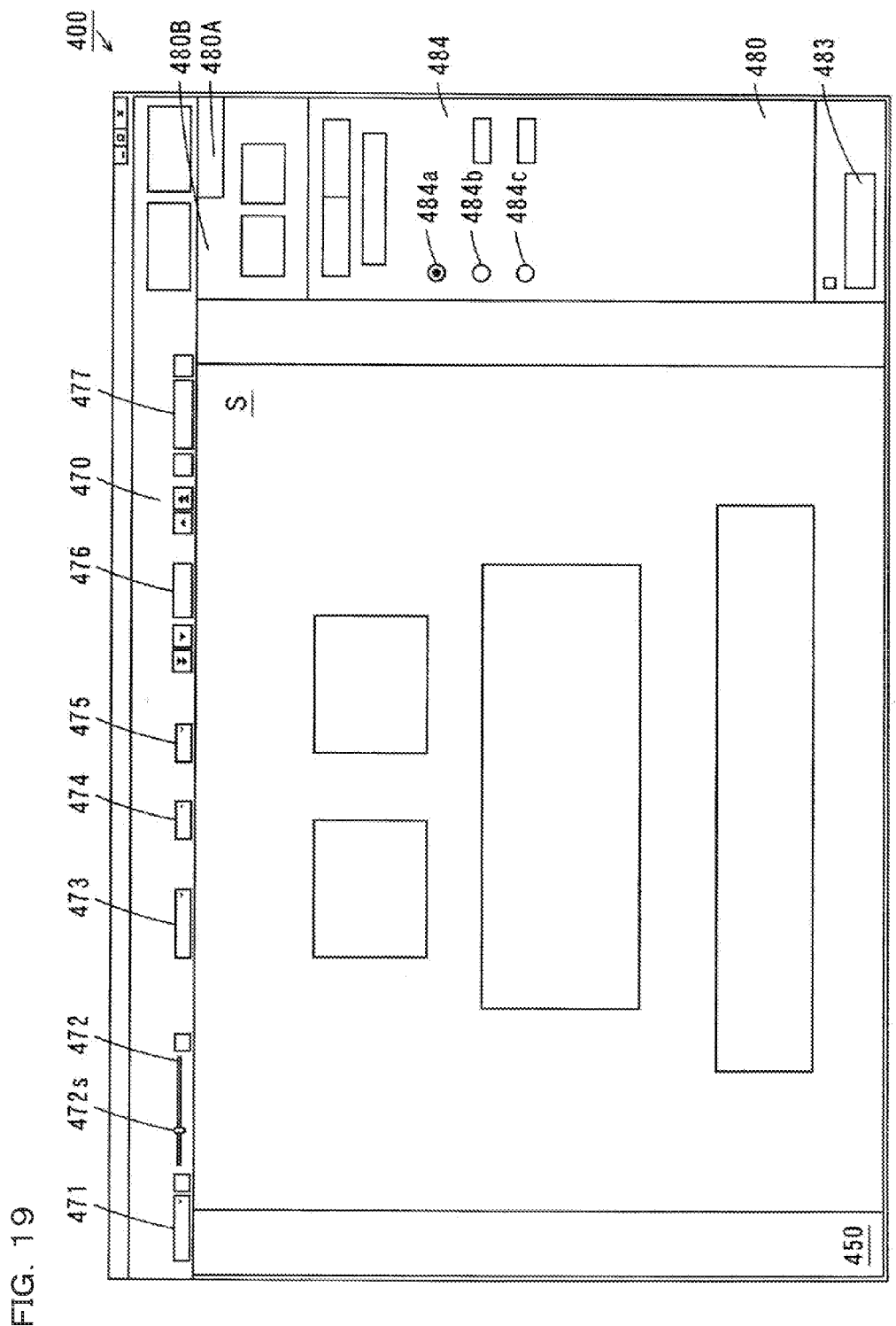
FIG. 19 is a view showing an example of the GUI of the display section at the time of selecting the type of texture image.

FIG. 19 is a view showing an example of the GUI of the display section 400 at the time of selecting the type of texture image. As shown in FIG. 19, at the time of selecting the type of texture image, a texture image selecting field 484 is displayed in the setting changing region 480 of the display section 400. The texture image selecting field 484 displays three check boxes 484a, 484b, and 484c.

The user specifies the check box 484a to 484c to select the normal texture image, the HDR texture image, and the all-focus texture image, respectively. The user specifies the check boxes 484b, 484c to select the HDR all-focus texture image.

(3) Correction of Main Stereoscopic Shape Data

The accuracy of the sub-stereoscopic shape data is lower than the accuracy of the main stereoscopic shape data. However, since the main stereoscopic shape data is generated based on the triangular distance measuring method, the measuring object S needs to be irradiated with light at an angle different from that of the optical axis of the light receiving unit 120 in order to generate the main stereoscopic shape data. The main stereoscopic shape data thus often contain a defective portion that corresponds to a region where the shape of the measuring object S cannot be accurately measured. The defective portion includes blank data corresponding to a portion of shade of the image, noise data corresponding to a portion of noise, or pseudo-shape data corresponding to a portion of pseudo-shape of the measuring object S due to multiple reflection or the like.

In order to generate the sub-stereoscopic shape data, on the other hand, the measuring object S is not required to be irradiated with light at an angle different from that of the optical axis of the light receiving unit 120, and the measuring object S can be irradiated at an angle substantially equal to that of the optical axis of the light receiving unit 120. In this case, the sub-stereoscopic shape data hardly contains the defective portion. Therefore, the sub-stereoscopic shape data that hardly contains the defective portion can be generated by using the illumination light emitted from the illumination light output unit 130, which is arranged substantially above the measuring object S.

The defective portion of the main stereoscopic shape data is determined based on the sub-stereoscopic shape data. In this example, the sub-stereoscopic shape data and the main stereoscopic shape data of the same measuring object S are compared. The defective portion of the main stereoscopic shape data thus can be easily determined. On the other hand, in the shape measurement processing, when the contrast of the pattern of the measurement light partially lowers, the reliability of the portion of the main stereoscopic shape data corresponding to such a portion lowers.

In this case as well, the portion of low reliability in the main stereoscopic shape data can be determined based on the sub-stereoscopic shape data and the main stereoscopic shape data. In this example, the sub-stereoscopic shape data and the main stereoscopic shape data are compared. A difference between each portion of the sub-stereoscopic shape data and each portion of the main stereoscopic shape data is calculated respectively, and determination is made that the portion of the main stereoscopic shape data where the difference is greater than a threshold value defined in advance has low reliability.

As described above, the portion where deviation from the sub-stereoscopic shape data is greater than the threshold value of the plurality of portions of the main stereoscopic shape data is determined to have low reliability. The threshold value may be a fixed value, or may be a variable value that can be arbitrarily adjusted by the user by operating the slider, and the like. The portion determined to have low reliability in the main stereoscopic shape data is referred to as low reliability portion of the main stereoscopic shape data.

The defective portion or the low reliability portion of the main stereoscopic shape data may be subjected to correction such as replacement, interpolation, or the like by the corresponding portion of the sub-stereoscopic shape data. The user then can observe the image of the main stereoscopic shape or the synthesized image of the measuring object S that does not contain the defective portion in appearance or the low reliability portion on the display section 400. The reliability of the low reliability portion of the main stereoscopic shape data can be enhanced. In correcting the main stereoscopic shape data, the defective portion or the low reliability portion of the main stereoscopic shape data may be interpolated by the portion of the main stereoscopic shape data at the periphery of the defective portion or the low reliability portion.

Figure 20A:
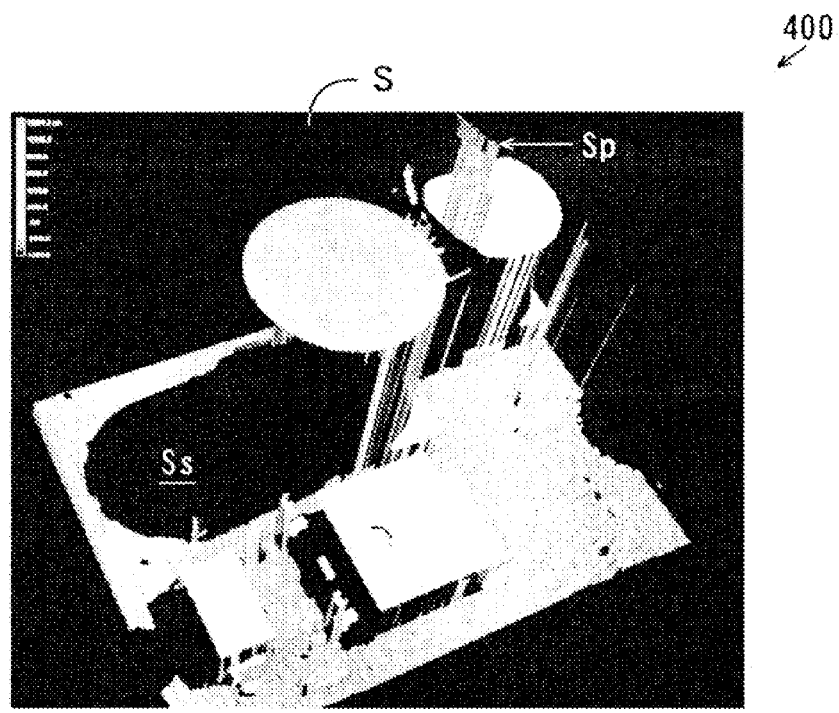
FIGS. 20A and 20B are views describing correction of main stereoscopic shape data by sub-stereoscopic shape data.
Figure 20B:
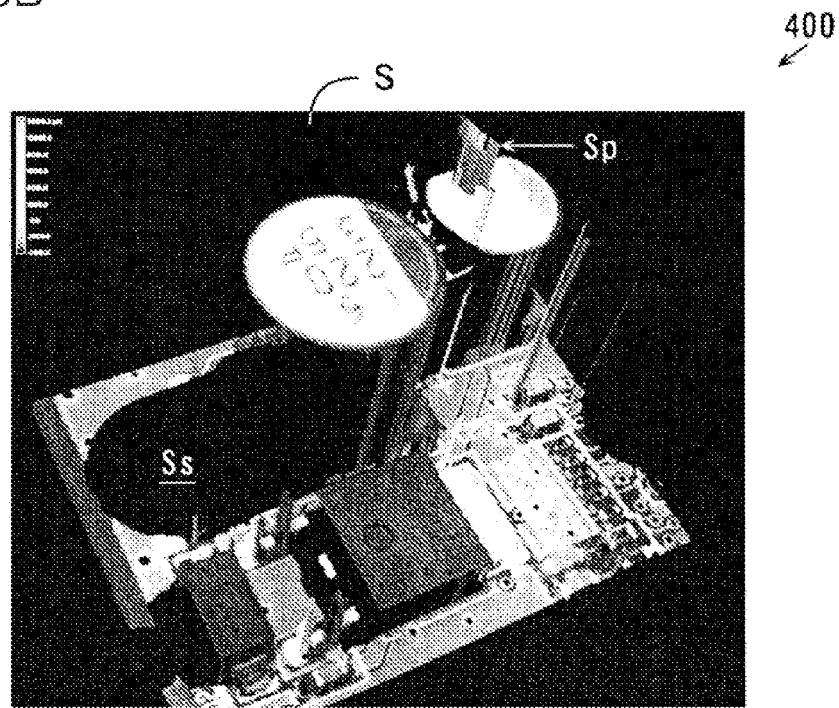
Figure 21A:
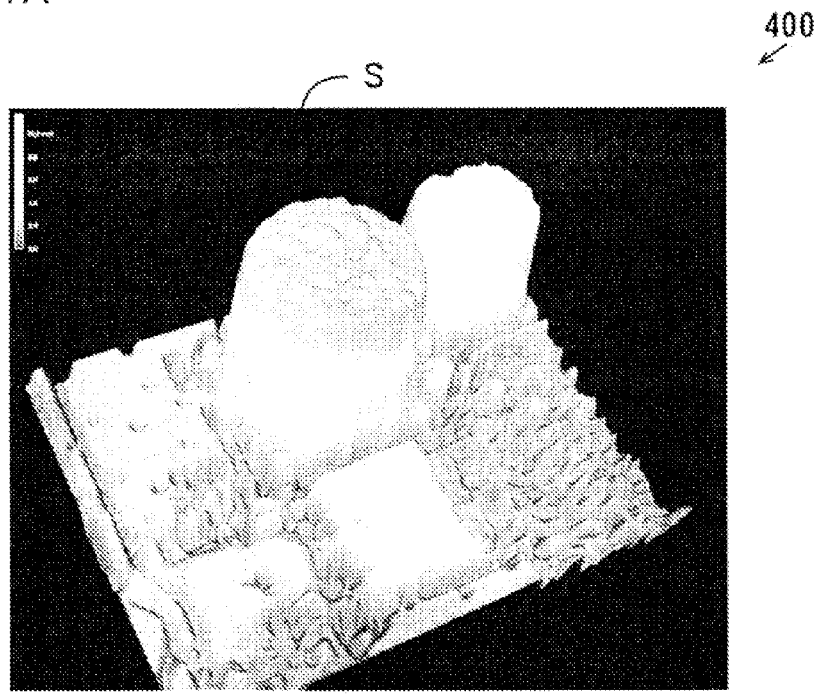
FIGS. 21A and 21B are views describing correction of the main stereoscopic shape data by the sub-stereoscopic shape data.
Figure 21B:
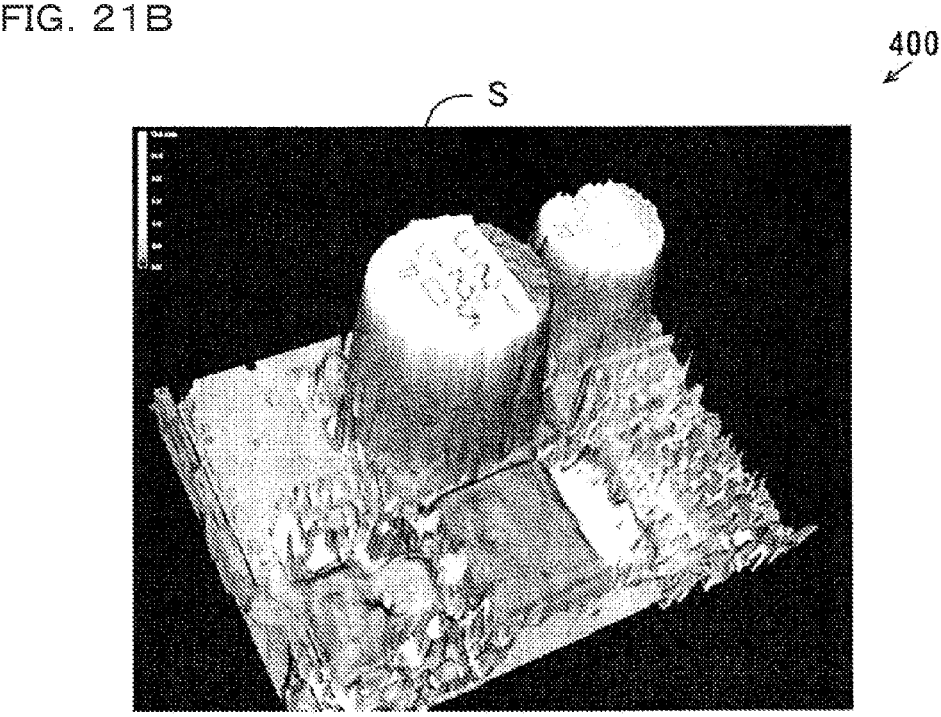
Figure 22A:
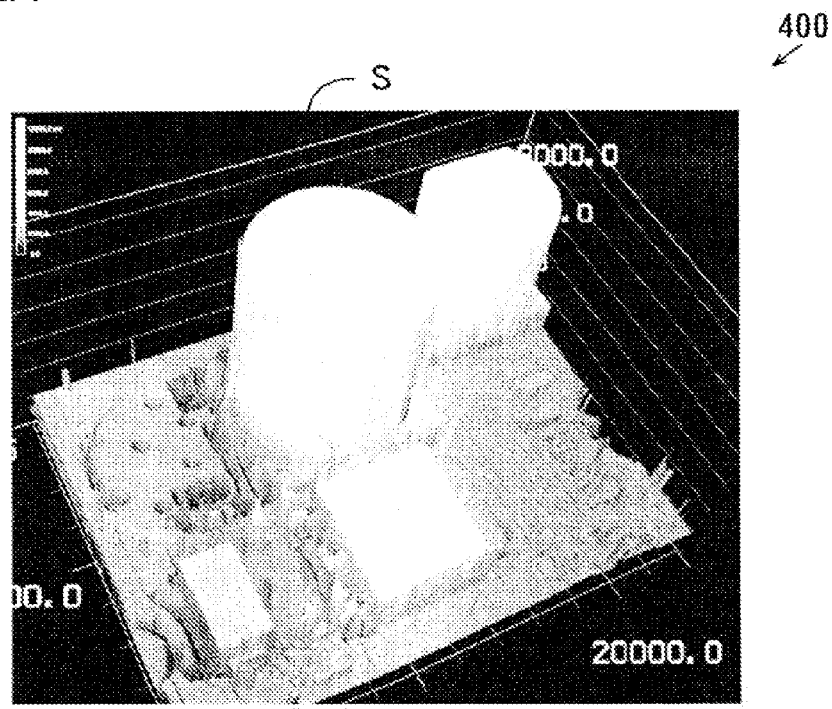
FIGS. 22A and 22B are views describing correction of the main stereoscopic shape data by the sub-stereoscopic shape data.
Figure 22B:
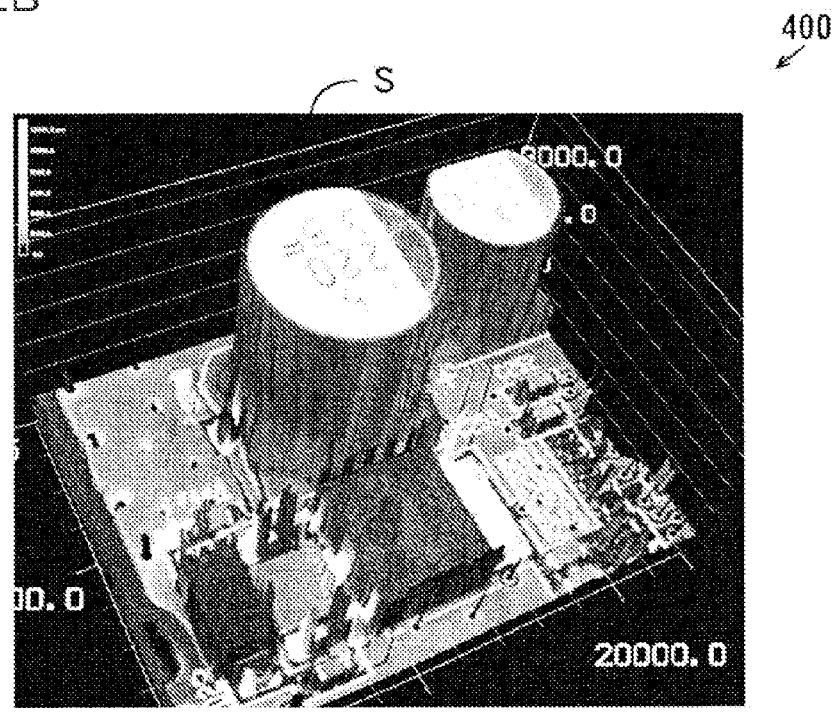

FIGS. 20A and 20B, FIGS. 21A and 21B, and FIGS. 22A and 22B are views describing the correction of the main stereoscopic shape data by the sub-stereoscopic shape data. FIGS. 20A and 20B respectively show the image of the main stereoscopic shape and the synthesized image of the measuring object S. FIGS. 21A and 21B respectively show the image of the sub-stereoscopic shape and the synthesized image of the measuring object S. FIGS. 22A and 22B respectively show the corrected image of the main stereoscopic shape and the corrected synthesized image of the measuring object S.

As shown in FIGS. 20A and 20B, the image of the main stereoscopic shape and the synthesized image contain the shade Ss, which is based on the blank data, and also contain the pseudo-shape Sp, which is based on the pseudo-shape data. On the contrary, the image of the sub-stereoscopic shape and the synthesized image do not have the influence of shade, as shown in FIGS. 21A and 21B.

The portions of the shade Ss and the pseudo-shape Sp in the image of the main stereoscopic shape and the synthesized image of FIGS. 20A and 20B are corrected by the corresponding portions of the image of the sub-stereoscopic shape and the all-focus texture image of FIGS. 21A and 21B. The image of the main stereoscopic shape and the synthesized image without the influence of shade thus can be observed, as shown in FIGS. 22A and 22B.

When displaying the image of the main stereoscopic shape or the texture image on the display section 400, the defective portion or the low reliability portion of the main stereoscopic shape data may not be corrected, and the portion of the stereoscopic shape image or the texture image corresponding to the defective portion or the low reliability portion of the main stereoscopic shape data may be highlighted. Alternatively, when displaying the corrected image of the main stereoscopic shape on the display section 400, the portion of the image of the corrected stereoscopic shape corresponding to the defective portion or the low reliability portion of the main stereoscopic shape data may be highlighted with the defective portion or the low reliability portion of the main stereoscopic shape data corrected. The user thus can easily and reliably recognize the defective portion or the low reliability portion of the main stereoscopic shape data. The defective portion or the low reliability portion of the main stereoscopic shape data may be handled as invalid data in measuring or analyzing the measurement position in the shape measurement processing.

In the shape measurement processing, if the main stereoscopic shape data is generated using the measurement light from both light projecting units 110A, 110B, the main stereoscopic shape data based on the measurement light from the light projecting units 110A, 110B are synthesized with an appropriate weighting to generate the main stereoscopic shape data. If the main stereoscopic shape data based on one measurement light contains the defective portion or the low reliability portion, the weighting in the synthesis of the main stereoscopic shape data based on the one measurement light may be reduced and the weighting in the synthesis of the main stereoscopic shape data based on the other measurement light may be increased, for the relevant portion.

(4) Improvement in Efficiency of Shape Measurement Processing

In the shape measurement processing of FIGS. 30 to 32, to be described later, the measuring object S is irradiated with the coded measurement light (see FIG. 11), and then irradiated with the striped measurement light (see FIG. 9) from the light projecting unit 110. In this case, the absolute value of the height of each portion of the measuring object S is calculated based on the coded measurement light, and the relative value of the height of each portion of the measuring object S is calculated at high resolution based on the striped measurement light. The absolute value of the height of each portion of the measuring object S is thereby calculated at high resolution. In other words, the absolute value of the height calculated based on the striped measurement light is determined by the height calculated based on the coded measurement light.

Alternatively, the absolute value of the height calculated based on the striped measurement light may be determined by the height of each portion in the sub-stereoscopic shape data. In this case, the measuring object S may not be irradiated with the coded measurement light from the light projecting unit 110 in the shape measurement processing. The shape measurement processing thus can be executed efficiently and in a short time while calculating the absolute value of the height of each portion of the measuring object S at high resolution.

[5] Shape Measurement Processing (1) Preparation of Shape Measurement

Figure 23:
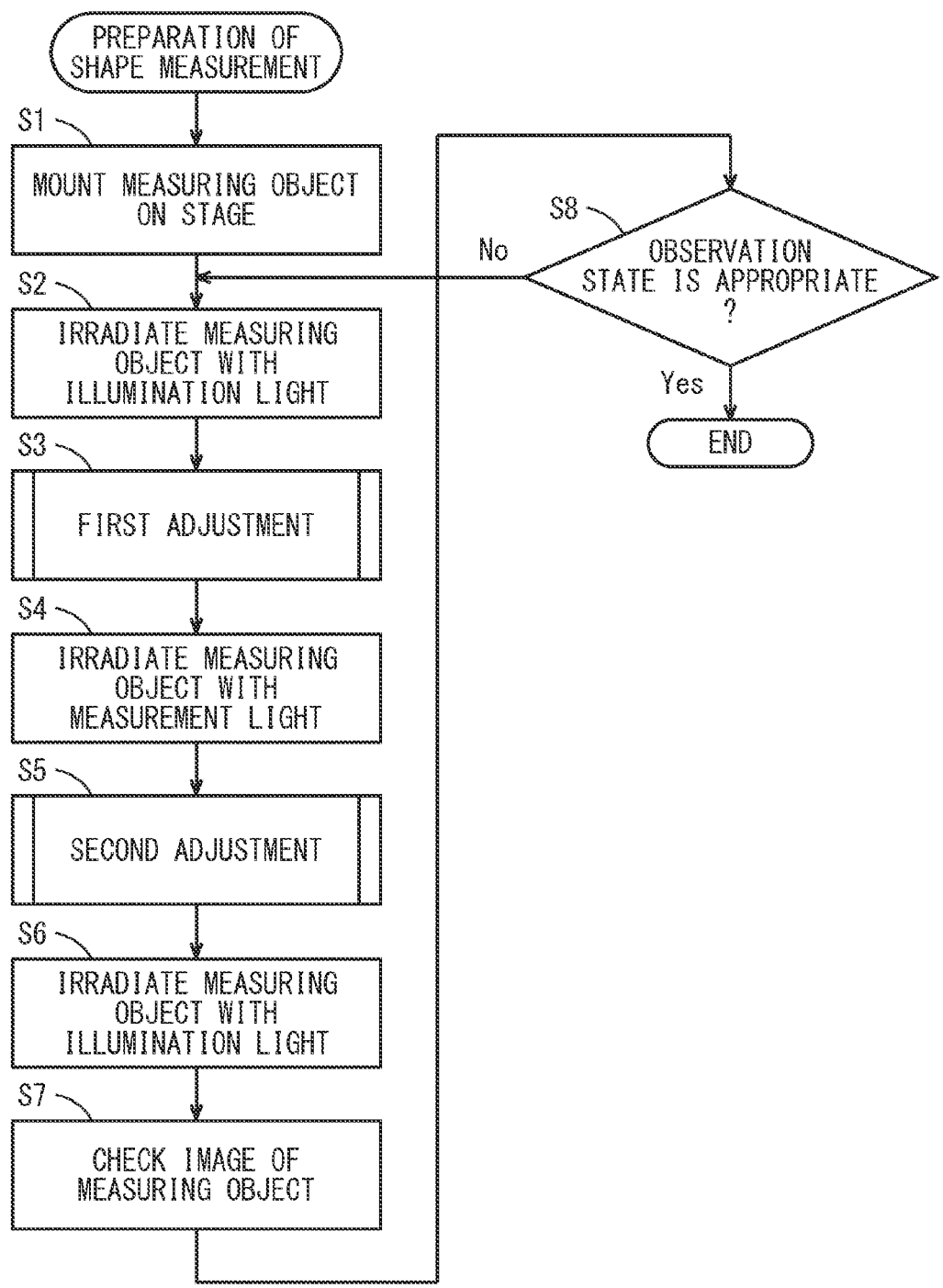
FIG. 23 is a flowchart showing a procedure for preparation of the shape measurement.

The user prepares for the shape measurement before executing the shape measurement processing of the measuring object S. FIG. 23 is a flowchart showing a procedure for the preparation of the shape measurement. Hereinafter, the procedure for the preparation of the shape measurement will be described with reference to FIGS. 1, 2, and 23. The user first mounts the measuring object S on the stage 140 (step S1). The user then irradiates the measuring object S with the illumination light from the illumination light output unit 130 (step S2). The image of the measuring object S is thereby displayed on the display section 400. The user then adjusts the light amount of the illumination light, the focus of the light receiving unit 120, as well as the position and the posture of the measuring object S (hereinafter referred to as first adjustment) while viewing the image of the measuring object S displayed on the display section 400 (step S3).

The user then stops the irradiation of the illumination light, and irradiates the measuring object S with the measurement light from the light projecting unit 110 (step S4). The image of the measuring object S is thereby displayed on the display section 400. The user then adjusts the light amount of the measurement light, the focus of the light receiving unit 120, as well as the position and the posture of the measuring object S (hereinafter referred to as second adjustment) while viewing the image of the measuring object S displayed on the display section 400 (step S5). In step S5, if there is no shade at the position desired to be measured in the measuring object S, the user is not required to perform the adjustment of the focus of the light receiving unit 120, as well as the position and the posture of the measuring object S for the second adjustment, and merely needs to adjust the light amount of the measurement light.

The user thereafter stops the irradiation of the measurement light, and again irradiates the measuring object S with the illumination light from the illumination light output unit 130 (step S6). The image of the measuring object S is thereby displayed on the display section 400. The user then checks the image of the measuring object S displayed on the display section 400 (step S7). The user determines whether or not the light amount of the light, the focus of the light receiving unit 120, as well as the position and the posture of the measuring object S (hereinafter referred to as observation state) are appropriate from the image of the measuring object S displayed on the display section 400 (step S8).

If determined that the observation state is not appropriate in step S8, the user returns to the processing of step S2. If determined that the observation state is appropriate in step S8, the user terminates the preparation of the shape measurement.

In the above description, the second adjustment is carried out after the first adjustment, but the present invention is not limited thereto. The first adjustment may be carried out after the second adjustment. In this case, the measuring object S is irradiated with the measurement light, and not with the illumination light in step S6. Furthermore, if the adjustment of the focus of the light receiving unit 120 as well as the position and the posture of the measuring object S in the second adjustment is not carried out in step S5, the user may omit the procedure of steps S6 to S8 and terminate the preparation of the shape measurement.

(2) First Adjustment

Figure 24:
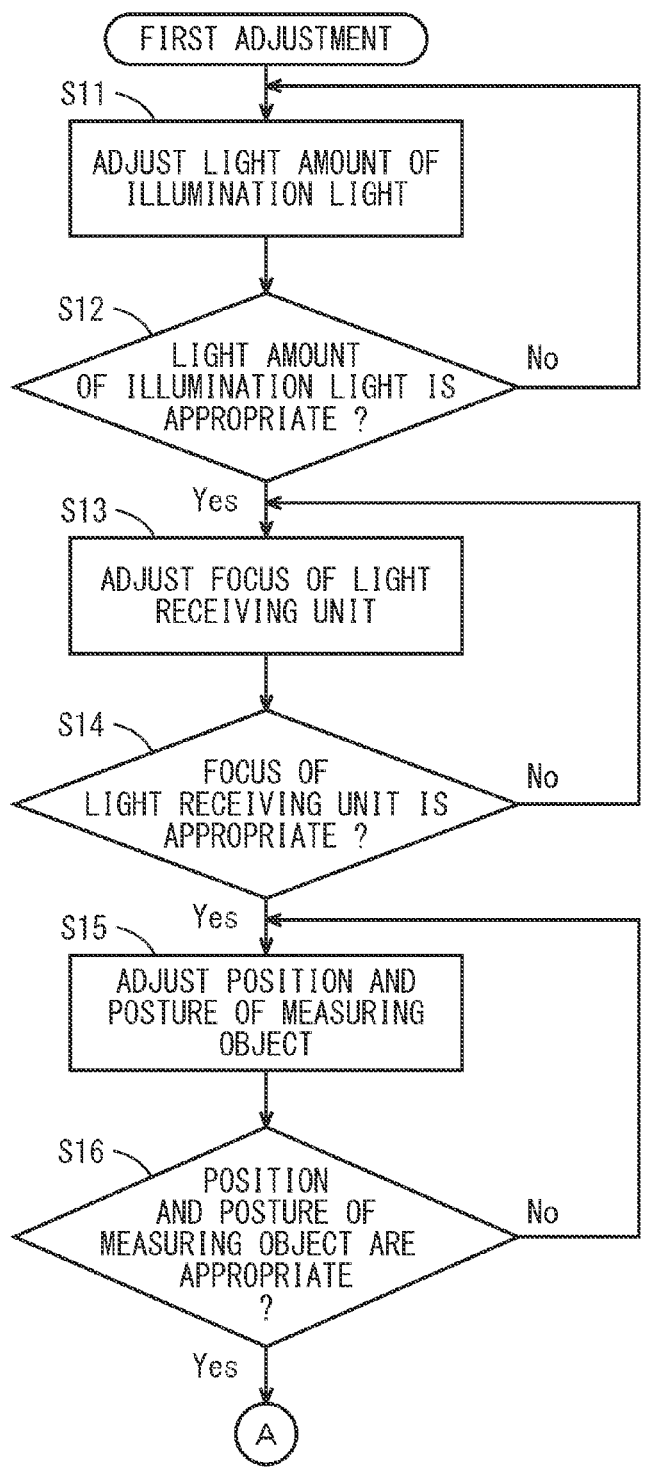
FIG. 24 is a flowchart showing details of first adjustment in the procedure for the preparation of the shape measurement.
Figure 25:
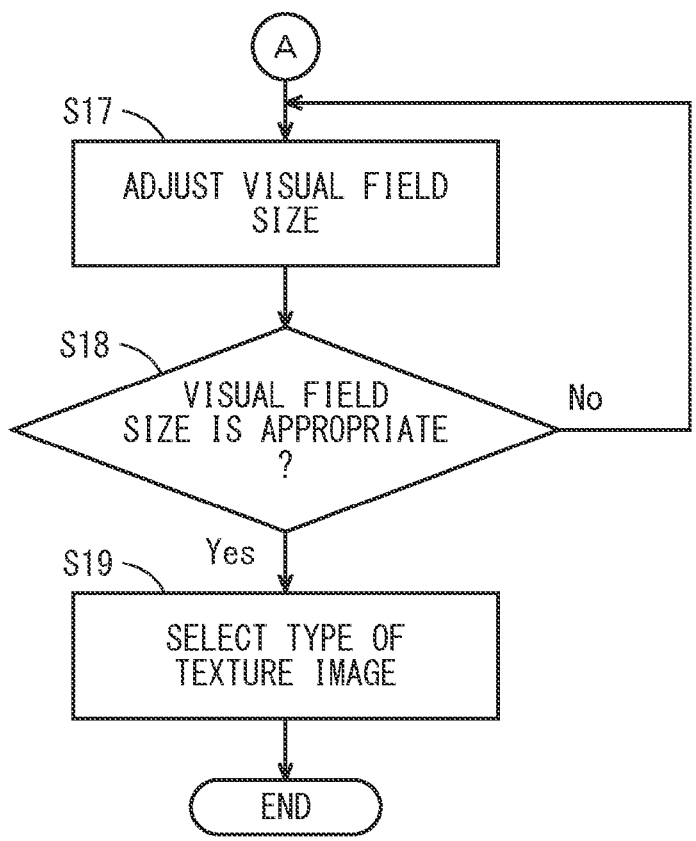
FIG. 25 is a flowchart showing details of the first adjustment in the procedure for the preparation of the shape measurement.

FIGS. 24 and 25 are flowcharts showing details of the first adjustment in the procedure for the preparation of the shape measurement. The details of the first adjustment in the procedure for the preparation of the shape measurement will be hereinafter described with reference to FIGS. 1, 2, 24, and 25. First, the user adjusts the light amount of the illumination light (step S11). The light amount of the illumination light is adjusted by adjusting the brightness of the illumination light emitted from the illumination light source 320 of the control section 300 or the exposure time of the light receiving unit 120. The user then determines whether or not the light amount of the illumination light applied on the measuring object S is appropriate based on the image of the measuring object S displayed on the display section 400 (step S12).

If determined that the light amount of the illumination light is not appropriate in step S12, the user returns to the processing of step S11. If determined that the light amount of the illumination light is appropriate in step S12, the user adjusts the focus of the light receiving unit 120 (step S13). The focus of the light receiving unit 120 is adjusted by changing the position of the Z stage 142 of the stage 140, and adjusting the relative distance in the Z direction between the light receiving unit 120 and the measuring object S. The user then determines whether or not the focus of the light receiving unit 120 is appropriate based on the image of the measuring object S displayed on the display section 400 (step S14).

If determined that the focus of the light receiving unit 120 is not appropriate in step S14, the user returns to the processing of step S13. If determined that the focus of the light receiving unit 120 is appropriate in step S14, the user adjusts the position and the posture of the measuring object S (step S15). The position and the posture of the measuring object S are adjusted by changing the position of the X-Y stage 141 and the angle of the θ stage 143 of the stage 140.

The user then determines whether or not the position and the posture of the measuring object S are appropriate based on the image of the measuring object S displayed on the display section 400 (step S16). If the measurement position of the measuring object S is included in the visual field range of the light receiving unit 120, the user determines that the position and the posture of the measuring object S are appropriate. If the measurement position of the measuring object S is not included in the visual field range of the light receiving unit 120, the user determines that the position and the posture of the measuring object S are not appropriate.

If determined that the position and the posture of the measuring object S are not appropriate in step S16, the user returns to the processing of step S15. If determined that the position and the posture of the measuring object S are appropriate in step S16, the user adjusts the visual field size (step S17). The visual field size is adjusted, for example, by changing the magnification of the lens of the camera 121 of the light receiving unit 120.

The user then determines whether or not the visual field size is appropriate based on the image of the measuring object S displayed on the display section 400 (step S18). If determined that the visual field size is not appropriate in step S18, the user returns to the processing of step S17. If determined that the visual field size is appropriate in step S18, the user selects the type of texture image (step S19), and terminates the first adjustment. The light amount condition of the illumination light optimum for generating the texture image data is set by performing the first adjustment.

In step S17, the light receiving unit 120 may include a plurality of cameras 121, in which the magnifications of the lenses differ from each other, and the magnification of the lens may be changed by switching the cameras 121. Alternatively, one camera 121 in which the magnification of the lens can be switched may be arranged, and the magnification of the lens may be changed by switching the magnification of the lens. Furthermore, the visual field size may be adjusted by the digital zoom function of the light receiving unit 120 without changing the magnification of the lens.

FIG. 26 is a schematic view showing the light receiving unit 120 of FIG. 2 seen from the X direction. As shown in FIG. 26, the light receiving unit 120 includes cameras 121A, 121B for the plurality of cameras 121. The magnification of the lens of the camera 121A and the magnification of the lens of the camera 121B are different from each other. The light receiving unit 120 further includes a half mirror 124.

The light that passed the plurality of lenses 122, 123 is separated into two pieces of light by the half mirror 124. One light is received by the camera 121A, and the other light is received by the camera 121B. The magnification of the lens can be changed by switching the camera 121, which outputs the light receiving signal to the control board 150 of FIG. 1, between the camera 121A and the camera 121B. The switching between the camera 121A and the camera 121B is carried out by selecting the magnification of the camera in the magnification switching field 474 of FIG. 13.

(3) Second Adjustment

Figure 27:
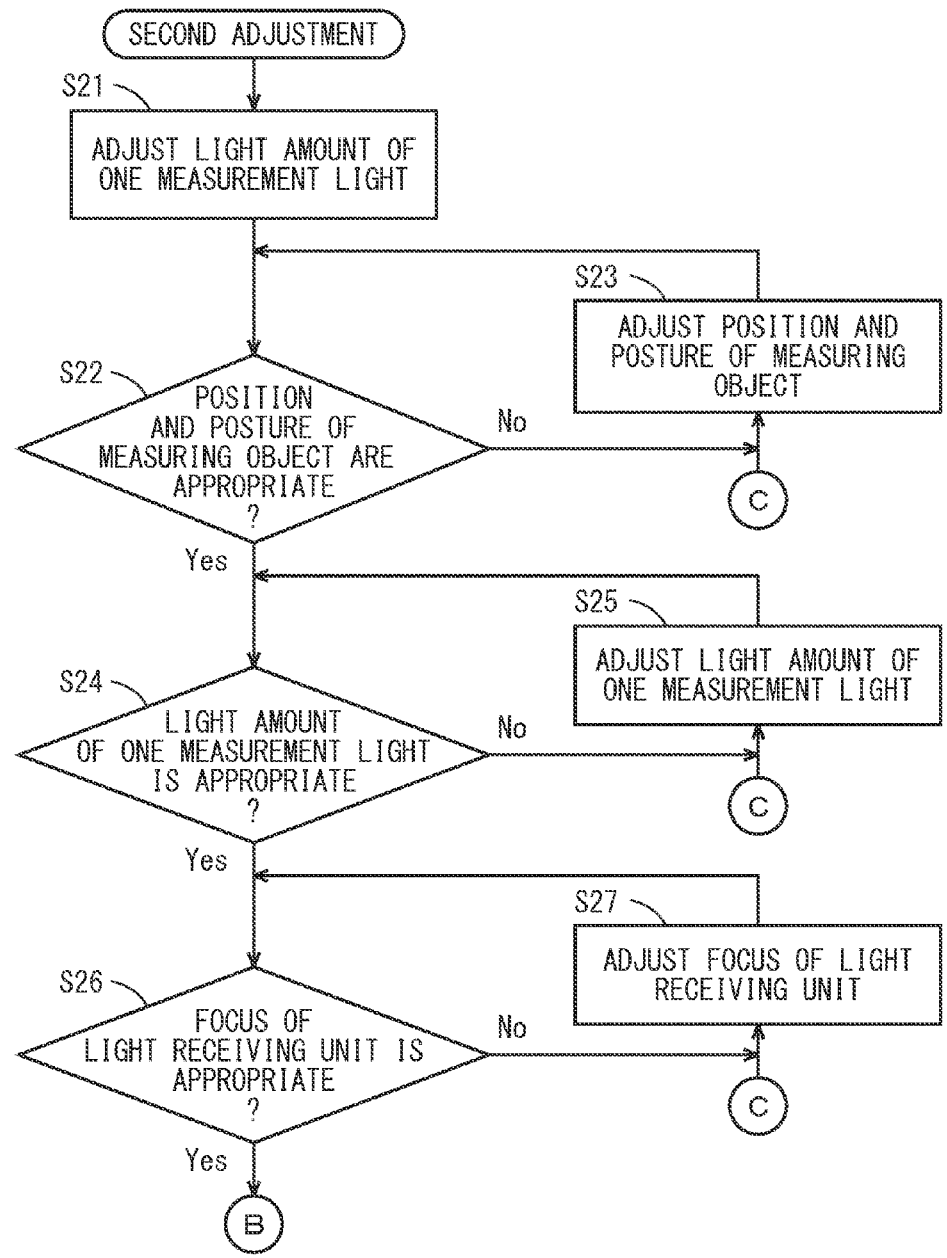
FIG. 27 is a flowchart showing details of second adjustment in the procedure for the preparation of the shape measurement.
Figure 28:
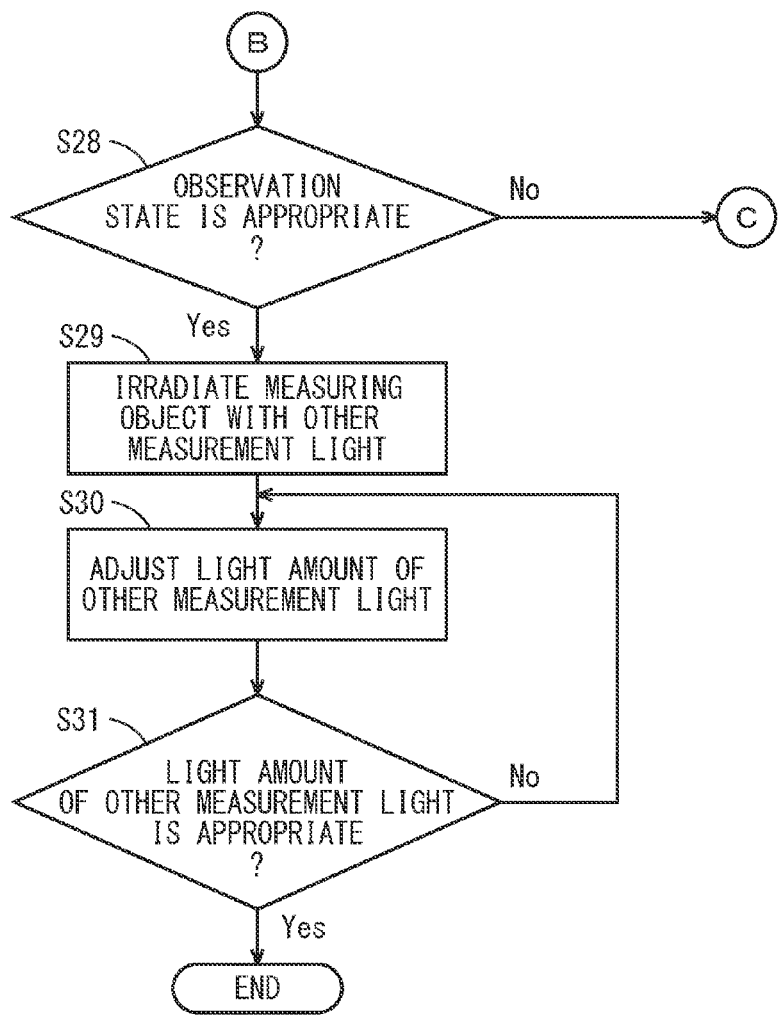
FIG. 28 is a flowchart showing details of the second adjustment in the procedure for the preparation of the shape measurement.

FIGS. 27 and 28 are flowcharts showing details of the second adjustment in the procedure for the preparation of the shape measurement. The details of the second adjustment in the procedure for the preparation of the shape measurement will be hereinafter described with reference to FIGS. 1, 2, 27, and 28. The user first adjusts the light amount of one measurement light (step S21).

The user then determines whether or not the position and the posture of the measuring object S are appropriate based on the image of the measuring object S displayed on the display section 400 (step S22). If there is no shade at the measurement position of the measuring object S, the user determines that the position and the posture of the measuring object S are appropriate. If there is shade at the measurement position of the measuring object S, the user determines that the position and the posture of the measuring object S are not appropriate.

If determined that the position and the posture of the measuring object S are not appropriate in step S22, the user adjusts the position and the posture of the measuring object S (step S23). The position and the posture of the measuring object S are adjusted by changing the position of the X-Y stage 141 and the angle of the θ stage 143 of the stage 140. Thereafter, the user returns to the processing of step S22.

If determined that the position and the posture of the measuring object S are appropriate in step S22, the user determines whether or not the light amount of one measurement light applied on the measuring object S is appropriate based on the image of the measuring object S displayed on the display section 400 (step S24).

If determined that the light amount of the one measurement light is not appropriate in step S24, the user adjusts the light amount of the one measurement light (step S25). The user then returns to the processing of step S24.

If determined that the light amount of the one measurement light is appropriate in step S24, the user determines whether or not the focus of the light receiving unit 120 is appropriate based on the image of the measuring object S displayed on the display section 400 (step S26).

If determined that the focus of the light receiving unit 120 is not appropriate in step S26, the user adjusts the focus of the light receiving unit 120 (step S27). The focus of the light receiving unit 120 is adjusted by changing the position of the Z stage 142 of the stage 140, and adjusting the relative distance in the Z direction between the light receiving unit 120 and the measuring object S. The user thereafter returns to the processing of step S26.

If determined that the focus of the light receiving unit 120 is appropriate in step S26, the user determines whether or not the observation state is appropriate from the image of the measuring object S displayed on the display section 400 (step S28).

If determined that the observation state is not appropriate in step S28, the user returns to the processing of step S23, step S25, or step S27. Specifically, the user returns to the processing of step S23 when determining that the position and the posture of the measuring object S are not appropriate in the observation state. The user returns to the processing of step S25 when determining that the light amount of the light (one measurement light) is not appropriate in the observation state. The user returns to the processing of step S27 when determining that the focus of the light receiving unit 120 is not appropriate in the observation state.

If determined that the observation state is appropriate in step S28, the user stops the irradiation of the one measurement light and irradiates the measuring object S with the measurement light from the other light projecting unit 110B (step S29). The image of the measuring object S is thereby displayed on the display section 400. The user then adjusts the light amount of the other measurement light while viewing the image of the measuring object S displayed on the display section 400 (step S30).

The user then determines whether or not the light amount of the other measurement light is appropriate based on the image of the measuring object S displayed on the display section 400 (step S31). If determined that the light amount of the other measurement light is not appropriate in step S31, the user returns to the processing of step S30. If determined that the light amount of the other measurement light is appropriate in step S31, the user terminates the second adjustment. The light amount condition of the one measurement light and the other measurement light optimum for generating the main stereoscopic shape data is set by performing the second adjustment. If the other light projecting unit 110B is not used, the user may omit the procedure of steps S29 to S31 and terminate the second adjustment after the processing of step S28.

Figure 29:
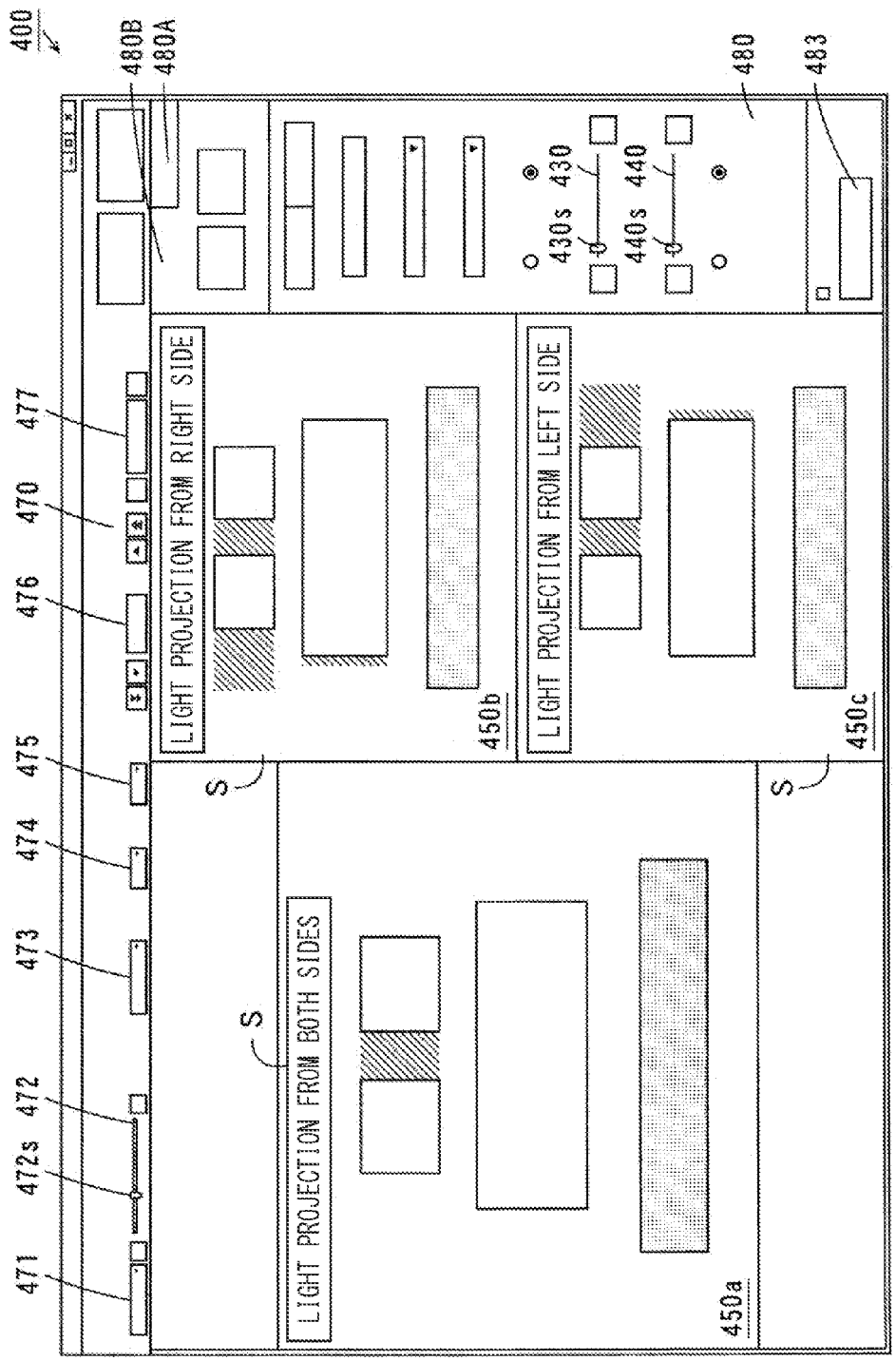
FIG. 29 is a view showing an example of the GUI of the display section at the time of executing the second adjustment.

FIG. 29 is a view showing an example of the GUI of the display section 400 at the time of executing the second adjustment. As shown in FIG. 29, the light amount setting bars 430, 440, similar to FIG. 5, are displayed in the setting changing region 480 of the display section 400 at the time of executing the second adjustment. The user can operate the operation unit 250 and move the slider 430s of the light amount setting bar 430 in the horizontal direction to change the light amount of the one measurement light. Similarly, the user can operate the operation unit 250 and move the slider 440s of the light amount setting bar 440 in the horizontal direction to change the light amount of the other measurement light.

At the time of executing the second adjustment, three image display regions 450a, 450b, and 450c are arranged in the display section 400. In the image display region 450a is displayed an image of the measuring Object S when irradiated with the one measurement light and the other measurement light. The image display region 450b displays an image of the measuring object S when irradiated with the one measurement light. The image display region 450c displays an image of the measuring object S when irradiated with the other measurement light.

The image is displayed in the image display regions 450a to 450c such that the portion where the overexposure has occurred due to excessive brightness and the portion where the underexposure has occurred due to excessive darkness can be identified. In the example of FIG. 29, the portion where the overexposure has occurred due to excessive brightness is highlighted with a dot pattern. The portion where the underexposure has occurred due to excessive darkness is highlighted with a hatching pattern.

(4) Shape Measurement Processing

The shape measurement processing of the measuring object S is executed after preparing for the shape measurement of FIG. 23. FIGS. 30, 31, and 32 are flowcharts showing the procedure for the shape measurement processing. The procedure for the shape measurement processing will be hereinafter described with reference to FIGS. 1, 2, and 30 to 32. The user instructs the start of the shape measurement processing to the CPU 210 after finishing the preparation of the shape measurement. The CPU 210 determines whether or not the start of the shape measurement processing is instructed by the user (step S41).

If the start of the shape measurement processing is not instructed in step S41, the CPU 210 waits until the start of the shape measurement processing is instructed. The user can prepare for the shape measurement before instructing the start of the shape measurement processing. If the start of the shape measurement processing is instructed in step S41, the CPU 210 irradiates the measuring object S with the measurement light from the light projecting unit 110 according to the light amount condition set in the second adjustment, and acquires an image (hereinafter referred to as pattern image) in which the pattern of the measurement light is projected onto the measuring object S (step S42). The acquired pattern image is stored in the working memory 230.

The CPU 210 processes the acquired pattern image with a predetermined measurement algorithm to generate the main stereoscopic shape data indicating the stereoscopic shape of the measuring object S (step S43). The generated main stereoscopic shape data is stored in the working memory 230.

The CPU 210 then displays the image of the main stereoscopic shape of the measuring object S on the display section 400 based on the generated main stereoscopic shape data (step S44).

The CPU 210 then determines whether or not the stereoscopic shape of the position to be measured (hereinafter referred to as measurement position) is displayed based on the instruction of the user (step S45). The user instructs the CPU 210 whether or not the stereoscopic shape of the measurement position is displayed by viewing the image of the main stereoscopic shape of the measuring object S displayed on the display section 400.

If determined that the stereoscopic shape of the measurement position is not displayed in step S45, the CPU 210 returns to the processing of step S41. The CPU 210 then waits until the start of the shape measurement processing is instructed, and the user can prepare for the shape measurement so that the stereoscopic shape of the measurement position is displayed before again instructing the start of the shape measurement processing. If determined that the stereoscopic shape of the measurement position is displayed in step S45, the CPU 210 determines whether or not the normal texture image is selected in step S19 of the first adjustment of FIG. 25 by the user (step S46).

The CPU 210 determines that the normal texture image is selected when the check box 484a of the texture image selecting field 484 of FIG. 19 is specified. The CPU 210 also determines that the normal texture image is selected even when none of the check boxes 484a to 484c of the texture image selecting field 484 of FIG. 19 are specified.

If determined that the normal texture image is selected in step S46, the CPU 210 irradiates the measuring object S with the illumination light from the illumination light output unit 130 according to the light amount condition set in the first adjustment, and generates the normal texture image data of the measuring object S (step S47). The CPU 210 thereafter proceeds to the processing of step S55.

If determined that the normal texture image is not selected in step S46, the CPU 210 determines whether or not the all-focus texture image is selected in step S19 of the first adjustment of FIG. 25 by the user (step S48). The CPU 210 determines that the all-focus texture image is selected when the check box 484c of the texture image selecting field 484 of FIG. 19 is specified.

If determined that the all-focus texture image is selected in step S48, the CPU 210 irradiates the measuring object S with the illumination light from the illumination light output unit 130 according to the light amount condition set in the first adjustment, and generates the all-focus texture image data of the measuring object S (step S49). If determined that the all-focus texture image is not selected in step S48, the CPU 210 proceeds to the processing of step S50.

The CPU 210 determines whether or not the HDR texture image is selected in step S19 of the first adjustment of FIG. 25 by the user (step S50). The CPU 210 determines that the HDR texture image is selected when the check box 484b of the texture image selecting field 484 of FIG. 19 is specified.

If determined that the HDR texture image is selected in step S50, the CPU 210 irradiates the measuring object S with the illumination light from the illumination light output unit 130 according to the light amount condition set in the first adjustment, and generates the HDR texture image data of the measuring object S (step S51). If the all-focus texture image data is generated in step S49, the CPU 210 generates the HDR all-focus texture image data instead of the HDR texture image data in step S51. If determined that the HDR texture image is not selected in step S50, the CPU 210 proceeds to the processing of step S52.

The user can instruct the CPU 210 to display the texture image based on the generated texture image data on the display section 400. The CPU 210 determines whether or not the displaying of the texture image is instructed (step S52). If determined that the displaying of the texture image is not instructed in step S52, the CPU 210 proceeds to the processing of step S55. If determined that the displaying of the texture image is instructed in step S52, the CPU 210 displays the texture image on the display section 400 based on the generated texture image data (step S53).

The CPU 210 then determines whether or not the texture image is appropriate based on the instruction of the user (step S54). The user instructs the CPU 210 whether or not the texture image is appropriate by viewing the texture image displayed on the display section 400.

If determined that the texture image is not appropriate in step S54, the CPU 210 returns to the processing of step S48. Thus, the processing of steps S48 to S54 are repeated until it is determined that the texture image is appropriate. The user can cause the CPU 210 to generate appropriate texture image data by changing the type of texture image to be selected.

If determined that the texture image is appropriate in step S54, the CPU 210 generates the synthesized data (step S55). The synthesized data is generated by synthesizing the texture image data generated in step S47, step S49, or step S51, and the main stereoscopic shape data generated in step S43.

The CPU 210 then displays the synthesized image of the measuring object S on the display section 400 based on the generated synthesized data (step S56). The CPU 210 thereafter executes measurement or analysis of the measurement position based on the instruction of the user (step S57). The shape measurement processing is thereby terminated. According to such shape measurement processing, the CPU 210 can execute measurement or analysis of the measurement position on the synthesized image based on the instruction of the user.

In step S42, if the measuring object S is irradiated with the measurement light from both light projecting units 110A, 110B, one pattern image corresponding to the measurement light from one light projecting unit 110A is acquired, and the other pattern image corresponding to the measurement light from the other light projecting unit 110B is acquired.

In step S43, one main stereoscopic shape data corresponding to the measurement light from the one light projecting unit 110A is generated, and the other main stereoscopic shape data corresponding to the measurement light from the other light projecting unit 110B is generated. The one main stereoscopic shape data and the other main stereoscopic shape data are synthesized at an appropriate weighting to generate one main stereoscopic shape data.

In steps S47, S49, S51, the texture image data of the measuring object S is generated by irradiating the measuring object S with the illumination light from the illumination light output unit 130, but the present invention is not limited thereto. In steps S47, S49, S51, the texture image data of the measuring object S may be generated by irradiating the measuring object S with the measurement light from the light projecting unit 110. In this case, the shape measuring device 500 may not include the illumination light output unit 130, and hence the shape measuring device 500 can be miniaturized. The manufacturing cost of the shape measuring device 500 can also be reduced.

In the shape measurement processing described above, whether or not the HDR image is selected is determined after determining whether or not the all-focus texture image is selected, but the present invention is not limited thereto. Whether or not the all-focus texture image is selected may be determined after determining whether or not the HDR texture image is selected.

In the shape measurement processing described above, the processing of generating the texture image data (steps S46 to S54) are executed after the processing of generating the main stereoscopic shape data (steps S42 to S45), but the present invention is not limited thereto. Either one of the processing of generating the texture image data or the processing of generating the main stereoscopic shape data may be executed first, and parts of the processing of generating the texture image data and the processing of generating the main stereoscopic shape data may be simultaneously executed.

For example, the processing of generating the main stereoscopic shape data (steps S42 to S45) may be carried out after the processing of generating the texture image data (steps S46 to S54) is carried out. In this case as well, the CPU 210 can generate the synthesized data in the processing of step S55. Furthermore, in step S54, a part of the processing of generating the main stereoscopic shape data can be executed while the user is determining whether or not the texture image is appropriate by viewing the texture image displayed on the display section 400. The shape measurement processing thus can be executed efficiently and in a short time.

If the processing of generating the texture image data is carried out before the processing of generating the main stereoscopic shape data, the upper end and the lower end of the dimension in the Z direction of the measuring object S can be calculated based on the sub-stereoscopic shape data. Therefore, the focus of the light receiving unit 120 can be automatically adjusted to the center in the Z direction of the measuring object S in the processing of generating the main stereoscopic shape data. In this case, the accuracy of the main stereoscopic shape data can be further enhanced.

Figure 30:
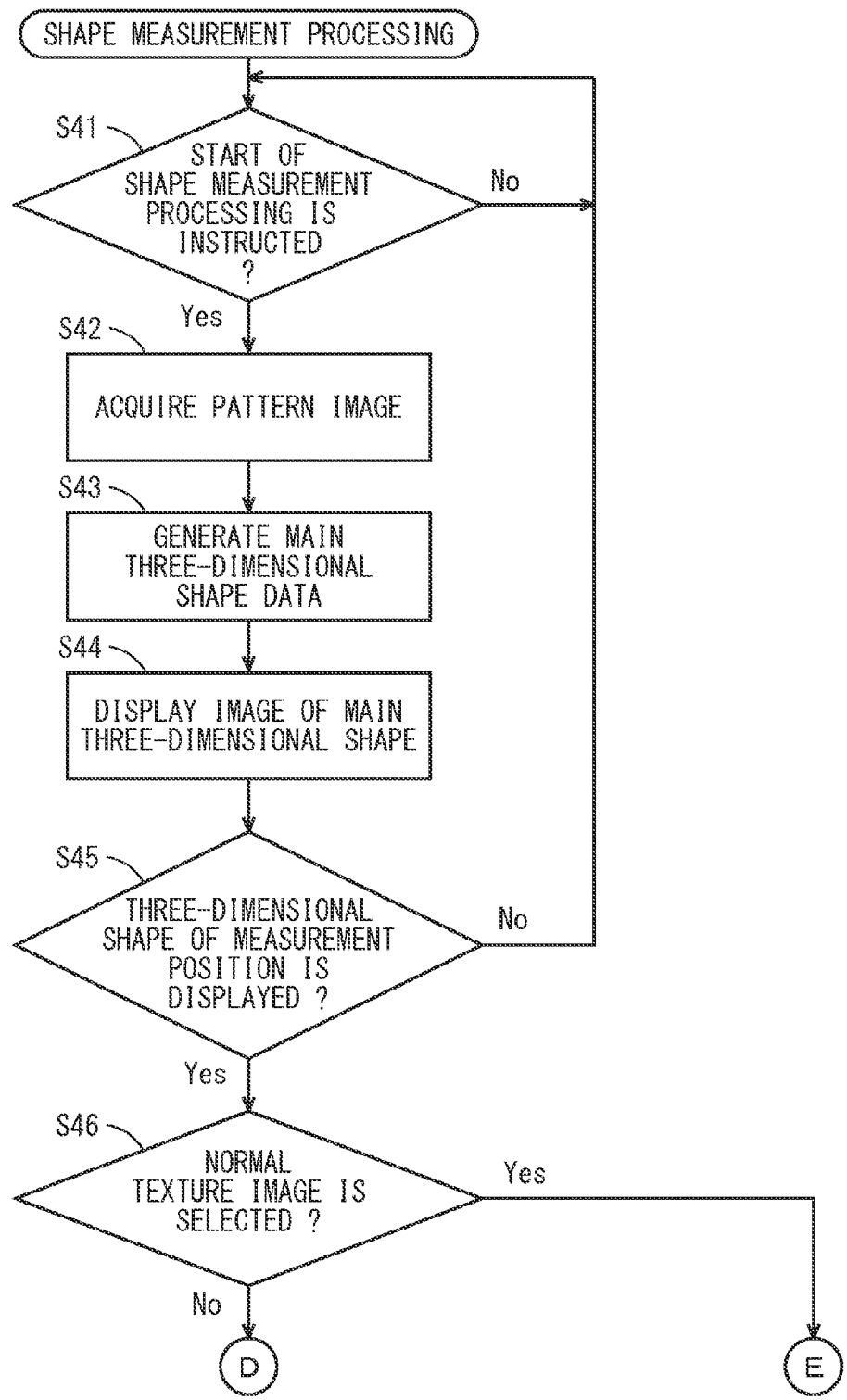
FIG. 30 is a flowchart showing the procedure for the shape measurement processing.
Figure 31:
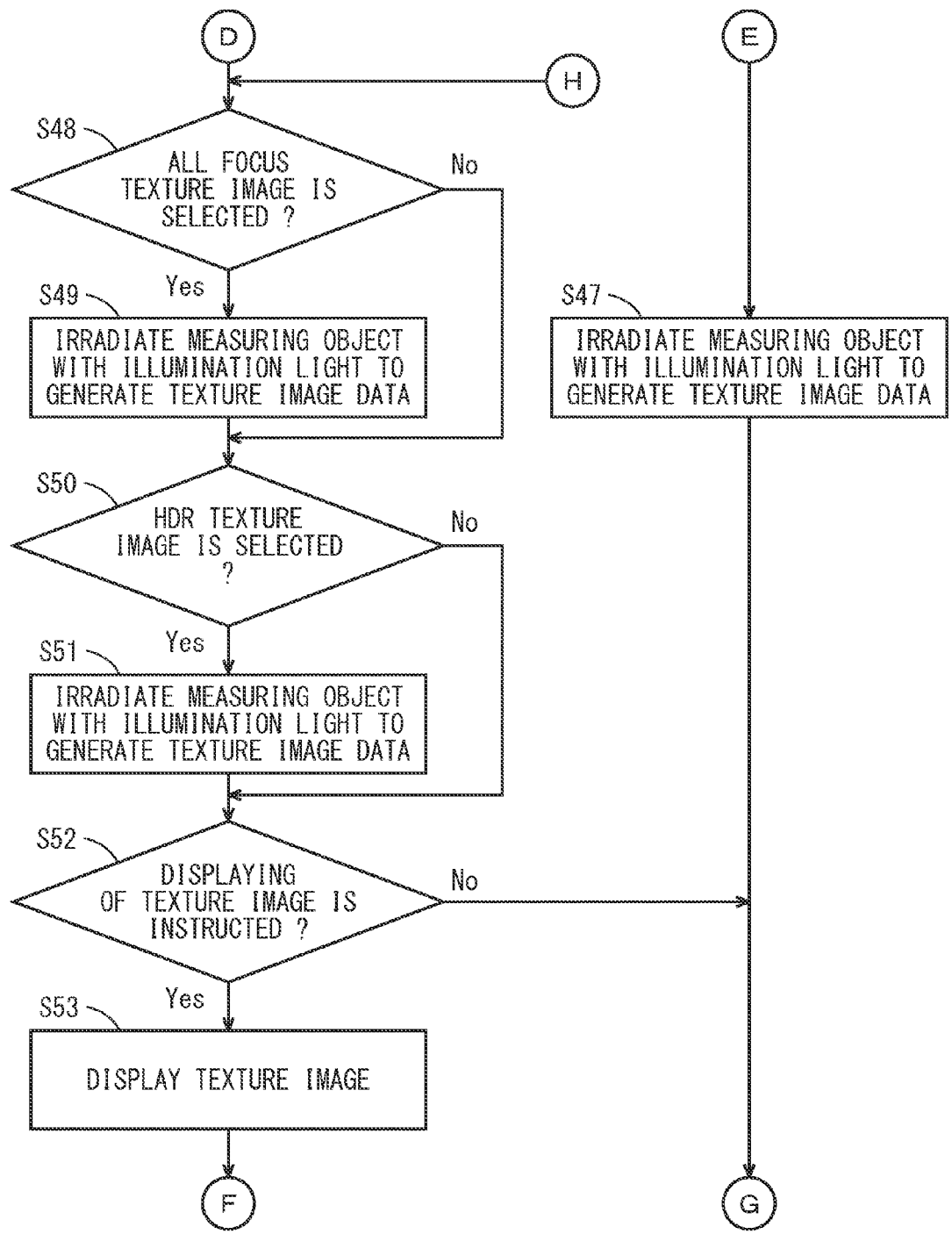
FIG. 31 is a flowchart showing the procedure for the shape measurement processing.
Figure 32:
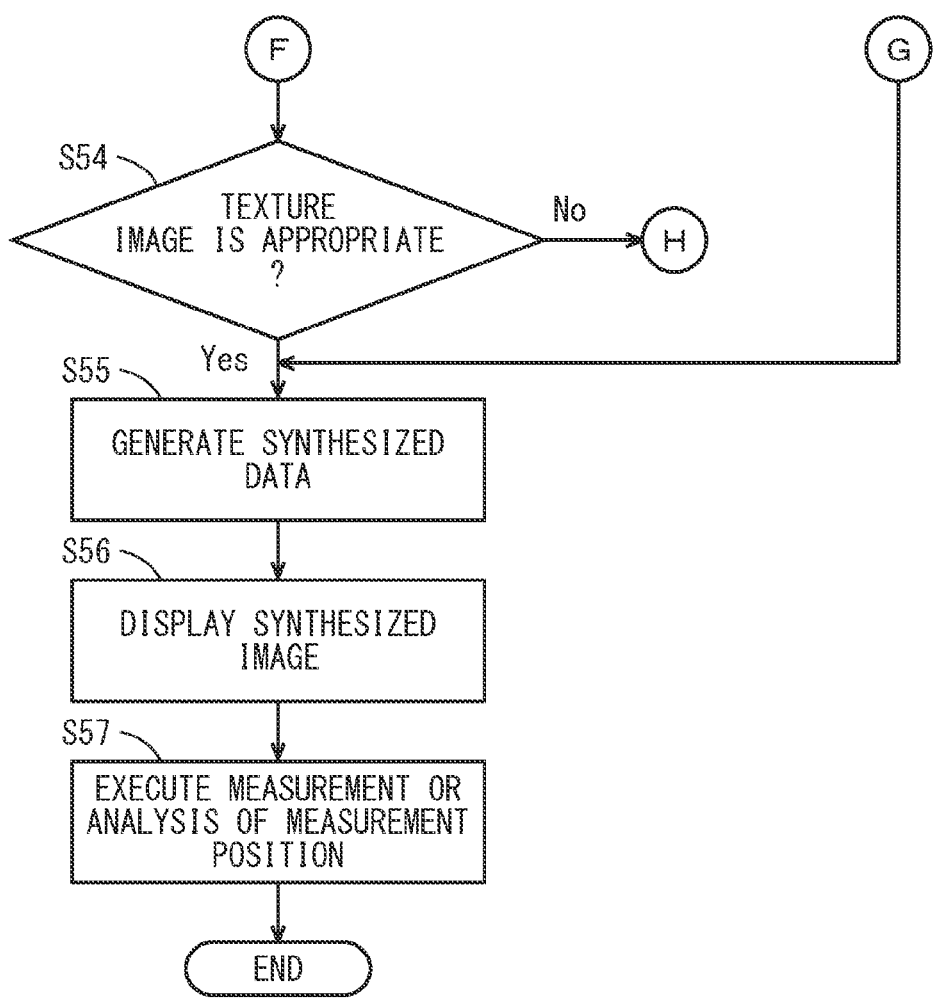
FIG. 32 is a flowchart showing the procedure for the shape measurement processing.

If the processing of generating the main stereoscopic shape data is carried out before the processing of generating the texture image data as in the shape measurement processing of FIGS. 30 to 32, the upper end and the lower end of the dimension in the Z direction of the measuring object S can be calculated based on the main stereoscopic shape data. Therefore, the moving range in the Z direction of the stage 140 with respect to the light receiving unit 120 can be minimized and the movement interval can be appropriately set when generating the all-focus texture image data in the processing of generating the texture image data. The all-focus texture image data thus can be generated at high speed.

(5) Effects

In the shape measuring device 500 according to the present embodiment, the main stereoscopic shape data indicating the stereoscopic shape of the measuring object S is generated at high accuracy by the triangular distance measurement method. The all-focus texture image data is generated by synthesizing the texture image data of the measuring object S when each portion of the measuring object S is positioned within the range of the depth of field of the light receiving unit 120. Thus, the all-focus texture image data clearly indicates the surface state of the entire surface of the measuring object S.

The synthesized data in which the main stereoscopic shape data and the all-focus texture image data are synthesized indicates the stereoscopic shape of the measuring object S measured at high accuracy and clearly indicates the surface state of the measuring object S. The synthesized image based on the synthesized data is displayed on the display section 400. As a result, the user can clearly observe the surface state of the measuring object S while measuring the shape of the measuring object S at high accuracy.

In the shape measuring device 500 according to the present embodiment, the light amount condition of the one measurement light and the other measurement light suited for generating the main stereoscopic shape data and the light amount condition of the illumination light suited for generating the texture image data are individually set. The main stereoscopic shape data thus can be generated at higher accuracy, and the texture image data more clearly indicating the surface state of the entire surface of the measuring object S can be generated. As a result, the surface state of the measuring object S can be more clearly observed while measuring the shape of the measuring object S at higher accuracy.

[6] First Auxiliary Function of Focus Adjustment (1) First Example of First Auxiliary Function of Focus Adjustment The measuring object S is positioned within the range of the depth of field of the light receiving unit 120 by adjusting the focus of the light receiving unit 120 in the second adjustment in the preparation of the shape measurement. The shape of the measuring object S thus can be accurately measured. If the measuring object S is positioned near the center of the range of the depth of field of the light receiving unit 120, that is, near the focus of the light receiving unit 120, the shape of the measuring object S can be more accurately measured.

However, the image of the measuring object S displayed on the display section 400 hardly changes even if the measuring object S is moved in the Z direction within the range of the depth of field by adjusting the Z stage 142. For example, assume the depth of field is 5 mm and the visual field size is 25 mm×25 mm. In this case, the measuring object S is observed as if at the focus position of the light receiving unit 120 in the entire range of the depth of field of 5 mm. Thus, a shift of about a few mm is assumed to occur in the adjustment of the focus.

Thus, it is difficult to position the measuring object S near the focus of the light receiving unit 120. In the shape measuring device 500 according to the present embodiment, a function of assisting the positioning of the measuring object S near the focus of the light receiving unit 120 (hereinafter referred to as first auxiliary function of focus adjustment) is provided.

Figure 33:
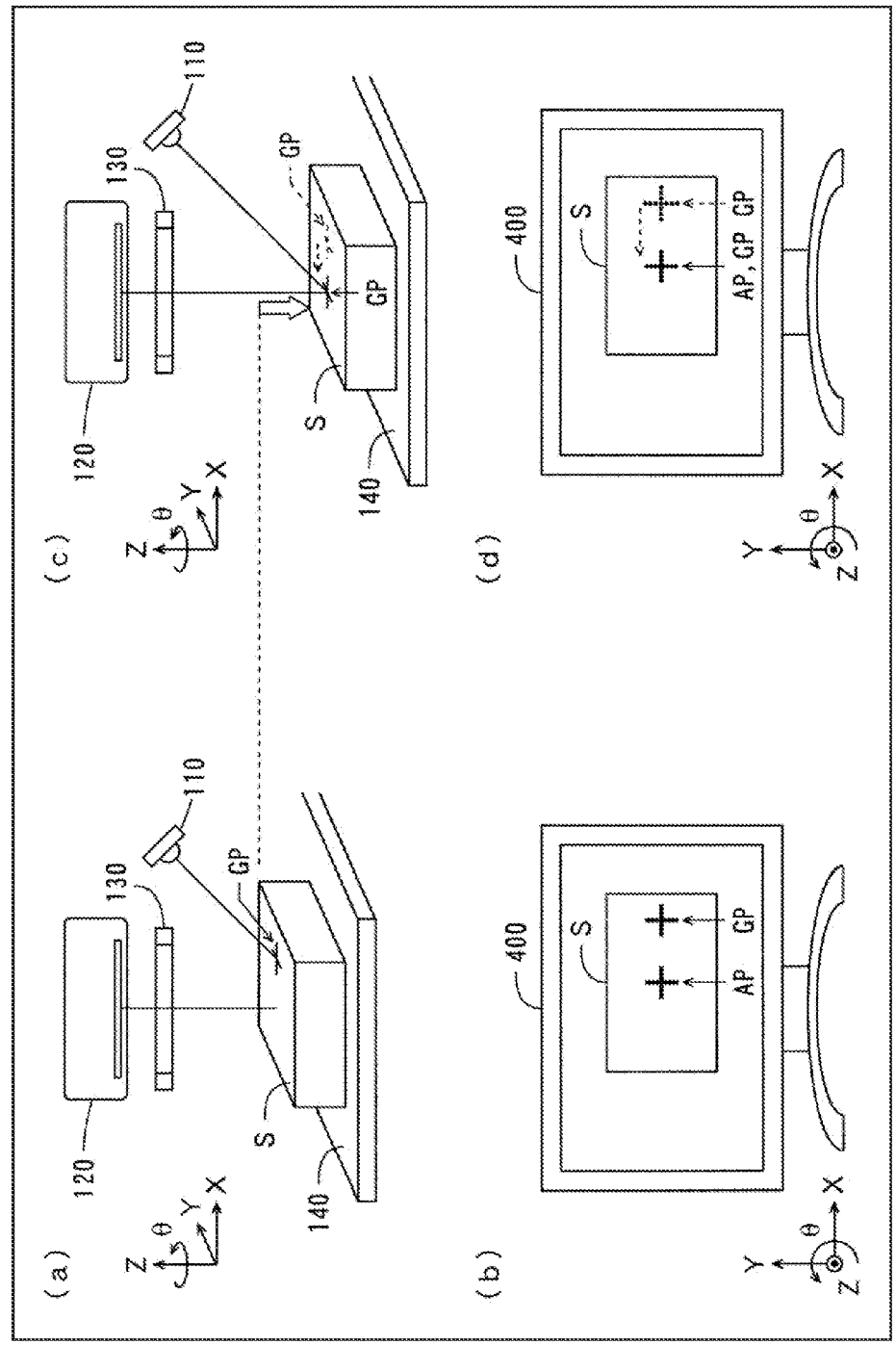
FIGS. 33A to 33D are views describing a first example of a first auxiliary function of focus adjustment.
Figure 34:
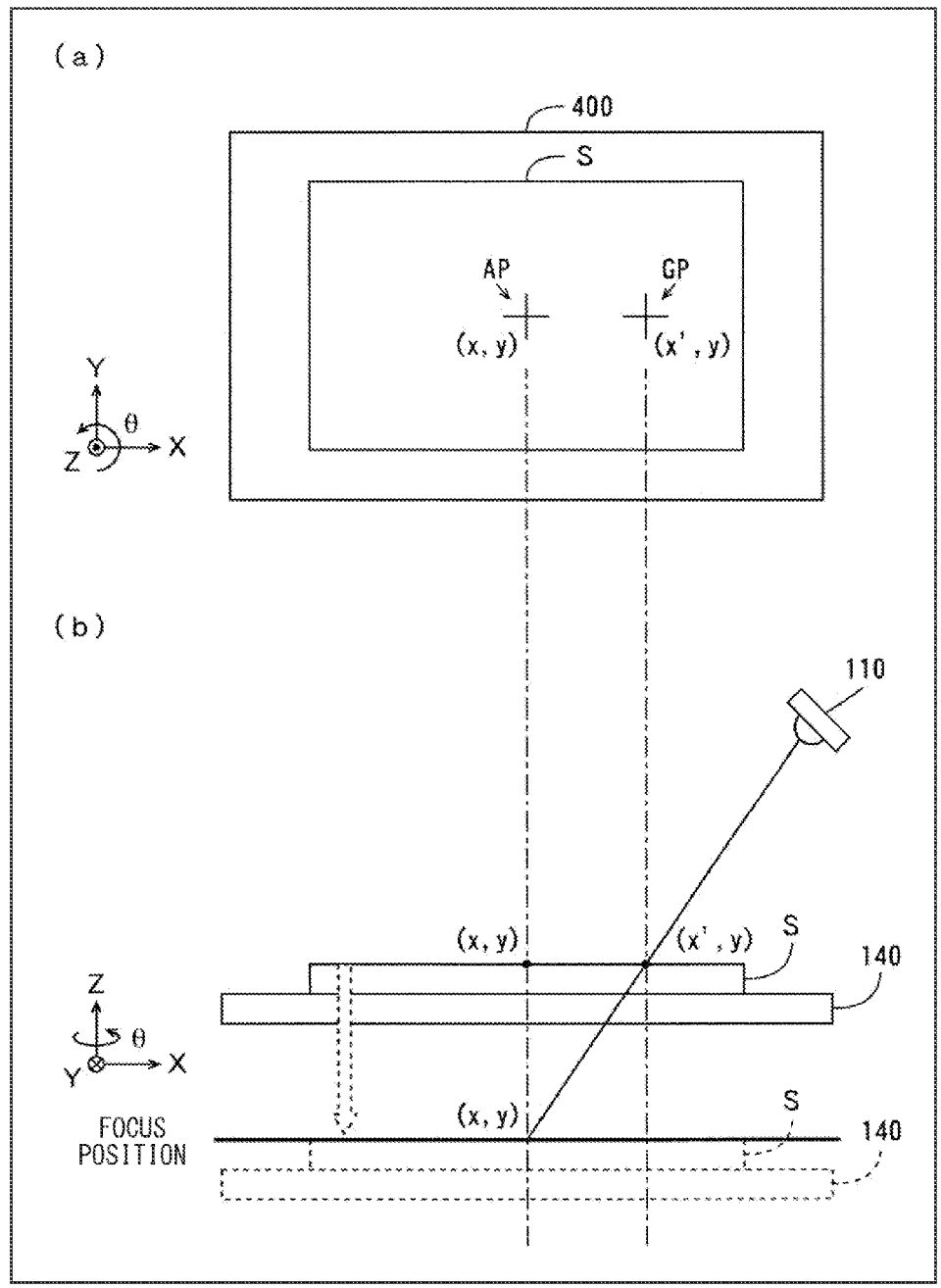
FIGS. 34A and 34B are views describing the first example of the first auxiliary function of the focus adjustment.

FIGS. 33A to 33D and FIGS. 34A and 34B are views describing a first example of the first auxiliary function of the focus adjustment. FIGS. 33A and 33C show states in which the measuring object S on the stage 140 is irradiated with the illumination light from the illumination light output unit 130. FIGS. 33B and 33D show images displayed on the display section 400 when the measuring object S is imaged by the light receiving unit 120 of FIGS. 33A and 33C, respectively. FIG. 34A shows an image displayed on the display section 400 when the measuring object S is imaged by the light receiving unit 120. FIG. 34B shows a relationship between the position of the measuring object S when seen from the Y direction and the focus position.

When the user operates the focus guide display field 477 of FIG. 13, a predetermined pattern (also referred to as auxiliary pattern) AP set in advance is displayed at a specific position set in advance on the image displayed on the display section 400, as shown in FIGS. 33B and 33D. In this example, the auxiliary pattern AP is displayed at a specific position such as the center, upper, lower, left, and right portions, four corners, and the like of the screen of the display section 400. As shown in FIG. 34A, coordinates on the display section 400 where the auxiliary pattern AP is displayed are assumed as (x, y). The auxiliary pattern AP is a pattern displayed so as to overlap the image on the display section 400. Thus, the auxiliary pattern AP does not move or change even if the measuring object S of FIGS. 33A and 33C is moved or changed.

The focus position of the light receiving unit 120 is known. In FIG. 34B, the focus position is indicated with a thick solid line. The focus position of the light receiving unit 120 exists on a plane perpendicular to the Z direction. The light projecting unit 110 irradiates light having a predetermined pattern (hereinafter referred to as guide pattern) GP set in advance toward an intersection of a line segment in the Z direction passing through a point on the measuring object S corresponding to the coordinates (x, y) of the auxiliary pattern AP, and the focus position of the light receiving unit 120.

The guide pattern GP is thereby projected onto the surface of the measuring object S as shown in FIGS. 33A and 33C, and the guide pattern GP is displayed on the image of the measuring object S of the display section 400 as shown in FIGS. 33B, 33D, and 34A. In this case, the CPU 210 of FIG. 1 controls the light projecting unit 110 such that the positions in the Y direction of the auxiliary pattern AP and the guide pattern GP become the same.

According to such a configuration, when the surface of the measuring object S is at the focus position of the light receiving unit 120, the guide pattern GP is displayed at coordinates equal to the coordinates (x, y) of the auxiliary pattern AP. In other words, the guide pattern GP and the auxiliary pattern AP are displayed in an overlapping manner.

When the surface of the measuring object S is not at the focus position of the light receiving unit 120, the guide pattern GP is displayed at coordinates (x', y) different from the coordinates (x, y) of the auxiliary pattern AP. The distance between the position x and the position x' is proportional to the distance in the Z direction between the focus position of the light receiving unit 120 and the position of the surface of the measuring object S. Therefore, when the measuring object S is moved in the Z direction, the guide pattern GP does not move in the Y direction but moves in the X direction.

In the example of FIG. 33A, the position of the surface of the measuring object S do not coincide with the focus position of the light receiving unit 120. Therefore, the guide pattern GP and the auxiliary pattern AP are not overlapped on the display section 400, as shown in FIG. 33B.

As shown in FIG. 33C, the guide pattern GP is moved in the X direction by moving the stage 140 in the Z direction. The user can move the stage 140 in the Z direction so that the guide pattern GP approaches the auxiliary pattern AP while viewing the auxiliary pattern AP and the guide pattern GP displayed on the display section 400. As shown in FIG. 33D, the user can easily make the position of the surface of the measuring object S coincide with the focus position of the light receiving unit 120 by adjusting the stage 140 so that the guide pattern GP and the auxiliary pattern AP overlap.

For example, assume the visual field size is 25 mm×25 mm, the number of pixels of the visual field in the X direction of the light receiving unit 120 is 1024 pixels, and the shift of the guide pattern GP and the auxiliary pattern AP can be recognized in units of one pixel. In this case, the size of one pixel is 25 mm÷1024≈24 μm. In other words, the shift between the guide pattern GP and the auxiliary pattern AP can be recognized in units of 24 μM. If the distance d of such shift is converted to height h, assuming that the angle α of FIG. 6 is, for example, 45 degrees, the height h is 24÷tan 45°=24 μm. Therefore, the focus of the light receiving unit 120 can be adjusted at very high accuracy by the first auxiliary function of the focus adjustment.

In FIGS. 33A to 33D, the light projecting unit 110 is illustrated in a simplified manner. The light projecting unit 110 is a projection pattern optical system that has a function of irradiating the measuring object S with the measurement light, which has a periodic pattern, at the time of executing the shape measurement processing. The light projecting unit 110 irradiates the measuring object S with the light generated by the pattern generating portion 112 (FIG. 2), representatively DMD, LCD, or the like.

A light source for the guide pattern GP is not required to be separately arranged in the measuring section 100 by projecting the guide pattern GP on the surface of the measuring object S using such a projection pattern optical system. The guide pattern GP having an arbitrary shape can be projected onto the surface of the measuring object S. Furthermore, the projection position of the guide pattern GP can be changed such that the light receiving unit 120 is focused on the portion of the measuring object S specified by the user within the irradiation range of the light projecting unit 110. The details will be described later.

(2) Second Example of First Auxiliary Function of Focus Adjustment

Figure 35:
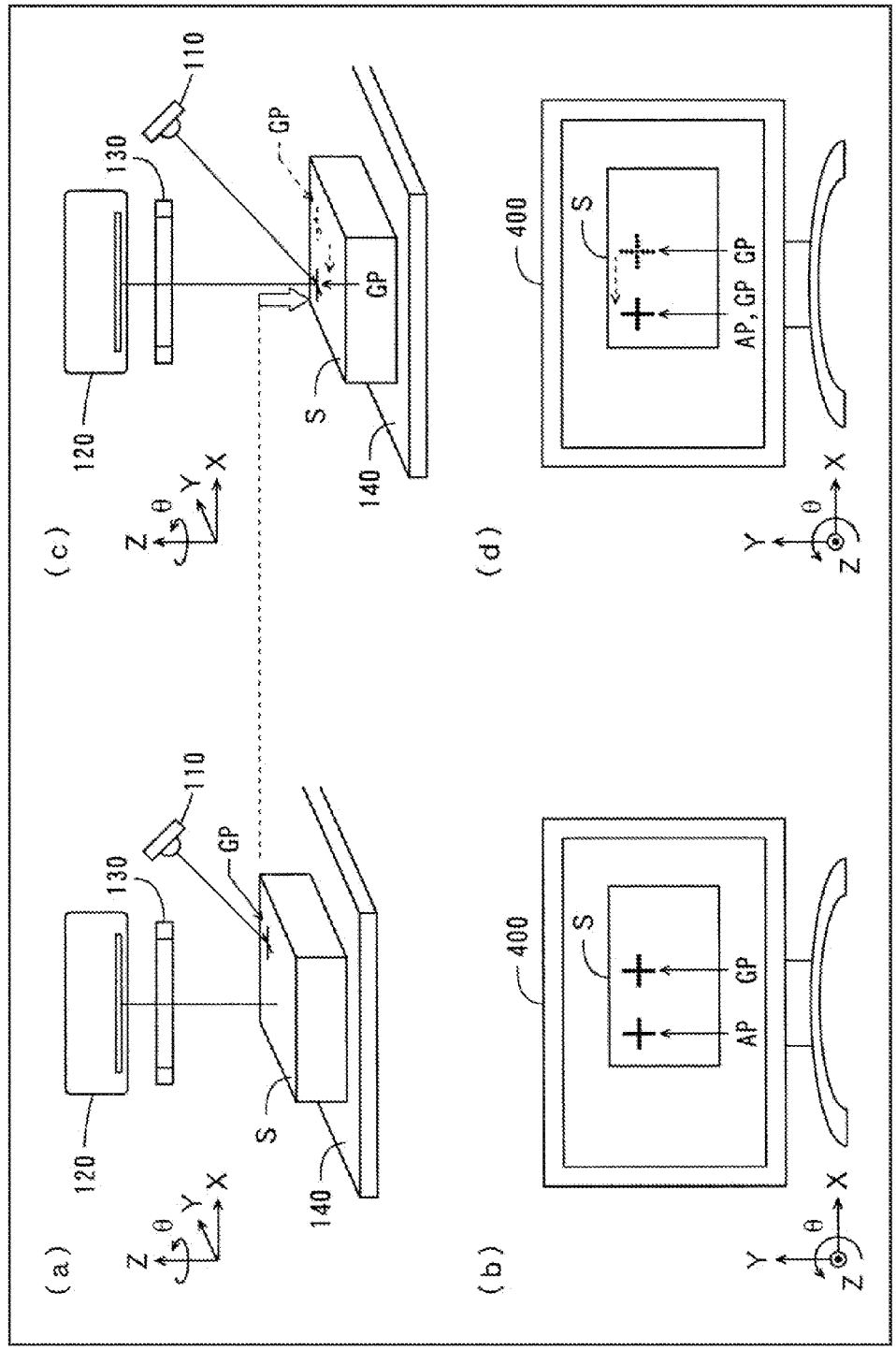
FIGS. 35A to 35D are views describing a second example of the first auxiliary function of the focus adjustment.

FIGS. 35A to 35D are views describing a second example of the first auxiliary function of the focus adjustment. FIGS. 35A and 35C show states in which the measuring object S on the stage 140 is irradiated with the illumination light from the illumination light output unit 130. FIGS. 35B and 35D show images displayed on the display section 400 when the measuring object S is imaged by the light receiving unit 120 of FIGS. 35A and 35C.

In this example, the auxiliary pattern AP is displayed at a position on the image on the display section 400 specified by the user. In other words, the user can specify the coordinates (x, y) of FIG. 34A where the auxiliary pattern AP is displayed. As shown in FIGS. 35A and 35C, the measuring object S is irradiated with the light having the guide pattern GP from the light projecting unit 110. In this case, the CPU 210 of FIG. 1 calculates the coordinates (x, y) of the AP based on the specification of the user, and controls the light projecting unit 110 so that the light is irradiated toward the coordinates (x, y) on the focus position of FIG. 34B. The guide pattern GP is thereby projected onto the surface of the measuring object S, and the guide pattern GP is displayed on the image of the measuring object S of the display section 400.

In the example of FIG. 35A, the position of the surface of the measuring object S do not coincide with the focus position of the light receiving unit 120. Therefore, the guide pattern GP and the auxiliary pattern AP are not overlapped on the display section 400, as shown in FIG. 35B.

As shown in FIG. 35C, the user can move the stage 140 in the Z direction so that the guide pattern GP approaches the auxiliary pattern AP while viewing the auxiliary pattern AP and the guide pattern GP displayed on the display section 400. As shown in FIG. 35D, the user can easily make the position of the surface of the measuring object S coincide with the focus position of the light receiving unit 120 by adjusting the stage 140 so that the guide pattern GP and the auxiliary pattern AP overlap.

Figure 36A:
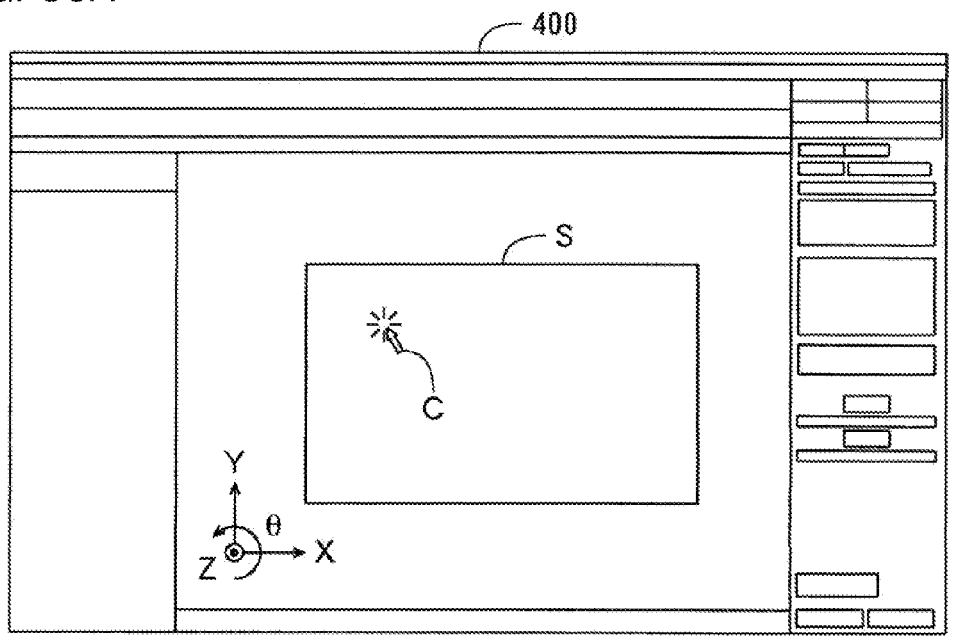
FIGS. 36A and 36B are views showing an example of the GUI for specifying a position to display an auxiliary pattern.
Figure 36B:
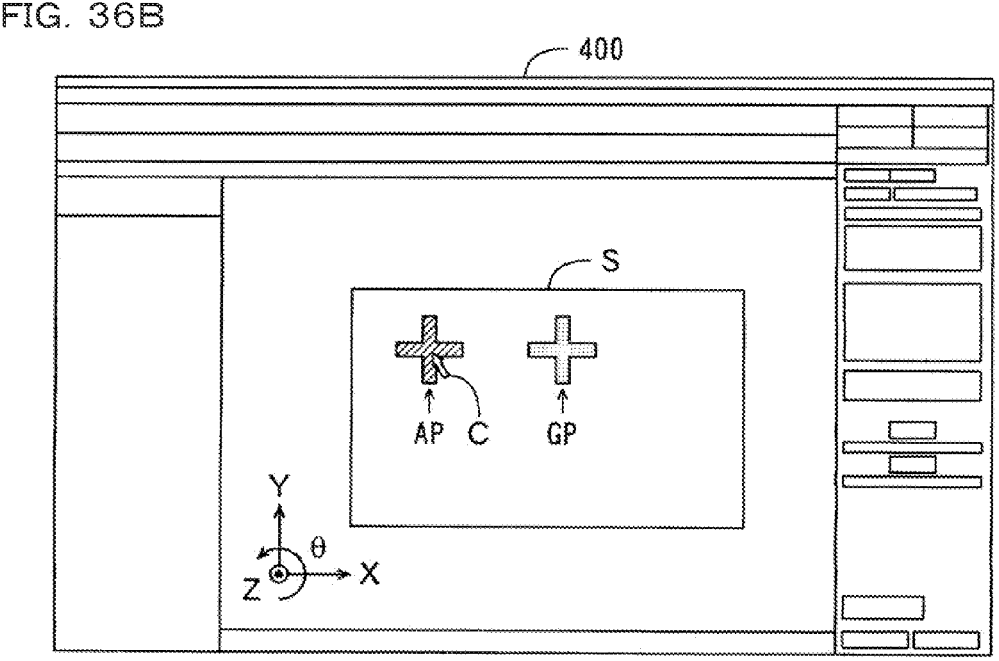

FIGS. 36A and 36B are views showing an example of the GUI for specifying the position to display the auxiliary pattern AP. As shown in FIG. 36A, the user can operate the operation unit 250 of the PC 200 of FIG. 1 to place a cursor C at an arbitrary position on the image of the display section 400.

When the relevant position is selected in this state, the user can display the auxiliary pattern AP at the position of the cursor C and display the guide pattern GP, as shown in FIG. 36B. Thus, in this example, the user can display the auxiliary pattern AP at an arbitrary position. The user thus can focus the light receiving unit 120 to the arbitrary position on the surface of the measuring object S.

(3) Third Example of First Auxiliary Function of Focus Adjustment

FIGS. 37A to 37D are views describing a third example of the first auxiliary function of the focus adjustment. FIGS. 37A and 37C show states in which the measuring object S on the stage 140 is irradiated with the illumination light from the illumination light output unit 130. FIGS. 37B and 37D show images displayed on the display section 400 when the measuring object S is imaged by the light receiving unit 120 of FIGS. 37A and 37C.

Similarly to the first and second examples of the first auxiliary function of the focus adjustment, the auxiliary pattern AP is displayed on the image of the display section 400. The position where the auxiliary pattern AP is displayed may be set in advance or may be specified by the user. In this example, the auxiliary pattern AP includes a rectangular frame. The dimension in the X direction of the rectangular frame of the auxiliary pattern AP indicates the measurable range in the Z direction of the light receiving unit 120.

As shown in FIGS. 37A and 37C, the measuring object S is irradiated with the light having the guide pattern GP from the light projecting unit 110. The guide pattern GP is thereby projected onto the surface of the measuring object S, and the guide pattern GP is displayed on the image of the measuring object S displayed on the display section 400. The guide pattern GP has a rectangular shape, and the dimension of the guide pattern GP is smaller than the dimension of the auxiliary pattern AP. According to such a configuration, the surface of the measuring object S is included within the measurable range in the Z direction of the light receiving unit 120 when the guide pattern GP is positioned within the rectangular frame of the auxiliary pattern AP.

In the example of FIG. 37A, the surface of the measuring object S is not positioned within the measurable range in the Z direction of the light receiving unit 120. Therefore, as shown in FIG. 37B, the guide pattern GP is not positioned within the rectangular frame of the auxiliary pattern AP on the display section 400.

As shown in FIG. 37C, the user can move the stage 140 in the Z direction so that the guide pattern GP approaches the auxiliary pattern AP while viewing the auxiliary pattern AP and the guide pattern GP displayed on the display section 400. As shown in FIG. 37D, the user can easily position the surface of the measuring object S within the measurable range in the Z direction of the light receiving unit 120 by adjusting the stage 140 so that the guide pattern GP is positioned within the rectangular frame of the auxiliary pattern AP.

Therefore, the position of the surface of the measuring object S is not required to coincide with the focus position of the light receiving unit 120, and the dimension in the X direction of the auxiliary pattern AP may have a spread range corresponding to the measurable range in the Z direction of the light receiving unit 120 when positioning the measuring object S within the measurable range in the Z direction of the light receiving unit 120. In this case, the measuring object S can be more easily positioned within the measurable range in the Z direction of the light receiving unit 120.

(4) Fourth Example of First Auxiliary Function of Focus Adjustment

Figure 38:
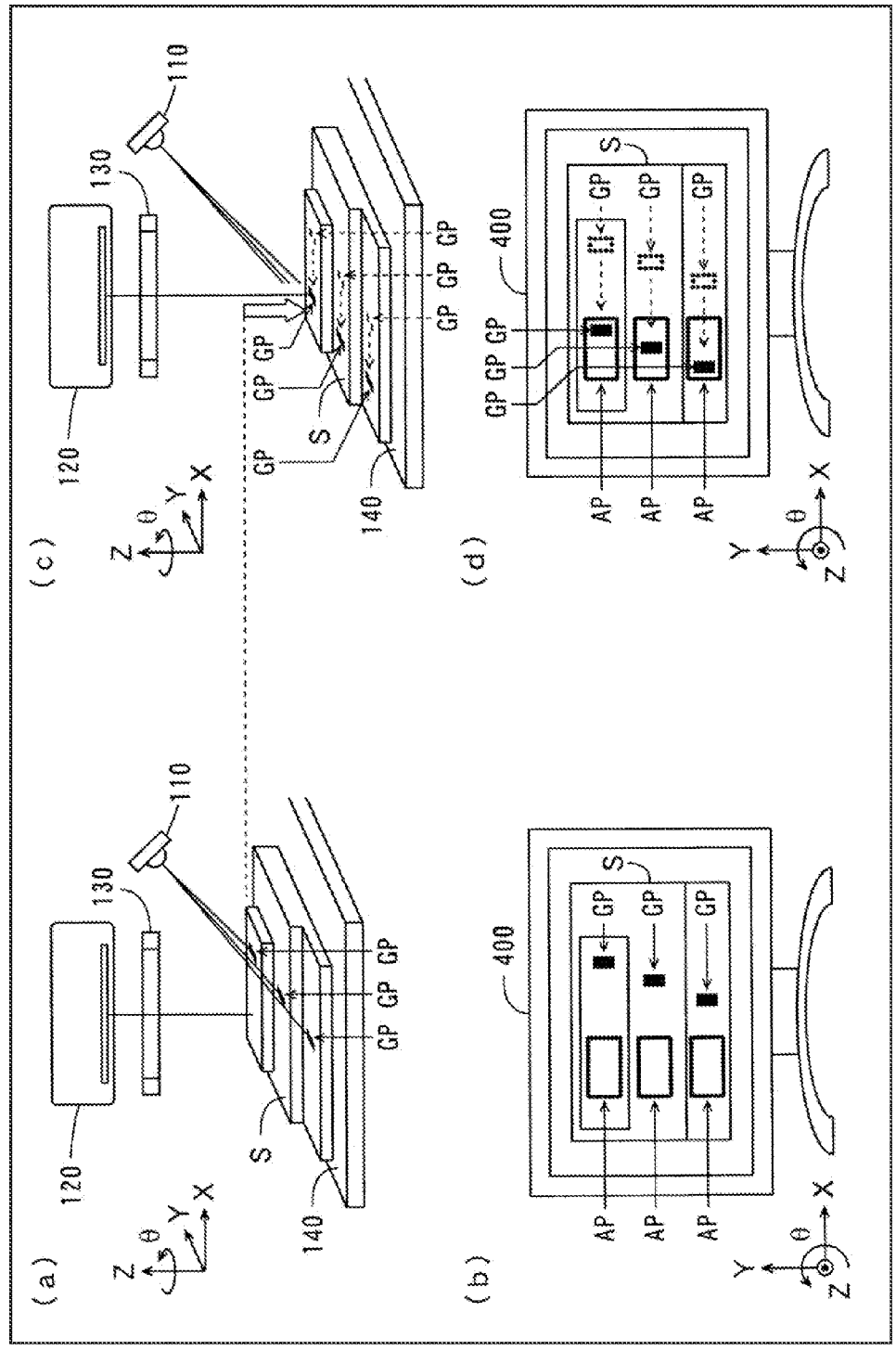
FIGS. 38A to 38D are views describing a fourth example of the first auxiliary function of the focus adjustment.

FIGS. 38A to 38D are views describing a fourth example of the first auxiliary function of the focus adjustment. FIGS. 38A and 38C show states in which the measuring object S on the stage 140 is irradiated with the illumination light from the illumination light output unit 130. The measuring object S of FIGS. 38A and 38C have a plurality of upper surfaces of different heights. FIGS. 38B and 38D show images displayed on the display section 40 when the measuring object S is imaged by the light receiving unit 120 of FIGS. 38A and 38C.

In this example, the auxiliary pattern AP is displayed at a plurality of positions on the image on the display section 400 specified by the user. Therefore, the user can specify the auxiliary pattern AP on each of the plurality of upper surfaces of different heights of the measuring object S displayed on the display section 400. Each auxiliary pattern AP includes a rectangular frame. The dimension in the X direction of the rectangular frame of each auxiliary pattern AP indicates the measurable range in the Z direction of the light receiving unit 120.

As shown in FIGS. 38A and 38C, the measuring object S is irradiated with the light having a plurality of guide patterns GP from the light projecting unit 110. The plurality of guide patterns GP are thereby projected onto the surface of the measuring object S, and the plurality of guide patterns GP are displayed on the image of the measuring object S displayed on the display section 400. The plurality of guide patterns GP respectively correspond to the plurality of auxiliary patterns AP. Each guide pattern GP has a rectangular shape, and the dimension of each guide pattern GP is smaller than the dimension of each auxiliary pattern AP. According to such a configuration, the plurality of upper surfaces of the measuring object S are positioned within the measurable range in the Z direction of the light receiving unit 120 when each guide pattern GP is positioned within the rectangular frame of each auxiliary pattern AP.

In the example of FIG. 38A, the plurality of upper surfaces of the measuring object S are not included in the measurable range in the Z direction of the light receiving unit 120. Therefore, as shown in FIG. 38B, each guide pattern GP is not positioned within the rectangular frame of each auxiliary pattern AP on the display section 400.

As shown in FIG. 38C, the user can move the stage 140 in the Z direction so that each guide pattern GP approaches each auxiliary pattern AP while viewing the auxiliary patterns AP and the guide patterns GP displayed on the display section 400. As shown in FIG. 38D, the user can easily position the plurality of upper surfaces of the measuring object S within the range of the depth of field of the light receiving unit 120 by adjusting the stage 140 so that each guide pattern GP is positioned within the rectangular frame of each auxiliary pattern AP.

Therefore, when positioning a plurality of positions in the measuring object S within the measurable range in the Z direction of the light receiving unit 120, a plurality of auxiliary patterns AP corresponding to such positions may be specified. Thus, even if a plurality of portions of the measuring object S are at a plurality of different positions in the Z direction, each of the plurality of portions of the measuring object S can be accurately and easily positioned at the focus of the light receiving unit 120. The dimension in the X direction of each auxiliary pattern AP may have a spread range corresponding to the measurable range in the Z direction of the light receiving unit 120. In this case, the measuring object S can be easily positioned within the measurable range in the Z direction of the light receiving unit 120.

(5) Fifth Example of First Auxiliary Function of Focus Adjustment

Figure 39:
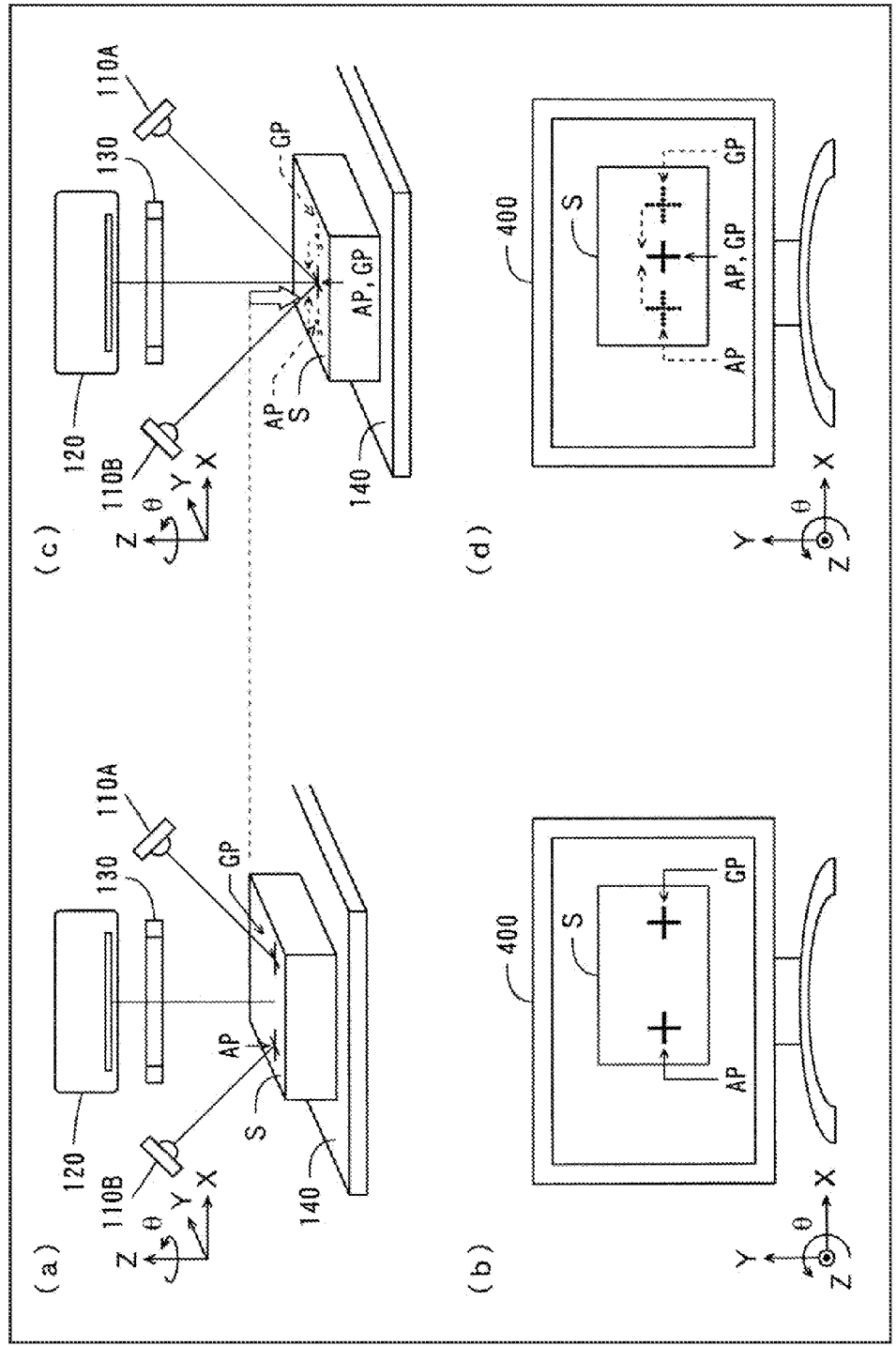
FIGS. 39A to 39D are views describing a fifth example of the first auxiliary function of the focus adjustment.

FIGS. 39A to 39D and FIGS. 40A and 40B are views describing a fifth example of the first auxiliary function of the focus adjustment. FIGS. 39A and 39C show states in which the measuring object S on the stage 140 is irradiated with the illumination light from the illumination light output unit 130.

Figure 40:
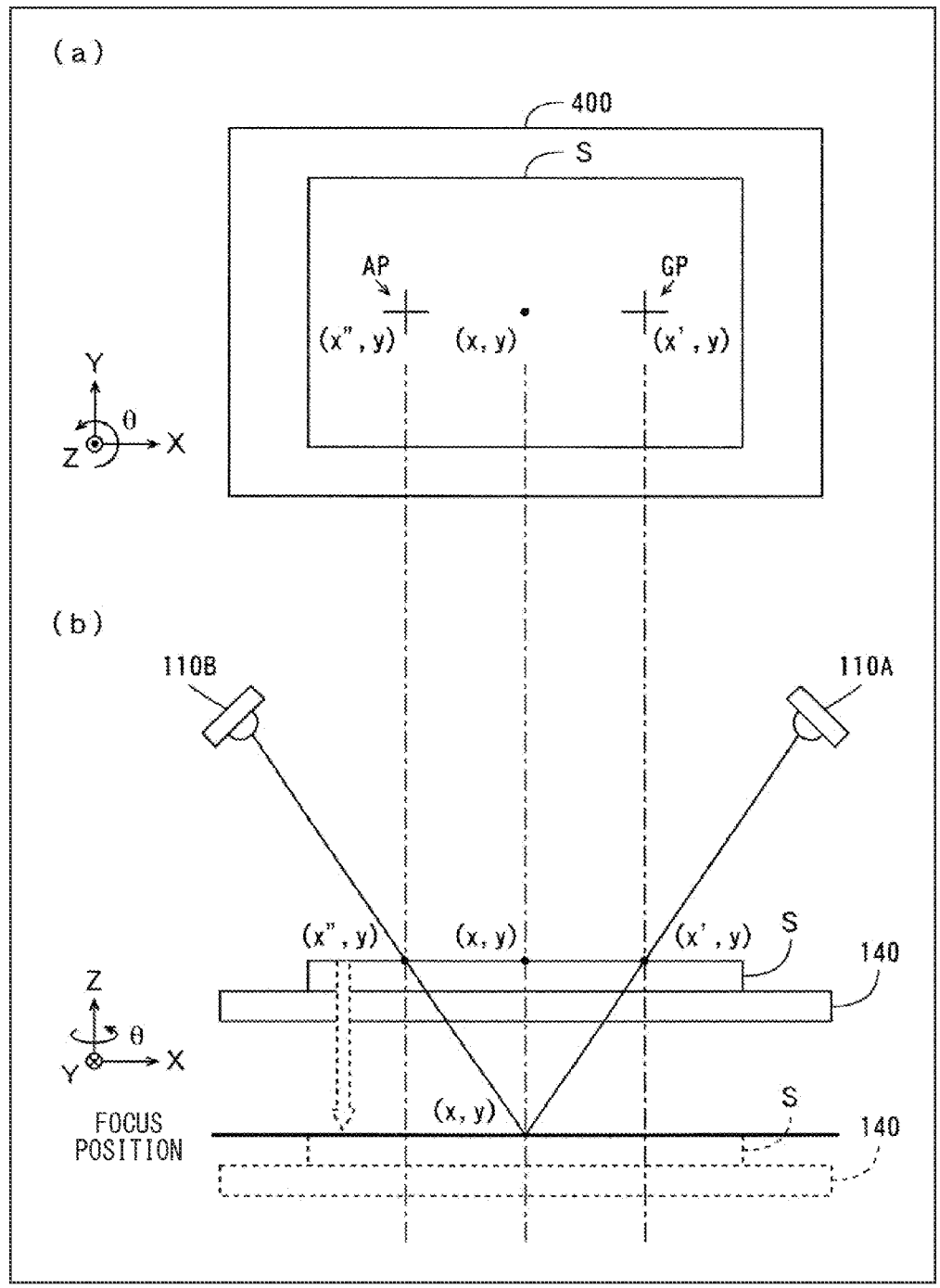
FIGS. 40A and 40B are views describing the fifth example of the first auxiliary function of the focus adjustment.

FIGS. 39B and 39D show images displayed on the display section 400 when the measuring object S is imaged by the light receiving unit 120 of FIGS. 39A and 39C. FIG. 40A shows an image displayed on the display section 400 when the measuring object S is imaged by the light receiving unit 120. FIG. 40B shows a relationship between the position of the measuring object S when seen from the Y direction and the focus position. In this example, a plurality of light projecting units 110A, 110B are used for the first auxiliary function of the focus adjustment.

In FIG. 40B, the focus position is indicated with a thick solid line. When the user operates the focus guide display field 477 of FIG. 13, the measuring object S is irradiated with the light having the guide pattern GP from the one light projecting unit 110A, as shown in FIGS. 39A, 39C, and 40B. Thus, the guide pattern GP is projected onto the surface of the measuring object S as shown in FIGS. 39A and 39C, and the guide pattern GP is displayed on the image of the measuring object S of the display section 400 as shown in FIGS. 39B, 39D, and 40A. In this case, the CPU 210 of FIG. 1 controls the one light projecting unit 110A so that the light is irradiated toward the coordinates (x, on the focus position with respect to an arbitrary coordinates (x, y) set in advance.

Similarly, the measuring object S is irradiated with the light having the auxiliary pattern AP from the other light projecting unit 110B, as shown in FIGS. 39A, 39C, and 40B. Thus, the auxiliary pattern AP is projected onto the surface of the measuring object S as shown in FIGS. 39A and 39C, and the auxiliary pattern AP is displayed on the image of the measuring object S of the display section 400 as shown in FIGS. 39B, 39D, and 40A. In this case, the CPU 210 controls the other light projecting unit 110B so that the light is irradiated toward the coordinates (x, y) on the focus position with respect to an arbitrary coordinates (x, y) set in advance. The light projecting units 110A, 110B are controlled such that the positions in the Y direction of the auxiliary pattern AP and the guide pattern GP are the same.

Differently from the first to fourth examples of the first auxiliary function of the focus adjustment, the auxiliary pattern AP in this example is not a pattern displayed to overlap the image on the display section 400. Thus, the auxiliary pattern AP moves or changes when the measuring object S of FIGS. 39A and 39C is moved or changed.

According to such a configuration, when the surface of the measuring object S is at the focus position of the light receiving unit 120, the guide pattern GP and the auxiliary pattern AP are displayed at the same coordinates as the coordinates (x, y). In other words, the guide pattern GP and the auxiliary pattern AP are displayed so as to overlap.

When the surface of the measuring object S is not at the focus position of the light receiving unit 120, the guide pattern GP is displayed at coordinates (x', y) different from the coordinates (x, y), and the auxiliary pattern AP is displayed at coordinates (x", different from the coordinates (x, y) and the coordinates (x', y). The distance between the position x' and the position x" is proportional to the distance in the Z direction between the focus position of the light receiving unit 120 and the position of the surface of the measuring object S. Therefore, when the measuring object S is moved in the Z direction, the guide pattern GP and the auxiliary pattern AP are not moved in the Y direction, and are moved in opposite directions to each other in the X direction.

In the example of FIG. 39A, the position of the surface of the measuring object S do not coincide with the focus position of the light receiving unit 120. Therefore, the guide pattern GP and the auxiliary pattern AP are not overlapped on the measuring object S and the display section 400, as shown in FIG. 39B.

As shown in FIG. 39C, the guide pattern GP and the auxiliary pattern AP are moved in opposite directions to each other in the X direction by moving the stage 140 in the Z direction. The user can move the stage 140 in the Z direction so that the guide pattern GP and the auxiliary pattern AP approach each other while viewing the auxiliary pattern AP and the guide pattern GP projected onto the surface of the measuring object S or displayed on the display section 400. As shown in FIG. 39D, the user can easily make the position of the surface of the measuring object S coincide with the focus position of the light receiving unit 120 by adjusting the stage 140 so that the guide pattern GP and the auxiliary pattern AP overlap.

Therefore, in this example, the auxiliary pattern AP and the guide pattern GP are displayed not only on the display section 400 but also on the measuring object S. Therefore, even in a situation where the display section 400 cannot be viewed, the user can adjust the focus of the light receiving unit 120 while viewing the auxiliary pattern AP and the guide pattern GP displayed on the measuring object S. The operability of the measuring section 100 of FIG. 1 thus can be enhanced.

In this example as well, the portion of the measuring object S on which the user desires to focus the light receiving unit 120 on the display section 400 can be specified. In this case, when the focus of the light receiving unit 120 is at the portion specified by the user, the irradiation position of the measurement light by each light projecting unit 110A, 110B is changed such that the guide pattern GP projected onto the measuring object S by the one light projecting unit 110A and the auxiliary pattern AP projected onto the measuring object S by the other light projecting unit 110B overlap.

In addition to the guide pattern GP or the auxiliary pattern AP, the light having a frame pattern indicating the visual field range of the light receiving unit 120 may be irradiated from at least one of the light projecting units 110A, 110B. FIGS. 41A and 41B and FIGS. 42A and 42B are views showing examples in which the measuring object S is irradiated with the light having the frame pattern from the light projecting unit 110A.

Figure 41A:
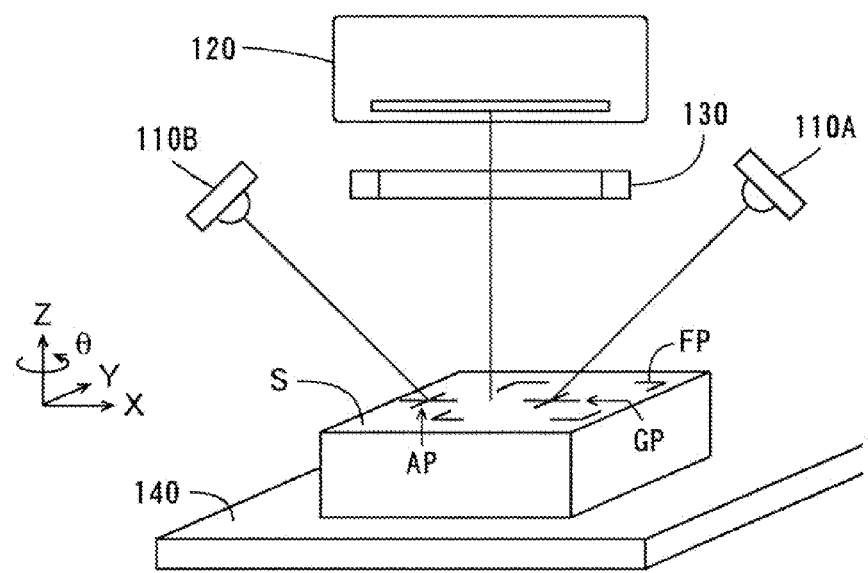
FIGS. 41A and 41B are views showing an example in which the measuring object is irradiated with light having a frame pattern from a measurement light source.
Figure 41B:
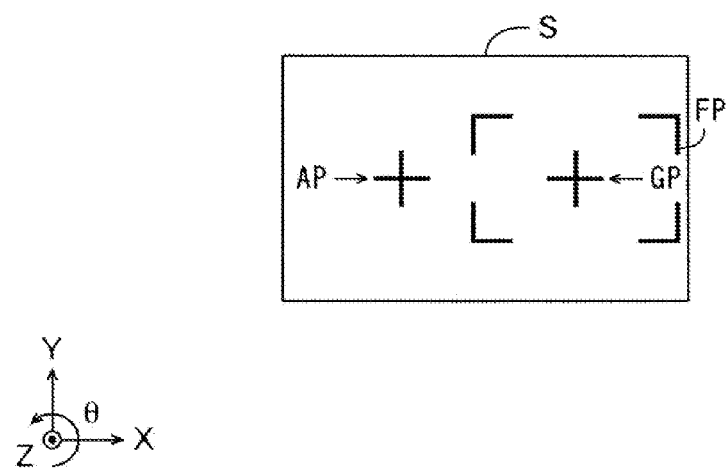

As shown in FIGS. 41A and 41B, the measuring object S is irradiated with the light having the frame pattern FP from the one light projecting unit 110A. The frame pattern FP is thereby projected onto the surface of the measuring object S. The frame pattern FP indicates the visual field range including the guide pattern GP as the center.

In the examples of FIGS. 41A and 41B and FIGS. 42A and 42B, the frame pattern FP is four L-shaped patterns indicating the four corners of the visual field size. The frame pattern FP may be four cross-shaped patterns or four dot-shaped patterns indicating the four corners of the visual field range. Alternatively, the frame pattern FP may be a rectangular pattern indicating the visual field range.

Figure 42A:
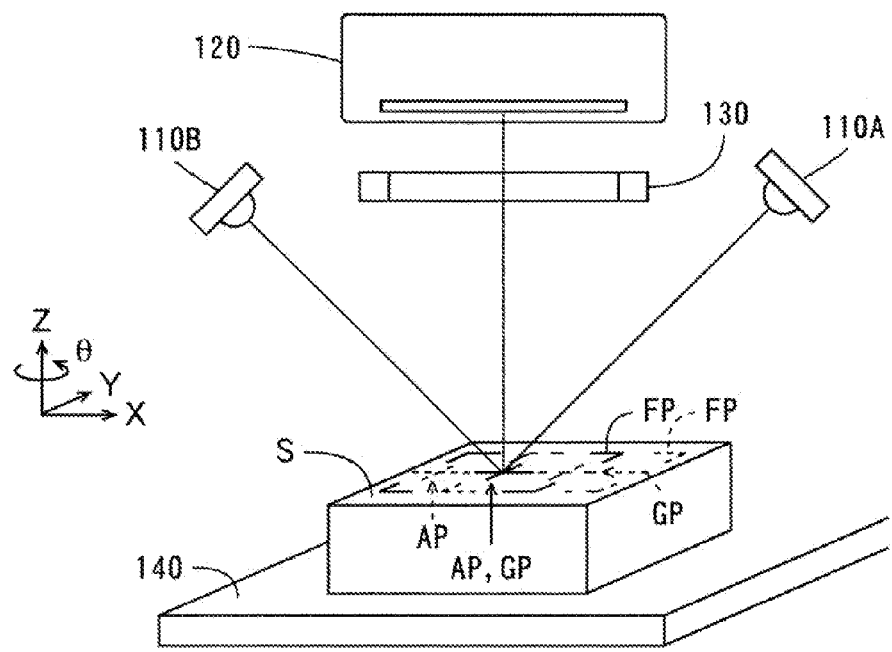
FIGS. 42A and 42B are views showing an example in which the measuring object is irradiated with the light having the frame pattern from the measurement light source.
Figure 42B:
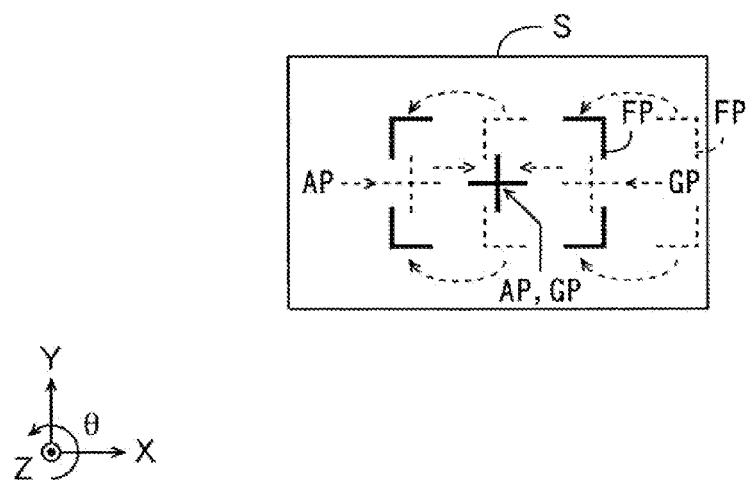

As shown in FIGS. 42A and 42B, the user can make the position of the surface of the measuring object S coincide with the focus position of the light receiving unit 120 by adjusting the stage 140 so that the guide pattern GP and the auxiliary pattern AP overlap. The range surrounded by the frame pattern FP in this state becomes the visual field range of the light receiving unit 120.

In this example, therefore, the frame pattern FP is projected onto the measuring object S. The user thus can easily recognize the visual field range of the light receiving unit 120 displayed on the display section 400 even in a situation where the display section 400 cannot be viewed. The operability of the measuring section 100 thus can be further enhanced.

Figure 43:
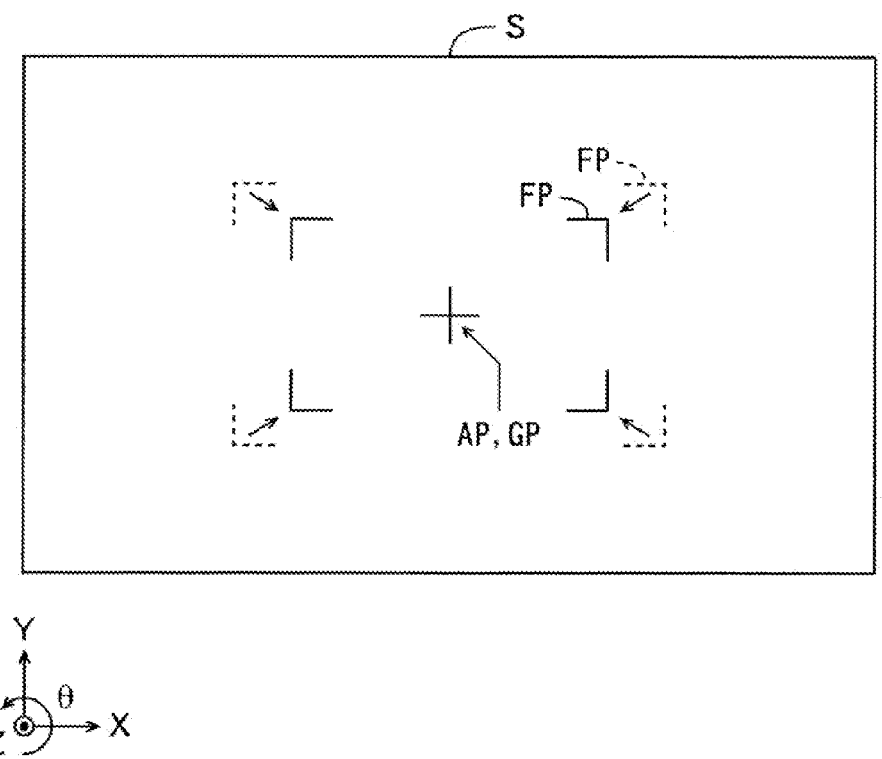
FIG. 43 is a view showing a frame pattern corresponding to a digital zoom function.

Furthermore, in this example, the light receiving unit 120 has the digital zoom function. FIG. 43 is a view showing the frame pattern FP corresponding to the digital zoom function. As shown in FIG. 43, the visual field range after the enlargement can be projected onto the surface of the measuring object S by the frame pattern FP before actually enlarging and observing the measuring object S with the digital zoom function of the light receiving unit 120. In FIG. 43, the visual field range when the digital zoom function is not used is indicated with the frame pattern FP of dotted lines, and the visual field range after the enlargement when the digital zoom function is used is indicated with the frame pattern FP of solid lines.

Therefore, the user can recognize the visual field range after the enlargement before actually enlarging and observing the measuring object S with the digital zoom function of the light receiving unit 120. The operability of the measuring section 100 thus can be further enhanced.

As a variant of the fifth example of the first auxiliary function of the focus adjustment, the measuring section 100 may include an adjustment light source for the first auxiliary function of the focus adjustment. In this case, the light projecting unit 110A and the adjustment light source are used for the first auxiliary function of the focus adjustment. The measuring section 100 may not include the other light projecting unit 110B. Since the adjustment light source is not used for the measurement of the shape of the measuring object S, a light source having a simple configuration may be adopted. In this example, the adjustment light source is, for example, a laser pointer.

The measuring object S is irradiated with the light having the guide pattern GP from the light projecting unit 110A. The guide pattern GP is thereby projected onto the surface of the measuring object S, and the guide pattern GP is displayed on the image of the measuring object S of the display section 400. The measuring object S is irradiated with the light having the auxiliary pattern AP from the adjustment light source. The auxiliary pattern AP is thereby projected onto the surface of the measuring object S, and the auxiliary pattern AP is displayed on the image of the measuring object S of the display section 400.

The user adjusts the stage 140 so that the guide pattern GP and the auxiliary pattern AP overlap while viewing the auxiliary pattern AP and the guide pattern GP projected onto the surface of the measuring object S or displayed on the display section 400 to easily make the position of the surface of the measuring object S coincide with the focus position of the light receiving unit 120.

The adjustment light source may be arranged at any portion of the measuring section 100 as long as light can be irradiated toward the measuring object S from a direction different from the irradiating direction of the light from the light projecting unit 110A toward the measuring object S. For example, the adjustment light source may be arranged in the light receiving unit 120, and the measuring object S may be irradiated with the light from substantially directly above the measuring object S. Alternatively, if the measuring object S transmits light, the adjustment light source may be arranged on the stage 140 and the measuring object S may be irradiated with the light from below the measuring object S.

(6) Variant of First Auxiliary Function of Focus Adjustment

In the first to fifth examples of the first auxiliary function of the focus adjustment, the user manually adjusts the focus of the light receiving unit 120 so that the guide pattern GP and the auxiliary pattern AP overlap or so that the guide pattern GP is positioned within the rectangular frame of the auxiliary pattern AP, but the present invention is not limited thereto. The focus of the light receiving unit 120 may be automatically adjusted without the operation of the user by having the CPU 210 of FIG. 1 drive the stage drive unit 146 of FIG. 1 based on a distance between the guide pattern GP and the auxiliary pattern AP.

Alternatively, the CPU 210 may determine whether to move the stage 140 in one direction or the other direction in the Z direction to approach the guide pattern GP and the auxiliary pattern AP, and display such a direction on the display section 400, for example. The CPU 210 may determine an extent of focusing by the degree of overlapping of the guide pattern GP and the auxiliary pattern AP, and numerically or visually display the extent of focusing on the display section 400. The visual display of the extent of focusing includes display by a bar, for example. As other visual displays of the extent of focusing, the hue of the guide pattern GP and the auxiliary pattern AP may be changed when the guide pattern GP and the auxiliary pattern AP are completely overlapped.

(7) Shapes of Auxiliary Pattern and Guide Pattern

In the first, second, and fifth examples of the first auxiliary function of the focus adjustment, the guide pattern GP and the auxiliary pattern AP are set such that the position of the surface of the measuring object S coincide with the focus position of the light receiving unit 120 when the guide pattern GP and the auxiliary pattern AP are overlapped. In the third and fourth examples of the first auxiliary function of the focus adjustment, the guide pattern GP and the auxiliary pattern AP are set such that the measuring object S is positioned within the measurable range in the Z direction of the light receiving unit 120 when the guide pattern GP is positioned within the rectangular frame of the auxiliary pattern AP.

Without being limited thereto, the guide pattern GP and the auxiliary pattern AP may be set such that the position of the surface of the measuring object S coincides with the focus position of the light receiving unit 120 or the measuring object S is positioned within the measurable range in the Z direction of the light receiving unit 120 when the guide pattern GP and the auxiliary pattern AP are in a specific positional relationship. The specific positional relationship is a relationship in which the user can recognize that the focus of the light receiving unit 120 coincides with the relevant position by visually checking the relative positional relationship between the guide pattern GP and the auxiliary pattern AP, and differs from the positional relationship between the guide pattern GP and the auxiliary pattern AP when the focus of the light receiving unit 120 does not coincide.

FIGS. 44A to 44E are views showing examples of the shapes of the auxiliary pattern AP and the guide pattern GP.

In FIGS. 44A to 44E, the auxiliary pattern AP is shown with a hatching pattern and the guide pattern GP is shown with a dot pattern.

Figure 44:
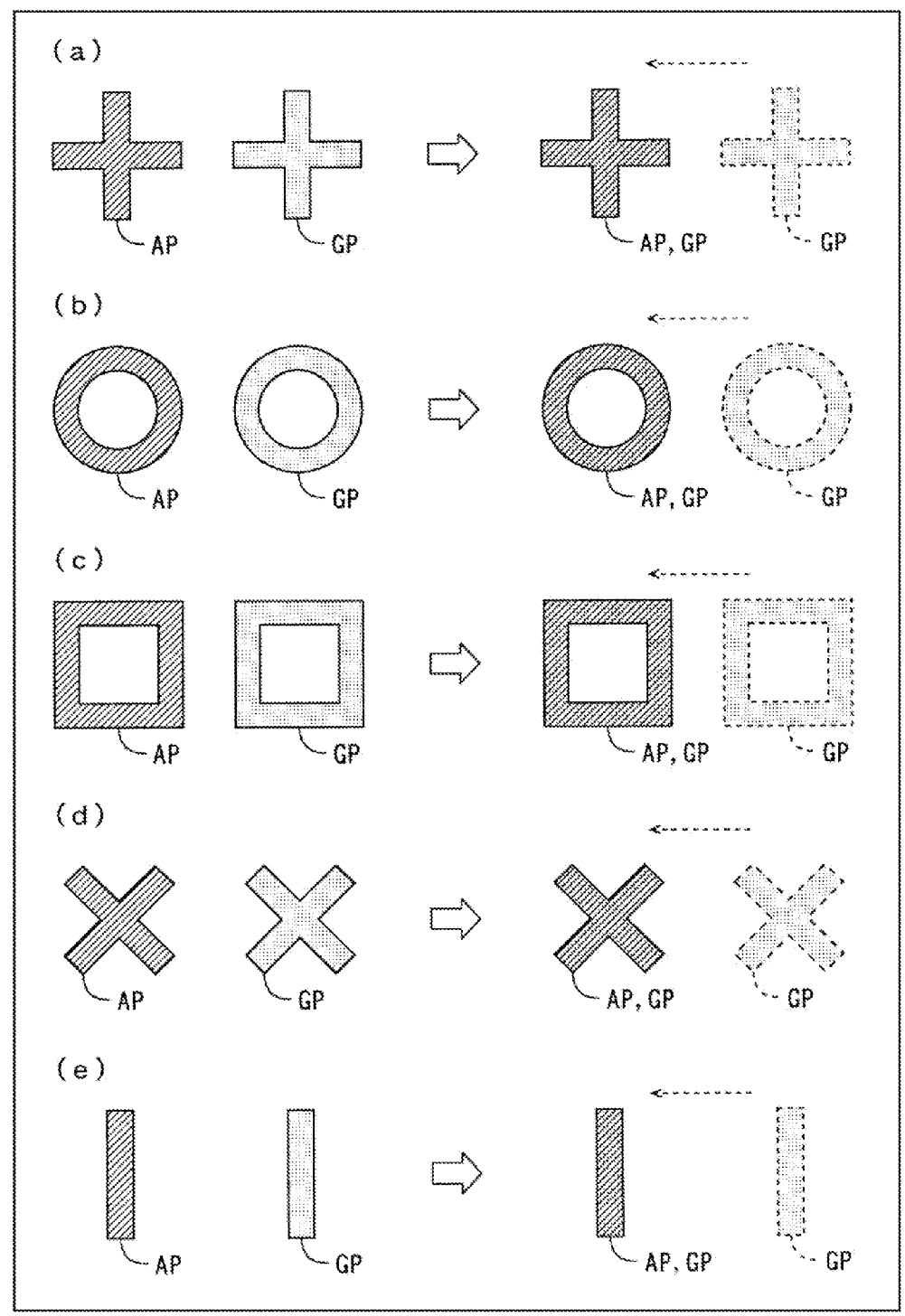
FIGS. 44A to 44E are views showing examples of the shapes of the auxiliary pattern and a guide pattern.

In the example of FIG. 44A, the auxiliary pattern AP and the guide pattern GP have a cross-shape. In the example of FIG. 44B, the auxiliary pattern AP and the guide pattern GP have a circular ring shape. In the example of FIG. 44C, the auxiliary pattern AP and the guide pattern GP have a rectangular shape. In the example of FIG. 44D, the auxiliary pattern AP and the guide pattern GP have an X-shape. In the example of FIG. 44E, the auxiliary pattern AP and the guide pattern GP have an I-shape.

Therefore, in the examples of FIGS. 44A to 44E, the auxiliary pattern AP and the guide pattern GP have the same shapes. In such examples, the position of the surface of the measuring object S coincides with the focus position of the light receiving unit 120 when the guide pattern GP and the auxiliary pattern AP are overlapped. The auxiliary pattern AP and the guide pattern GP in the first, second, and fifth examples of the first auxiliary function of the focus adjustment are the auxiliary pattern AP and the guide pattern GP of FIG. 44A.

FIGS. 45A to 45E are views showing other examples of the shapes of the auxiliary pattern AP and the guide pattern GP. In FIGS. 45A to 45E, the auxiliary pattern AP is shown with a hatching pattern and the guide pattern GP is shown with a dot pattern.

Figure 45:
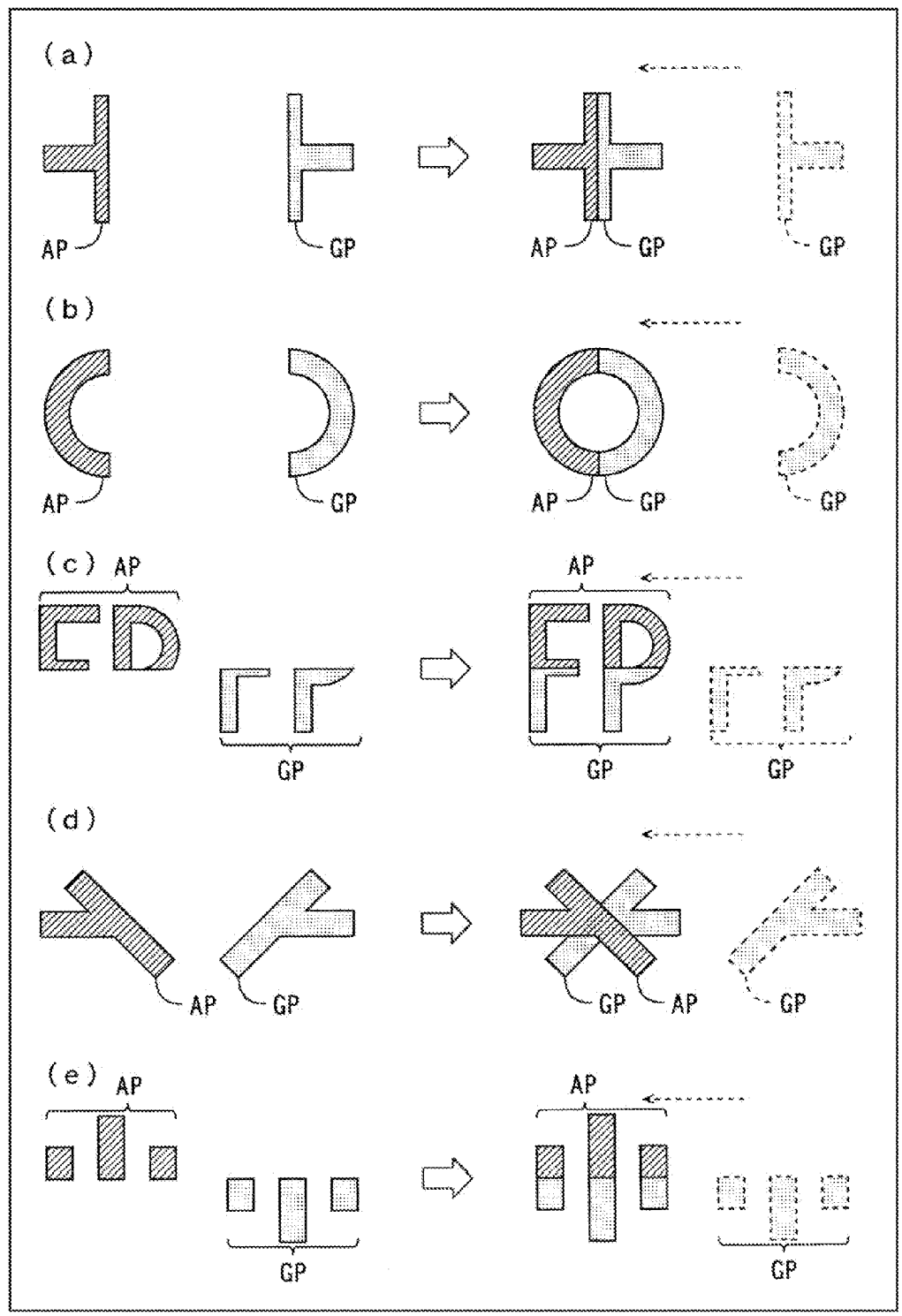
FIGS. 45A to 45E are views showing other examples of the shapes of the auxiliary pattern and the guide pattern.

In the example of FIG. 45A, the auxiliary pattern AP has a shape of half of the cross-shape, and the guide pattern GP has a shape of the other half of the cross-shape. In this example, the position of the surface of the measuring object S coincides with the focus position of the light receiving unit 120 when the guide pattern GP and the auxiliary pattern AP are combined to form the cross-shape.

In the example of FIG. 45B, the auxiliary pattern AP has a shape of half of the circular ring shape, and the guide pattern GP has a shape of the other half of the circular ring shape. In this example, the position of the surface of the measuring object S coincides with the focus position of the light receiving unit 120 when the guide pattern GP and the auxiliary pattern AP are combined to form the circular ring shape.

In the example of FIG. 45C, the auxiliary pattern AP has a shape of portions of a shape of characters "FP", and the guide pattern GP has a shape of the other portions of the shape of characters "FP". In this example, the position of the surface of the measuring object S coincides with the focus position of the light receiving unit 120 when the guide pattern GP and the auxiliary pattern AP are combined to form the shape of the characters "FP".

In the example of FIG. 45D, the auxiliary pattern AP has a shape of one portion of an asterisk shape, and the guide pattern GP has a shape of the other portion of the asterisk shape. In this example, the position of the surface of the measuring object S coincides with the focus position of the light receiving unit 120 when the guide pattern GP and the auxiliary pattern AP are combined to form the asterisk shape.

In the example of FIG. 45E, the auxiliary pattern AP has a shape of portions of a plurality of bar shapes extending in the up and down direction and having different lengths, and the guide pattern GP has a shape of the other portions of the plurality of bar shapes extending in the up and down direction and having different lengths. In this example, the position of the surface of the measuring object S coincides with the focus position of the light receiving unit 120 when the guide pattern GP and the auxiliary pattern AP are combined to form the plurality of bar shapes extending in the up and down direction and having different lengths.

Figure 46:
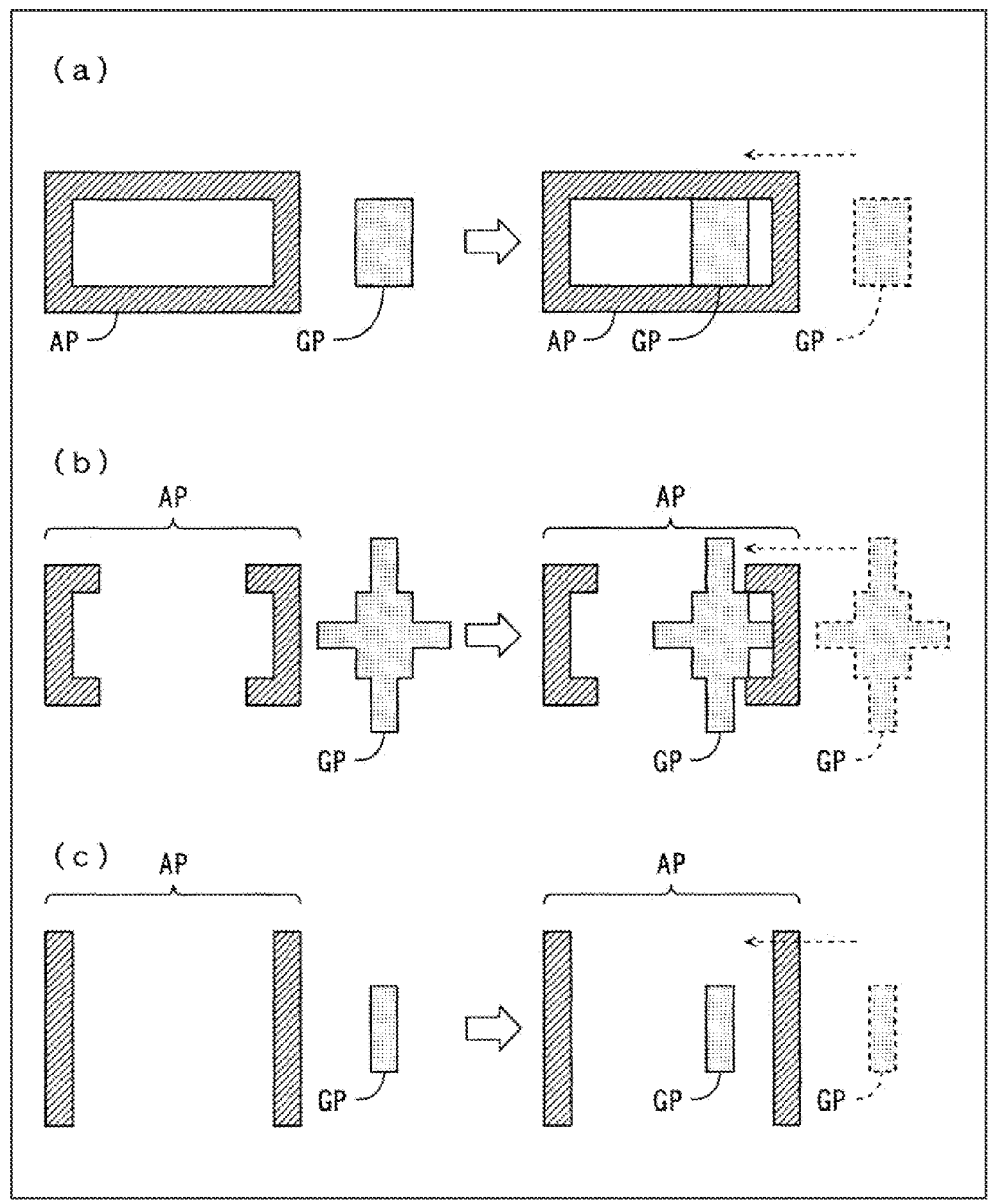
FIGS. 46A to 46C are views showing further examples of the shapes of the auxiliary pattern and the guide pattern.

FIGS. 46A to 46C are views showing other further examples of the shapes of the auxiliary pattern AP and the guide pattern GP. In FIGS. 46A to 46C, the auxiliary pattern AP is shown with a hatching pattern and the guide pattern GP is shown with a dot pattern.

In the example of FIG. 46A, the auxiliary pattern AP includes a rectangular frame, and the guide pattern GP has a rectangular shape smaller than the dimension of the auxiliary pattern AP. The dimension in the horizontal direction (X direction of FIG. 2) of the auxiliary pattern AP indicates the measurable range in the Z direction of the light receiving unit 120 of FIG. 1. In this example, the display portion of the guide pattern GP on the measuring object S is positioned within the measurable range in the Z direction of the light receiving unit 120 when the guide pattern GP is positioned within the rectangular frame of the auxiliary pattern AP.

The auxiliary pattern AP and the guide pattern GP in the third and fourth examples of the first auxiliary function of the focus adjustment are the auxiliary pattern AP and the guide pattern GP of FIG. 46A.

In the example of FIG. 46B, the auxiliary pattern AP includes two angled brackets facing each other in the horizontal direction. The guide pattern GP has a shape in which a rectangular portion smaller than the dimension of the auxiliary pattern AP and a cross-shaped portion are combined. The spacing in the horizontal direction of the two angled brackets of the auxiliary pattern AP indicates the measurable range in the Z direction of the light receiving unit 120. In this example, the display portion of the guide pattern GP on the measuring object S is positioned within the measurable range in the Z direction of the light receiving unit 120 when the rectangular portion of the guide pattern GP is positioned between the two angled brackets of the auxiliary pattern AP.

In the example of FIG. 46C, the auxiliary pattern AP includes two bar-shaped portions extending in the up and down direction and being lined in the horizontal direction. The guide pattern GP has a bar shape extending in the up and down direction and being smaller than the dimension of the auxiliary pattern AP. The spacing in the horizontal direction of the two bar-shaped portions of the auxiliary pattern AP indicates the measurable range in the Z direction of the light receiving unit 120. In this example, the display portion of the guide pattern GP on the measuring object S is positioned within the measurable range in the Z direction of the light receiving unit 120 when the guide pattern GP is positioned between the two bar-shaped portions of the auxiliary pattern AP.

(8) Effects by Illumination Light

In the first to fifth examples of the first auxiliary function of the focus adjustment, the measuring object S is irradiated with the illumination light from the illumination light source 320 of the control section 300 of FIG. 1 through the illumination light output unit 130. Hereinafter, the effect by the illumination light will be described by comparing an example in which the measuring object S is not irradiated with the illumination light and an example in which the measuring object S is irradiated with the illumination light.

The pattern generating portion 112 of FIG. 2 generates the guide pattern GP by forming the bright portion and the dark portion in the light to be emitted from the light projecting unit 110. The guide pattern GP can be formed by either the bright portion or the dark portion. The guide pattern GP formed by the bright portion is referred to as a white guide pattern GP, and the guide pattern GP formed by the dark portion is referred to as a black guide pattern GP.

Figure 47A:
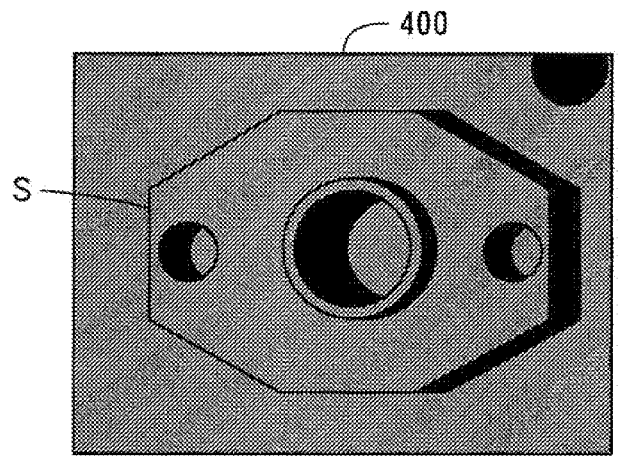
FIGS. 47A to 47C are views showing the measuring object displayed on the display section when the measuring object is not irradiated with illumination light.
Figure 47B:
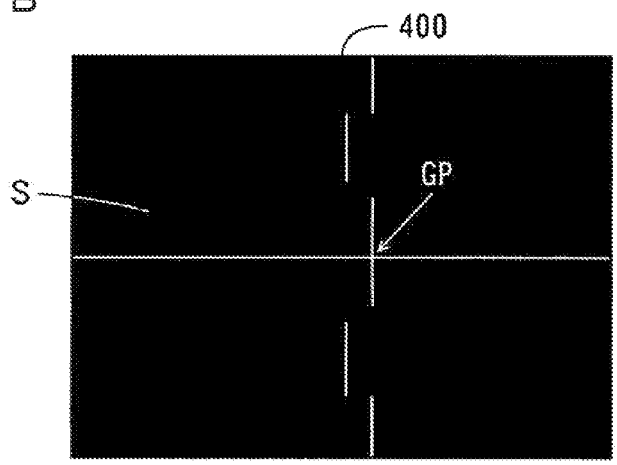
Figure 47C:
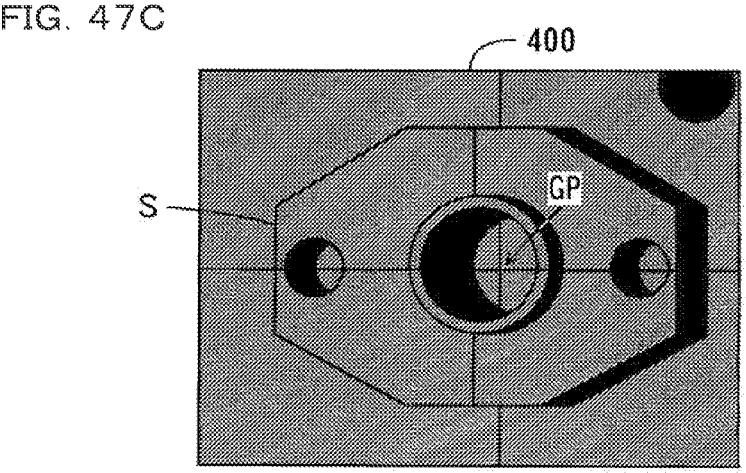

FIGS. 47A to 47C are views showing the measuring object S displayed on the display section 400 when the measuring object S is not irradiated with the illumination light. FIG. 47A shows the measuring object S in a state where the uniform light (light including only bright portion) is irradiated from the light projecting unit 110 as a reference example. As shown in FIG. 47A, when the measuring object S is irradiated with the uniform light from the light projecting unit 110, shade is formed at a part of the measuring object S.

FIG. 47B shows the measuring object S in a state irradiated with the light having the white guide pattern GP from the light projecting unit 110. As shown in FIG. 47B, the white guide pattern GP is displayed on the display section 400 when the measuring object S is not irradiated with the illumination light. However, since the measuring object S is not illuminated, the measuring object S is not displayed on the display section 400. Thus, it is difficult to adjust the focus of the light receiving unit 120.

FIG. 47C shows the measuring object S in a state irradiated with the light having the black guide pattern GP from the light projecting unit 110. As shown in FIG. 47C, the black guide pattern GP is displayed on the display section 400 when the measuring object S is not irradiated with the illumination light. Since a part of the measuring object S is illuminated by the bright portion of the light from the light projecting unit 110, the user can recognize the position of the measuring object S. However, shade is formed at a part of the measuring object S, and thus the black guide pattern GP is embedded in the shade when the black guide pattern GP and the shade are overlapped, whereby it is difficult to recognize the accurate position of the black guide pattern GP.

Figure 48A:
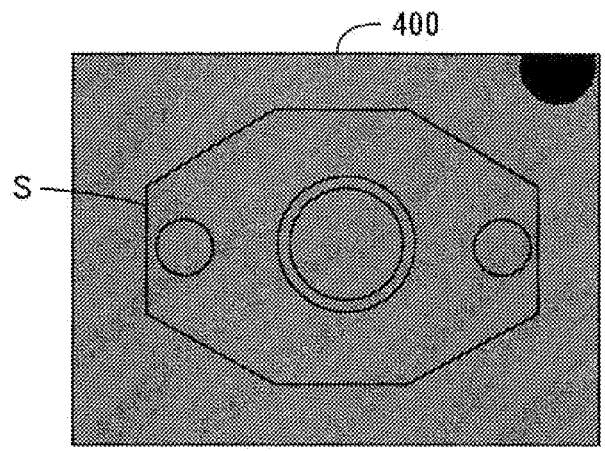
FIGS. 48A to 48C are views showing the measuring object displayed on the display section when the measuring object is irradiated with the illumination light.
Figure 48B:
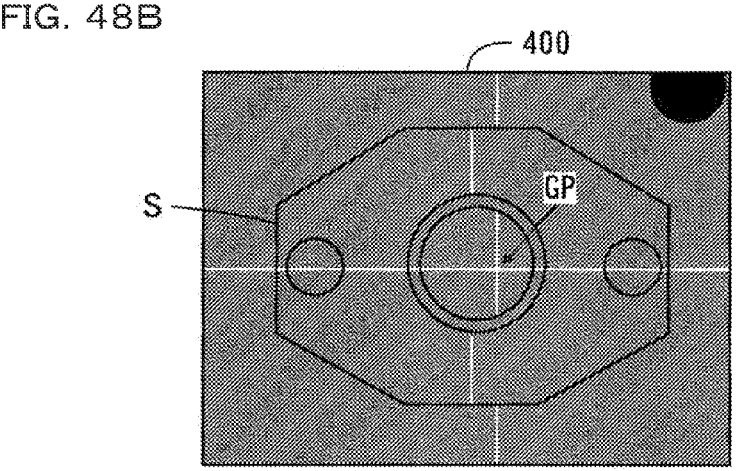
Figure 48C:
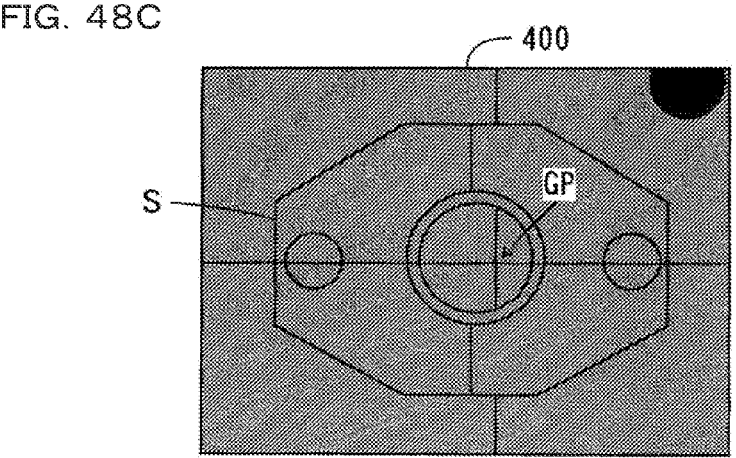

FIGS. 48A to 48C are views showing the measuring object S displayed on the display section 400 when the measuring object S is irradiated with the illumination light. FIG. 48A shows the measuring object S in a state irradiated with the illumination light from the illumination light output unit 130 as a reference example. As shown in FIG. 48A, when the measuring object S is irradiated with the illumination light from the illumination light output unit 130, shade is hardly formed on the measuring object S.

FIG. 48B shows the measuring object S in a state irradiated with the light having the white guide pattern GP from the light projecting unit 110. As shown in FIG. 48B, when the measuring object S is irradiated with the illumination light adjusted to the appropriate brightness, the white guide pattern GP is displayed together with the measuring object S on the display section 400. Since the shade is hardly formed on the measuring object S, the positions of the measuring object S and the white guide pattern GP can be accurately recognized.

FIG. 48C shows the measuring object S in a state irradiated with the light having the black guide pattern GP from the light projecting unit 110. As shown in FIG. 48C, when the measuring object S is irradiated with the illumination light adjusted to the appropriate brightness, the black guide pattern GP is displayed together with the measuring object S on the display section 400. Since the shade is hardly formed on the measuring object S, the positions of the measuring object S and the black guide pattern GP can be accurately recognized.

Therefore, the illumination light is emitted at an angle substantially equal to that of the optical axis of the light receiving unit 120, whereby the measuring object S is illuminated while suppressing the formation of shade. The user thus can reliably recognize the image of the measuring object S, as well as the auxiliary pattern AP and the guide pattern GP. As a result, the measuring object S can be more accurately positioned at the focus of the light receiving unit 120.

In particular, when specifying the portion of the measuring object S on which the user desires to focus the light receiving unit 120 on the display section 400, it is difficult for the user to appropriately specify the portion originally desired to be focused in a state where the image of the measuring object S is dark and is not displayed, as shown in FIG. 47B. Therefore, the user can easily specify the portion desired to be focused by illuminating the illumination light on the entire measuring object S from the illumination light output unit 130 and displaying the image.

In the first to fourth examples of the first auxiliary function of the focus adjustment, the intensity of the illumination light when the measuring object S is irradiated with the measurement light having the guide pattern GP is set to be smaller than the intensity of the illumination light when the measuring object S is not irradiated with the measurement light having the guide pattern GP.

According to such a configuration, even when the measuring object S is simultaneously irradiated with the illumination light and the measurement light having the guide pattern GP, the guide pattern GP projected onto the surface of the measuring object S can be recognized since the intensity of the illumination light is small. The user thus can reliably recognize the image of the measuring object S and the guide pattern GP displayed on the display section 400. As a result, the surface of the measuring object S can be reliably positioned at the focus of the light receiving unit 120.

Similarly, in the fifth example of the first auxiliary function of the focus adjustment, the intensity of the illumination light when the measuring object S is irradiated with the measurement light having the guide pattern GP and the auxiliary pattern AP is set to be smaller than the intensity of the illumination light when the measuring object S is not irradiated with the measurement light having the guide pattern GP and the auxiliary pattern AP.

According to such a configuration, even when the measuring object S is simultaneously irradiated with the illumination light and the measurement light having the guide pattern GP and the auxiliary pattern AP, the guide pattern GP and the auxiliary pattern AP projected onto the surface of the measuring object S can be recognized since the intensity of the illumination light is small. The user thus can reliably recognize the image of the measuring object S as well as the guide pattern GP and the auxiliary pattern AP displayed on the display section 400. As a result, the surface of the measuring object S can be reliably positioned at the focus of the light receiving unit 120.

(9) Effect

In the shape measuring device 500 according to the present embodiment, the stage 140 is moved in the Z direction so that the auxiliary pattern AP, which is displayed on the display section 400 or projected onto the surface of the measuring object S by the other light projecting unit 110B, and the guide pattern GP, which is projected onto the surface of the measuring object S by the one light projecting unit 110A, are overlapped. The user thus can position the surface of the measuring object S at the focus of the light receiving unit 120. As a result, the measuring object S can be accurately and easily positioned at the focus of the light receiving unit 120 in the shape measurement processing of the measuring object S.

In particular, the portion where the user desires the most to perform the measurement at high accuracy can be focused on by the user specifying the portion of the measuring object S desired to be focused on the display section 400, and displaying or projecting the auxiliary pattern AP on the specified portion. In this case, the shape measuring device 500 may be configured so that a plurality of portions of the measuring object S the user desires to focus on can be specified.

In this case, the user can adjust, while visually checking, the auxiliary pattern AP and the guide pattern GP corresponding to the respective portions so that a plurality of specified portions of the measuring object S can be focused on in a balanced manner while moving the stage 140. The user can also check whether or not all the specified portions are included in the measurable range in the Z direction of the light receiving unit 120 by displaying the measurable range with the auxiliary pattern AP.

The stage 140 may be moved by the user operating the stage operation unit 145, or may be automatically moved by having the CPU 210 drive the stage drive unit 146.

Figure 49A:
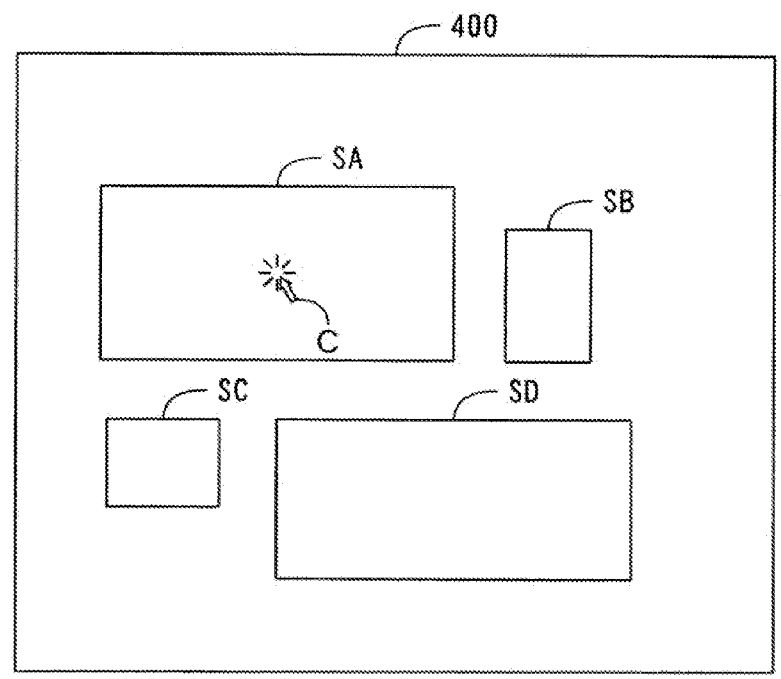
FIGS. 49A and 49B are views describing a first example of a second auxiliary function of the focus adjustment.
Figure 49B:
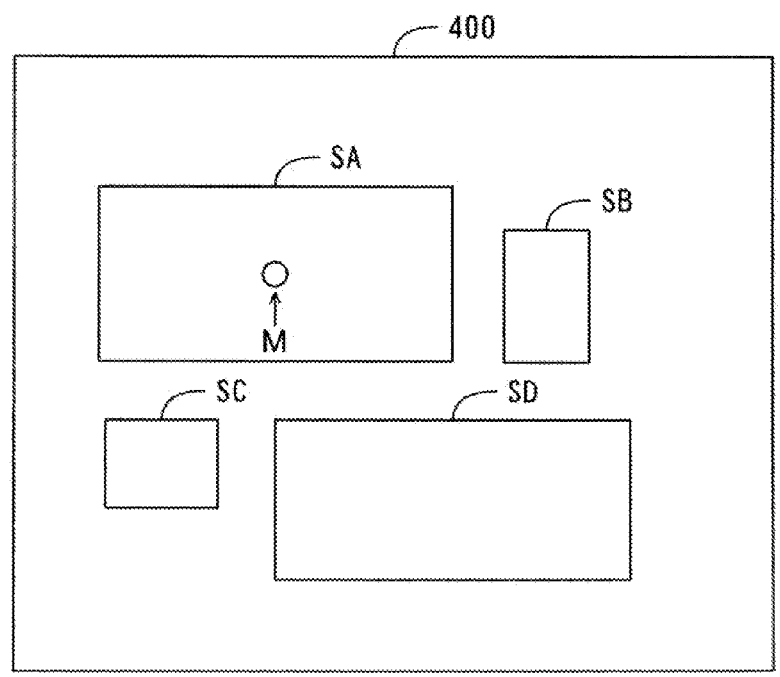

[7] Second Auxiliary Function of Focus Adjustment (1) First Example of Second Auxiliary Function of Focus Adjustment A second auxiliary function of the focus adjustment different from the first auxiliary function of the focus adjustment will now be described. FIGS. 49A and 49B are views describing a first example of the second auxiliary function of the focus adjustment. In the examples of FIGS. 49A and 49B, a plurality of measuring objects SA, SB, SC, SD having different heights from each other are mounted on the stage 140 of FIG. 1. Still images or live images of the measuring objects SA to SD are displayed on the display section 400 based on the light receiving signal output by the light receiving unit 120 of FIG. 1.

As shown in FIG. 49A, the user can place the cursor C at an arbitrary position on the image of the display section 400 by operating the operation unit 250 of the PC 200 of FIG. 1. In the example of FIG. 49A, the cursor C is placed at the position on the measuring object SA displayed on the display section 400. When the relevant position is selected in this state, the user can display a marker M at the position on the measuring object SA specified with the cursor C on the display section 400, as shown in FIG. 49B.

After the marker M is displayed, at least the portion of the measuring object SA corresponding to the position where the marker M is displayed and the portion at the periphery thereof are irradiated with the measurement light from the light projecting unit 110. The height of the portion of the measuring object SA corresponding to the position where the marker M is displayed thus can be calculated by the triangular distance measuring method.

However, since the height of the portion of the measuring object S corresponding to the position on the image where the marker M is displayed cannot be known before the irradiation of the measurement light, the measurement light cannot be accurately applied only to such a portion. Therefore, when the light receiving unit 120 is focused on the portion, the measuring object S is irradiated with the measurement light having a spread corresponding to a predetermined range (e.g., range of depth of field of light receiving unit 120) including the relevant portion as the center. The portion of the measuring object S corresponding to the position where the marker M is displayed is thereby irradiated with the measurement light, so that the height of the portion can be calculated.

If the portion of the measuring object SA corresponding to the position where the marker M is displayed is not within the measurable range in the Z direction of the light receiving unit 120, an error message indicating that the height cannot be calculated is displayed on the display section 400. The user thus can easily recognize that the specified position is not within the measurable range in the Z direction of the light receiving unit 120.

In executing the shape measurement processing, the Z stage 142 of the stage 140 of FIG. 2 is moved so that the light receiving unit 120 is focused on the portion of the measuring object S corresponding to the position where the marker M is displayed based on the calculated height. The movement of the Z stage 142 may be automatically performed (auto-focus function) by having the CPU 210 of FIG. 1 drive the stage drive unit 146 of FIG. 1. Alternatively, the movement of the Z stage 142 may be manually performed by the user operating the stage operation unit 145 of FIG. 1. In this case, the CPU 210 may numerically or visually display the direction of moving and the amount of moving the Z stage 142 on the display section 400. The user thus can focus the light receiving unit 120 on the specified portion of the measuring object SA.

(2) Second Example of Second Auxiliary Function of Focus Adjustment

Figure 50A:
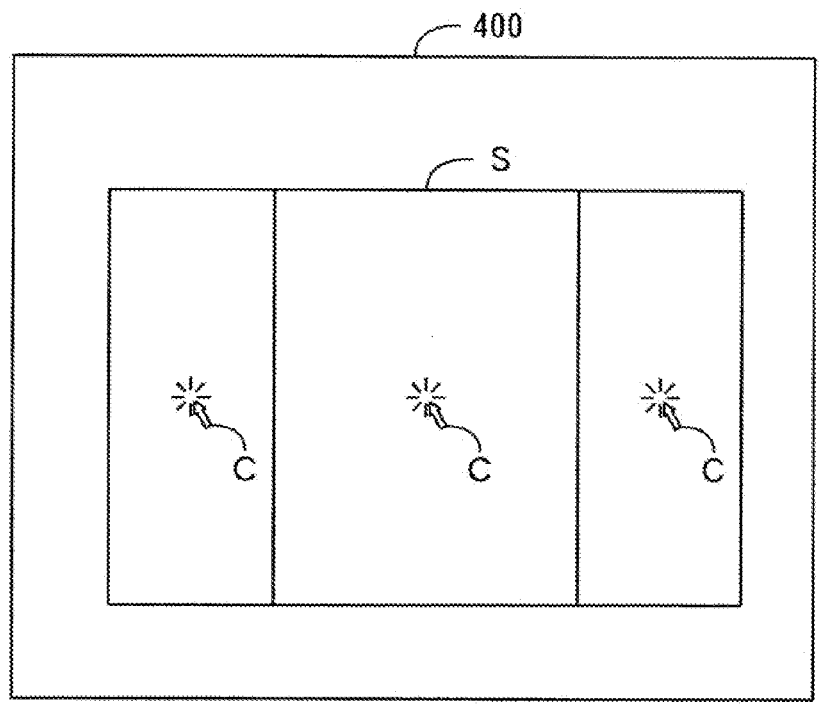
FIGS. 50A and 50B are views describing a second example of the second auxiliary function of the focus adjustment.
Figure 50B:
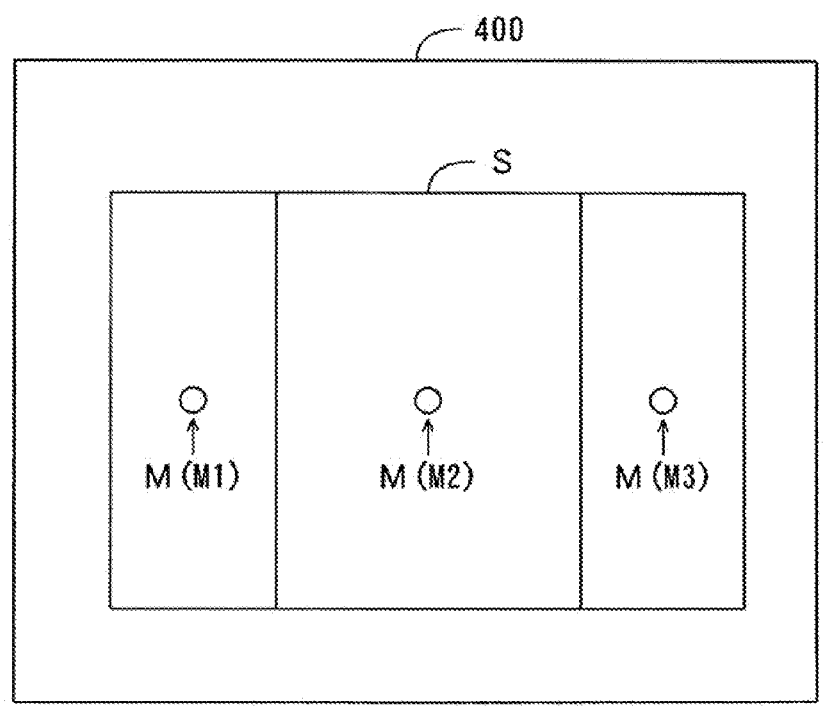
Figure 51:
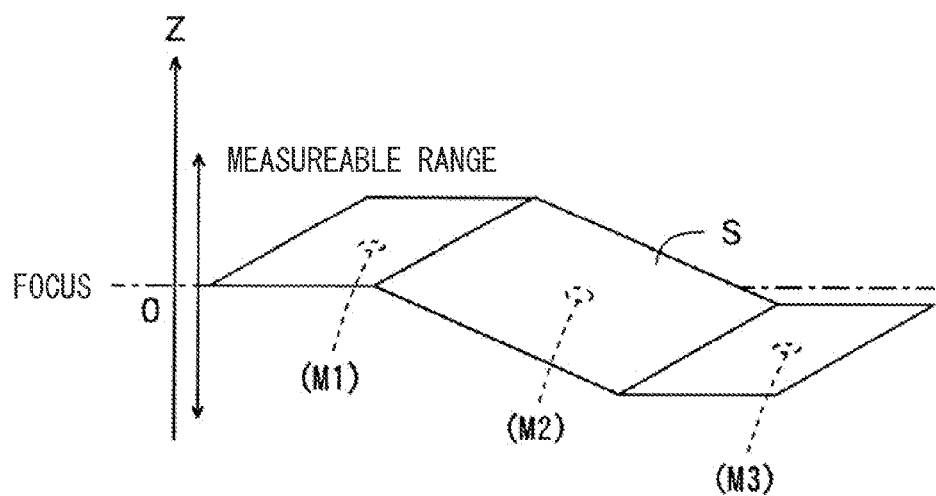
FIG. 51 is a view describing the second example of the second auxiliary function of the focus adjustment.

FIGS. 50A and 50B, and FIG. 51 are views describing a second example of the second auxiliary function of the focus adjustment. In the example of FIGS. 50A and 50B and FIG. 51, one measuring object S is mounted on the stage 140 of FIG. 1. The measuring object S of FIGS. 50A and 50B, and FIG. 51 has a plurality of upper surfaces, where the height of each upper surface differs from each other. On the display section 400 is displayed the still image or the live image of the measuring object S based on the light receiving signal output by the light receiving unit 120 of FIG. 1.

In the second example of the second auxiliary function of the focus adjustment, the user can place the cursor C at an arbitrary position on the image of the display section 400 by operating the operation unit 250 of the PC 200 of FIG. 1, similarly to the first example of the second auxiliary function of the focus adjustment. The user can display the marker M at the position specified with the cursor C by selecting the relevant position in this state.

The user sequentially repeats placing the cursor C to each of a plurality of arbitrary positions and then displaying the marker M to display the marker M at each of the plurality of positions specified with the cursor C on the display section 400. Each time the marker M is displayed at the specified position, the height of the portion of the measuring object S corresponding to such a portion is calculated.

In this example, as shown in FIG. 50A, the user places the cursor C at the position of the measuring object S displayed on the display section 400. The relevant position is selected in this state, so that the user can display a first marker M1 at the position of the measuring object S specified with the cursor C on the display section 400, as shown in FIG. 50B.

After the marker M1 is displayed, at least the portion of the measuring object S corresponding to the position where the marker M1 is displayed and the portion at the periphery thereof are irradiated with the measurement light from the light projecting unit 110. The height of the portion of the measuring object S corresponding to the position where the marker M1 is displayed thus can be calculated by the triangular distance measuring method. If the portion of the measuring object S corresponding to the position where the marker M1 is displayed is not within the measurable range in the Z direction, an error message indicating that the height cannot be calculated is displayed on the display section 400.

Next, as shown in FIG. 50A, the user places the cursor C at another position of the measuring object S displayed on the display section 400. The relevant position is selected in this state, so that the user can display a second marker M2 at the position of the measuring object S specified with the cursor C on the display section 400, as shown in FIG. 50B.

After the marker M2 is displayed, at least the portion of the measuring object S corresponding to the position where the marker M2 is displayed and the portion at the periphery thereof are irradiated with the measurement light from the light projecting unit 110. The height of the portion of the measuring object S corresponding to the position where the marker M2 is displayed thus can be calculated by the triangular distance measuring method. If the portion of the measuring object S corresponding to the position where the marker M2 is displayed is not within the measurable range in the Z direction, an error message indicating that the height cannot be calculated is displayed on the display section 400.

Next, as shown in FIG. 50A, the user places the cursor C at another further position of the measuring object S displayed on the display section 400. The relevant position is selected in this state, so that the user can display a third marker M3 at the position of the measuring object S specified with the cursor C on the display section 400, as shown in FIG. 50B.

After the marker M3 is displayed, at least the portion of the measuring object S corresponding to the position where the marker M3 is displayed and the portion at the periphery thereof are irradiated with the measurement light from the light projecting unit 110. The height of the portion of the measuring object S corresponding to the position where the marker M3 is displayed thus can be calculated by the triangular distance measuring method. If the portion of the measuring object S corresponding to the position where the marker M3 is displayed is not within the measurable range in the Z direction, an error message indicating that the height cannot be calculated is displayed on the display section 400.

The user preferably places the cursor C so as to include the portion at the highest position and the portion at the lowest position among the plurality of portions of the measuring object S when placing the cursor C at a plurality of positions of the measuring object S displayed on the display section 400. The distance in the Z direction among the plurality of portions of the measuring object S corresponding to the plurality of markers M1 to M3 may be measured.

In executing the shape measurement processing, the Z stage 142 of the stage 140 of FIG. 2 is moved such that the plurality of portions of the measuring object S corresponding to the markers M1 to M3 are distributed near the focus of the light receiving unit 120 based on the plurality of calculated heights, as shown in FIG. 51. In this example, the plurality of portions of the measuring object S corresponding to the markers M1 to M3 displayed on the image of the display section 400 are indicated with dotted circles.

Therefore, according to the second example of the second auxiliary function of the focus adjustment, the plurality of portions of the measuring object S corresponding to the plurality of specified positions can be positioned within the range of the depth of field of the light receiving unit 120 by the user specifying the plurality of arbitrary positions on the image of the measuring object S displayed on the display section 400. In the shape measurement processing of the measuring object S, the plurality of arbitrary portions of the measuring object S thus can be accurately and easily positioned within the range of the depth of field of the light receiving unit 120.

Similarly to the first example of the second auxiliary function of the focus adjustment, the Z stage 142 may be moved automatically or manually by the user. The user thus can focus the light receiving unit 120 on a plurality of desired portions of the measuring object S. When the Z stage 142 is manually moved by the user, the height of the portion to measure may be again calculated and whether or not the measuring object S is mounted at a position suited for the shape measurement processing may be checked before executing the shape measurement processing of the measuring object S.

(3) Third Example of Second Auxiliary Function of Focus Adjustment

FIGS. 52A and 52B, and FIGS. 53A to 53D are views describing a third example of the second auxiliary function of the focus adjustment. In the examples of FIGS. 52A and 52B, and FIGS. 53A to 53D, a plurality of measuring objects SA, SB, SC, SD having different heights from each other are mounted on the stage 140 of FIG. 1. The still images or the live images of the measuring objects SA to SD are displayed on the display section 400 based on the light receiving signal output by the light receiving unit 120 of FIG. 1.

In the third example of the second auxiliary function of the focus adjustment, the user can operate the operation unit 250 of the PC 200 of FIG. 1 to display the marker M at each of a plurality of specified positions on the image of the display section 400, similarly to the second example of the second auxiliary function of the focus adjustment. Each time the marker M is displayed at the specified position, the height of the portion of the measuring object S corresponding to such a position is calculated.

Figure 52A:
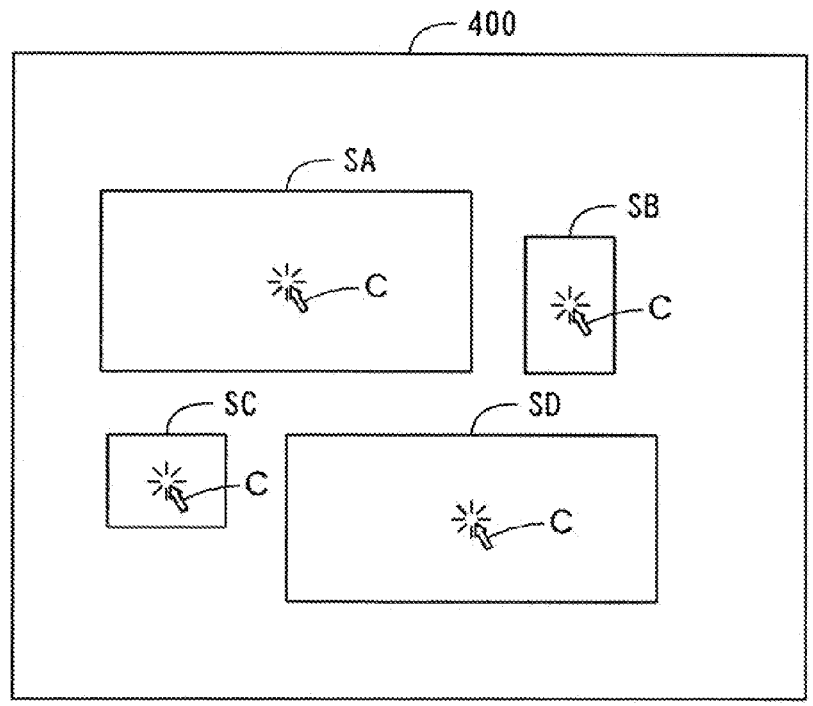
FIGS. 52A and 52B are views describing a third example of the second auxiliary function of the focus adjustment.
Figure 52B:
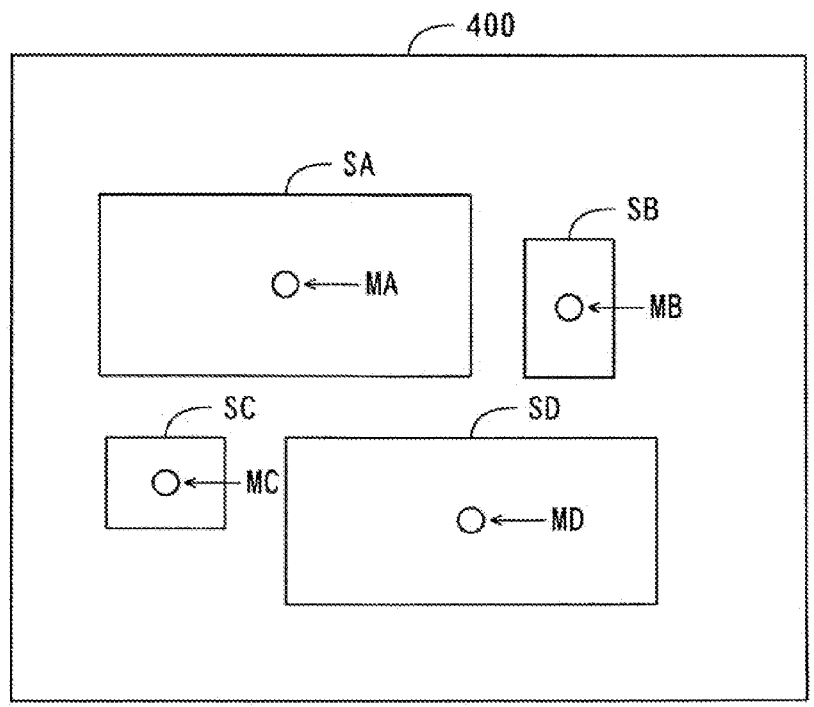

In this example, the user places the cursor C at the position on the measuring object SA displayed on the display section 400, as shown in FIG. 52A. When the relevant position is selected in this state, the user can display a marker MA at the position on the measuring object SA specified with the cursor C on the display section 400, as shown in FIG. 52B.

After the marker MA is displayed, at least the portion of the measuring object SA corresponding to the position where the marker MA is displayed and the portion at the periphery thereof are irradiated with the measurement light from the light projecting unit 110. The height of the portion of the measuring object SA corresponding to the position where the marker MA is displayed thus can be calculated by the triangular distance measuring method. If the portion of the measuring object SA corresponding to the position where the marker MA is displayed is not within the measurable range in the Z direction, an error message indicating that the height cannot be calculated is displayed on the display section 400.

Then, as shown in FIG. 52A, the user places the cursor C at the position on the measuring object SB displayed on the display section 400. When the relevant position is selected in this state, the user can display a marker MB at the position on the measuring object SB specified with the cursor C on the display section 400, as shown in FIG. 52B.

After the marker MB is displayed, at least the portion of the measuring object SB corresponding to the position where the marker MB is displayed and the portion at the periphery thereof are irradiated with the measurement light from the light projecting unit 110. The height of the portion of the measuring object SB corresponding to the position where the marker MB is displayed thus can be calculated by the triangular distance measuring method. If the portion of the measuring object SB corresponding to the position where the marker MB is displayed is not within the measurable range in the Z direction, an error message indicating that the height cannot be calculated is displayed on the display section 400.

Then, as shown in FIG. 52A, the user places the cursor C at the position on the measuring object SC displayed on the display section 400. When the relevant position is selected in this state, the user can display a marker MC at the position on the measuring object SC specified with the cursor C on the display section 400, as shown in FIG. 52B.

After the marker MC is displayed, at least the portion of the measuring object SC corresponding to the position where the marker MC is displayed and the portion at the periphery thereof are irradiated with the measurement light from the light projecting unit 110. The height of the portion of the measuring object SC corresponding to the position where the marker MC is displayed thus can be calculated by the triangular distance measuring method. If the portion of the measuring object SC corresponding to the position where the marker MC is displayed is not within the measurable range in the Z direction, an error message indicating that the height cannot be calculated is displayed on the display section 400.

Then, as shown in FIG. 52A, the user places the cursor C at the position on the measuring object SD displayed on the display section 400. When the relevant position is selected in this state, the user can display a marker MD at the position on the measuring object SD specified with the cursor C on the display section 400, as shown in FIG. 52B.

After the marker MD is displayed, at least the portion of the measuring object SD corresponding to the position where the marker MD is displayed and the portion at the periphery thereof are irradiated with the measurement light from the light projecting unit 110. The height of the portion of the measuring object SD corresponding to the position where the marker MD is displayed thus can be calculated by the triangular distance measuring method. If the portion of the measuring object SD corresponding to the position where the marker MD is displayed is not within the measurable range in the Z direction, an error message indicating that the height cannot be calculated is displayed on the display section 400.

When the user places the cursor C at the respective positions on the plurality of measuring objects SA to SD displayed on the display section 400, the user preferably places the cursor C so that the plurality of portions from the portion at the highest position to the portion at the lowest position among the plurality of portions of the plurality of measuring objects SA to SD are at substantially equal interval. The distance in the Z direction among the portions of the measuring objects SA to SD corresponding to the plurality of markers MA to MD may be measured.

Figure 53A:
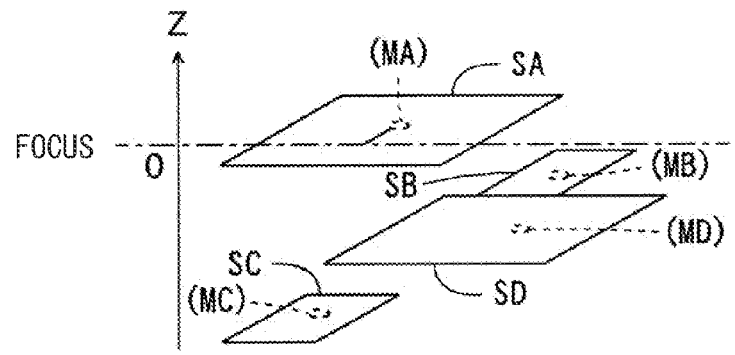
FIGS. 53A to 53D are views describing the third example of the second auxiliary function of the focus adjustment.
Figure 53B:
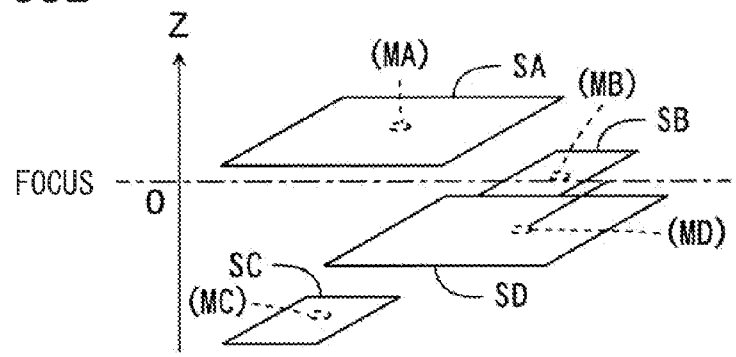

In executing the shape measurement processing, the Z stage 142 of the stage 140 is moved so that the portion of the measuring object SA at the highest position among the plurality of calculated portions is at the focus of the light receiving unit 120, as shown in FIG. 53A. In this example, the portions of the measuring objects SA to SD corresponding to the markers MA to MD displayed on the image of the display section 400 are shown with dotted circles. The shape measurement of the measuring object SA is carried out in this state. After the shape measurement of the measuring object SA is carried out, the Z stage 142 of the stage 140 is moved so that the portion of the measuring object SD at the second highest position among the plurality of calculated portions is at the focus of the light receiving unit 120, as shown in FIG. 53B. The shape measurement of the measuring object SD is carried out in this state.

Figure 53C:
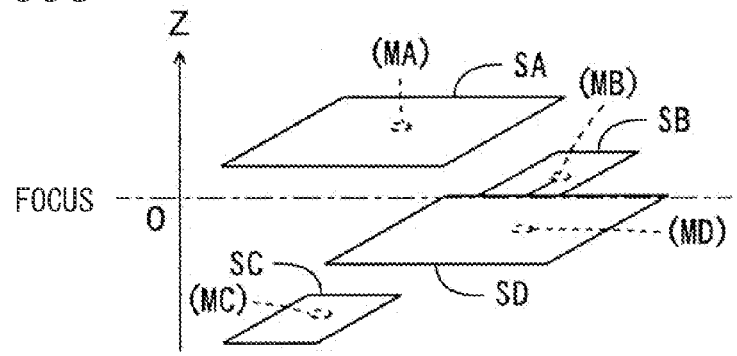
Figure 53D:
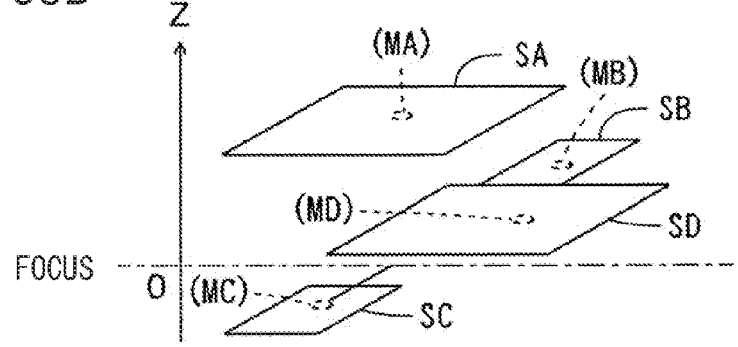

After the shape measurement of the measuring object SD is carried out, the Z stage 142 of the stage 140 is moved so that the portion of the measuring object SB at the third highest position among the plurality of calculated portions is at the focus of the light receiving unit 120, as shown in FIG. 53C. The shape measurement of the measuring object SB is carried out in this state. After the shape measurement of the measuring object SB is carried out, the Z stage 142 of the stage 140 is moved so that the portion of the measuring object SC at the lowest highest position among the plurality of calculated portions is at the focus of the light receiving unit 120, as shown in FIG. 53D. The shape measurement of the measuring object SC is carried out in this state.

After the shape measurement of the measuring objects SA to SD is finished, the shape data indicating the shapes of the measuring objects SA to SD are synthesized. Similarly to the first example of the second auxiliary function of the focus adjustment, the Z stage 142 may be moved automatically or manually by the user. Thus, even if the distance from the portion at the specified highest position to the portion at the specified lowest position exceeds the measurable range in the Z direction, the user can focus the light receiving unit 120 to each of the specified portions of the plurality of measuring objects SA to SD.

According to the third example of the second auxiliary function of the focus adjustment, the user can specify a plurality of arbitrary positions on the image of the measuring object S displayed on the display section 400, so that the measuring object S is irradiated with light with each of the plurality of portions of the measuring object S corresponding to each of the plurality of specified positions positioned at the focus of the light receiving unit 120. Thus, in the shape measurement processing of the measuring object S, each of the plurality of arbitrary portions of the measuring object S can be accurately and easily positioned at the focus of the light receiving unit 120.

In the first to third examples of the second auxiliary function of the focus adjustment, when the portion of the measuring object S corresponding to the position where the marker M is displayed is not in the measurable range in the Z direction, the CPU 210 of FIG. 1 may change the position where the marker M is displayed to position the portion of the measuring object S corresponding to the position after such change within the measurable range in the Z direction. Thus, the light receiving unit 120 can accurately and easily focus on the portion of the measuring object S corresponding to the position of the marker M after the change or the position at the periphery thereof. In the shape measurement processing, the shape of the measuring object S can be measured based on the position of the marker M after the change.

In the second and third examples of the second auxiliary function of the focus adjustment, the user specifies the position desired to be focused on the display section 400, and the Z stage 142 is controlled such that the light receiving unit 120 focuses on the portion of the measuring object S corresponding to the specified position. In order to focus the light receiving unit 120 on the portion of the measuring object S corresponding to the specified position, the height of the relevant portion needs to be known, and thus, such a portion to calculate the height is irradiated with the measurement light.

However, it is difficult to accurately irradiate the portion of the measuring object S corresponding to the specified position with the measurement light. This is because the measurement light shifts in the X direction according to the height of the measuring object S. Therefore, the height of the relevant portion is necessary to accurately irradiate the portion of the measuring object S corresponding to the specified position with the measurement light. In this example, the measuring object S is irradiated with the measurement light having a predetermined width in the X direction so that at least the height of the portion of the measuring object S corresponding to the specified position is calculated. Note that the entire width of the measuring object S in the X direction may be irradiated with the measurement light.

After the height of the portion of the measuring object S corresponding to the specified position is calculated, the Z stage 142 is moved so that the focus of the light receiving unit 120 is at the calculated height. Since the height cannot be calculated for the portion of the measuring object S outside the current measurable range in the Z direction of the light receiving unit 120, the Z stage 142 cannot be moved so that the focus of the light receiving unit 120 is at the relevant portion.

The user thus sequentially specifies the position corresponding to the portion desired to be focused and moves the Z stage 142 while specifying the position corresponding to the portion of the measuring object S assumed to be relatively close to the focus of the light receiving unit 120 from the current position of the Z stage 142. The overall height of the measuring object S thus can be calculated even for the measuring object S having a large dimension in the Z direction.

(4) Increase in Speed of Calculation of Height

The height of the portion of the measuring object S corresponding to the position where the marker M is displayed is preferably calculated at high speed. The methods of increasing the speed of calculation of height will be described below.

Figure 54:
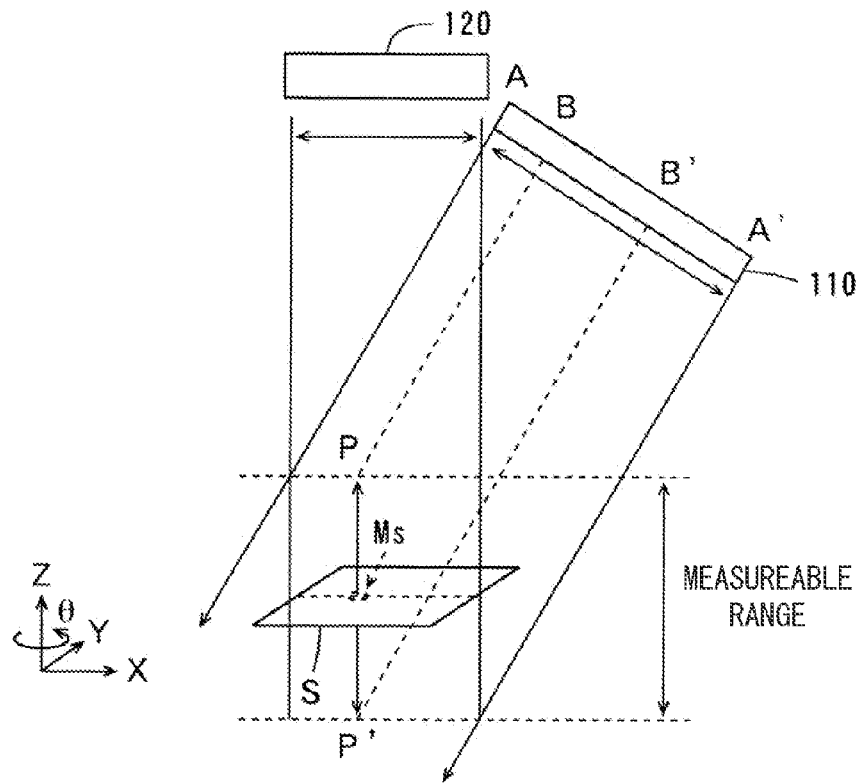
FIG. 54 is a view describing a first method of increasing a speed of calculation of height.

FIG. 54 is a view describing a first method of increasing the speed of calculation of height. The portion of the measuring object S corresponding to the position where the marker M is displayed is referred to as a measuring portion Ms. As shown in FIG. 54, the light projecting unit 110 can irradiate the measuring object S with the measurement light obliquely from above in a range from point A to point A'. In the example of FIG. 54, the height of the measuring portion Ms of the measuring object S is calculated. The measurable range in the Z direction of the measuring portion Ms of the measuring object S is a range from point P to point P'. The points P, P' are defined by the position in the X direction of the measuring portion Ms.

The point P, which is the upper limit of the measurable range in the Z direction is irradiated with the measurement light emitted from point B of the light projecting unit 110. On the other hand, the point P', which is the lower limit of the measurable range in the Z direction is irradiated with the measurement light emitted from point B' of the light projecting unit 110. That is, it is sufficient for the light projecting unit 110 to irradiate the measurement light in the range from point B to point B' in the range from point A to point A' to calculate the height of the measuring portion Ms of the measuring object S.

Thus, the light projecting unit 110 irradiates the measuring object S with the measurement light in the range from point B to point B', and does not irradiate the measuring object S with the measurement light in the range from point A to point B and in the range from point B' to point A'. In this case, the range to acquire the pattern image is reduced in the calculation of height. The speed of the calculation of height of the measuring portion Ms of the measuring object S thus increases.

Figure 55:
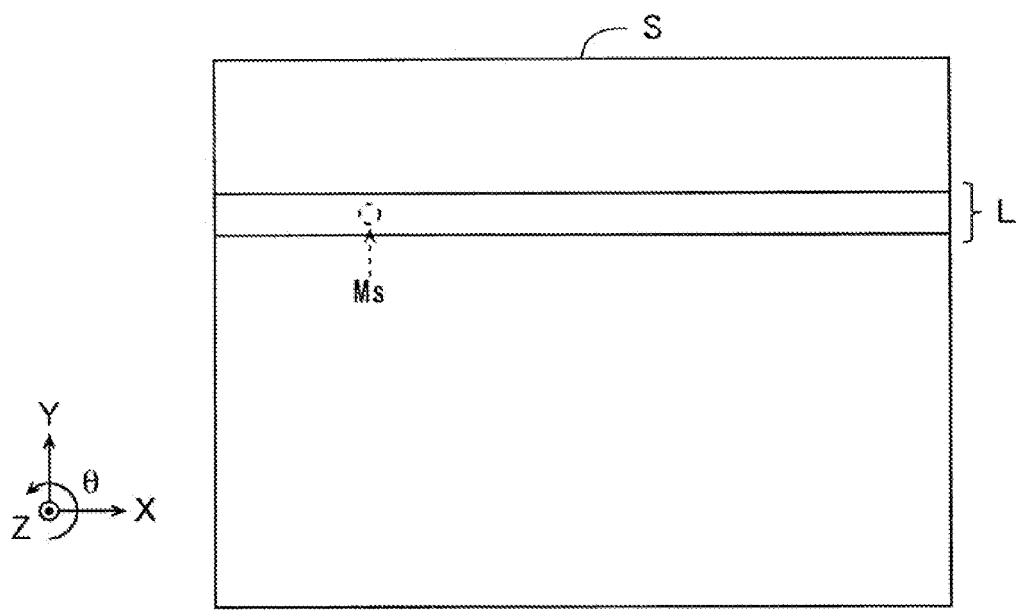
FIG. 55 is a view describing a second method of increasing the speed of calculation of height.

FIG. 55 is a view describing a second method of increasing the speed of calculation of height. The portion of the measuring object S corresponding to the position where the marker M is displayed is referred to as the measuring portion Ms. In the example of FIG. 55, the height of the measuring portion Ms of the measuring object S is calculated. The light receiving unit 120 of FIG. 1 can selectively output only a specific range of the light receiving signal corresponding to the pixels arrayed two-dimensionally to the control board 150 of FIG. 2.

In this example, when calculating the height, the light receiving unit 120 outputs only the light receiving signal corresponding to the line L of a certain width that includes the measuring portion Ms and extends in the X direction of the light receiving signal of the visual field range to the control board 150 of FIG. 1, as shown in FIG. 55. On the other hand, the light receiving unit 120 does not output the light receiving signal corresponding to other portions of the light receiving signal of the visual field range. In other words, in the examples of FIGS. 2 and 55, the irradiation position of the measurement light changes in the X direction depending on the height of the measuring object S but does not change in the Y direction. Using such properties, the range in the Y direction of the light receiving signal output by the light receiving unit 120 is limited in a state where the height of the portion of the measuring object S corresponding to at least the specified position can be calculated.

In this case, the transfer speed of the light receiving signal from the light receiving unit 120 to the control board 150 enhances. Therefore, the frame rate of the light receiving unit 120 can be increased. The CPU 210 of FIG. 1 thus can acquire the pattern image at high speed. As a result, the speed of the calculation of height of the measuring portion Ms of the measuring object S can be increased.

Figure 56:
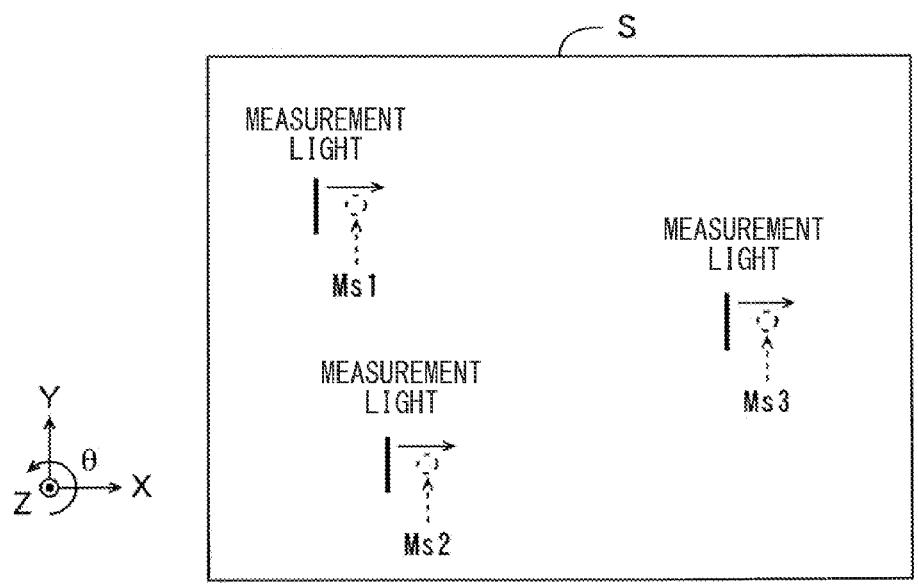
FIG. 56 is a view describing a third method of increasing the speed of calculation of height.

FIG. 56 is a view describing a third method of increasing the speed of calculation of height. The portions of the measuring object S corresponding to the positions where a plurality of markers M are displayed are referred to as measuring portions Ms1, Ms2, Ms3. In the example of FIG. 56, the heights of the plurality of measuring portions Ms1 to Ms3 of the measuring object S are calculated.

In this example, when calculating the height, the vicinity of the plurality of measuring portions Ms1 to Ms3 is irradiated with the measurement light to acquire the pattern images of the plurality of measuring portions Ms1 to Ms3 of the measuring object S. In this case, the pattern of the measurement light is preferably set to include the positions in the Y direction of the measuring portions Ms1 to Ms3. On the other hand, the other portions of the portions of the measuring object S are not irradiated with measurement light. The range to acquire the pattern image is thereby reduced. As a result, the speed of the calculation of heights of the plurality of measuring portions Ms1 to Ms3 of the measuring object S increases.

Accordingly, in the first to third methods of increasing the speed of calculation of height, the processing time of the CPU 210 is reduced when calculating the height. The position of the portion of the measuring object S corresponding to the position specified through the operation unit 250 thus can be calculated at high speed. The first to third methods of increasing the speed of the calculation of height can be executed in combination. The height of the measuring portion Ms of the measuring object S thus can be calculated at 220 ms, for example.

(5) Height Display Function

Figure 57A:
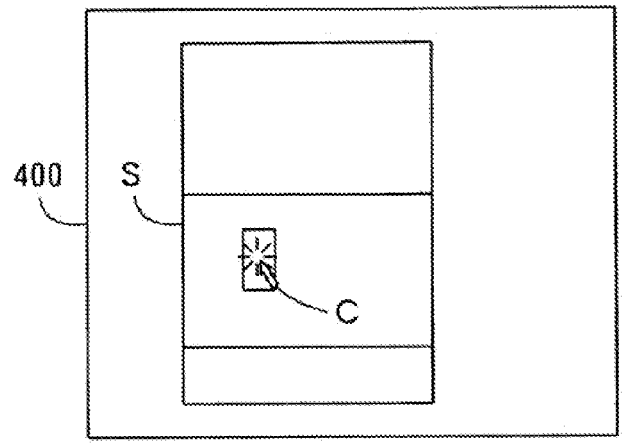
FIGS. 57A to 57C are views showing an example of a height display function.
Figure 57B:
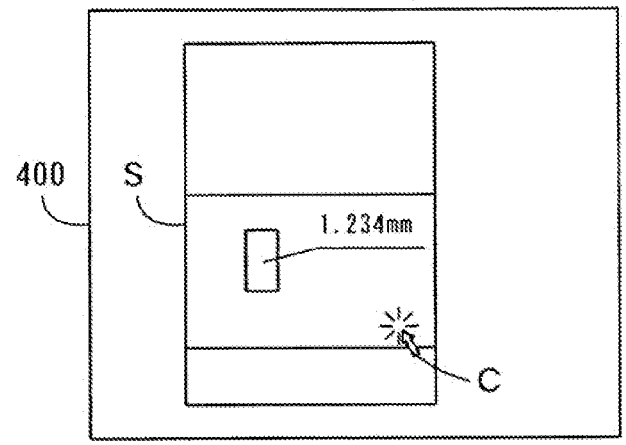
Figure 57C:
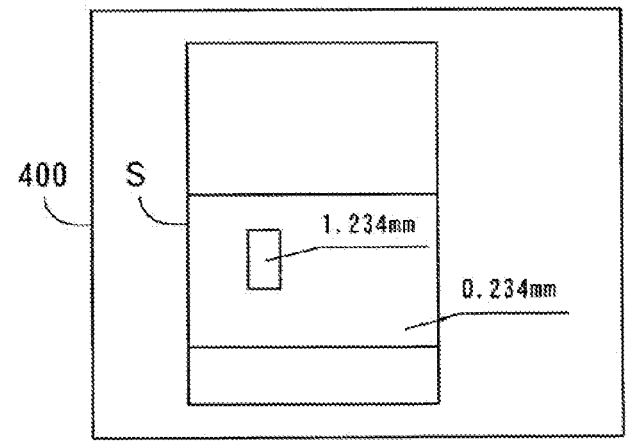

The user can display information (e.g., height) related to the position of the specified portion in the measuring object S on the display section 400. FIGS. 57A to 57C are views showing an example of the height display function. As shown in FIG. 57A, the user can operate the operation unit 250 of the PC 200 of FIG. 1 to place the cursor C at an arbitrary position of the measuring object S displayed on the display section 400.

When the relevant position is selected in this state, at least the portion of the measuring object S corresponding to the selected position and the portion at the periphery thereof are irradiated with the measurement light from the light projecting unit 110 of FIG. 1. The height of the portion of the measuring object S corresponding to the selected position is thereby calculated with the triangular distance measuring method. The calculated height is displayed on the display section 400, as shown in FIG. 57B. The user thus can easily recognize the calculated height.

The user can operate the operation unit 250 of the PC 200 to place the cursor C at another position in the measuring object S displayed on the display section 400. When the relevant position is selected in this state, the height of the portion of the measuring object S corresponding to the selected position is calculated. As shown in FIG. 57C, the calculated height is displayed on the display section 400. A difference in heights of a plurality of portions of the measuring object S selected through the operation unit 250 of the PC 200 may be displayed on the display section 400. In this case, the user can recognize the difference in the calculated heights of the plurality of portions.

(6) Profile Display Function

Figure 58A:
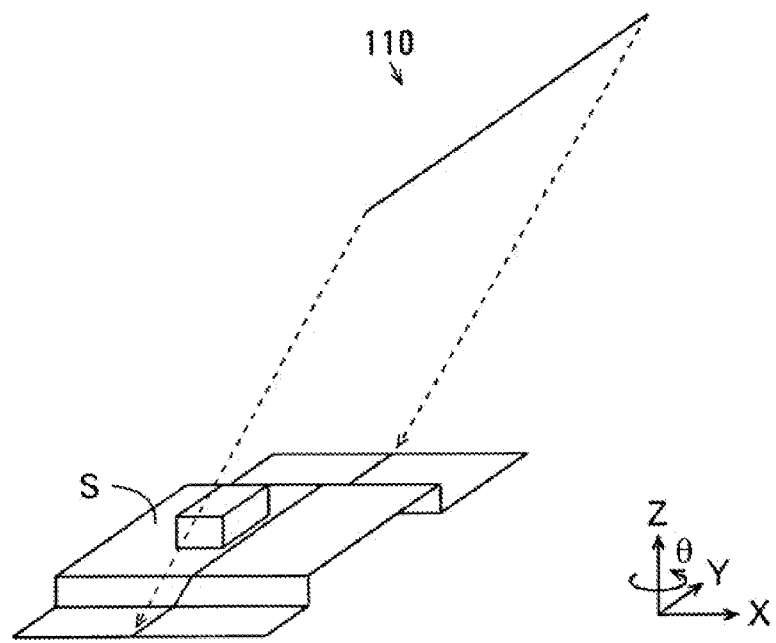
FIGS. 58A and 58B are views describing measurement of a profile of the measuring object.
Figure 58B:
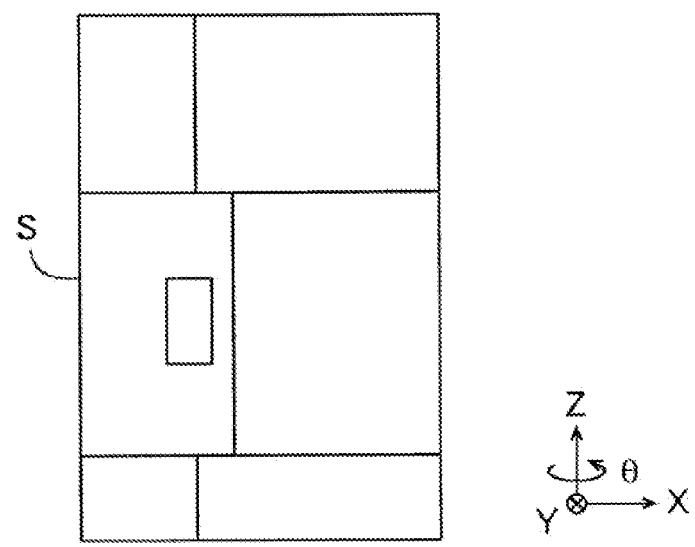
Figure 59A:
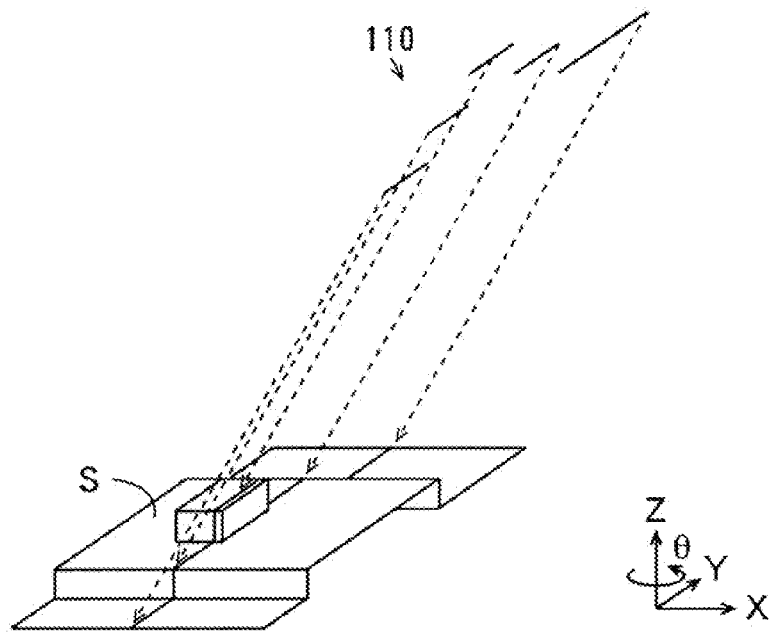
FIGS. 59A and 59B are views describing the measurement of a profile of the measuring object.
Figure 59B:
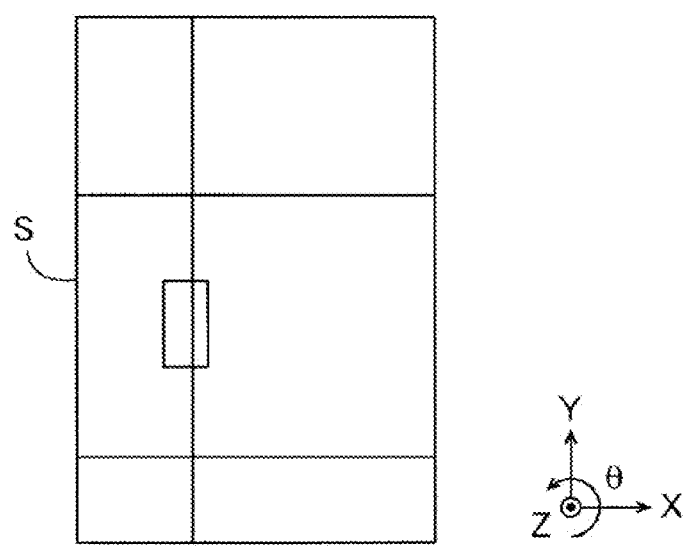

The user can display a profile of the specified portion in the measuring object S on the display section 400. FIGS. 58A and 58B, and FIGS. 59A and 59B are views describing the measurement of the profile of the measuring object S. The measuring object S of FIGS. 58A and 58B, and FIGS. 59A and 59B has a plurality of upper surfaces, where the height of each upper surface differs from each other. FIGS. 58A and 59A show perspective views of the measuring object S in a state irradiated with the measurement light from the light projecting unit 110. FIGS. 58B and 59B show plan views of the measuring object S irradiated with the measurement light.

In the example of FIG. 58A, the linear measurement light parallel to the Y direction is emitted from the light projecting unit 110. In this case, as shown in FIG. 58B, a plurality of portions of the linear measurement light parallel to the Y direction are shifted with respect to each other in the X direction by a distance corresponding to the heights of the plurality of upper surfaces of the measuring object S and applied on the plurality of upper surfaces of the measuring object S.

In the example of FIG. 59A, a plurality of pieces of linear measurement light parallel to the Y direction and shifted in the X direction by a distance corresponding to the height of each upper surface of the measuring object S are emitted from the light projecting unit 110. In this case, as shown in FIG. 59B, the plurality of upper surfaces of the measuring object S are irradiated with the plurality of pieces of linear measurement light parallel to the Y direction so as to be lined on the same line. The profile of the measuring object S can be measured based on the distance in the X direction among the plurality of pieces of linear measurement light emitted from the light projecting unit 110 and the position in the Y direction of each linear measurement light.

Figure 60A:
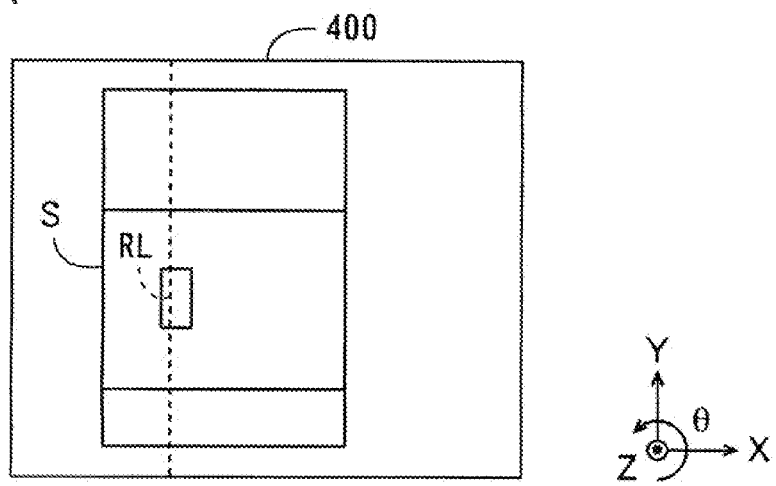
FIGS. 60A to 60C are views showing a measurement procedure of the profile of the measuring object.

FIGS. 60A to 60C and FIGS. 61A to 61C are views showing a measurement procedure of the profile of the measuring object S. First, as shown in FIG. 60A, the user operates the operation unit 250 of the PC 200 of FIG. 1 to specify the position in the X direction of the measuring portion of the measuring object S on the display section 400. A reference line RL parallel to the Y direction indicated with a dotted line in FIG. 60A may be displayed on the specified position in the X direction. Note that the procedure of FIG. 60A may be omitted when not displaying the reference line RL.

Figure 60B:
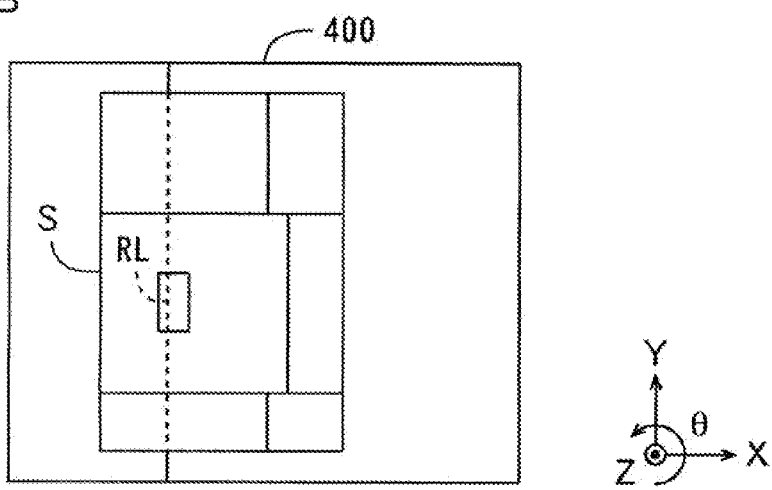

As shown in FIG. 60B, the user operates the operation unit 250 to move the linear measurement light displayed at a part of the upper surface of the measuring object S on the display section 400 in the X direction so as to overlap the reference line RL. The portion of the linear measurement light to be moved is determined by the user operating the operation unit 250 and specify a plurality of locations of the position in the Y direction of the linear measurement light, for example. The CPU 210 of FIG. 1 deforms the linear measurement light emitted from the light projecting unit 110 by controlling the pattern generating portion 112 of FIG. 2 so that the measuring object S is irradiated with the linear measurement light displayed on the display section 400.

Figure 60C:
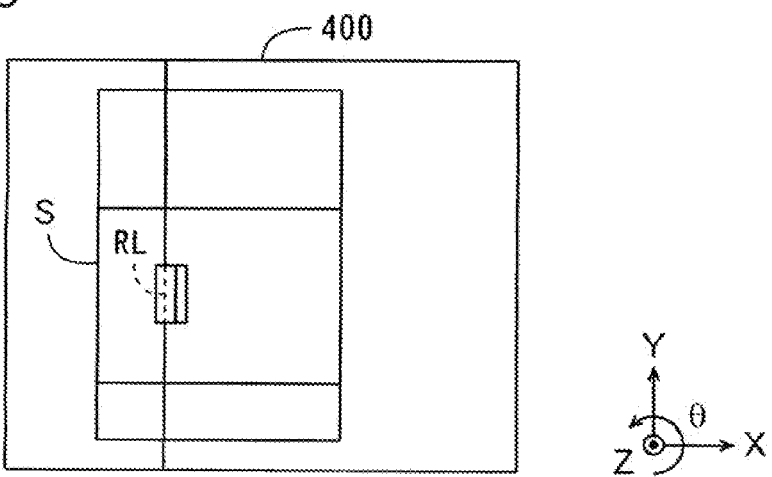
Figure 61A:
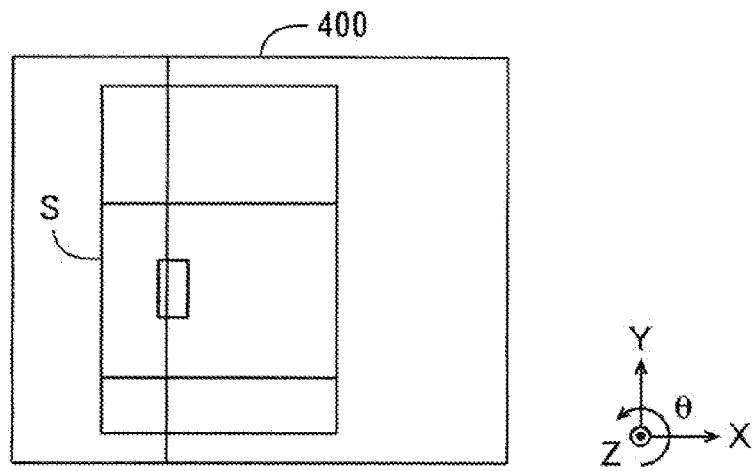
FIGS. 61A to 61C are views showing a measurement procedure of the profile of the measuring object.

As shown in FIGS. 60C and 61A, the user then repeats the operation of operating the operation unit 250 and moving the linear measurement light displayed at another part of the upper surface of the measuring object S on the display section 400 in the X direction so as to overlap the reference line RL. The CPU 210 thereby further deforms the linear measurement light emitted from the light projecting unit 110 by controlling the pattern generating portion 112 so that the measuring object S is irradiated with the linear measurement light displayed on the display section 400.

Figure 61B:
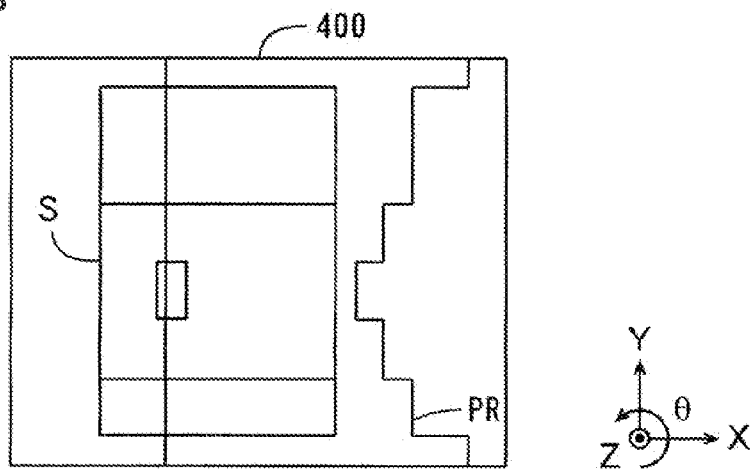

The CPU 210 calculates the profile (cross-sectional shape) of the measuring object S based on the movement distance of each portion of the linear measurement light moved on the display section 400 before the linear measurement light displayed on the display section 400 becomes linear. As shown in FIG. 61B, the calculated profile PR of the measuring object S is displayed on the display section 400 so as to be side by side with the image of the measuring object S. In this case, the user can easily recognize the cross-sectional shape of the measuring object S by operating the pattern of the light displayed on the display section 400. The profile PR may be displayed on the display section 400 so as to overlap the image of the measuring object S, or may be displayed in a window different from the window in which the measuring object S is displayed.

Figure 61C:
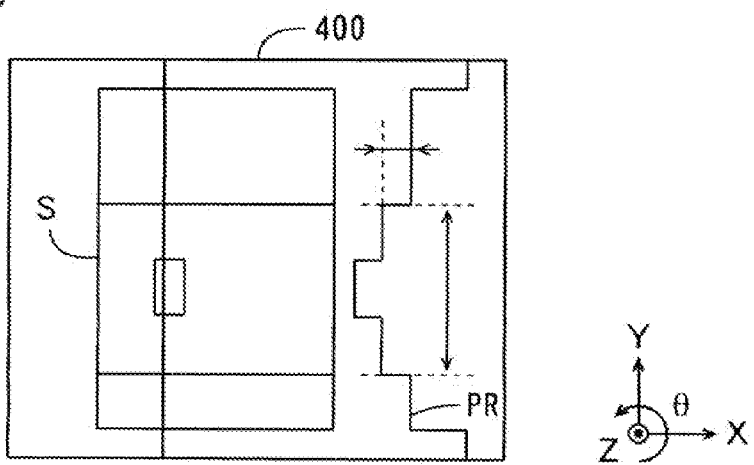

The user can specify a plurality of portions of the profile PR by operating the operation unit 250. As shown in FIG. 61C, the dimension between the plurality of portions of the measuring object S corresponding to the plurality of portions specified by the user is displayed on the display section 400. The dimension such as the width, the height, or the like of the arbitrary portions of the measuring object S thus can be easily recognized.

(7) Effects

In the shape measuring device 500 according to the present embodiment, when the user specifies an arbitrary position on the image of the measuring object S displayed on the display section 400, the position of the portion of the measuring object S corresponding to the specified position is calculated by the triangular distance measuring method. The calculated position is positioned at the focus of the light receiving unit 120. The arbitrary portion of the measuring object S thus can be accurately and easily positioned at the focus of the light receiving unit 120 in the shape measurement processing of the measuring object S.

Figure 62:
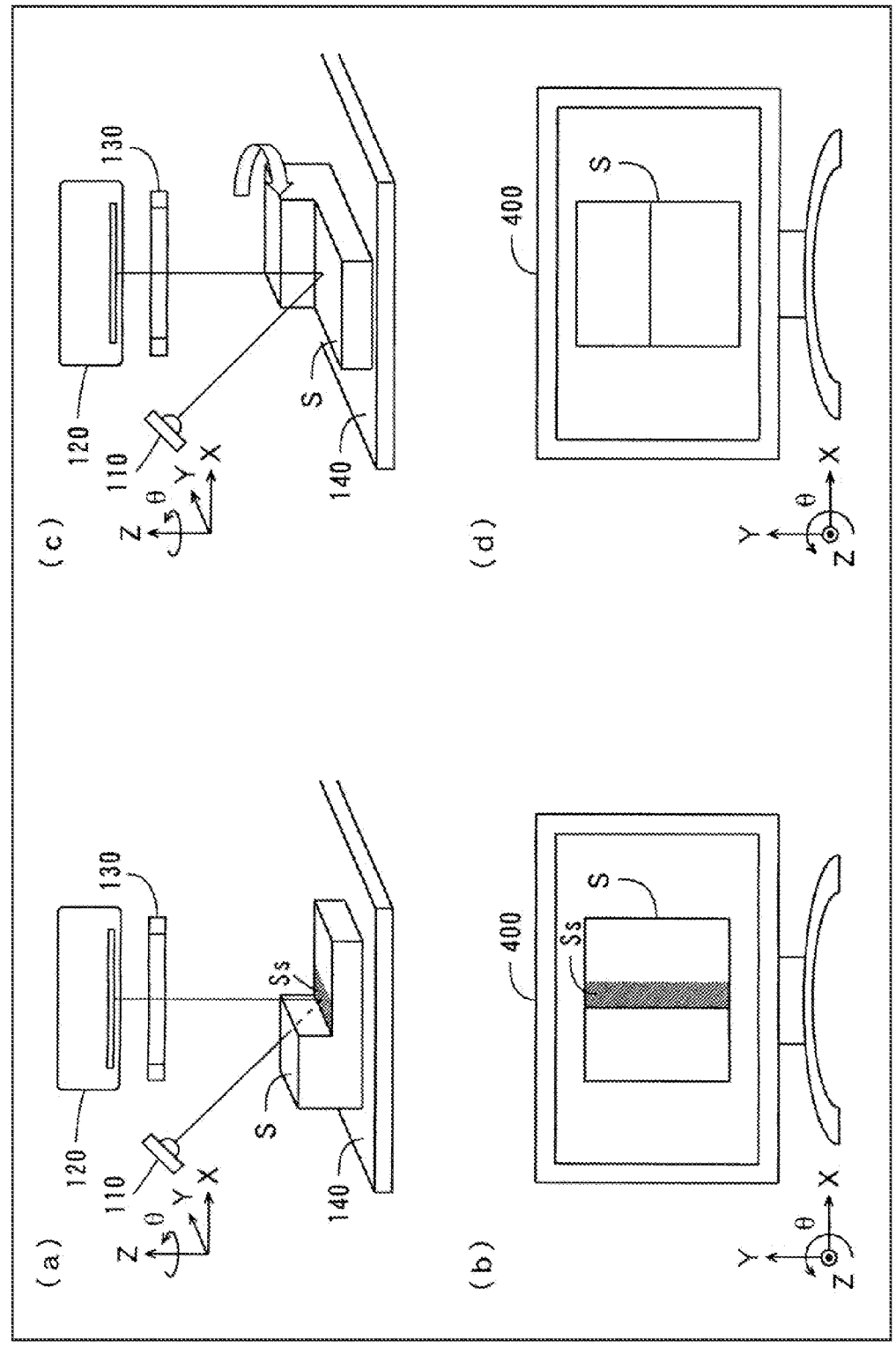
FIGS. 62A to 62D are views describing adjustment of a posture of the measuring object.

[8] First Auxiliary Function of Posture Adjustment (1) First Example of First Auxiliary Function of Posture Adjustment In the second adjustment in the preparation of the shape measurement, the posture of the measuring object S is adjusted. FIGS. 62A to 62D are views describing the adjustment of the posture of the measuring object S. FIGS. 62A and 62C show states in which the measuring object S on the stage 140 is irradiated with the measurement light from the light projecting unit 110. FIGS. 62B and 62D show images displayed on the display section 400 when the measuring object S is imaged by the light receiving unit 120 of FIGS. 62A and 62C, respectively.

In the examples of FIGS. 62A to 62D, the measuring object S is a block having an L-shaped cross section with an upper surface of two levels having different heights. In the example of FIG. 62A, the measurement light from the light projecting unit 110 is shielded by the upper surface on the upper level of the measuring object S. In this case, shade Ss is formed at the measurement position in the upper surface of the lower level of the measuring object S, as shown in FIG. 62B. Therefore, the shape of the measurement position of the measuring object S cannot be measured.

In the example of FIG. 62C, the posture of the measuring object S is adjusted by changing the direction of the measuring object S. In this case, the shade Ss is not formed at the measurement position in the upper surface of the lower level of the measuring object S, as shown in FIG. 62D. Therefore, the shape of the measurement position of the measuring object S can be measured.

However, even if the shade is not formed at the measurement position, the measurement light that is reflected a plurality of times (multiply-reflected) by the plurality of portions of the measuring object S is sometimes received by the light receiving unit 120 of FIG. 1. In this case, a pseudo-image by the multiply-reflected measurement light is displayed in a superimposing manner on the image of the measuring object S on the display section 400 of FIG. 1. The shape of the measurement position of the measuring object S thus cannot be accurately measured.

The formation of shade Ss or occurrence of multiple reflection at a part of the measuring object S is a natural phenomenon, and the user may not notice even if the shade Ss is formed or the multiple reflection occurs at the measurement position. The shape measuring device 500 according to the present embodiment is thus provided with a function (hereinafter referred to as first auxiliary function of posture adjustment) of assisting the mounting of the measuring object S at the posture in which the shade Ss is not formed and the multiple reflection does not occur at the measurement position.

In the first example of the first auxiliary function of the posture adjustment, the measuring object S is irradiated with the measurement light for the posture adjustment having a predetermined pattern from the light projecting unit 110 of FIG. 2. Hereinafter, the measurement light with which the measuring object S is irradiated from the light projecting unit 110 for posture adjustment is referred to as adjustment light. The pattern of the adjustment light may be different from the pattern of the measurement light with which the measuring object S is irradiated in the shape measurement processing.

As an example of the pattern of the adjustment light different from the pattern of the measurement light with which the measuring object S is irradiated in the shape measurement processing, the measuring object S may be irradiated with the adjustment light having the pattern of one measurement light among the plurality of pieces of measurement light with which the measuring object S is sequentially irradiated in the shape measurement processing. Alternatively, the measuring object S may be irradiated with the adjustment light having the pattern different from the pattern of any measurement light among the plurality of pieces of measurement light with which the measuring object S is sequentially irradiated in the shape measurement processing.

The adjustment light preferably has a pattern in which the formation of shade or occurrence of multiple reflection can be easily determined by the user. When the measuring object S is irradiated with the adjustment light having such a pattern, the user can easily determine that the shade formed or the multiple reflection occurred at the measurement position. A striped pattern parallel to the Y direction of FIG. 2 is referred to as a vertical pattern, and a striped pattern parallel to the X direction of FIG. 2 is referred to as a horizontal pattern.

Figure 63A:
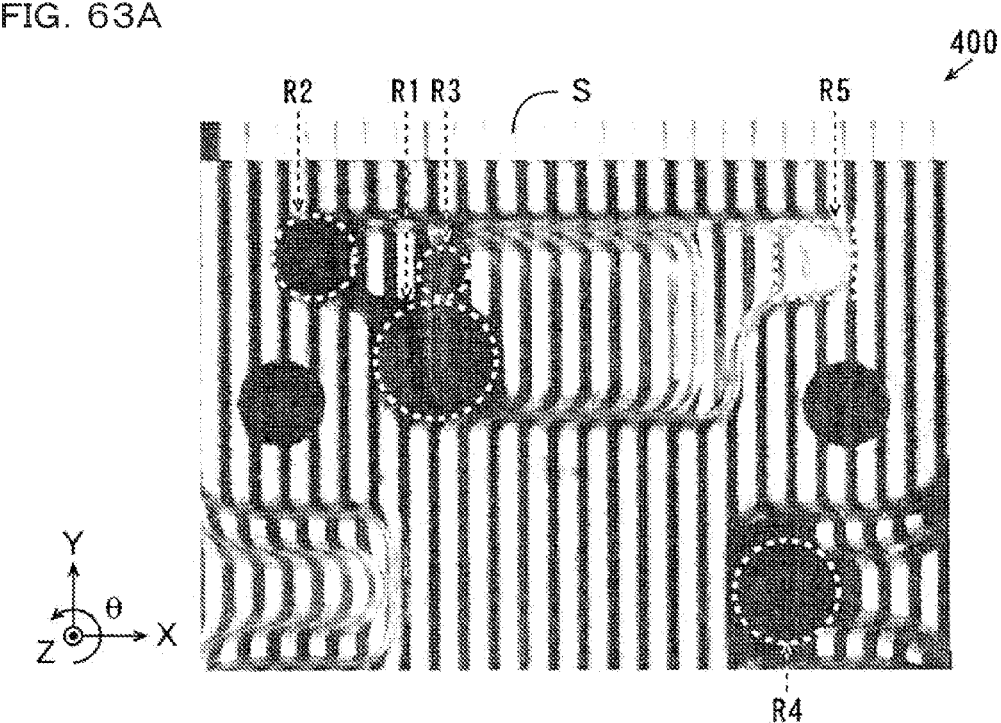
FIGS. 63A and 63B are views describing a first example of a first auxiliary function of a posture adjustment.

FIGS. 63A and 63B, and FIGS. 64A and 64B are views describing the first example of the first auxiliary function of the posture adjustment. FIG. 63A shows an image of the measuring object S irradiated with the adjustment light having the vertical pattern from the one light projecting unit 110A. As shown in FIG. 63A, shades are formed in regions R1, R2, R3, R4, which are indicated with dotted circles. The lowering in contrast of the vertical pattern occurred due to multiple reflection in a region R5 indicated with a dotted rectangle.

Figure 63B:
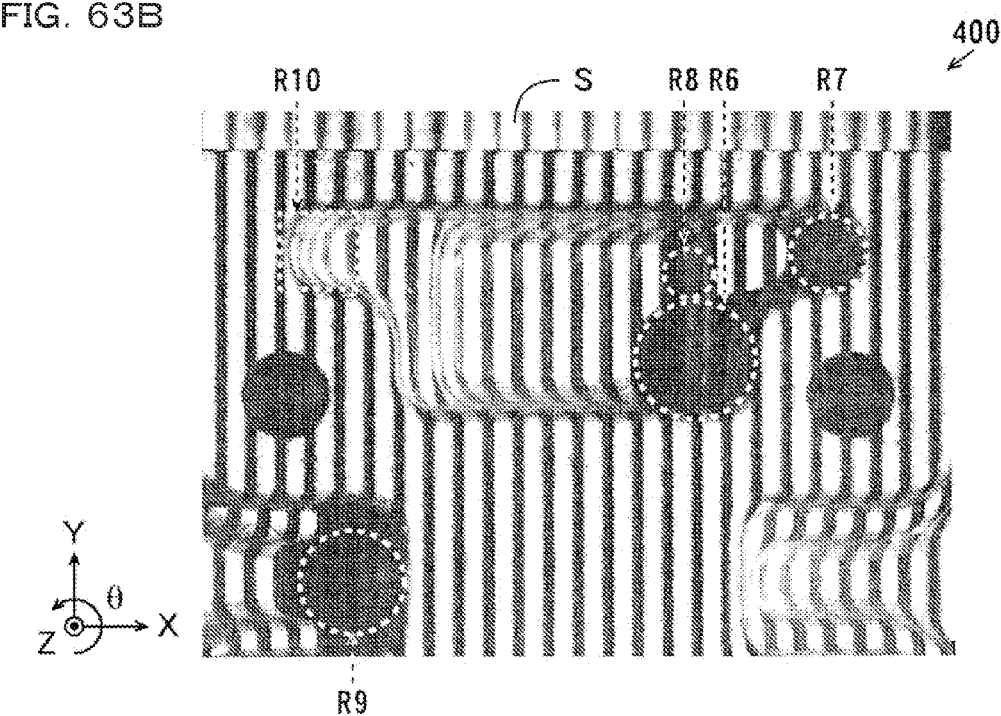

FIG. 63B shows an image of the measuring object S irradiated with the adjustment light having the vertical pattern from the other light projecting unit 110B. As shown in FIG. 63B, shades are formed in regions R6, R7, R8, R9, which are indicated with dotted circles. In a region R10 indicated with a dotted rectangle, the interval of the vertical pattern is close since the portion of the measuring object S is inclined.

Figure 64A:
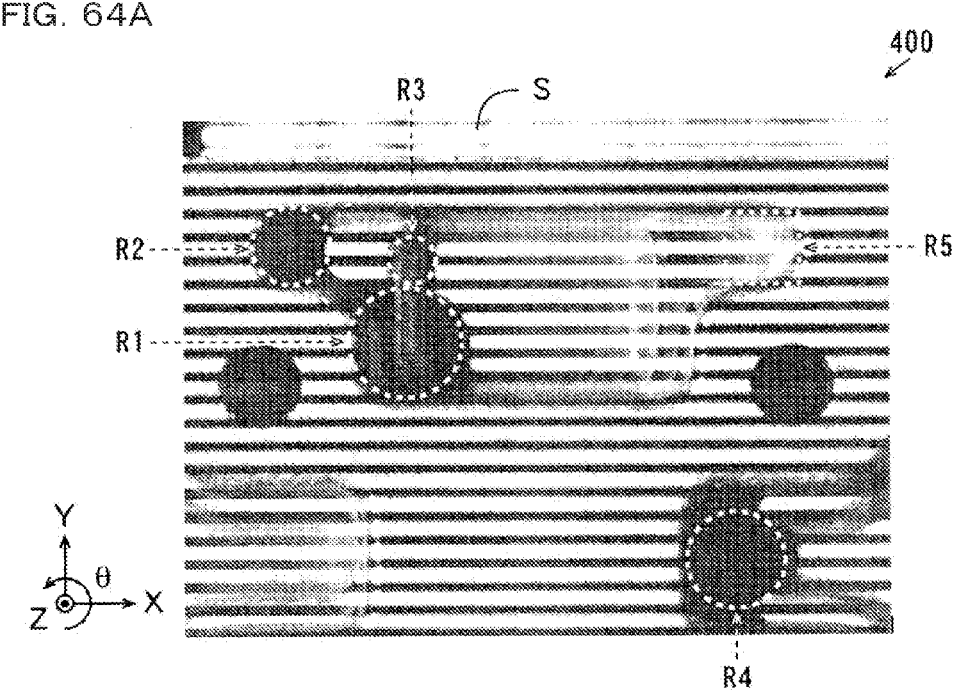
FIGS. 64A and 64B are views describing the first example of the first auxiliary function of the posture adjustment.

FIG. 64A shows an image of the measuring object S irradiated with the adjustment light having the horizontal pattern from the one light projecting unit 110A. As shown in FIG. 64A, shades are formed in the regions R1, R2, R3, R4, which are indicated with dotted circles. The lowering in contrast of the horizontal pattern occurred due to multiple reflection in the region R5 indicated with a dotted rectangle.

Figure 64B:
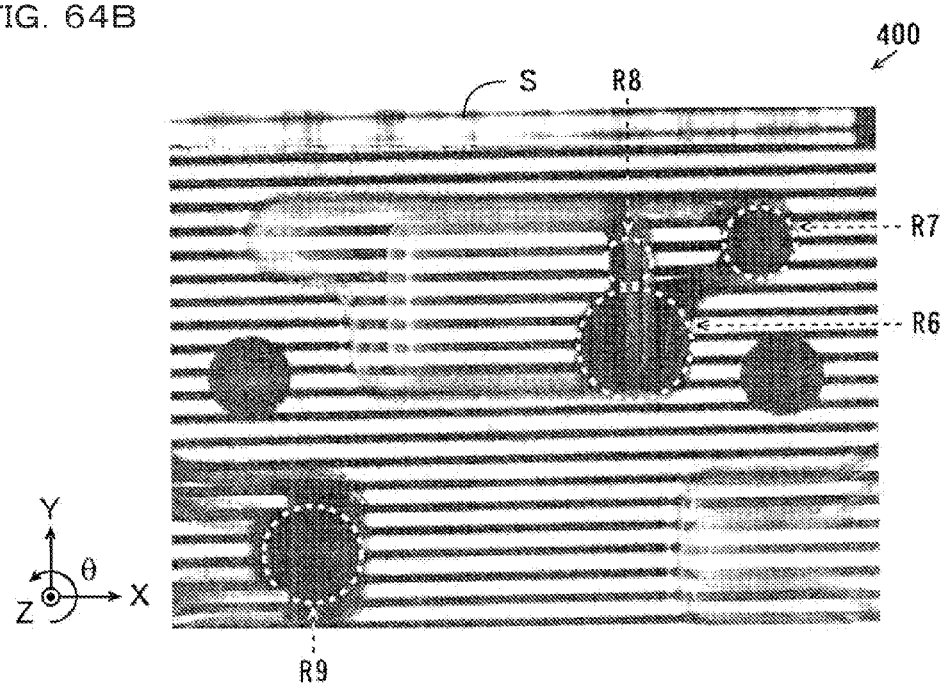

FIG. 64B shows an image of the measuring object S irradiated with the adjustment light having the horizontal pattern from the other light projecting unit 110B. As shown in FIG. 64B, shades are formed in the regions R6, R7, R8, R9, which are indicated with dotted circles.

As shown in FIGS. 63A and 63B, and FIGS. 64A and 64B, the shape cannot be accurately measured in the region where the shade is formed, in the region where the lowering of the contrast of the pattern occurs due to multiple reflection, and in the region where the interval of the pattern is close in the measuring object S. The region where the shade is formed, the region where the lowering of the contrast of the pattern occurs due to multiple reflection, and the region where the interval of the pattern is close in the measuring object S are hereinafter referred to as measurement difficulty regions.

In the first auxiliary function of the posture adjustment, the user can easily recognize the measurement difficulty region since the measuring object S is irradiated with the adjustment light having the pattern different from the pattern of the measurement light in the shape measurement processing. The use of the pattern of the adjustment light having the same pattern as the pattern of the sinusoidal measurement light, the striped measurement light, or the coded measurement light may not be appropriate in the recognition of the measurement difficulty region.

The reason is that the unit of interval and movement of a plurality of lines (stripes) parallel to the Y direction that forms the pattern is set to appropriately carry out the shape measurement processing. Therefore, it is preferable to irradiate the measuring object S with the adjustment light having a pattern in which the user can easily recognize the portion where the shade and the like are formed, which becomes the measurement difficulty region. The user thus can easily recognize the measurement difficulty region.

The user can adjust the posture of the measuring object S with the measuring object S irradiated with the adjustment light. The posture of the measuring object S may be adjusted by rotating the measuring object S on the stage 140, for example, or by moving the θ stage 143 of the stage 140, for example. In this case, the posture of the measuring object S can be easily adjusted to a state appropriate for the shape measurement before the shape measurement of the measuring object S since the posture of the measuring object S can be adjusted while checking the measurement difficulty region.

(2) Second Example of First Auxiliary Function of Posture Adjustment

In a second example of the first auxiliary function of the posture adjustment, the measuring object S is irradiated with the adjustment light from both light projecting units 110A, 110B. The region where the shade is formed, the region where the lowering of the contrast of the pattern occurs due to multiple reflection, and the region where the interval of the pattern is close become the measurement difficulty region regardless of with which adjustment light, the adjustment light from the light projecting unit 110A or the adjustment light from the light projecting unit 110B, the measuring object S is irradiated.

Figure 65:
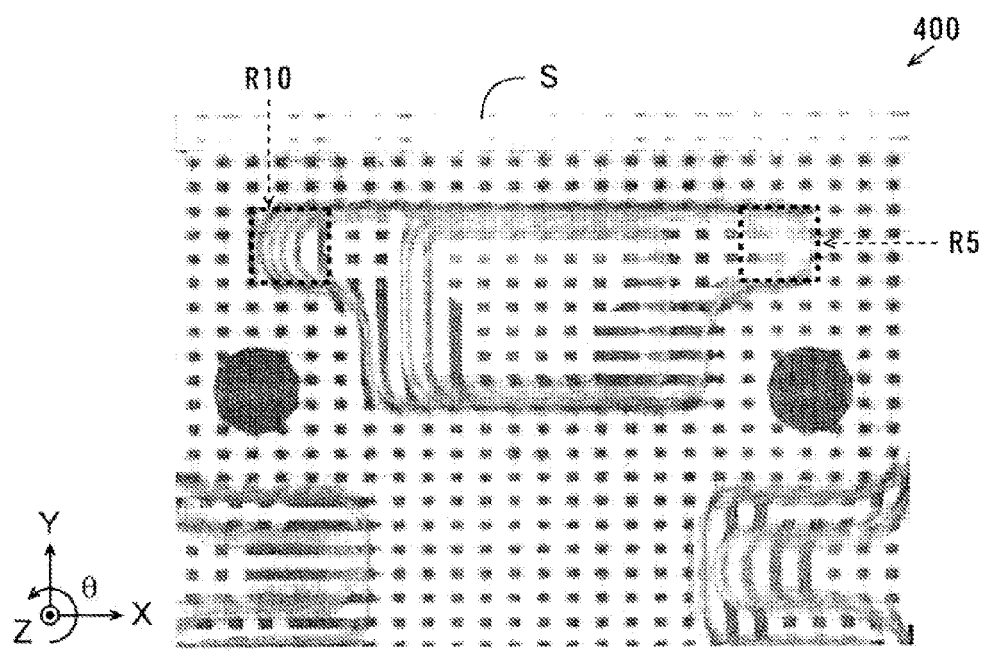
FIG. 65 is a view describing a second example of the first auxiliary function of the posture adjustment.

FIG. 65 is a view describing a second example of the first auxiliary function of the posture adjustment. FIG. 65 shows an image of the measuring object S irradiated with the adjustment light having a horizontal pattern from the one light projecting unit 110A and irradiated with the adjustment light having a vertical pattern from the other light projecting unit 110B.

As shown in FIG. 65, the lowering in the contrast of the horizontal pattern occurred due to multiple reflection in the region R5 indicated with the dotted rectangle. In the region R10 indicated with the dotted rectangle, the interval of the vertical pattern is close since the portion of the measuring object S is inclined.

Therefore, in this example, the regions R5, R10 are the measurement difficulty regions. Thus, the measurement difficulty region can be reduced by irradiating the measuring object S with the adjustment light from both light projecting units 110A, 110B as compared to the case where the measuring object S is irradiated with the adjustment light from any one of the light projecting units 110A, 110B.

In the example described above, the adjustment light having the horizontal pattern is emitted from the one light projecting unit 110A and the adjustment light having the vertical pattern is emitted from the other light projecting unit 110B, but the present invention is not limited thereto. The adjustment light having the vertical pattern may be emitted from the one light projecting unit 110A, and the adjustment light having the horizontal pattern may be emitted from the other light projecting unit 110B. If there is no need to distinguish the adjustment light from the light projecting unit 110A and the adjustment light from the light projecting unit 110B, both light projecting units 110A, 110b may emit the adjustment light having the vertical pattern or both light projecting units 110A, 110B may emit the adjustment light having the horizontal pattern.

In the example described above, the image of the measuring object S simultaneously irradiated with the adjustment light from the light projecting units 110A, 110B is displayed, but the present invention is not limited thereto. The image (e.g., image of FIG. 64A) of the measuring object S irradiated with the adjustment light from the one light projecting unit 110A and the image (e.g., image of FIG. 63B) of the measuring object S irradiated with the adjustment light from the other light projecting unit 110B may be separately displayed. In this case, an image substantially equivalent to the image of FIG. 65 can be displayed by synthesizing the image of FIG. 63B and the image of FIG. 64A.

Figure 66:
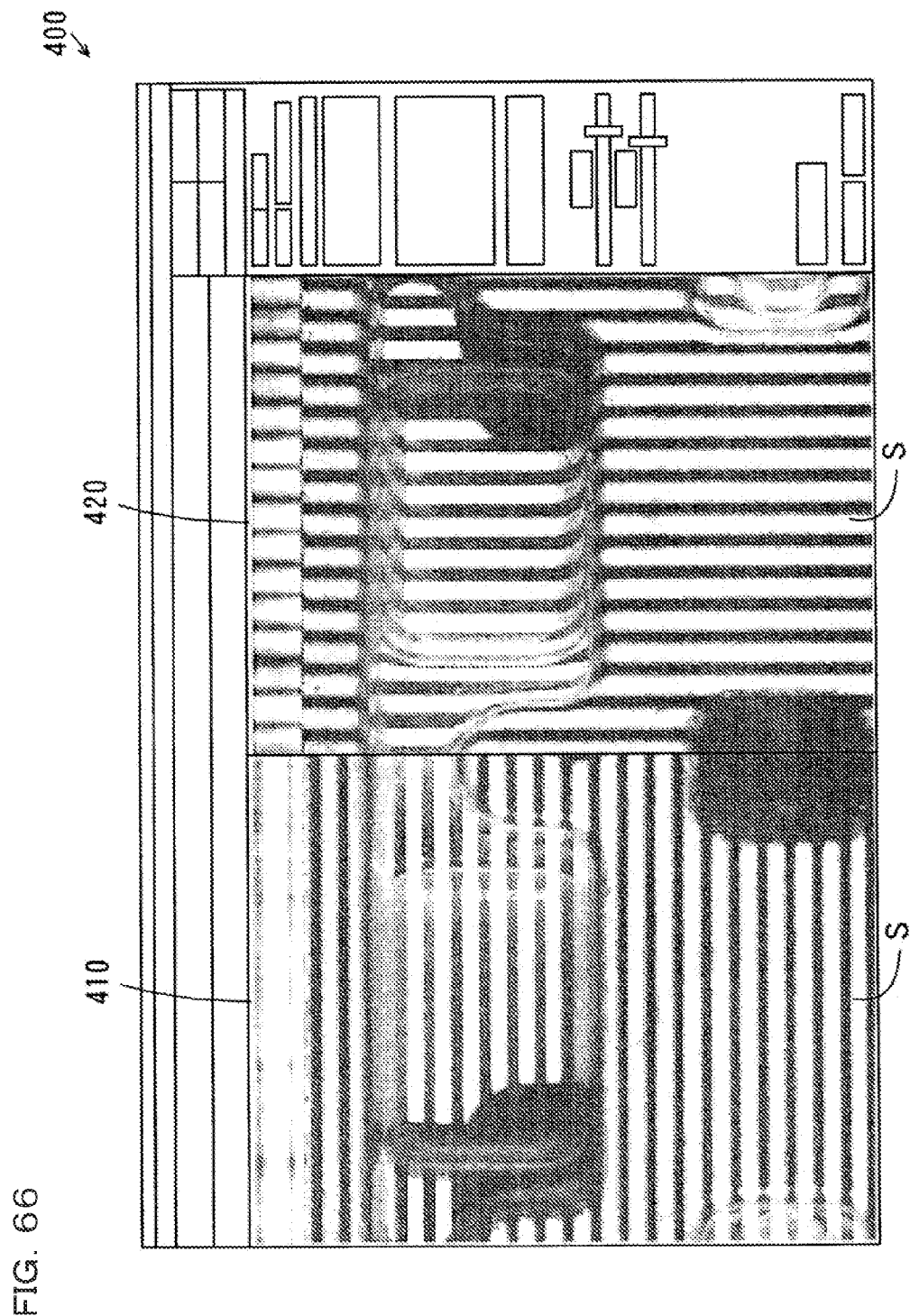
FIG. 66 is a view showing an example of the GUI for displaying the images in dual screen.

Alternatively, similarly to the example of FIG. 5, the image of the measuring object S irradiated with the adjustment light from the one light projecting unit 110A and the image of the measuring object S irradiated with the adjustment light from the other light projecting unit 110B may be displayed on the display section 400 in dual screen so as to be displayed side by side. FIG. 66 is a view showing an example of the GUI for displaying the images in dual screen.

As shown in FIG. 66, the image of the measuring object S irradiated with the adjustment light from the one light projecting unit 110A is displayed in the image display region 410 of the display section 400. The image of the measuring object S irradiated with the adjustment light from the other light projecting unit 110B is displayed in the image display region 420 of the display section 400. If two images of the measuring object S are displayed side by side, the user can easily distinguish and recognize the measurement difficult region when the measuring object S is irradiated with the adjustment light from the one light projecting unit 110A and the measurement difficulty region when the measuring object S is irradiated with the adjustment light from the other light projecting unit 110B.

Thus, the user can easily distinguish and recognize the measurement difficult region corresponding to the light projecting unit 110A and the measurement difficulty region corresponding to the light projecting unit 110B by separately displaying the images of the measuring object S irradiated with the adjustment light from the respective light projecting units 110A, 110B on the display section 400. The user thus can select the light projecting unit 110 in which the measurement position is not included in the measurement difficulty region from the light projecting units 110A, 110B, and carry out the shape measurement processing.

If the measuring object is irradiated with the measurement light from both light projecting units 110A, 110B, the measurement difficulty region is reduced as compared to the case where the measuring object is irradiated with the measurement light from one of the light projecting units 110A, 110B.

The user can recognize the measurement difficulty region when the measuring object S is irradiated with the measurement light from both light projecting units 110A, 110B by synthesizing the images of the measuring object S irradiated with the adjustment light from the respective light projecting units 110A, 110B and displaying the same on the display section 400.

The shape measurement can be carried out for the portion of the measuring object S irradiated with at least one measurement light from the light projecting units 110A, 110B. In other words, the shape measurement cannot be carried out for the portion of the measuring object S that is not irradiated with the measurement light from either of the light projecting units 110A, 110B. Therefore, the user merely needs to recognize the portion of the measuring object S that is not irradiated with the measurement light from either of the light projecting units 110A, 110B.

In the example of FIG. 65, the image of the measuring object S in a state irradiated with the adjustment light from both light projecting units 110A, 110B is displayed on the display section 400. In the example of FIG. 66, the image of the measuring object S in a state irradiated with the adjustment light from the one light projecting unit 110A and the image of the measuring object S in a state irradiated with the adjustment light from the other light projecting unit 110B are displayed side by side on the display section 400. The user thus can easily recognize the portion of the measuring object S that becomes the measurement difficulty region by not being irradiated with the measurement light from either of the light projecting units 110A, 110B.

Figure 67:
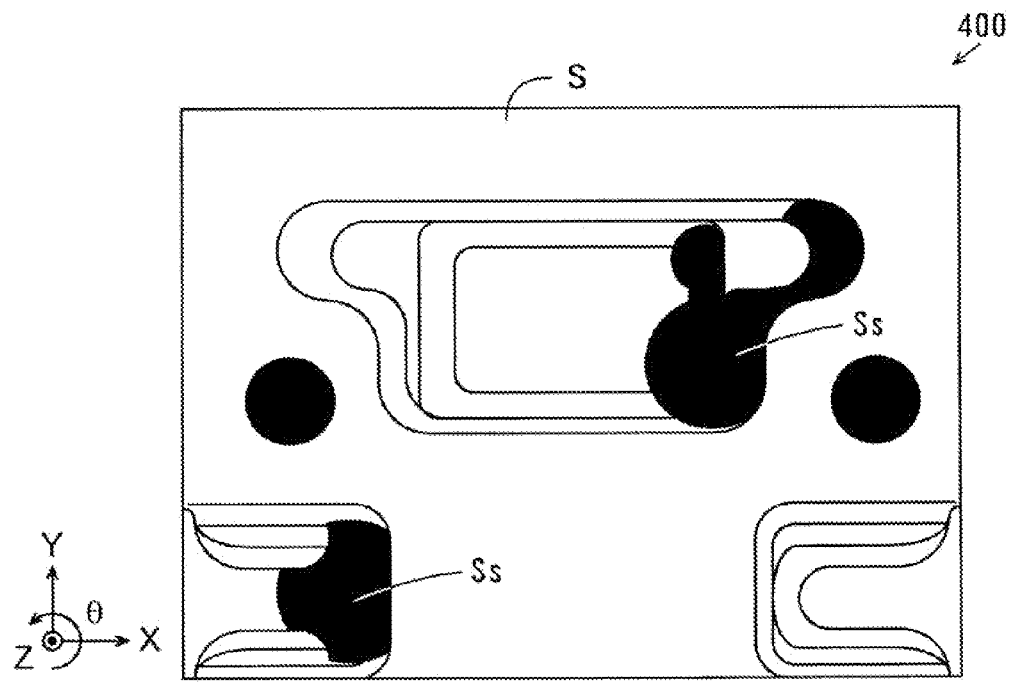
FIG. 67 is a view showing the measuring object irradiated with light having a uniform pattern as adjustment light.

In the first and second examples of the first auxiliary function of the posture adjustment, the adjustment light has the vertical pattern or the horizontal pattern, but the present invention is not limited thereto. The adjustment light may, for example, have a dot pattern or a checkered pattern (checkerboard design). Alternatively, the adjustment light may have a uniform light amount distribution (uniform pattern). The user then can more easily recognize the measurement difficulty region. FIG. 67 is a view showing the measuring object S irradiated with light having the uniform pattern for the adjustment light. As shown in FIG. 67, the shade Ss is formed at a part of the measuring object S. The user can recognize the measurement difficulty region based on the shade Ss formed on the measuring object S.

When using the light having the uniform pattern for the adjustment light, the measuring object S is preferably irradiated with the adjustment light in which the intensity, the frequency, or the like is appropriately set so that the user can easily recognize the portion where the shade and the like are formed, which becomes the measurement difficulty region. According to such a configuration, the user can easily recognize the measurement difficulty region as compared to the case where the measuring object S is irradiated with a natural light as a natural phenomenon.

(3) Estimation of Measurement Difficulty Region

In the first and second examples of the first auxiliary function of the posture adjustment, the user recognizes the measurement difficulty region by viewing the image of the adjustment light applied on the measuring object S, but the present invention is not limited thereto. If it is difficult for the user to recognize the measurement difficulty region, the CPU 210 of FIG. 1 may estimate the measurement difficulty region based on the adjustment light irradiated on the measuring object S.

The portion of the main stereoscopic shape data corresponding to the measurement difficulty region is the defective portion such as the data-missing portion, data inaccurate portion, or the like. The defective portion of the main stereoscopic shape data is estimated, and the image of the measuring object S is displayed such that the estimated defective portion can be identified, so that the user can accurately recognize the measurement difficulty region. Thus, the posture of the measuring object S can be easily and accurately adjusted to a state appropriate for the shape measurement before the shape measurement processing of the measuring object S.

Figure 68:
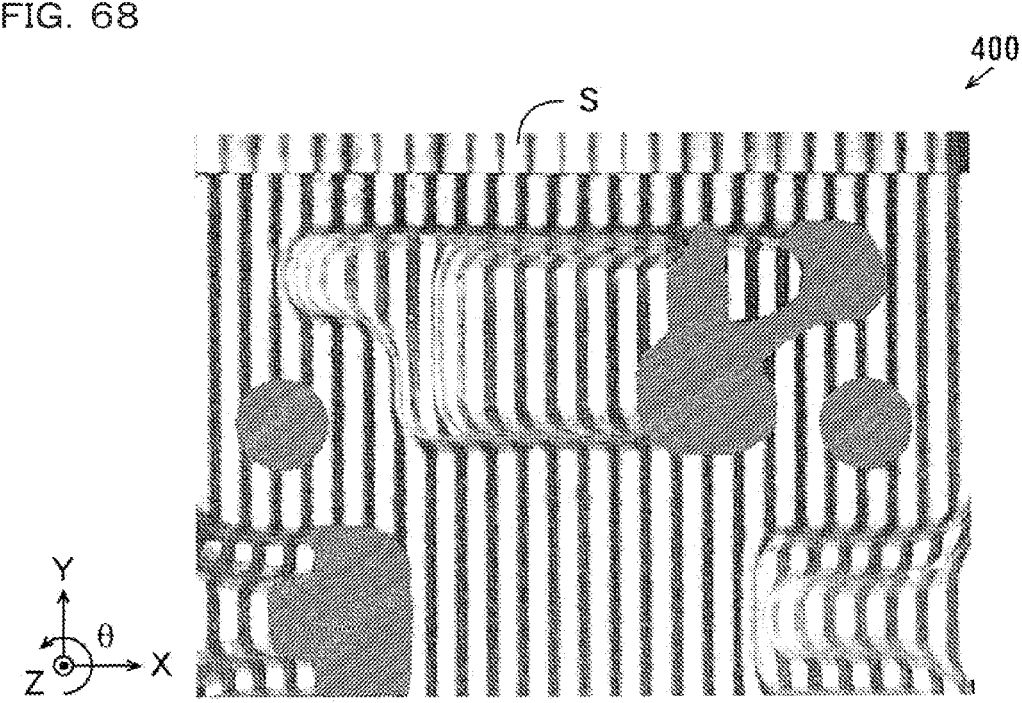
FIG. 68 is a view showing an image of the measuring object including an estimation result of a measurement difficulty region.

FIG. 68 is a view showing an image of the measuring object S including an estimation result of the measurement difficulty region. In the example of FIG. 68, the CPU 210 estimates the portion where the shade is formed on the display section 400 as the measurement difficulty region based on the portion of the measuring object S that is not irradiated with the adjustment light and thus is dark, that is, the shade portion. The CPU 210 can also estimate the portion where the multiple reflection occurs on the display section 400 as the measurement difficulty region based on the contrast of the pattern of the adjustment light. Furthermore, the CPU 210 can estimate the portion where the pattern of the adjustment light is close as the measurement difficulty region.

As shown in FIG. 68, the CPU 210 superimposes and displays the estimated measurement difficulty region on the image of the measuring object S. In the example of FIG. 68, the measurement difficulty region is highlighted with the hatching pattern. The user thus can easily recognize the measurement difficulty region.

In the estimation of the measurement difficulty region, the measuring object S may be sequentially irradiated with a plurality of pieces of adjustment light having different patterns from each other from the light projecting unit 110. For example, the measuring object S may be irradiated with first adjustment light having the arbitrary pattern from the light projecting unit 110, and then the measuring object S may be irradiated with second adjustment light having a pattern in which the bright portion and the dark portion of the first adjustment light are inverted.

In this case, since the shade is formed in the region in which the reflected light is not detected when the measuring object S is irradiated with the first adjustment light or the second adjustment light, such a region is estimated as the measurement difficulty region. According to such a procedure, the region in which the reflected light is not detected due to the correspondence with the dark portion of the adjustment light and the region in which the reflected light is not detected due to the formation of the shade can be identified.

The image of the measuring object S displayed on the display section 400 may be the image of the measuring object S captured using the one measurement light, or may be the image of the measuring object S captured using the one measurement light and the other measurement light. Alternatively, the image of the measuring object S displayed on the display section 400 may be the image of the measuring object S captured using the illumination light, or may be the image of the stereoscopic shape of the measuring object S.

The measuring object S may be irradiated with the adjustment light for every predetermined time. In this case, the CPU 210 sequentially estimates the measurement difficulty region for every predetermined time based on the adjustment light with which the measuring object S is irradiated. According to such a configuration, when the posture of the measuring object is changed, the measurement difficulty region on the image of the measuring object S displayed on the display section 400 is sequentially updated following the change in the posture of the measuring object S.

Figure 69A:
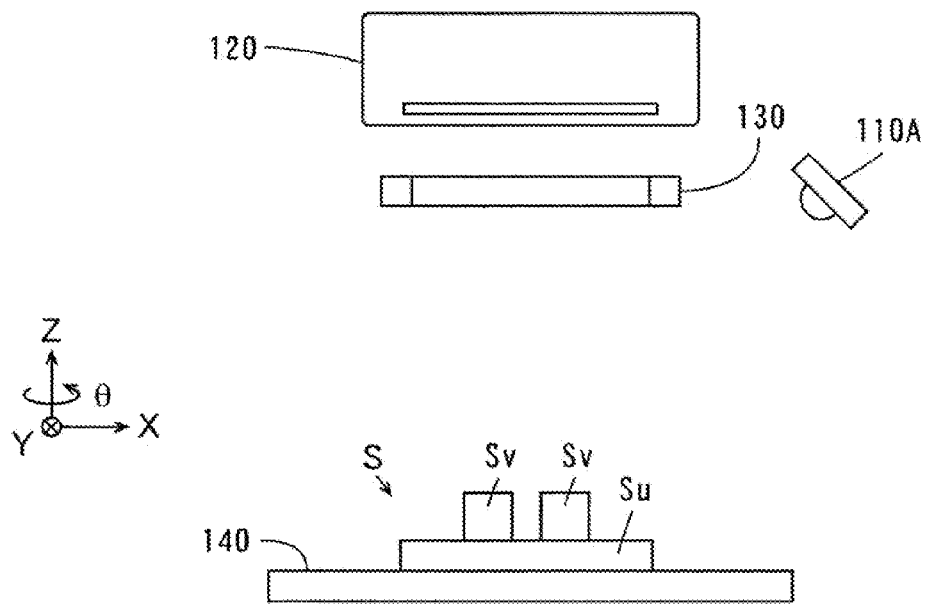
FIGS. 69A and 69B are views showing change in the measurement difficulty region when the measuring object is irradiated with the adjustment light from one light projecting unit.
Figure 69B:
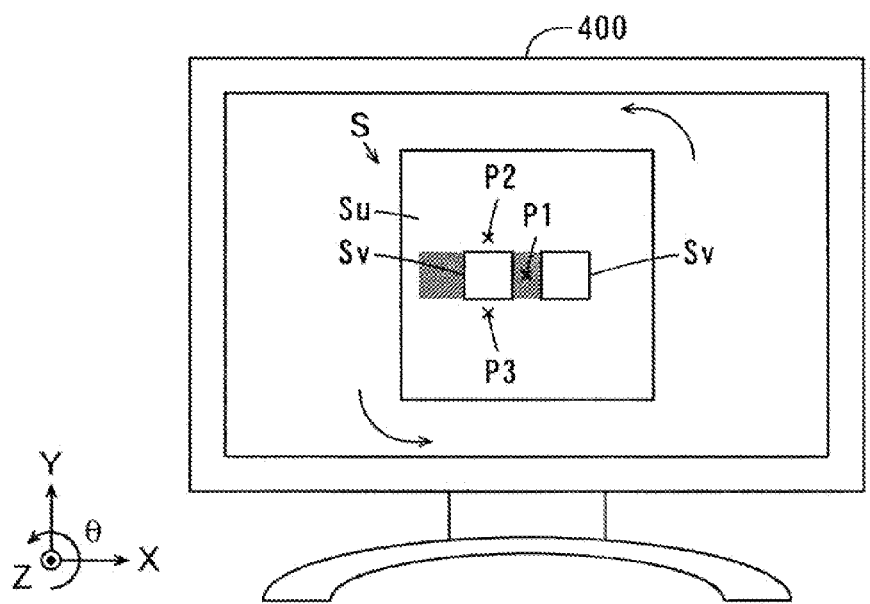
Figure 70A:
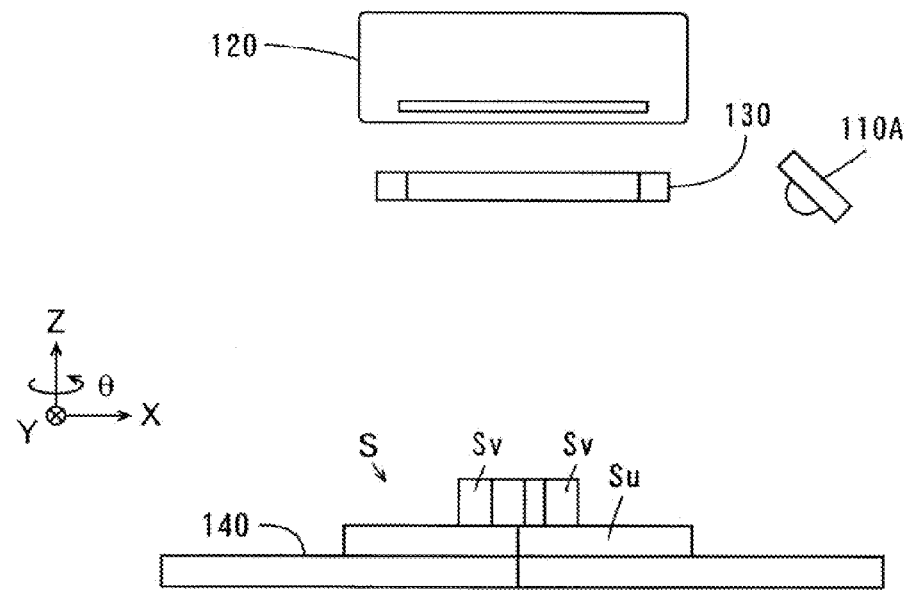
FIGS. 70A and 70B are views showing change in the measurement difficulty region when the measuring object is irradiated with the adjustment light from the one light projecting unit.
Figure 70B:
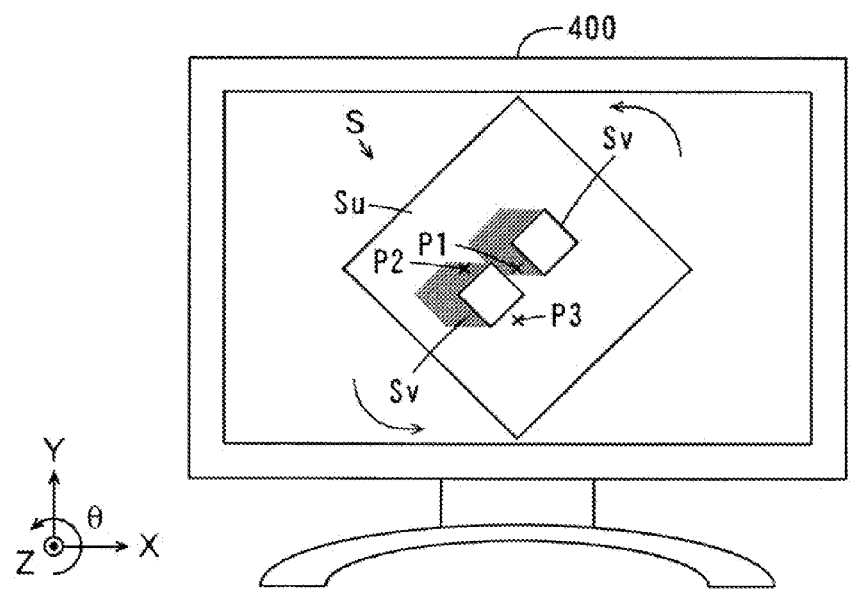
Figure 71A:
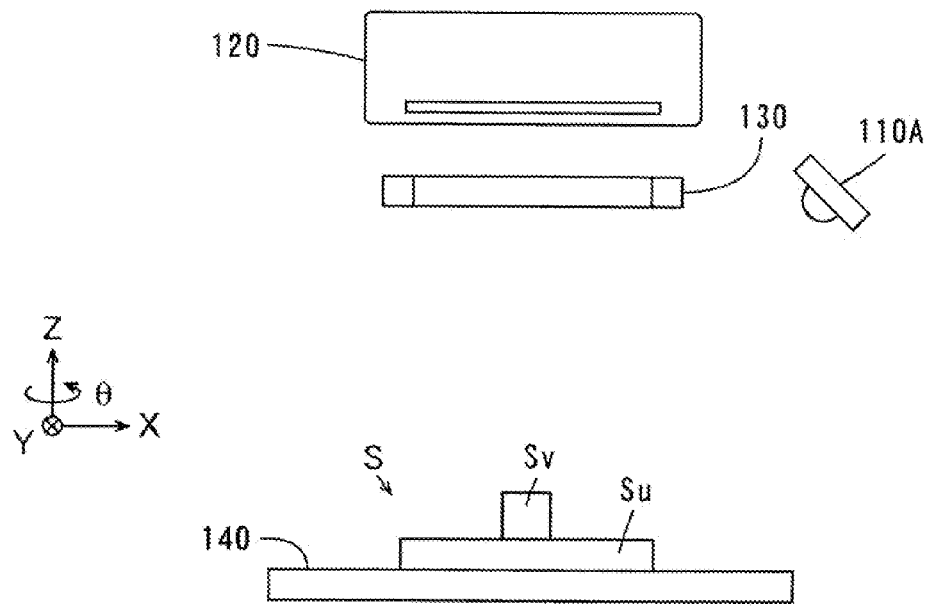
FIGS. 71A and 71B are views showing change in the measurement difficulty region when the measuring object is irradiated with the adjustment light from the one light projecting unit.
Figure 71B:
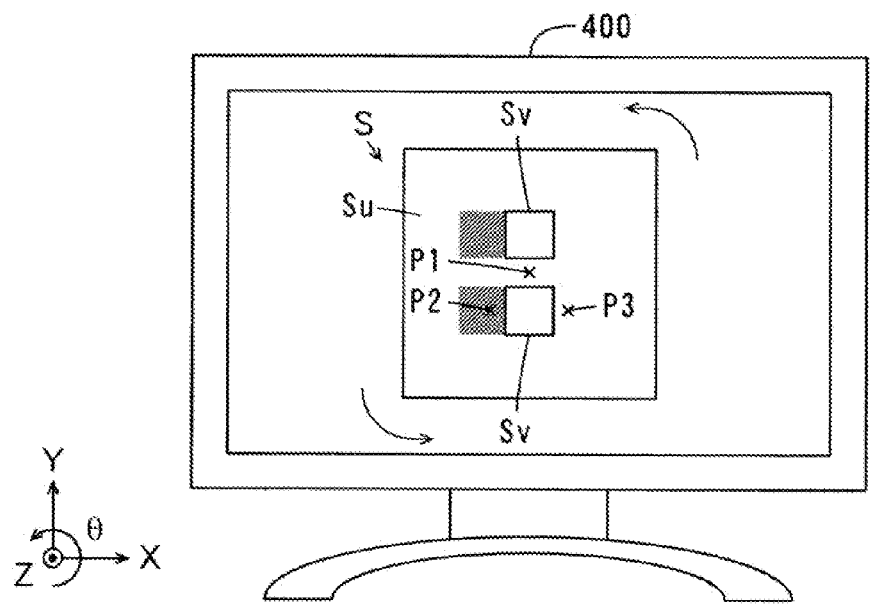

FIGS. 69A and 69B, FIGS. 70A and 70B, and FIGS. 71A and 71B are views showing change in the measurement difficulty region when the measuring object S is irradiated with the adjustment light from the one light projecting unit 110A. FIGS. 69A, 70A, and 71A show states in which the measuring object S on the stage 140 is irradiated with the adjustment light from the one light projecting unit 110A. FIGS. 69B, 70B, and 71B show images displayed on the display section 400 when the measuring object S is imaged by the light receiving unit 120 of FIGS. 69A, 70A, and 71A, respectively.

In the measuring object S of FIGS. 69A and 69B to FIGS. 71A and 71B, two rectangular column-shaped members Sv are formed side by side on a plate-like member Su. In this example, three points P1, P2, P3 at the periphery of one rectangular column-shaped member Sv are measurement positions.

In the posture of the measuring object S of FIG. 69A, the measuring object S is arranged on the stage 140 such that the two rectangular column-shaped members Sv are lined in the X direction. In this case, the portion between the two rectangular column-shaped members Sv and the portion of one side (left side) of the one rectangular column-shaped member Sv are estimated as the measurement difficulty regions.

As shown in FIG. 69B, the estimated measurement difficulty region is superimposed and displayed on the image of the measuring object S. In the posture of the measuring object S of FIG. 69B, the points P2, P3 are not included in the measurement difficulty region. However, the point P1 is included in the measurement difficulty region.

The user can adjust the posture of the measuring object S by operating the stage operation unit 145. FIG. 70A is a view showing a state in which the stage 140 of FIG. 69A is rotated 45 degrees in the θ direction. As shown in FIG. 70A, the posture of the measuring object S on the stage 140 changes when the stage 140 is rotated.

As shown in FIG. 70B, the measurement difficulty region on the image of the measuring object S displayed on the display section 400 is updated following the change in the posture of the measuring object S. In the posture of the measuring object S of FIG. 70B, the point P3 is not included in the measurement difficulty region. However, the points P1, P2 are included in the measurement difficulty region.

The user can further adjust the posture of the measuring object S by further operating the stage operation unit 145. FIG. 71A is a view showing a state in which the stage 140 of FIG. 70A is further rotated 45 degrees in the θ direction. As shown in FIG. 71A, the posture of the measuring object S on the stage 140 changes when the stage 140 is rotated.

As shown in FIG. 71B, the measurement difficulty region on the image of the measuring object S displayed on the display section 400 is updated following the change in the posture of the measuring object S. In the posture of the measuring object S of FIG. 71B, the points P1, P3 are not included in the measurement difficulty region. However, the point P2 is included in the measurement difficulty region.

The user thus can adjust the posture of the measuring object S by operating the stage operation unit 145 while checking the measurement difficulty region displayed on the display section 400. On the other hand, as in the examples of FIGS. 69A and 69B to FIGS. 71A and 71B, it is sometimes difficult to adjust the posture of the measuring object S so that the points P1 to P3 are not included in the measurement difficulty region depending on the shape of the measuring object S. In such case as well, the measurement difficulty region can be reduced by irradiating the measuring object S with the adjustment light from both light projecting units 110A, 110B.

Figure 72A:
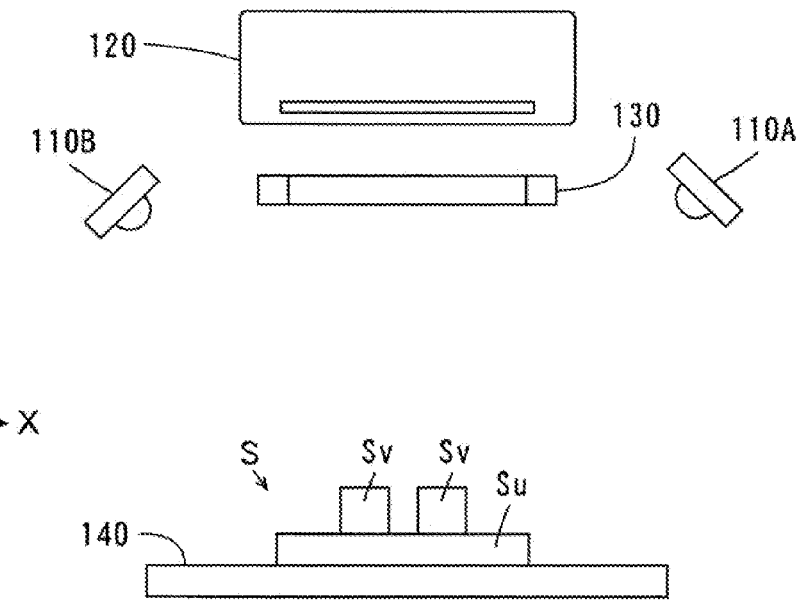
FIGS. 72A and 72B are views showing change in the measurement difficulty region when the measuring objects of FIGS. 69A to 71B are irradiated with the adjustment light from both light projecting units.
Figure 72B:
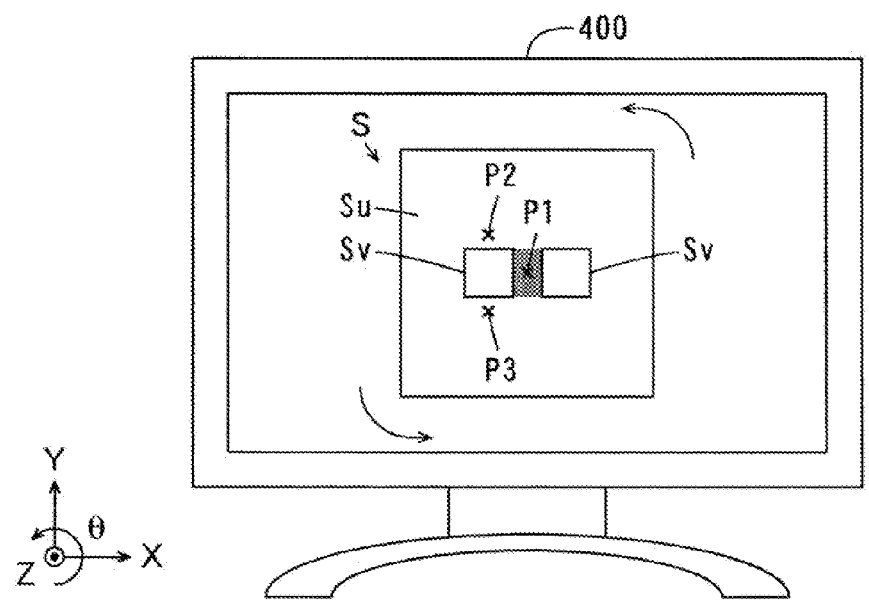
Figure 73A:
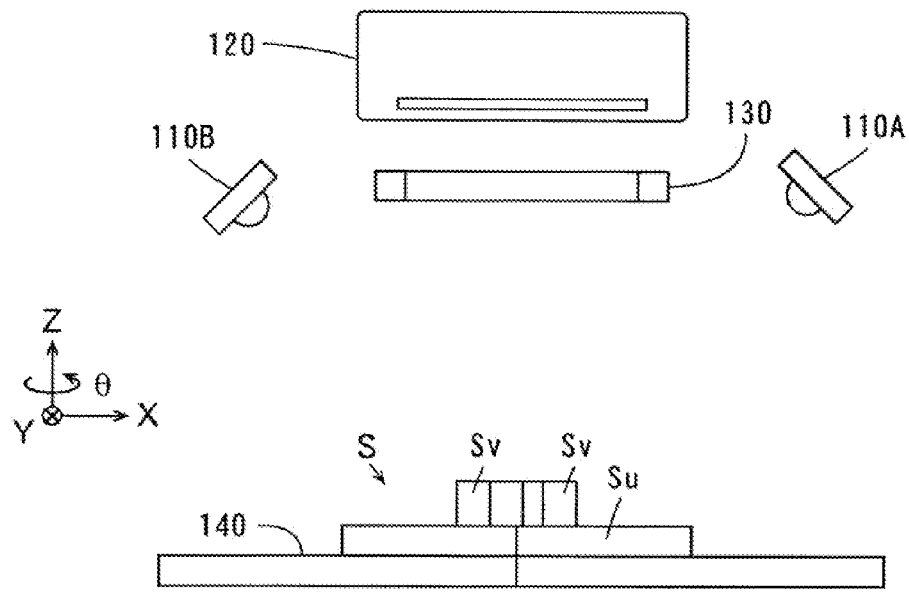
FIGS. 73A and 73B are views showing change in the measurement difficulty region when the measuring objects of FIGS. 69A to 71B are irradiated with the adjustment light from both light projecting units.
Figure 73B:
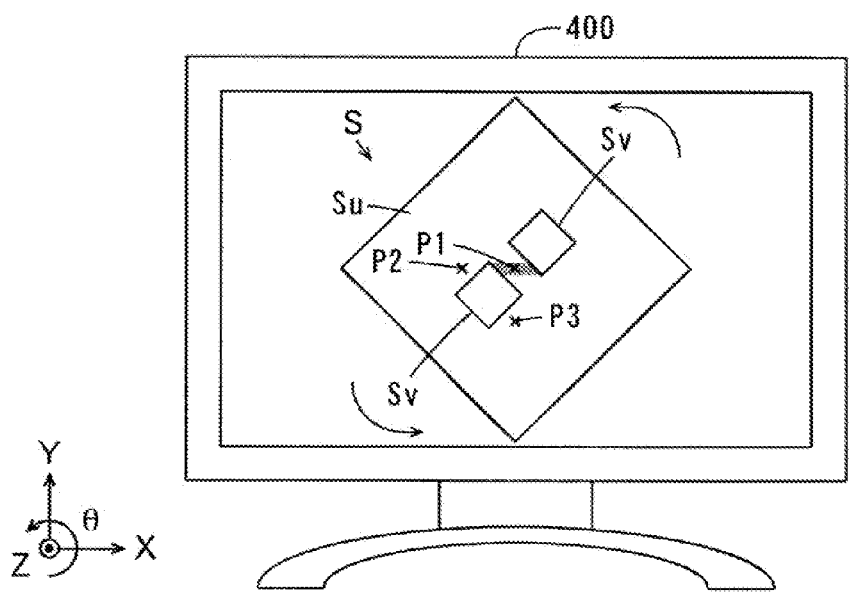
Figure 74A:
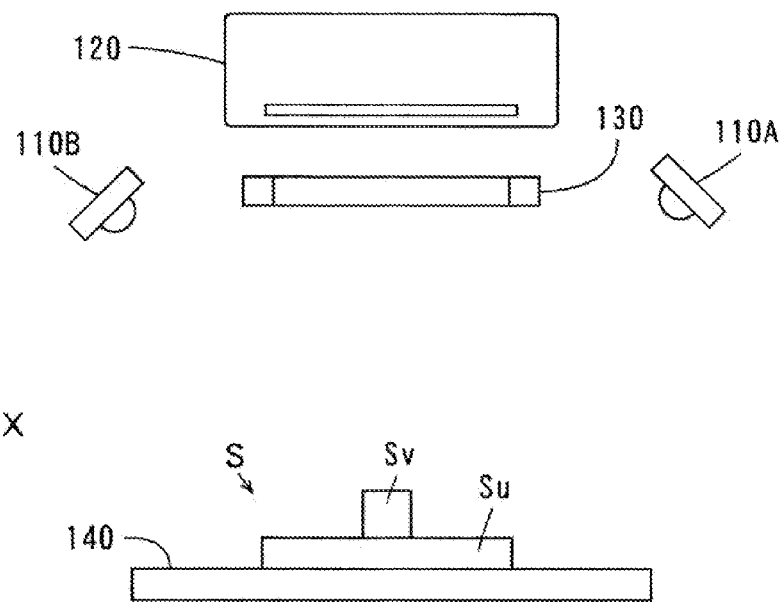
FIGS. 74A and 74B are views showing change in the measurement difficulty region when the measuring objects of FIGS. 69A to 71B are irradiated with the adjustment light from both light projecting units.
Figure 74B:
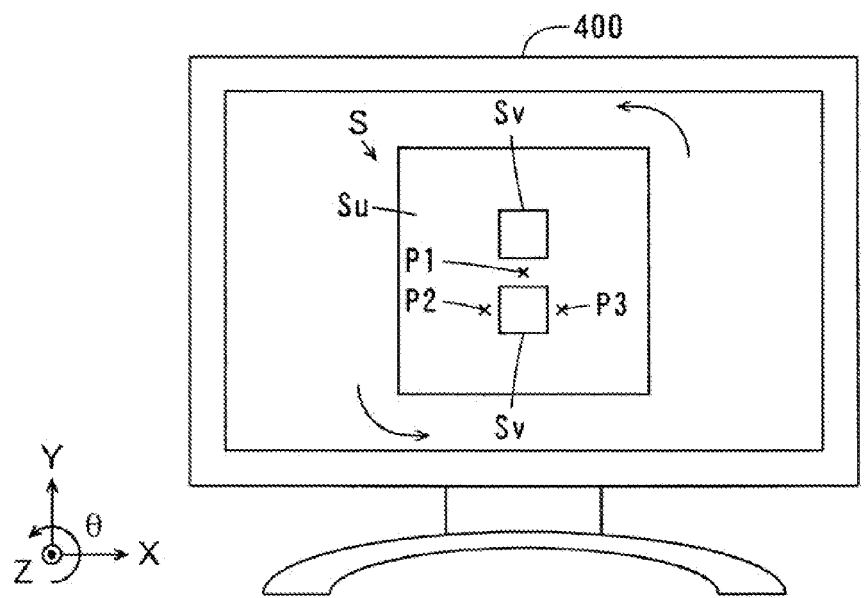

FIGS. 72A and 72B, FIGS. 73A and 73B, and FIGS. 74A and 74B are views showing change in the measurement difficulty region when the measuring object S of FIGS. 69A and 69B to FIGS. 71A and 71B is irradiated with the adjustment light from both light projecting units 110A, 110B. FIGS. 72A, 73A, and 74A show states in which the measuring object S on the stage 140 is irradiated with the adjustment light from both light projecting units 110A, 110B. FIGS. 72B, 73B, and 74B show images displayed on the display section 400 when the measuring object S is imaged by the light receiving unit 120 of FIGS. 72A, 73A, and 74A, respectively.

In the posture of the measuring object S of FIG. 72A, the measuring object S is arranged on the stage 140 so that two rectangular column-shaped members Sv are lined in the X direction. In this case, the portion between the two rectangular column-shaped members Sv is estimated as the measurement difficulty region.

As shown in FIG. 72B, the estimated measurement difficulty region is superimposed and displayed on the image of the measuring object S. In the posture of the measuring object S of FIG. 72B, the points P2, P3 are not included in the measurement difficulty region. However, the point P1 is included in the measurement difficulty region.

The user can adjust the posture of the measuring object S by operating the stage operation unit 145. FIG. 73A is a view showing a state in which the stage 140 of FIG. 72A is rotated 45 degrees in the θ direction. As shown in FIG. 73A, the posture of the measuring object S on the stage 140 changes when the stage 140 is rotated.

As shown in FIG. 73B, the measurement difficulty region on the image of the measuring object S displayed on the display section 400 is updated following the change in the posture of the measuring object S. In the posture of the measuring object S of FIG. 73B, the points P2, P3 are not included in the measurement difficulty region. However, the point P1 is included in the measurement difficulty region.

The user can further adjust the posture of the measuring object S by further operating the stage operation unit 145. FIG. 74A is a view showing a state in which the stage 140 of FIG. 73A is further rotated 45 degrees in the θ direction. As shown in FIG. 74A, the posture of the measuring object S on the stage 140 changes when the stage 140 is rotated.

As shown in FIG. 74B, the measurement difficulty region on the image of the measuring object S displayed on the display section 400 is updated following the change in the posture of the measuring object S. In the posture of the measuring object S of FIG. 74B, the points P1 to P3 are not included in the measurement difficulty region. The user thus can adjust the posture of the measuring object S so that the points P1 to P3 are not included in the measurement difficulty region by irradiating the measuring object S with the adjustment light from both light projecting units 110A, 110B.

Figure 75:
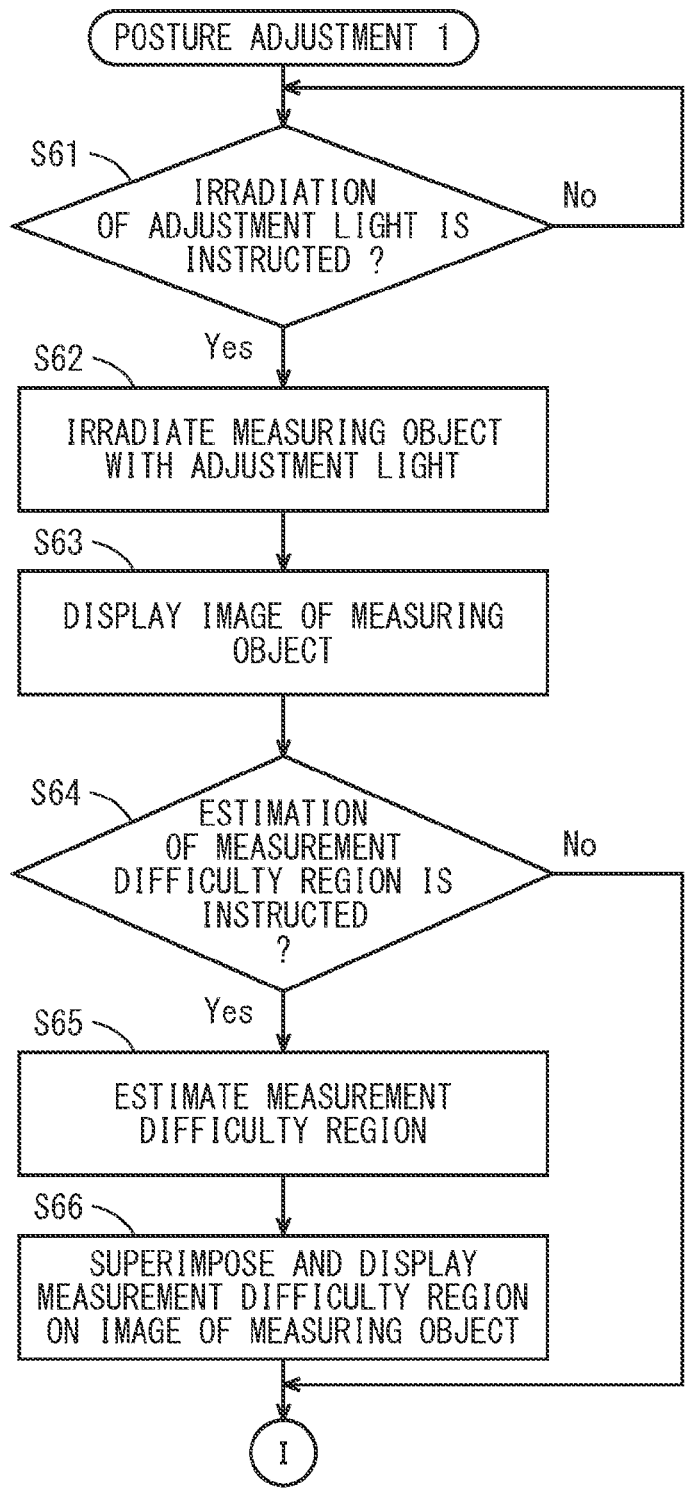
FIG. 75 is a flowchart showing the procedure for the posture adjustment based on the first auxiliary function of the posture adjustment.
Figure 76:
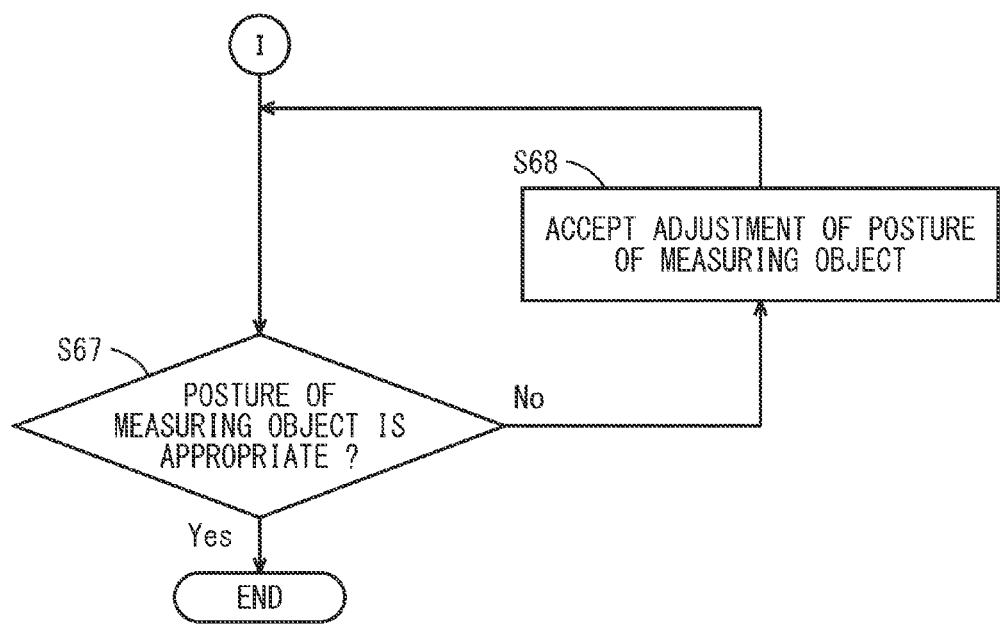
FIG. 76 is a flowchart showing the procedure for the posture adjustment based on the first auxiliary function of the posture adjustment.

(4) Procedure for Posture Adjustment Based on First Auxiliary Function of Posture Adjustment FIGS. 75 and 76 are flowcharts showing the procedure for the posture adjustment based on the first auxiliary function of the posture adjustment. The procedure for the posture adjustment based on the first auxiliary function of the posture adjustment will be described with reference to FIGS. 1, 2, 75, and 76. The CPU 210 determines whether or not the irradiation of the adjustment light is instructed by the user (step S61). The user can instruct the irradiation of the adjustment light to the CPU 210 in step S22 of FIG. 27 in the second adjustment, for example.

If the irradiation of the adjustment light is not instructed in step S61, the CPU 210 waits until the irradiation of the adjustment light is instructed. If the irradiation of the adjustment light is instructed in step S61, the CPU 210 irradiates the measuring object S with the adjustment light from the light projecting unit 110 (step S62). The CPU 210 can irradiate the measuring object S with the adjustment light from one or both light projecting units 110A, 110B based on the instruction of the user.

The CPU 210 then displays an image of the measuring object S irradiated with the adjustment light on the display section 400 (step S63). The CPU 210 determines whether or not the estimation of the measurement difficulty region is instructed by the user in this state (step S64). If the estimation of the measurement difficulty region is not instructed in step S64, the CPU 210 proceeds to the processing of step S67.

If the estimation of the measurement difficulty region is instructed in step S64, the CPU 210 estimates the measurement difficulty region (step S65). The CPU 210 also superimposes the estimated measurement difficulty region on the image of the measuring object S and displays the same on the display section 400 (step S66).

Thereafter, the CPU 210 determines whether or not the posture of the measuring object S is appropriate based on the instruction of the user (step S67). The user can instruct the CPU 210 whether or not the posture of the measuring object S is appropriate.

If the posture of the measuring object S is not appropriate in step S67, the CPU 210 accepts the adjustment of the posture of the measuring object S by the user (step S68). Meanwhile, the user can adjust the posture of the measuring object S. The CPU 210 then returns to step S67. If the posture of the measuring object S is appropriate in step S67, the user instructs the CPU 210 that the posture of the measuring object S is appropriate. The procedure for the posture adjustment based on the first auxiliary function of the posture adjustment is thereby terminated.

If not instructing the estimation of the measurement difficulty region in step S64, the user determines the measurement difficulty region based on the region where the shade is formed, the region where the lowering of the contrast of the pattern occurs due to multiple reflection, and the region where the interval of the pattern is close in the measuring object S. The posture of the measuring object S is inappropriate if the measurement position of the measuring object S is in the determined measurement difficulty region, and the posture of the measuring object S is appropriate if the measurement position of the measuring object S is not in the determined measurement difficulty region. The user thereafter instructs the CPU 210 whether or not the posture of the measuring object S is appropriate in step S67.

If the user instructs the estimation of the measurement difficulty region in step S64, the measurement difficulty region is displayed on the display section 400 in step S66. The posture of the measuring object S is inappropriate if the measurement position of the measuring object S is in the displayed measurement difficulty region, and the posture of the measuring object S is appropriate if the measurement position of the measuring object S is not in the estimated measurement difficulty region. The user thereafter instructs the CPU 210 whether or not the posture of the measuring object S is appropriate in step S67.

In step S67, the CPU 210 determines whether or not the posture of the measuring object S is appropriate based on the instruction of the user, but the present invention is not limited thereto. If an ROI (Region Of Interest) is set by the user in advance, the CPU 210 may determine whether or not the posture of the measuring object S is appropriate based on the ROI.

Figure 77A:
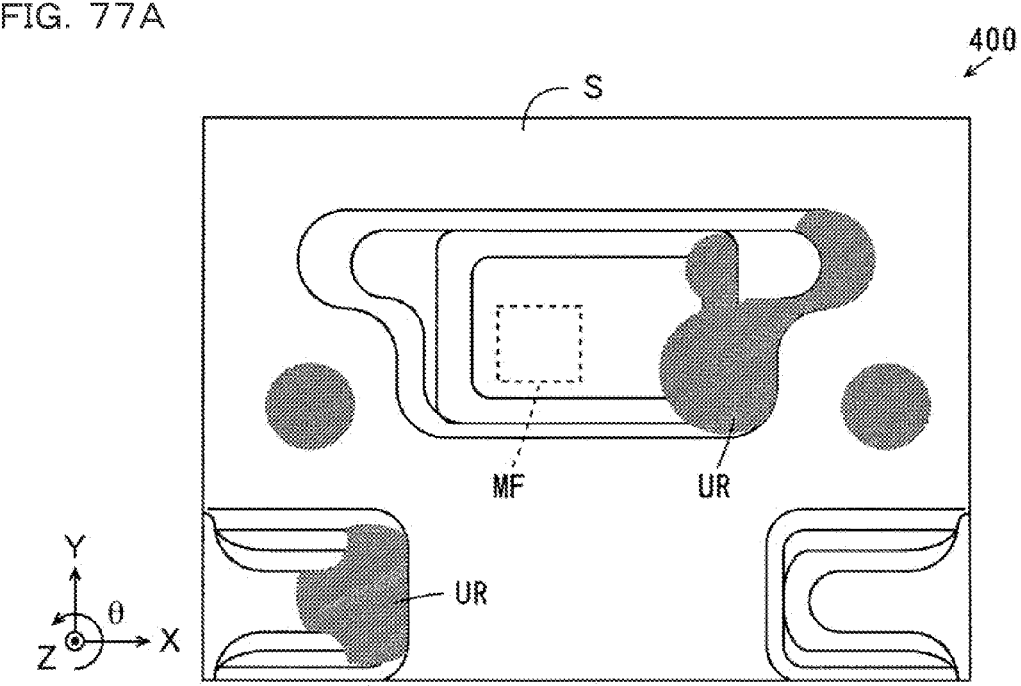
FIGS. 77A and 77B are views each showing an example of display of the display section in which an ROI is set.
Figure 77B:
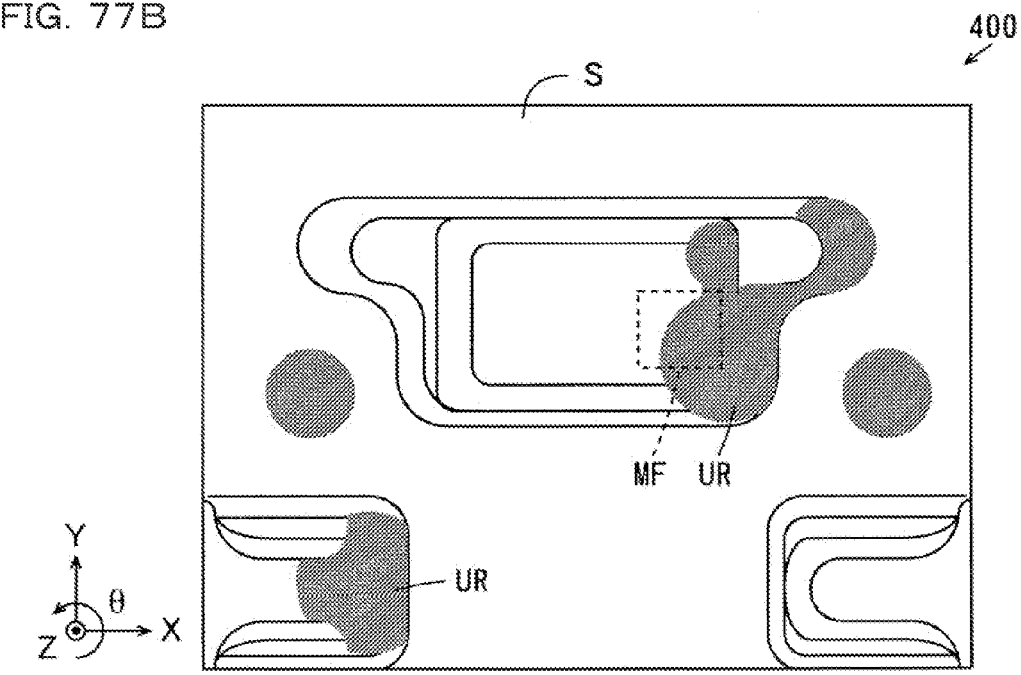

FIGS. 77A and 77B are views showing an example of a display of the display section 400 in which the ROI is set. The user can operate the operation unit 250 of the PC 200 of FIG. 1 to set a measurement position specifying frame MF that indicates the measurement position as the ROI on the screen of the display section 400, as shown in FIGS. 77A and 77B. If the estimation of the measurement difficulty region is instructed in step S64, the measurement difficulty region UR is displayed on the display section 400 in step S66.

In the example of FIG. 77A, the measurement position specifying frame MF is not overlapped with the measurement difficulty region UR. In this case, the CPU 210 determines that the posture of the measuring object S is appropriate in step S67. In the example of FIG. 77B, the measurement position specifying frame MF is overlapped with the measurement difficulty region UR. In this case, the CPU 210 determines that the posture of the measuring object S is not appropriate in step S67. If determined that the posture of the measuring object S is not appropriate, the CPU 210 may drive the stage drive unit 146 of FIG. 1 to adjust the posture of the measuring object S so that the posture of the measuring object S becomes appropriate automatically without depending on the user in step S68.

(5) Effects

In the shape measuring device 500 according to the present embodiment, the measuring object S is irradiated with the adjustment light from the light projecting unit 110 before the shape measurement. The pattern of the adjustment light differs from the pattern of the measurement light with which the measuring object S is irradiated in the shape measurement processing. The image of the measuring object S displayed on the display section 400 is displayed together with the pattern of the adjustment light. The user thus can easily recognize the measurement difficulty region such as the portion where the shade is formed, the portion where the multiple reflection of the light occurs, or the like. If the position to be measured of the measuring object S is included in the measurement difficulty region, the user can easily adjust the posture of the measuring object S to a state appropriate for the shape measurement before the shape measurement processing of the measuring object S.

In the shape measuring device 500 according to the present embodiment, the measuring object S is irradiated with the adjustment light for every predetermined time, and the measurement difficulty region is sequentially estimated for every predetermined time based on the adjustment light with which the measuring object S is irradiated. The measurement difficulty region on the image of the measuring object S displayed on the display section 400 is sequentially updated.

Thus, when the user operates the stage operation unit 145 to adjust the posture of the measuring object S, the measurement difficulty region displayed on the display section 400 is updated following the change in the posture of the measuring object S. The user thus can adjust the posture of the measuring object S while checking the measurement difficulty region displayed on the display section 400. As a result, the posture of the measuring object S can be easily adjusted to a state appropriate for the shape measurement before the shape measurement processing of the measuring object S.

[9] Second Auxiliary Function of Posture Adjustment (1) Example of Second Auxiliary Function of Posture Adjustment A second auxiliary function of the posture adjustment different from the first auxiliary function of the posture adjustment will be described below. When the shape measurement processing of FIGS. 30 to 32 is executed in a state where the second auxiliary function of the posture adjustment is executed, the CPU 210 of FIG. 1 generates the main stereoscopic shape data and determines the measurement difficulty region based on the main stereoscopic shape data. In this case, the region where the main stereoscopic shape data indicating the height of the measuring object S is not generated is determined as the measurement difficulty region in the shape measurement processing. The region where the change in the generated main stereoscopic shape data is assumed as the change in the main stereoscopic shape data obtained by multiple reflection is determined as the measurement difficulty region. The determined measurement difficulty region is superimposed and displayed on the image of the measuring object S.

Figure 78A:
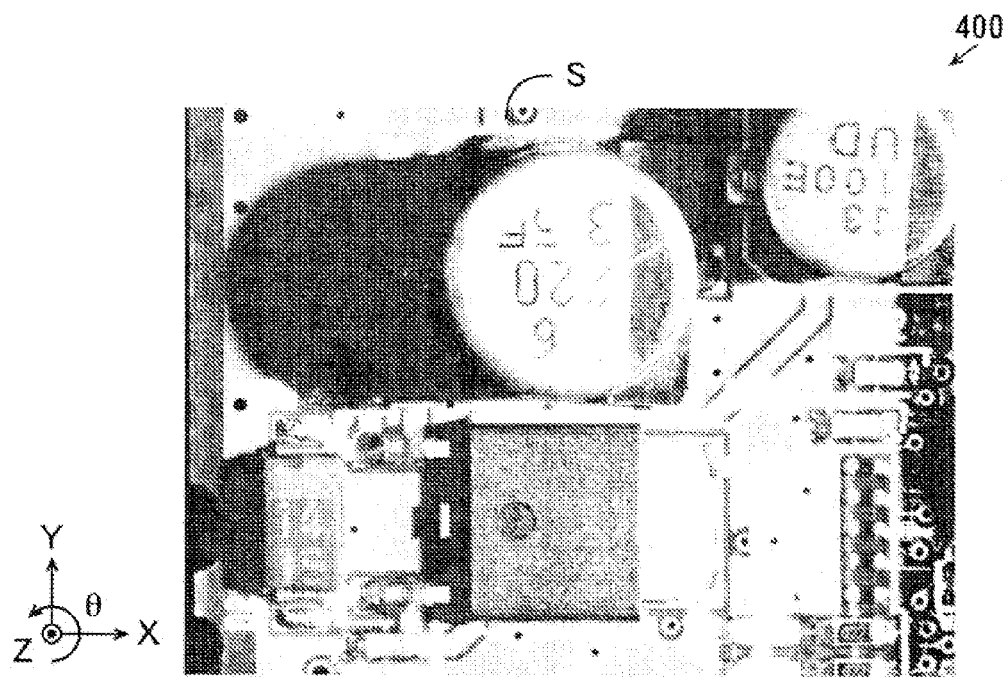
FIGS. 78A and 78B are views each showing an example of an image of the measuring object including the measurement difficulty region.
Figure 78B:
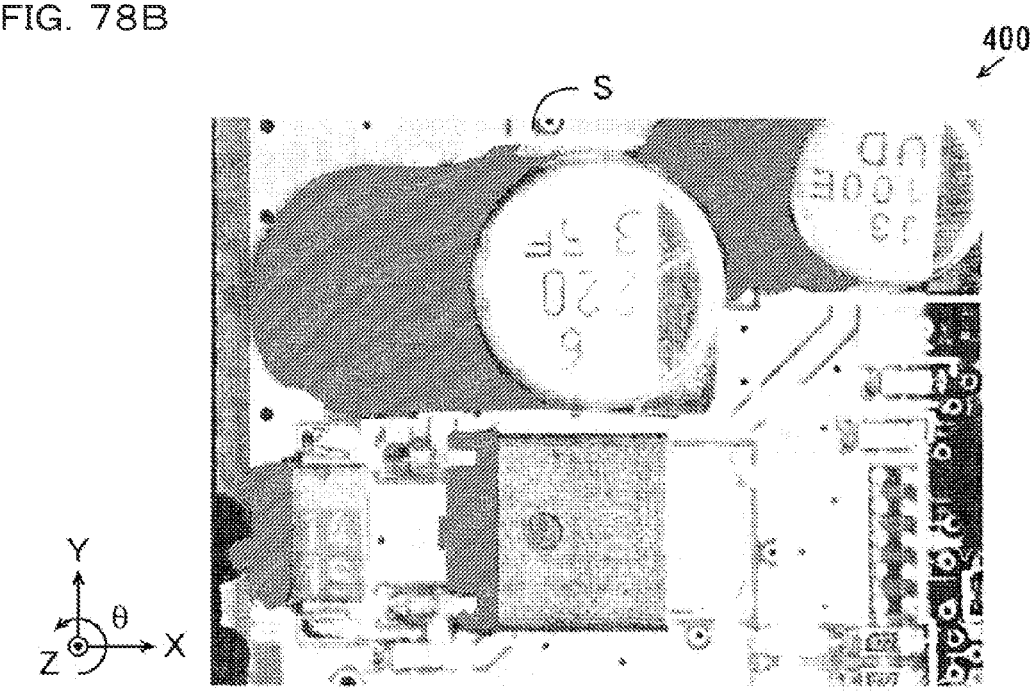

FIGS. 78A and 78B are views showing an example of an image of the measuring object S including the measurement difficulty region. FIG. 78A shows an image of the measuring object S captured by the light receiving unit 120 of FIG. 1 in a state of being irradiated with the measurement light from the one light projecting unit 110A of FIG. 2. As shown in FIG. 78A, shade is formed at a part of the measuring object S. However, the formation of shade at a part of the measuring object S is a natural phenomenon, and the user may not notice even if the shade is formed.

FIG. 78B shows the measurement difficulty region of the measuring object S determined in the second auxiliary function of the posture adjustment with respect to the measuring object S of FIG. 78A. As shown in FIG. 78B, the estimated measurement difficulty region is superimposed and displayed on the image of the measuring object S. In the example of FIG. 78B, the measurement difficulty region is highlighted with the hatching pattern. The user thus can reliably recognize the measurement difficulty region.

Figure 79A:
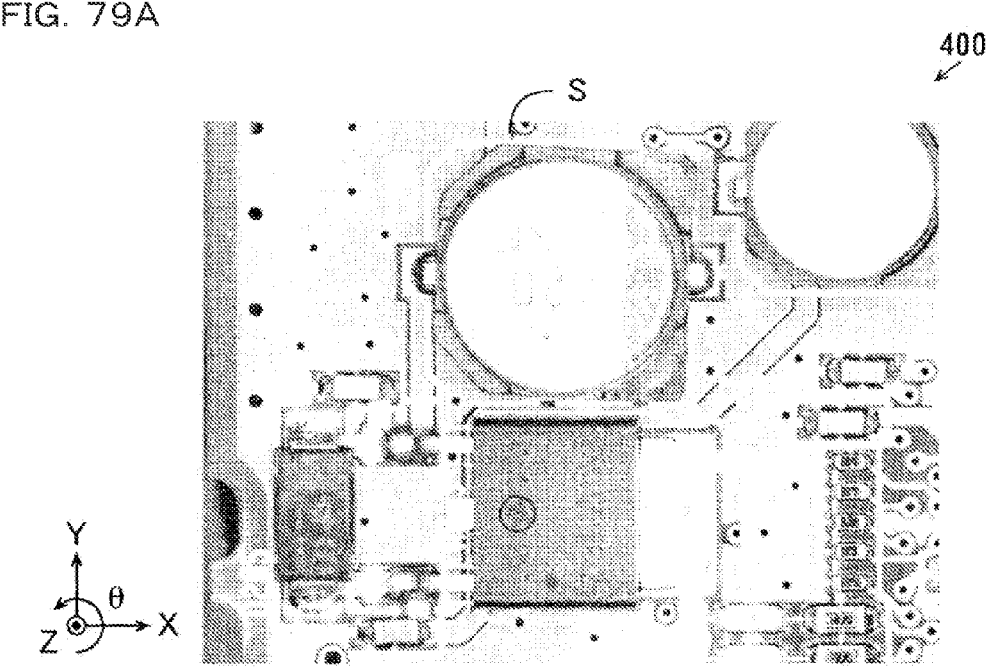
FIGS. 79A and 79B are views each showing another example of the image of the measuring object including the measurement difficulty region.
Figure 79B:
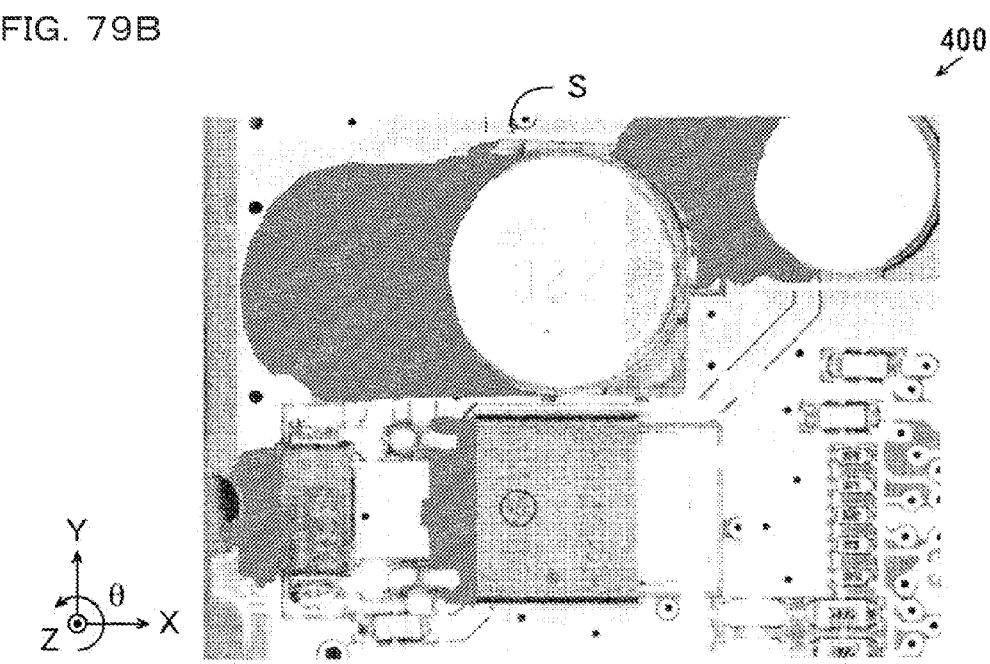

FIGS. 79A and 79B are views showing another example of the image of the measuring object S including the measurement difficulty region. FIG. 79A shows the image of the measuring object S captured by the light receiving unit 120 of FIG. 1 in a state of being irradiated with the illumination light from the illumination light output unit 130 of FIG. 1. As shown in FIG. 79A, shade is hardly formed on the measuring object S depending on the illumination light from the illumination light output unit 130. Therefore, the user cannot recognize the measurement difficulty region.

FIG. 79B shows the measurement difficulty region of the measuring object S determined in the second auxiliary function of the posture adjustment with respect to the measuring object S of FIG. 79A. As shown in FIG. 79B, the estimated measurement difficulty region may be superimposed and displayed on the image of the measuring object S captured using the illumination light. In the example of FIG. 79B, the measurement difficulty region is highlighted with the hatching pattern.

Figure 80A:
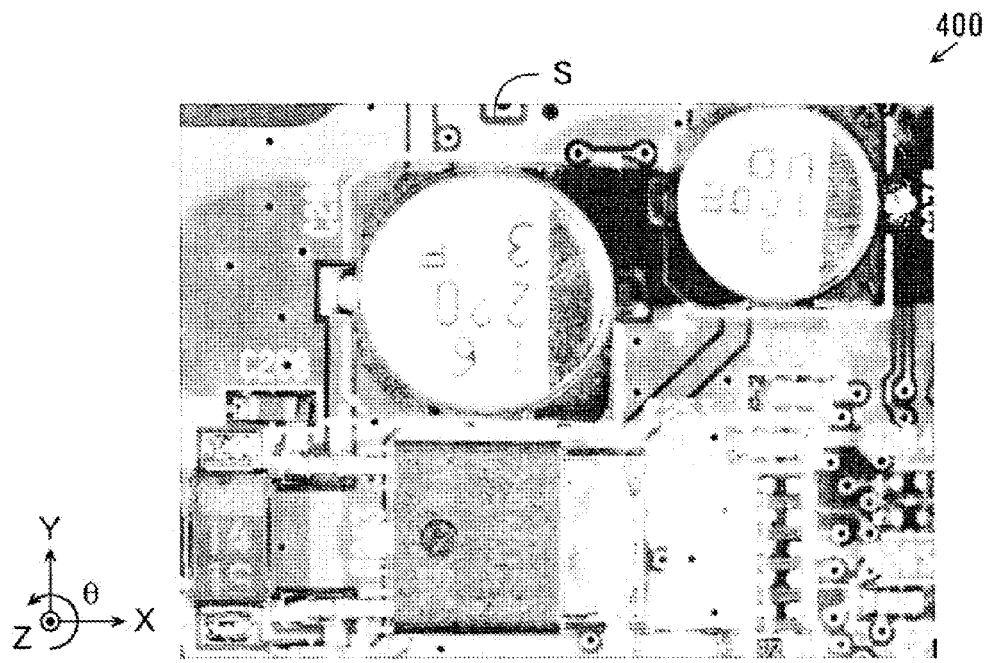
FIGS. 80A and 80B are views each showing still another example of the image of the measuring object including the measurement difficulty region.
Figure 80B:
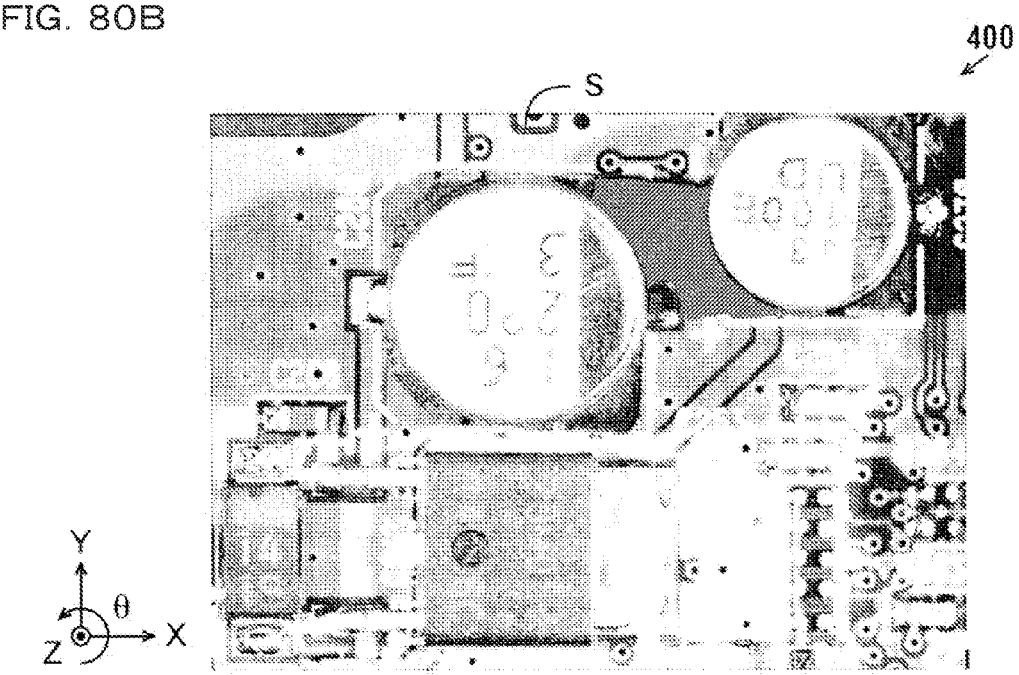

FIGS. 80A and 80B are views showing another further example of the image of the measuring object S including the measurement difficulty region. FIG. 80A shows the image of the measuring object S captured by the light receiving unit 120 of FIG. 1 in a state of being irradiated with the measurement light from both light projecting units 110A, 110B of FIG. 2. As shown in FIG. 80A, when the measuring object S is irradiated with the measurement light from both light projecting units 110A, 110B, the shade Ss that is formed is reduced as compared the case where the measuring object S is irradiated with the measurement light from the one light projecting unit 110A.

FIG. 80B shows the measurement difficulty region of the measuring object S determined in the second auxiliary function of the posture adjustment with respect to the measuring object S of FIG. 80A. As shown in FIG. 80B, the estimated measurement difficulty region may be superimposed and displayed on the image of the measuring object S captured using the one measurement light and the other measurement light. In the example of FIG. 80B, the measurement difficulty region is highlighted with the hatching pattern.

Figure 81A:
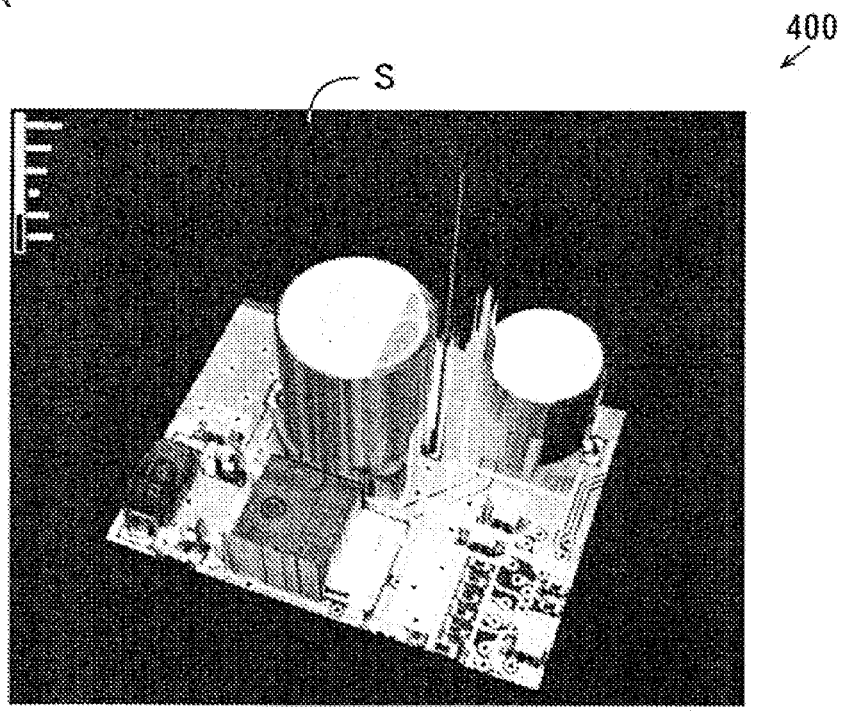
FIGS. 81A and 81B are views each showing yet another example of the image of the measuring object including the measurement difficulty region.
Figure 81B:
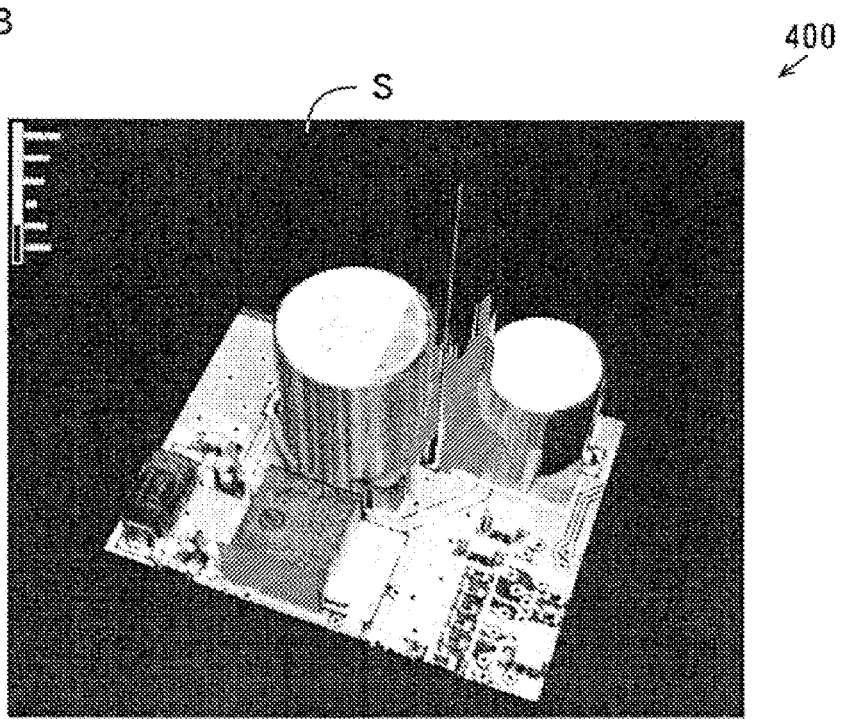

FIGS. 81A and 81B are views showing another further example of the image of the measuring object S including the measurement difficulty region. FIG. 81A shows the image of the stereoscopic shape of the measuring object S based on the main stereoscopic shape data. FIG. 81B shows the measurement difficulty region of the measuring object S determined in the second auxiliary function of the posture adjustment with respect to the measuring object S of FIG. 81A. As shown in FIG. 81B, the estimated measurement difficulty region may be superimposed and displayed on the image of the stereoscopic shape of the measuring object S. In the example of FIG. 81B, the measurement difficulty region is highlighted with the hatching pattern.

The defective portion of the main stereoscopic shape data generated when the measuring object S is irradiated with the measurement light from both light projecting units 110A, 110B is small compared to the defective portion of the main stereoscopic shape data generated when the measuring object S is irradiated with the measurement light from one of the light projecting units 110A, 110B. In other words, the measurement difficulty region can be reduced by irradiating the measuring object S with the measurement light from both light projecting units 110A, 110B, as compared to the case where the measuring object S is irradiated with the measurement light from one of the light projecting units 110A, 110B.

The defective portion of the synthesized stereoscopic shape data generated when the measuring object S is irradiated with the measurement light from both light projecting units 110A, 110B is determined, and the image of the measuring object S is displayed on the display section 400 such that the determined defective portion can be identified. The user thus can recognize the measurement difficulty region when the measuring object S is irradiated with the measurement light from both light projecting units 110A, 110B. As a result, the posture of the measuring object S can be easily and accurately adjusted to a state appropriate for the shape measurement before carrying out the next shape measurement processing.

The main stereoscopic shape data may be generated for every predetermined time. In this case, the CPU 210 sequentially determines the measurement difficulty region for every predetermined time based on the generated main stereoscopic shape data. According to such a configuration, when the posture of the measuring object is changed, the measurement difficulty region on the image of the measuring object S displayed on the display section 400 is sequentially updated following the change in the posture of the measuring object S.

Figure 82:
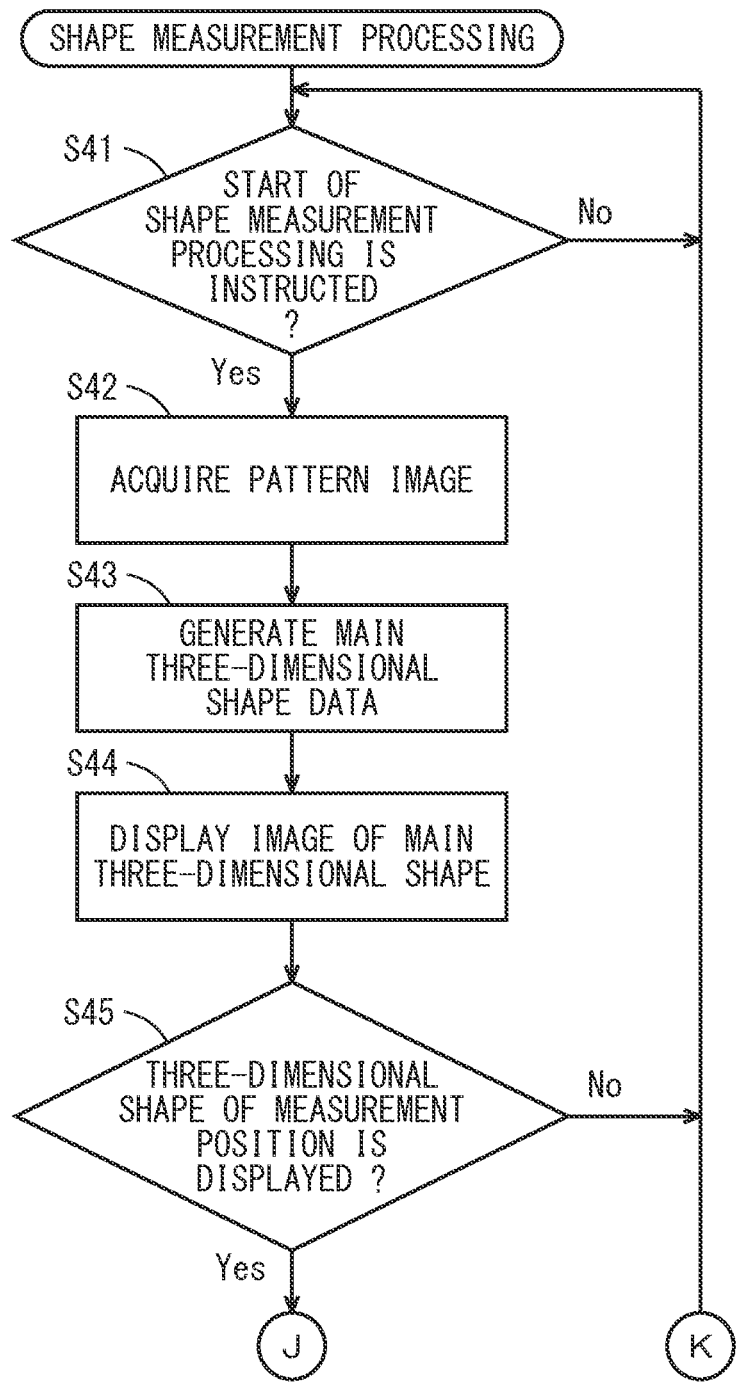
FIG. 82 is a flowchart showing the procedure for the posture adjustment based on a second auxiliary function of the posture adjustment.
Figure 83:
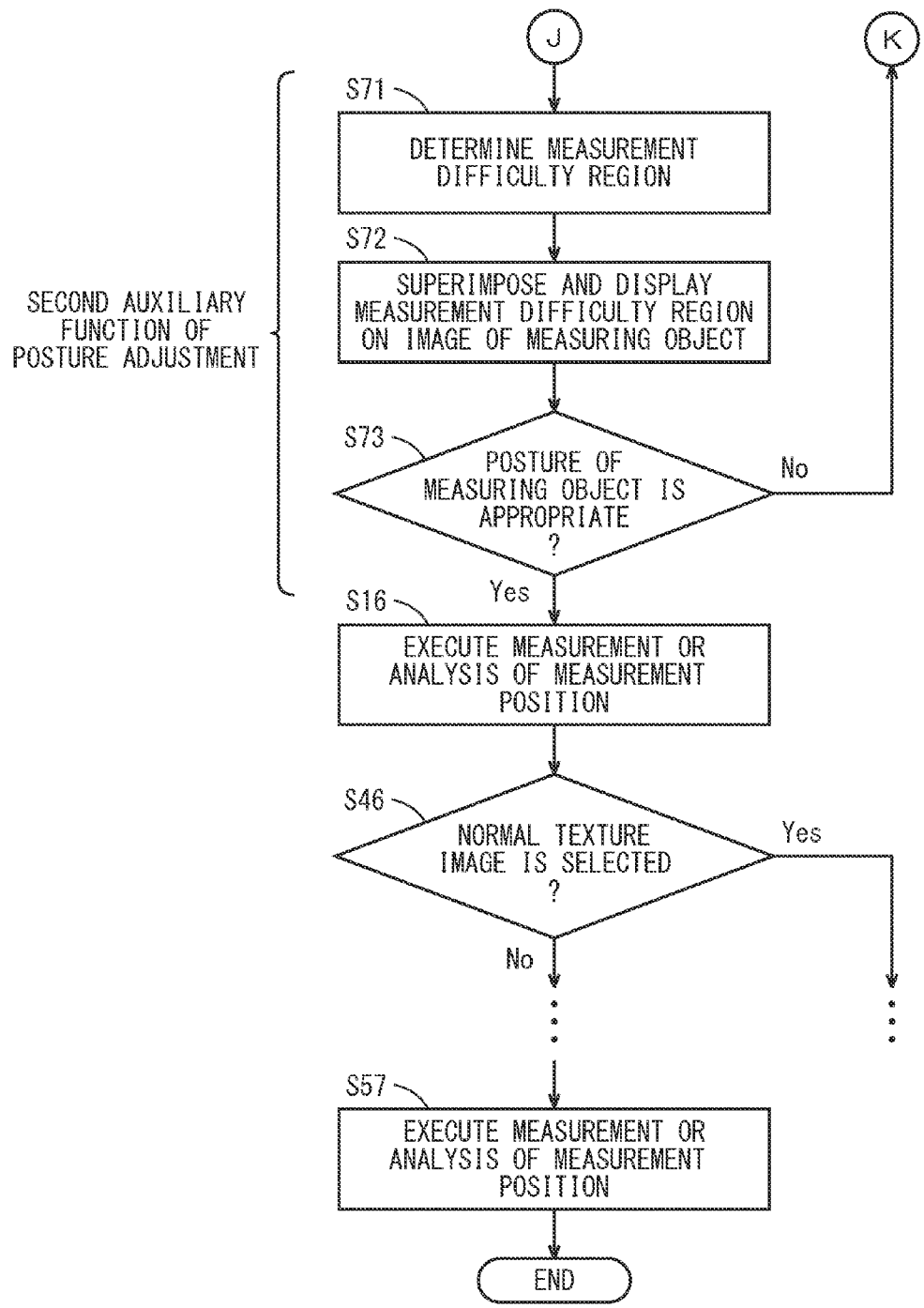
FIG. 83 is a flowchart showing the procedure for the posture adjustment based on the second auxiliary function of the posture adjustment.

(2) Procedure for Posture Adjustment Based on Second Auxiliary Function of Posture Adjustment FIGS. 82 and 83 are flowcharts showing the procedure for the posture adjustment based on the second auxiliary function of the posture adjustment. The procedure for the posture adjustment based on the second auxiliary function of the posture adjustment will be described with reference to FIGS. 1, 2, 82, and 83. The procedure for the posture adjustment based on the second auxiliary function of the posture adjustment is included in the shape measurement processing of FIGS. 30 to 32. The processing of steps S41 to S45 is similar to the shape measurement processing of steps S41 to S45 of FIGS. 30 to 32.

If determined that the stereoscopic shape of the measurement position is displayed in step S45, the CPU 210 determines the measurement difficulty region (step S71). The CPU 210 then superimposes the determined measurement difficulty region on the image of the measuring object S, and displays the same on the display section 400 (step S72).

The image of the measuring object S displayed on the display section 400 may be the image of the measuring object S captured using the one measurement light, or may be the image of the measuring object S captured using the one measurement light and the other measurement light. Alternatively, the image of the measuring object S displayed on the display section 400 may be the image of the measuring object S captured using the illumination light or may be the image of the stereoscopic shape of the measuring object S.

The CPU 210 then determines whether or not the posture of the measuring object S is appropriate based on the instruction of the user (step S73). The user can instruct the CPU 210 whether or not the posture of the measuring object S is appropriate.

If the posture of the measuring object S is not appropriate in step S73, the CPU 210 returns to the processing of step S41. The CPU 210 thus waits until the start of the shape measurement processing is instructed, and the user can adjust the posture of the measuring object S so that the posture of the measuring object S becomes appropriate before again instructing the start of the shape measurement processing.

If the posture of the measuring object S is appropriate in step S73, the user instructs the CPU 210 that the posture of the measuring object S is appropriate. The CPU 210 then proceeds to the processing of step S46. The processing of steps S46 to S57 is similar to the shape measurement processing of steps S46 to S57 of FIGS. 30 to 32.

The CPU 210 then executes the measurement or the analysis of the measurement position based on the instruction of the user (step S57). The shape measurement processing is then terminated. The procedure for the posture adjustment based on the second auxiliary function of the posture adjustment is thus included in the shape measurement processing of FIGS. 30 to 32. The procedure for the posture adjustment based on the second auxiliary function of the posture adjustment is configured by the processing of steps S71 to S73.

(3) Effects

In the shape measuring device 500 according to the present embodiment, the portion of the main stereoscopic shape data corresponding to the measurement difficulty region is determined as the defective portion such as the data missing portion, data inaccurate portion, or the like. The measuring object S is imaged by the light receiving unit 120, and the image of the measuring object S is displayed on the display section 400 such that the determined defective portion can be identified.

The user thus can accurately recognize the measurement difficulty region. Therefore, the posture of the measuring object S can be easily and accurately adjusted to a state appropriate for the shape measurement before carrying out the next shape measurement processing. If the measurement position of the measuring object S is not included in the measurement difficulty region, the user can recognize that there is no need to perform the shape measurement processing again. Thus, if the shape of the measuring object S is simple, the shape of the measuring object S can be measured efficiently and in a short time.

In the shape measuring device 500 according to the present embodiment, the generation of the main stereoscopic shape data is carried out for every predetermined time, and the measurement difficulty region is sequentially determined for every predetermined time based on the generated main stereoscopic shape data. The measurement difficulty region on the image of the measuring object S displayed on the display section 400 is sequentially updated.

Thus, when the user operates the stage operation unit 145 to adjust the posture of the measuring object S, the measurement difficulty region displayed on the display section 400 is updated following the change in the posture of the measuring object S. The user thus can adjust the posture of the measuring object S while checking the measurement difficulty region displayed on the display section 400. As a result, the posture of the measuring object S can be easily adjusted to a state appropriate for the shape measurement before the shape measurement processing of the measuring object S.

[10] Third Auxiliary Function of Posture Adjustment (1) First Example of Third Auxiliary Function of Posture Adjustment A third auxiliary function of the posture adjustment different from the first or second auxiliary function of the posture adjustment will be described below. The posture adjustment based on the third auxiliary function of the posture adjustment is carried out between the preparation of the shape measurement of FIG. 23 and the shape measurement processing of FIGS. 30 to 32.

When a first example of the third auxiliary function of the posture adjustment is executed after preparing for the shape measurement of FIG. 23, the CPU 210 of FIG. 1 irradiates the measuring object S with the coded measurement light (see FIGS. 11A to 11D) for a plurality of times from the light projecting unit 110 to generate the main stereoscopic shape data. The CPU 210 also generates the main stereoscopic shape data of the measuring object 5, and determines the measurement difficulty region based on the main stereoscopic shape data, similarly to the second auxiliary function of the posture adjustment. The determined measurement difficulty region is superimposed and displayed on the image of the measuring object 5, similarly to the case of the second auxiliary function of the posture adjustment.

If the posture of the measuring object S is not appropriate, the first example of the third auxiliary function of the posture adjustment is again executed after the posture adjustment of the measuring object S is carried out. If the posture of the measuring object S is appropriate, the shape measurement processing of FIGS. 30 to 32 is executed. In the shape measurement processing, the CPU 210 irradiates the measuring object S with the striped measurement light for a plurality of times, and then with the coded measurement light for a plurality of times from the light projecting unit 110 to generate the main stereoscopic shape data of the measuring object S.

Thus, the main stereoscopic shape data in the third auxiliary function of the posture adjustment is generated to determine the measurement difficulty region. Hereinafter, the shape measurement of the measuring object S in the third auxiliary function of the posture adjustment is referred to as simple measurement. The resolution of the main stereoscopic shape data in the simple measurement may be lower than the resolution of the main stereoscopic shape data in the shape measurement processing.

According to the simple measurement in the first example of the third auxiliary function of the posture adjustment described above, the accuracy of the main stereoscopic shape data in the simple measurement may be lower than the accuracy of the main stereoscopic shape data in the shape measurement processing. Thus, the number of acquisitions of the pattern image necessary for the generation of the main stereoscopic shape data is reduced and the processing time of the CPU 210 is reduced, whereby the defective portion of the main stereoscopic shape data in the simple measurement can be determined in a short time. In other words, the measurement difficulty region can be determined at high speed.

Therefore, the posture of the measuring object S can be appropriately adjusted in a short time when the shape of the measuring object S is complex and there is a need to repeat the posture adjustment of the measuring object S.

As described above, the measuring object S is irradiated with only the coded measurement light and a rough shape of the measuring object S is measured without irradiating the measuring object S with the striped measurement light in the simple measurement, whereas the measuring object S is sequentially irradiated with the coded measurement light and the striped measurement light and the shape of the measuring object S is accurately measured in the shape measurement processing.

The number of emissions N of the coded measurement light in the simple measurement may be set to be smaller than the number of emissions N of the coded measurement light in the shape measurement processing. For example, N may be set to 5 in the simple measurement, and N may be set to 8 in the shape measurement processing. In this case, the number of acquisitions of the pattern image is further reduced and the processing time of the CPU 210 is further reduced, whereby the defective portion of the main stereoscopic shape data in the simple measurement can be determined in a shorter time.

(2) Second Example of Third Auxiliary Function of Posture Adjustment

When a second example of the third auxiliary function of the posture adjustment is executed after preparing for the shape measurement of FIG. 23, the CPU 210 of FIG. 1 irradiates the measuring object S with the measurement light, in which a plurality of types of measurement light are combined, from the light projecting unit 110 to generate the main stereoscopic shape data of the measuring object S. When generating the main stereoscopic shape data of the measuring object S, the CPU 210 determines the measurement difficulty region based on the main stereoscopic shape data. The determined measurement difficulty region is superimposed and displayed on the image of the measuring object S, similarly to the case of the second auxiliary function of the posture adjustment.

If the posture of the measuring object S is not appropriate, the second example of the third auxiliary function of the posture adjustment is again executed after the posture adjustment of the measuring object S is carried out. If the posture of the measuring object S is appropriate, the shape measurement processing of FIGS. 30 to 32 is executed. In the shape measurement processing, the CPU 210 irradiates the measuring object S with the measurement light in which plurality of types of measurement light are combined from the light projecting unit 110 to generate the main stereoscopic shape data of the measuring object S.

The measurement light in the simple measurement is set so that the main stereoscopic shape data can be generated at higher speed than the measurement light in the shape measurement processing. According to one setting example, for example, the measuring object S is irradiated with the coded measurement light (see FIGS. 11A to 11D) and is also irradiated with the sinusoidal measurement light (see FIGS. 8A to 8D) from the light projecting unit 110 in the simple measurement. In the shape measurement processing, on the other hand, the measuring object S is irradiated with the coded measurement light and the striped measurement light (FIGS. 9A to 9C) from the light projecting unit 110.

According to another setting example, for example, the measuring object S is irradiated with the coded measurement light and is also irradiated with the striped measurement light from the light projecting unit 110 in the simple measurement and the shape measurement processing. The width in the X direction of each bright portion of the striped measurement light in the simple measurement is set to be greater than the width in the X direction of each bright portion of the striped measurement light in the shape measurement processing. For example, the width in the X direction of each bright portion of the striped measurement light in the simple measurement is 6 units, and the width in the X direction of each dark portion of the striped measurement light is 10 units. On the other hand, the width in the X direction of each bright portion of the striped measurement light in the shape measurement processing is 3 units, and the width in the X direction of each dark portion of the striped measurement light is 13 units.

According to another further setting example, for example, the measuring object S is irradiated with the coded measurement light and is also irradiated with the striped measurement light from the light projecting unit 110 in the simple measurement and the shape measurement processing. The movement distance in the X direction of the striped measurement light in the simple measurement is set to be greater than the movement distance in the X direction of the striped measurement light in the shape measurement processing. For example, the movement distance in the X direction of the striped measurement light in the simple measurement is 2 units. On the other hand, the movement distance in the X direction of the striped measurement light in the shape measurement processing is 1 unit.

According to the simple measurement in the second example of the third auxiliary function of the posture adjustment described above, the number of acquisitions of the pattern image necessary for the generation of the main stereoscopic shape data is reduced and the processing time of the CPU 210 is reduced so that the main stereoscopic shape data is generated at high speed. The defective portion of the main stereoscopic shape data in the simple measurement thus can be determined in a short time. In other words, the measurement difficulty region can be determined at high speed. Therefore, the posture of the measuring object S can be appropriately adjusted in a short time when the shape of the measuring object S is complex and there is a need to repeat the posture adjustment of the measuring object S.

(3) Third Example of Third Auxiliary Function of Posture Adjustment

When a third example of the third auxiliary function of the posture adjustment is executed after preparing for the shape measurement of FIG. 23, the CPU 210 of FIG. 1 irradiates the measuring object S with the measurement light from the light projecting unit 110. The control board 150 of FIG. 1 performs decimation of pixel data corresponding to the light receiving signal from the light receiving unit 120.

In this case, the pixel data in the X direction may be decimated, the pixel data in the Y direction may be decimated, or the pixel data in the X direction and the Y direction may be decimated. Alternatively, the pixel data may be decimated by binning processing. The exposure time of the light receiving unit 120 may be shortened. The frame rate of the light receiving unit 120 thus can be increased, and the transfer speed of the pixel data from the control board 150 to the CPU 210 can be increased.

The CPU 210 generates the main stereoscopic shape data of the measuring object S based on the pixel data after the decimation. The CPU 210 also generates the main stereoscopic shape data and determines the measurement difficulty region based on the main stereoscopic shape data. The determined measurement difficulty region is superimposed and displayed on the image of the measuring object S, similarly to the case of the second auxiliary function of the posture adjustment.

If the posture of the measuring object S is not appropriate, the third example of the third auxiliary function of the posture adjustment is again executed after the posture adjustment of the measuring object S is carried out. If the posture of the measuring object S is appropriate, the shape measurement processing of FIGS. 30 to 32 is executed. In the shape measurement processing, the CPU 210 irradiates the measuring object S with the measurement light from the light projecting unit 110 to generate the main stereoscopic shape data of the measuring object S.

According to the simple measurement in the third example of the third auxiliary function of the posture adjustment described above, the accuracy of the main stereoscopic shape data in the simple measurement may be lower than the accuracy of the main stereoscopic shape data in the shape measurement processing. The pixel data is thus transferred at high speed, whereby the CPU 210 can generate the main stereoscopic shape data at high speed. The processing time of the CPU 210 is also reduced. The defective portion of the main stereoscopic shape data in the simple measurement thus can be determined in a short time. In other words, the measurement difficulty region can be determined at high speed. Therefore, the posture of the measuring object S can be appropriately adjusted in a short time when the shape of the measuring object S is complex and there is a need to repeat the posture adjustment of the measuring object S.

(4) Fourth Example of Third Auxiliary Function of Posture Adjustment

In a fourth example of the third auxiliary function of the posture adjustment, the ROI is set in advance by the user, as shown in the example of FIGS. 77A and 77B. When the fourth example of the third auxiliary function of the posture adjustment is executed after preparing for the shape measurement of FIG. 23, the CPU 210 of FIG. 1 irradiates the measuring object S corresponding to at least the region in which the ROI is set with the measurement light from the light projecting unit 110. The control board 150 of FIG. 1 transfers the pixel data corresponding to the light receiving signal from the light receiving unit 120 to the CPU 210.

In this case, the pixel data to be transferred is reduced as compared to the case of irradiating all the portions of the measuring object S with the measurement light and acquiring the images of all the portions. The frame rate of the light receiving unit 120 thus can be increased, and the transfer speed of the pixel data from the control board 150 to the CPU 210 can be enhanced. As a result, the main stereoscopic shape data can be generated at high speed.

The CPU 210 generates the main stereoscopic shape data of the measuring object S based on the pixel data, and determines the measurement difficulty region based on the main stereoscopic shape data. The determined measurement difficulty region is superimposed and displayed on the image of the measuring object S, similarly to the case of the second auxiliary function of the posture adjustment.

If the posture of the measuring object S is not appropriate, the fourth example of the third auxiliary function of the posture adjustment is again executed after the posture adjustment of the measuring object S is carried out. If the posture of the measuring object S is appropriate, the shape measurement processing of FIGS. 30 to 32 is executed. In the shape measurement processing, the CPU 210 irradiates the measuring object S with the measurement light from the light projecting unit 110 to generate the main stereoscopic shape data of the measuring object S.

According to the simple measurement in the fourth example of the third auxiliary function of the posture adjustment described above, the amount of data of the main stereoscopic shape data in the simple measurement may be smaller than the amount of data of the main stereoscopic shape data in the shape measurement processing. The frame rate of the light receiving unit 120 is thus enhanced and the processing time of the CPU 210 is reduced. Since the main stereoscopic shape data is generated at high speed, whether or not the portion of the measuring object S corresponding to the specified position of the main stereoscopic shape data in the simple measurement includes the defective portion can be determined in a short time. In other words, the measurement difficulty region can be determined at high speed. Therefore, the posture of the measuring object S can be appropriately adjusted in a short time when the shape of the measuring object S is complex and there is a need to repeat the posture adjustment of the measuring object S.

The first to fourth examples of the third auxiliary function of the posture adjustment may be executed in combination. In this case, the main stereoscopic shape data is generated at higher speed, and thus the measurement difficulty region can be determined at a higher speed. As a result, the posture of the measuring object S can be appropriately adjusted in a shorter time.

The generation of the main stereoscopic shape data in the simple measurement may be carried out for every predetermined time. In this case, the CPU 210 sequentially determines the measurement difficulty region for every predetermined time based on the generated main stereoscopic shape data. According to such a configuration, when the posture of the measuring object is changed, the measurement difficulty region on the image of the measuring object S displayed on the display section 400 is sequentially updated following the change in the posture of the measuring object S.

Figure 84:
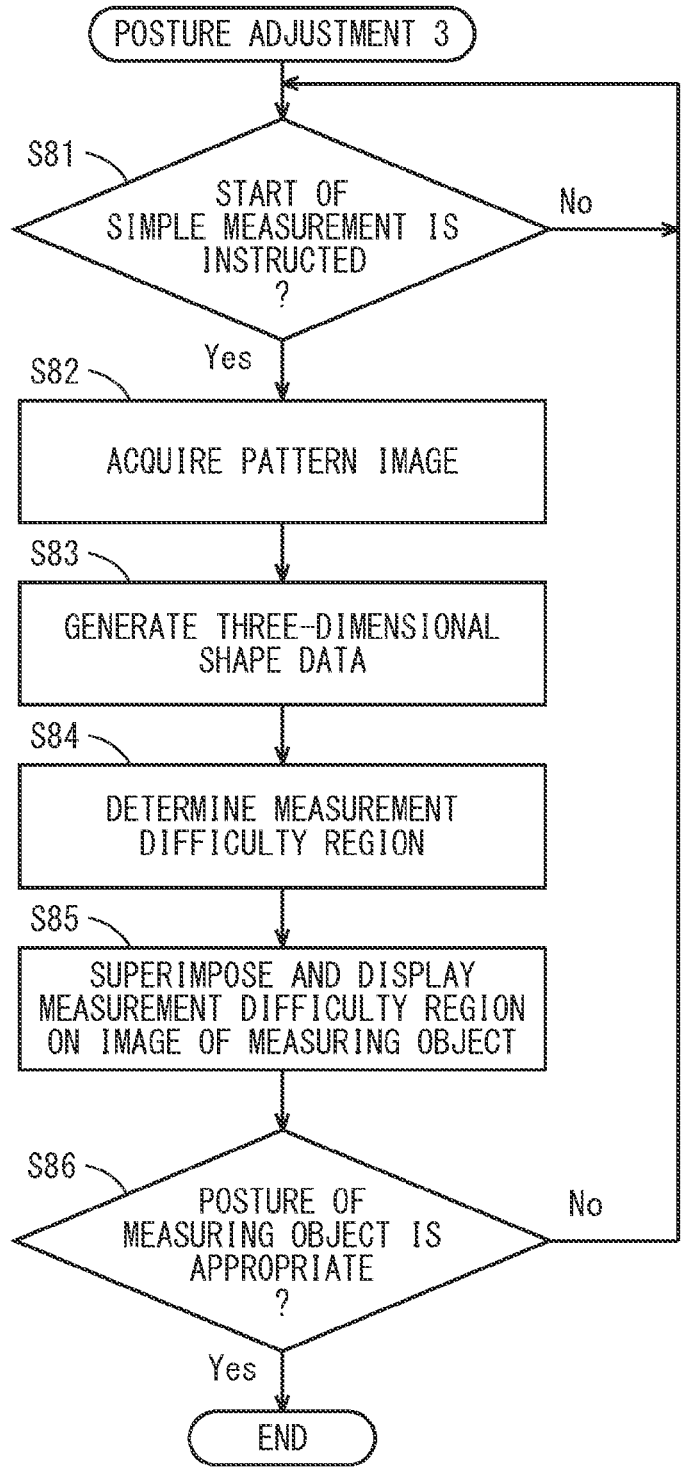
FIG. 84 is a flowchart showing the procedure for the posture adjustment based on a third auxiliary function of the posture adjustment.

(5) Procedure for Posture Adjustment Based on Third Auxiliary Function of Posture Adjustment The posture adjustment based on the third auxiliary function of the posture adjustment is executed after preparing for the shape measurement of FIG. 23. FIG. 84 is a flowchart showing the procedure for the posture adjustment based on the third auxiliary function of the posture adjustment. The procedure for the posture adjustment based on the third auxiliary function of the posture adjustment will be described with reference to FIGS. 1, 2, and 84. The user instructs the start of the simple measurement to the CPU 210 after the preparation of the shape measurement is finished. The CPU 210 determines whether or not the start of the simple measurement is instructed by the user (step S81).

If the start of the simple measurement is not instructed in step S81, the CPU 210 waits until the start of the simple measurement is instructed. The user can prepare for the shape measurement before instructing the start of the simple measurement. If the start of the simple measurement is instructed in step S81, the CPU 210 irradiates the measuring object S with the measurement light from the light projecting unit 110 and acquires the pattern image of the measuring object S (step S82). As described above, the acquisition of the pattern image in the simple measurement is carried out at higher speed than the acquisition of the pattern image in the shape measurement processing performed afterward. The acquired pattern image is stored in the working memory 230.

The CPU 210 processes the acquired pattern image with a predetermined measurement algorithm to generate the main stereoscopic shape data indicating the stereoscopic shape of the measuring object S (step S83). The generated main stereoscopic shape data is stored in the working memory 230.

The CPU 210 determines the measurement difficulty region (step S84), and displays the determined measurement difficulty region on the display section 400 by superimposing on the image of the measuring object S (step S85).

The CPU 210 then determines whether or not the posture of the measuring object S is appropriate based on the instruction of the user (step S86). The user can instruct the CPU 210 whether or not the posture of the measuring object S is appropriate.

If the posture of the measuring object S is not appropriate in step S86, the CPU 210 returns to the processing of step S81. The CPU 210 then waits until the start of the simple measurement is instructed, and the user can adjust the posture of the measuring object S so that the posture of the measuring object S becomes appropriate before again instructing the start of the simple measurement.

If the posture of the measuring object S is appropriate in step S86, the user instructs the CPU 210 that the posture of the measuring object S is appropriate. The CPU 210 then terminates the procedure for the posture adjustment based on the third auxiliary function of the posture adjustment. The CPU 210 then executes the shape measurement processing of FIGS. 30 to 32.

Thus, the posture of the measuring object S can be reliably adjusted after the defective portion of the main stereoscopic shape data in the simple measurement is determined by the CPU 210 and before the measuring object S is irradiated with the measurement light by the light projecting unit 110. The posture of the measuring object S thus can be easily adjusted to a state appropriate for the shape measurement before carrying out the shape measurement processing of the measuring object S.

In the simple measurement, the measuring object S may be irradiated with the measurement light from both light projecting units 110A, 110B. In this case, the measurement difficulty region can be reduced as compared to the case where the measuring object S is irradiated with the measurement light from one of the light projecting units 110A, 110B.

The defective portion of the synthesized stereoscopic shape data generated when the measuring object S is irradiated with the measurement light from both light projecting units 110A, 110B is determined, and the image of the measuring object S is displayed on the display section 400 so that the determined defective portion can be identified. The user thus can recognize the measurement difficulty region when the measuring object S is irradiated with the measurement light from both light projecting units 110A, 110B. As a result, the posture of the measuring object S can be easily and accurately adjusted to a state appropriate for the shape measurement before carrying out the shape measurement processing.

(6) Effects

In the shape measuring device 500 according to the present embodiment, the defective portion of the main stereoscopic shape data is determined by the simple measurement before carrying out the shape measurement processing. The main stereoscopic shape data in the simple measurement has lower accuracy or smaller amount of data than the main stereoscopic shape data in the shape measurement processing. Therefore, the determination of the defective portion can be carried out in a short time. The image of the measuring object S is displayed on the display section 400 such that the defective portion can be identified. The user thus can easily recognize the measurement difficulty portion.

If the measurement position of the measuring object S is included in the measurement difficulty portion, the user can easily adjust the posture of the measuring object S to a state appropriate for the shape measurement before carrying out the shape measurement processing of the measuring object S. In the shape measurement processing, the main stereoscopic shape data having higher accuracy or larger amount of data than the main stereoscopic shape data in the simple measurement is generated. The shape of the measuring object S thus can be measured at high accuracy.

In the shape measuring device 500 according to the present embodiment, the generation of the main stereoscopic shape data in the simple measurement is carried out for every predetermined time, and the measurement difficulty region is sequentially determined for every predetermined time based on the generated main stereoscopic shape data. The measurement difficulty region on the image of the measuring object S displayed on the display section 400 is sequentially updated. Since the generation of the main stereoscopic shape data in the simple measurement is carried out at higher speed than the generation of the main stereoscopic shape data in the shape measurement processing, the measurement difficulty region can be updated at a shorter interval.

Thus, when the user operates the stage operation unit 145 to adjust the posture of the measuring object S, the measurement difficulty region displayed on the display section 400 is updated at a shorter interval following the change in the posture of the measuring object S. The user thus can adjust the posture of the measuring object S in a short time while checking the measurement difficulty region displayed on the display section 400. As a result, the posture of the measuring object S can be easily adjusted in a short time to a state appropriate for the shape measurement before the shape measurement processing of the measuring object S.

[11] Correspondence Relationship Between Each Constituent Element of the Claims and Each Portion of the Embodiment An example of correspondence of each constituent element of the claims and each portion of the embodiment will be hereinafter described, but the present invention is not limited to the following example.

The measuring object S serves as a measuring object, the stage 140 serves as a stage, the light projecting unit 110 serves as a light projecting unit or a first light projecting unit, and the light projecting unit 110 or the illumination light source 320 (illumination light output unit 130) serves as a second light projecting unit. The measurement light source 111 serves as a measurement light source, the pattern generating portion 112 serves as a pattern generating portion, the light receiving unit 120 serves as a light receiving unit, and the CPU 210 serves as first and second data generating units, a synthesizing unit, a determination unit, and a processing device. The stage drive unit 146 serves as a relative distance changing unit, the display section 400 serves as a display section, the operation unit 250 serves as an operation unit, and the shape measuring device 500 serves as a shape measuring device. The measurement light serves as first light, the illumination light serves as second light, the main stereoscopic shape data serves as first stereoscopic shape data, the sub-stereoscopic shape data serves as second stereoscopic shape data, the texture image data serves as state data, and the angle α serves as a first angle.

Various other elements having the configuration or the function described in the claims may be used for the constituent elements of the claims.

The present invention can be effectively used in the various shape measuring devices, shape measuring methods, and shape measuring programs.

What is claimed is:

1. A shape measuring device comprising:
   a stage on which a measuring object is mounted;
   a light projecting unit configured to irradiate the measuring object mounted on the stage with first light for shape measurement obliquely from above and irradiate the measuring object mounted on the stage with second light for surface state imaging from above or obliquely from above;
   a light receiving unit arranged above the stage and configured to receive the first light and the second light reflected by the measuring object mounted on the stage and output a light receiving signal indicating a light receiving amount;
   a first data generating unit configured to generate first stereoscopic shape data indicating a stereoscopic shape of the measuring object by a triangular distance measuring method based on the light receiving signal corresponding to the first light output by the light receiving unit;
   a relative distance changing unit for changing a focus position of the light receiving unit by changing a relative distance between the light receiving unit and the stage in an optical axis direction of the light receiving unit;
   a second data generating unit for generating a plurality of pieces of data based on a plurality of light receiving signals corresponding to the second light output by the light receiving unit while changing the focus position by the relative distance changing unit, and generating state data indicating a surface state of the measuring object by extracting and synthesizing a plurality of data portions obtained while focusing on each of a plurality of portions of the measuring object from the plurality of pieces of generated data;
   a synthesizing unit for generating synthesized data indicating an image in which the stereoscopic shape and the surface state of the measuring object are synthesized by synthesizing the first stereoscopic shape data generated by the first data generating unit and the state data generated by the second data generating unit; and
   a display section for displaying an image in which the stereoscopic shape and the surface state of the measuring object are synthesized based on the synthesized data generated by the synthesizing unit.

2. The shape measuring device according to claim 1, wherein
   the light projecting unit includes a first light projecting unit configured to irradiate the measuring object with the first light, and a second light projecting unit configured to irradiate the measuring object with the second light,
   the first light projecting unit includes a measurement light source for emitting light, and a pattern generating portion for generating the first light by converting the light emitted from the measurement light source to light having a pattern for shape measurement, the first light projecting unit being arranged to emit the first light in a direction tilted by a first angle, which is greater than 0 degrees and smaller than 90 degrees with respect to an optical axis of the light receiving unit, and
   the second light projecting unit is arranged to emit the second light having a uniform light amount distribution in a direction parallel to the optical axis of the light receiving unit or in a direction tilted by a second angle, which is smaller than the first angle, with respect to the optical axis of the light receiving unit.

3. The shape measuring device according to claim 1, wherein the light projecting unit includes
a measurement light source for emitting light, and
a pattern generating portion configured to generate the first light by converting the light emitted from the measurement light source to light having a pattern for shape measurement, and to generate the second light by converting the light emitted from the measurement light source to light having a uniform light amount distribution.

4. The shape measuring device according to claim 1, further comprising:
an operation unit for individually setting a first light amount condition defined by adjusting an intensity of the first light irradiated from the light projecting unit or an exposure time of the light receiving unit when receiving the first light reflected by the measuring object, and a second light amount condition defined by adjusting an intensity of the second light or an exposure time of the light receiving unit when receiving the second light reflected by the measuring object, and for receiving an instruction of the shape measurement from a user, wherein
when receiving the instruction of the shape measurement from the user by the operation unit, the first data generating unit generates the first stereoscopic shape data of the measuring object based on the light receiving signal output by the light receiving unit when the measuring object is irradiated with the first light in the first light amount condition, and the second data generating unit generates the state data of the measuring object based on the light receiving signal output by the light receiving unit when the measuring object is irradiated with the second light in the second light amount condition.

5. The shape measuring device according to claim 4, wherein
the operation unit is configured to be operable by the user to select execution of any of first and second operation modes, and
in the first operation mode, the second data generating unit generates a plurality of pieces of data based on a plurality of light receiving signals corresponding to the second light output by the light receiving unit with the focus position changed to a plurality of positions by the relative distance changing unit, and generates the state data by extracting and synthesizing a plurality of data portions obtained while focusing on each of a plurality of portions of the measuring object from the plurality of pieces of generated data, and
in the second operation mode, the second data generating unit generates single data based on the light receiving signal corresponding to the second light output by the light receiving unit with the focus position of the light receiving unit fixed, and generates the state data from the single data.

6. The shape measuring device according to claim 5, wherein
the operation unit is configured to be operable by the user to select execution of a third operation mode, and
in the third operation mode, the second data generating unit generates a plurality of pieces of data based on a plurality of light receiving signals corresponding to the second light output by the light receiving unit with the exposure time of the light receiving unit or the intensity of the second light changed, synthesizes the plurality of pieces of generated data so that a dynamic range of the light receiving unit is enlarged, and generates the state data from the synthesized data.

7. The shape measuring device according to claim 6, wherein
the operation unit is configured to be operable by the user to select execution of a fourth operation mode, and
in the fourth operation mode, the second data generating unit generates a plurality of pieces of data based on a plurality of light receiving signals corresponding to the second light output by the light receiving unit with the exposure time of the light receiving unit or the intensity of the second light changed and the focus position changed to a plurality of positions by the relative distance changing unit, synthesizes the plurality of pieces of generated data so that the dynamic range of the light receiving unit is enlarged, and generates the state data by extracting and synthesizing a plurality of data portions obtained while focusing on each of a plurality of portions of the measuring object from the synthesized data.

8. The shape measuring device according to claim 1, wherein
the second data generating unit generates second stereoscopic shape data indicating a stereoscopic shape of the measuring object based on a relative distance between the light receiving unit and the stage by the relative distance changing unit, and
the shape measuring device further includes a determination unit for determining, among the plurality of portions of the first stereoscopic shape data generated by the first data generating unit, a portion where deviation from the second stereoscopic shape data generated by the second data generating unit is greater than a predetermined threshold value.

9. The shape measuring device according to claim 8, wherein the determination unit displays a stereoscopic image of the measuring object on the display section so that the portion of the first stereoscopic shape data where the deviation from the second stereoscopic shape data is greater than the predetermined threshold value is identified based on the first stereoscopic shape data generated by the first data generating unit.

10. The shape measuring device according to claim 8, wherein
the determination unit interpolates, among the first stereoscopic shape data, the data of the portion where the deviation from the second stereoscopic shape data is greater than the predetermined threshold value based on data of other portions.

11. The shape measuring device according to claim 8, wherein the determination unit interpolates the data of the portion where the deviation from the second stereoscopic shape data is greater than the predetermined threshold value of the first stereoscopic shape data based on data of a corresponding portion of the second stereoscopic shape data.

12. The shape measuring device according to claim 8, wherein the determination unit determines a defective portion of the first stereoscopic shape data, and interpolates the defective portion based on data of a corresponding portion of the second stereoscopic shape data.

13. A shape measuring method comprising the steps of:
irradiating a measuring object mounted on a stage with first light for shape measurement obliquely from above by a light projecting unit;
receiving the first light reflected by the measuring object mounted on the stage with a light receiving unit at a position above the stage, and outputting a light receiving signal indicating a light receiving amount;

generating first stereoscopic shape data indicating a stereoscopic shape of the measuring object by a triangular distance measuring method based on the output light receiving signal corresponding to the first light;

changing a focus position of the light receiving unit by changing a relative distance between the light receiving unit and the stage in an optical axis direction of the light receiving unit;

irradiating the measuring object mounted on the stage with second light for surface state imaging from above or obliquely from above by the light projecting unit;

receiving the second light reflected by the measuring object mounted on the stage with the light receiving unit at the position above the stage, and outputting a light receiving signal indicating the light receiving amount;

generating a plurality of pieces of data based on a plurality of output light receiving signals corresponding to the second light while changing the focus position;

generating state data indicating a surface state of the measuring object by extracting and synthesizing a plurality of data portions obtained while focusing on each of a plurality of portions of the measuring object from the plurality of pieces of generated data;

generating synthesized data utilizing a synthesizing unit indicating an image in which the stereoscopic shape and the surface state of the measuring object are synthesized by synthesizing the generated first stereoscopic shape data and the generated state data; and displaying on a display section an image in which the stereoscopic shape and the surface state of the measuring object are synthesized based on the generated synthesized data.

14. A shape measuring non-transitory program executable by a processing device, the non-transitory program causing the processing device to execute the processing of:

irradiating a measuring object mounted on a stage with first light for shape measurement obliquely from above by a light projecting unit;

receiving the first light reflected by the measuring object mounted on the stage with a light receiving unit at a position above the stage, and outputting a light receiving signal indicating a light receiving amount;

generating first stereoscopic shape data indicating a stereoscopic shape of the measuring object by a triangular distance measuring method based on the output light receiving signal corresponding to the first light;

changing a focus position of the light receiving unit by changing a relative distance between the light receiving unit and the stage in an optical axis direction of the light receiving unit;

irradiating the measuring object mounted on the stage with second light for surface state imaging from above or obliquely from above by the light projecting unit;

receiving the second light reflected by the measuring object mounted on the stage with the light receiving unit at a position above the stage, and outputting a light receiving signal indicating the light receiving amount;

generating a plurality of pieces of data based on a plurality of output light receiving signals corresponding to the second light while changing the focus position;

generating state data indicating a surface state of the measuring object by extracting and synthesizing a plurality of data portions obtained while focusing on each of a plurality of portions of the measuring object from the plurality of pieces of generated data;

generating synthesized data indicating an image in which the stereoscopic shape and the surface state of the measuring object are synthesized by synthesizing the generated first stereoscopic shape data and the generated state data; and displaying on a display section an image in which the stereoscopic shape and the surface state of the measuring object are synthesized based on the generated synthesized data.

* * * * *